US011820507B2

(12) United States Patent
Raptopoulos et al.

(10) Patent No.: US 11,820,507 B2
(45) Date of Patent: Nov. 21, 2023

(54) METHODS AND SYSTEMS FOR TRANSPORTATION USING UNMANNED AERIAL VEHICLES

(71) Applicant: Matternet, Inc., Mountain View, CA (US)

(72) Inventors: Andreas Raptopoulos, Palo Alto, CA (US); Ido Baruchin, San Francisco, CA (US); Christopher Winson Hinkle, San Francisco, CA (US); Derek X. Ma, Redwood City, CA (US); James Standish O'Sullivan, Palo Alto, CA (US)

(73) Assignee: Matternet, Inc., Mountain View, CA (US)

( * ) Notice: Subject to any disclaimer, the term of this patent is extended or adjusted under 35 U.S.C. 154(b) by 0 days.

(21) Appl. No.: 17/526,922

(22) Filed: Nov. 15, 2021

(65) Prior Publication Data
US 2022/0073204 A1    Mar. 10, 2022

Related U.S. Application Data

(63) Continuation of application No. 16/843,602, filed on Apr. 8, 2020, now abandoned, which is a continuation
(Continued)

(51) Int. Cl.
*B64C 39/02* (2023.01)
*G08G 5/02* (2006.01)
(Continued)

(52) U.S. Cl.
CPC ......... *B64C 39/024* (2013.01); *G05D 1/0676* (2013.01); *G08G 5/0069* (2013.01);
(Continued)

(58) Field of Classification Search
CPC .. B64C 39/024; G05D 1/0676; G08G 5/0069; G08G 5/025; B64U 10/13; B64U 50/19;
(Continued)

(56) References Cited

U.S. PATENT DOCUMENTS 3,894,613 A    7/1975   Elizondo
4,603,823 A    8/1986   Ayoub
(Continued)

FOREIGN PATENT DOCUMENTS

CN    201604796 U    10/2010
CN    203047531 U    7/2013
(Continued)

OTHER PUBLICATIONS

Non-Final Office Action received for U.S. Appl. No. 29/727,221, dated Mar. 2, 2021, 10 pages.
(Continued)

*Primary Examiner* — Medhat Badawi
(74) *Attorney, Agent, or Firm* — DLA Piper LLP (US)

(57) ABSTRACT

An unmanned aerial vehicle (UAV) for transporting a payload is provided. The UAV comprises a body and one or more propellers rotatably connected to the body. The UAV further comprises a battery mounted to the body. The battery is releasable from the bottom of the UAV. The UAV further comprises a payload container mounted to the body. The payload container is releasable from the bottom of the UAV to a landing platform associated with a UAV station.

8 Claims, 56 Drawing Sheets

Related U.S. Application Data of application No. 15/347,442, filed on Nov. 9, 2016, now abandoned.

(60) Provisional application No. 62/253,627, filed on Nov. 10, 2015.

(51) Int. Cl.

| | | |
|---|---|---|
| *G08G 5/00* | (2006.01) | |
| *G05D 1/06* | (2006.01) | |
| *B64U 10/13* | (2023.01) | |
| *B64U 50/19* | (2023.01) | |
| *B64U 80/86* | (2023.01) | |
| *B64U 101/60* | (2023.01) | |

(52) U.S. Cl.
CPC ............ *G08G 5/025* (2013.01); *B64U 10/13* (2023.01); *B64U 50/19* (2023.01); *B64U 80/86* (2023.01); *B64U 2101/60* (2023.01)

(58) Field of Classification Search
CPC ....... B64U 80/86; B64U 2101/60; B64F 1/32; B64F 1/22
See application file for complete search history.

(56) References Cited

U.S. PATENT DOCUMENTS

| | | | |
|---|---|---|---|
| 4,834,321 A | 5/1989 | Granger | |
| 5,720,330 A | 2/1998 | Schmalz, Jr. | |
| D401,593 S | 11/1998 | Nishimura et al. | |
| 5,897,079 A | 4/1999 | Specht et al. | |
| D421,439 S | 3/2000 | Giuntoli | |
| D442,947 S | 5/2001 | Warner et al. | |
| 6,311,107 B1 | 10/2001 | Curto et al. | |
| 6,575,204 B1 | 6/2003 | Godfrey et al. | |
| 6,685,140 B2 | 2/2004 | Carroll et al. | |
| 7,035,856 B1 | 4/2006 | Morimoto et al. | |
| D521,327 S | 5/2006 | Neal et al. | |
| 7,097,137 B2 | 8/2006 | Mcdonnell et al. | |
| D531,626 S | 11/2006 | Agrawal et al. | |
| 7,343,232 B2 | 3/2008 | Duggan et al. | |
| 7,429,997 B2 | 9/2008 | Givon | |
| D625,299 S * | 10/2010 | Kits van Heyningen ... D14/233 | |
| D626,667 S | 11/2010 | Jonsson et al. | |
| D651,327 S | 12/2011 | Hsiao et al. | |
| 8,082,102 B2 | 12/2011 | Ravenscroft et al. | |
| 8,256,705 B2 * | 9/2012 | Smith ................ B64C 39/064 | |
| | | | 244/12.1 |
| 8,256,715 B2 * | 9/2012 | Ballard ............... B64C 39/024 | |
| | | | 244/123.1 |
| 8,297,552 B2 | 10/2012 | Ying | |
| 8,302,902 B2 * | 11/2012 | Lynas ................. B64D 41/007 | |
| | | | 244/102 R |
| 8,308,522 B2 * | 11/2012 | Van de Rostyne .... A63H 27/06 | |
| | | | 244/17.23 |
| 8,336,805 B1 * | 12/2012 | Zapata ................ B63H 11/113 | |
| | | | 244/4 A |
| 8,350,403 B2 * | 1/2013 | Carroll ................. F03D 9/255 | |
| | | | 290/55 |
| D676,583 S * | 2/2013 | Holland ..................... D26/2 | |
| D676,984 S * | 2/2013 | Holland ..................... D26/2 | |
| 8,376,279 B2 * | 2/2013 | Parks ................. B64C 39/024 | |
| | | | 244/49 |
| 8,378,881 B2 * | 2/2013 | LeMire ................. G01S 13/87 | |
| | | | 342/63 |
| 8,382,029 B2 * | 2/2013 | Roy .................... B64C 39/001 | |
| | | | 244/23 C |
| 8,414,026 B1 * | 4/2013 | Lou ...................... B64D 25/06 | |
| | | | 296/68.1 |
| 8,430,709 B1 * | 4/2013 | Wong ................... A63H 27/02 | |
| | | | 446/57 |
| 8,434,920 B2 * | 5/2013 | Jones .................. G05D 1/0094 | |
| | | | 362/85 |
| 8,443,727 B2 * | 5/2013 | Roemerman ......... F42C 15/005 | |
| | | | 244/3.17 |
| 8,464,511 B1 * | 6/2013 | Ribarov .................. H02K 7/14 | |
| | | | 60/268 |
| 8,473,125 B2 * | 6/2013 | Rischmuller .......... G08C 17/02 | |
| | | | 701/3 |
| 8,479,883 B2 * | 7/2013 | Tkebuchava ............. B64D 1/22 | |
| | | | 182/4 |
| 8,492,692 B2 * | 7/2013 | Fisher .................... F42B 15/10 | |
| | | | 244/175 |
| 8,496,200 B2 * | 7/2013 | Yoeli .................. B64C 29/0025 | |
| | | | 244/23 B |
| 8,505,430 B2 * | 8/2013 | Miralles .................. F41F 3/042 | |
| | | | 89/1.816 |
| 8,511,606 B1 * | 8/2013 | Lutke ..................... B64C 39/028 | |
| | | | 320/109 |
| 8,521,339 B2 * | 8/2013 | Gariepy ............... G05D 1/0094 | |
| | | | 701/2 |
| 8,561,937 B2 * | 10/2013 | Goodarzi ............. B64C 39/064 | |
| | | | 244/23 C |
| 8,564,148 B1 * | 10/2013 | Novak .................... F03D 80/70 | |
| | | | 290/55 |
| 8,576,064 B1 * | 11/2013 | Mitchell .......... B64D 11/00155 | |
| | | | 340/539.11 |
| 8,590,828 B2 * | 11/2013 | Marcus ................. B64C 39/024 | |
| | | | 244/23 B |
| 8,608,103 B2 * | 12/2013 | Martin ................. B64C 39/026 | |
| | | | 244/4 A |
| 8,622,708 B2 * | 1/2014 | Kusters ................. F01D 5/3038 | |
| | | | 416/220 R |
| 8,646,720 B2 * | 2/2014 | Shaw ...................... B64C 27/20 | |
| | | | 244/17.23 |
| 8,661,980 B1 * | 3/2014 | Roemerman ......... F42B 33/001 | |
| | | | 102/489 |
| 8,695,916 B2 * | 4/2014 | Martin .................. B64C 39/026 | |
| | | | 244/4 A |
| 8,702,466 B2 * | 4/2014 | Cheng ..................... A63H 27/12 | |
| | | | 244/17.23 |
| 8,708,285 B1 * | 4/2014 | Carreiro ................ F42B 12/60 | |
| | | | 244/190 |
| 8,727,280 B1 * | 5/2014 | Lutke ..................... B64C 39/024 | |
| | | | 244/123.11 |
| 8,753,155 B2 * | 6/2014 | Olm ........................ B60B 15/00 | |
| | | | 280/5.2 |
| 8,764,397 B1 * | 7/2014 | Wittig ..................... B64C 27/32 | |
| | | | 416/61 |
| 8,794,566 B2 * | 8/2014 | Hutson ................. B64C 27/006 | |
| | | | 244/50 |
| 8,800,605 B2 * | 8/2014 | Barlow ................. B29C 70/085 | |
| | | | 138/140 |
| 8,821,123 B2 * | 9/2014 | Camci ................... F04D 29/541 | |
| | | | 416/189 |
| 8,855,952 B2 * | 10/2014 | Spierling ............. F01D 21/003 | |
| | | | 702/58 |
| 8,862,288 B2 | 10/2014 | Vavrina et al. | |
| 8,874,283 B1 * | 10/2014 | Cavote ..................... H04N 7/185 | |
| | | | 701/28 |
| 8,888,035 B2 * | 11/2014 | Lind, Jr. .................. B64C 37/00 | |
| | | | 244/49 |
| 8,899,903 B1 * | 12/2014 | Saad ..................... B64C 39/024 | |
| | | | 320/109 |
| 8,903,568 B1 * | 12/2014 | Wang ...................... B64D 47/08 | |
| | | | 701/2 |
| 8,908,573 B1 * | 12/2014 | Wang ...................... H04L 5/003 | |
| | | | 370/280 |
| 8,909,391 B1 * | 12/2014 | Peeters ................. G16H 20/10 | |
| | | | 709/201 |
| 8,910,905 B2 * | 12/2014 | DeVaul ...................... B64B 1/58 | |
| | | | 244/31 |
| 8,919,691 B2 * | 12/2014 | Lindmark ............... B64C 27/52 | |
| | | | 244/101 |
| 8,939,056 B1 * | 1/2015 | Neal, III .................. F42B 15/22 | |
| | | | 89/1.51 |
| 8,956,487 B2 * | 2/2015 | Gallet ..................... F01D 5/282 | |
| | | | 464/181 |

(56) References Cited

U.S. PATENT DOCUMENTS

| | | | |
|---|---|---|---|
| 8,960,591 B2* | 2/2015 | Pancotti | B64C 29/0033 244/66 |
| 8,979,016 B2* | 3/2015 | Hayden, III | B64C 27/20 244/17.11 |
| 8,983,682 B1* | 3/2015 | Peeters | B64C 39/024 701/2 |
| 8,985,504 B2* | 3/2015 | Tao | B64C 9/18 244/3.28 |
| 8,992,161 B2* | 3/2015 | Hindle | F16F 15/023 415/119 |
| 9,004,393 B2* | 4/2015 | Barrett-Gonzales | B64C 27/24 244/3.28 |
| 9,004,396 B1* | 4/2015 | Colin | B64D 47/08 244/17.23 |
| 9,045,226 B2* | 6/2015 | Piasecki | B64C 27/32 |
| 9,056,676 B1* | 6/2015 | Wang | G05D 1/0684 |
| 9,056,679 B1* | 6/2015 | Langston | B64D 1/12 |
| 9,061,763 B1* | 6/2015 | Christensen | A63H 17/28 |
| 9,085,362 B1* | 7/2015 | Kilian | B64C 25/68 |
| 9,109,575 B2* | 8/2015 | Weddendorf | F03D 5/00 |
| 9,126,693 B1* | 9/2015 | Shi | G05B 11/42 |
| 9,139,310 B1* | 9/2015 | Wang | B64C 39/02 |
| D741,751 S * | 10/2015 | Klaptocz | D21/441 |
| 9,171,479 B2* | 10/2015 | Martin | G09B 9/042 |
| 9,174,732 B2* | 11/2015 | Jensen | F03D 5/00 |
| 9,174,733 B1* | 11/2015 | Burgess | B64D 9/00 |
| 9,187,174 B2* | 11/2015 | Shaw | B64C 27/28 |
| 9,195,950 B2* | 11/2015 | Schenken | G06Q 10/06312 |
| 9,199,729 B1* | 12/2015 | Uebori | B64C 39/02 |
| 9,205,291 B2* | 12/2015 | Hawass | A62C 3/0228 |
| 9,211,025 B1* | 12/2015 | Elhawwashy | A47G 29/20 |
| 9,217,417 B2* | 12/2015 | Taneja | F03D 80/70 |
| 9,218,316 B2* | 12/2015 | Bernstein | G05D 1/0016 |
| 9,244,147 B1* | 1/2016 | Soundararajan | G05D 1/0202 |
| 9,262,929 B2* | 2/2016 | Roy | G08G 5/0034 |
| 9,266,609 B1* | 2/2016 | Kunz | B64C 29/0008 |
| D751,025 S * | 3/2016 | Howell | D12/326 |
| 9,284,062 B2* | 3/2016 | Wang | B60L 53/53 |
| 9,290,267 B2 | 3/2016 | Metreveli | |
| 9,290,277 B2* | 3/2016 | You | G05D 1/0038 |
| 9,305,317 B2* | 4/2016 | Grokop | H04R 3/002 |
| 9,321,531 B1* | 4/2016 | Takayama | B64D 1/12 |
| D756,842 S * | 5/2016 | Ashjaee | D12/16.1 |
| 9,359,075 B1* | 6/2016 | von Flotow | B64D 1/12 |
| 9,364,930 B2* | 6/2016 | Hethcock | B23K 26/38 |
| 9,376,208 B1* | 6/2016 | Gentry | G08G 5/006 |
| 9,384,668 B2 | 7/2016 | Raptopoulos et al. | |
| 9,387,928 B1* | 7/2016 | Gentry | G08G 5/0091 |
| 9,388,794 B2* | 7/2016 | Weddendorf | F03D 5/00 |
| 9,409,642 B1* | 8/2016 | Pingree | B64C 11/28 |
| 9,415,870 B1* | 8/2016 | Beckman | B64D 31/12 |
| 9,446,845 B2* | 9/2016 | Mintchev | A63H 27/12 |
| 9,457,901 B2* | 10/2016 | Bertrand | B64C 27/20 |
| 9,481,457 B2* | 11/2016 | Alber | B64C 39/024 |
| 9,499,263 B2* | 11/2016 | Youngblood | A63H 27/12 |
| 9,527,588 B1* | 12/2016 | Rollefstad | B64C 39/024 |
| 9,527,597 B1* | 12/2016 | Sada | B64C 39/024 |
| 9,527,600 B2* | 12/2016 | Russ | F01D 15/10 |
| 9,540,105 B2 | 1/2017 | Markov | |
| 9,545,852 B2* | 1/2017 | Streett | B60L 53/12 |
| 9,545,991 B1* | 1/2017 | Alley | B64C 39/024 |
| 9,550,567 B1* | 1/2017 | Erdozain, Jr. | B64C 29/02 |
| 9,555,886 B1* | 1/2017 | Hawass | B64C 39/04 |
| 9,567,076 B2* | 2/2017 | Zhang | B29C 43/18 |
| 9,580,173 B1* | 2/2017 | Burgess | B64D 1/22 |
| 9,586,683 B1* | 3/2017 | Buchmueller | G05D 1/0005 |
| 9,589,448 B1* | 3/2017 | Schneider | F41H 11/00 |
| 9,606,028 B2* | 3/2017 | Detweiller | G01S 15/08 |
| 9,611,032 B2* | 4/2017 | Briod | B64C 17/00 |
| 9,623,967 B2* | 4/2017 | Mallard | B64C 39/024 |
| 9,630,710 B2 | 4/2017 | Hutson | |
| 9,643,722 B1* | 5/2017 | Myslinski | G06V 20/52 |
| 9,663,236 B1* | 5/2017 | Shiosaki | B64D 31/06 |
| 9,677,564 B1* | 6/2017 | Woodworth | B64D 45/00 |
| 9,682,772 B2* | 6/2017 | Yoon | B60F 5/003 |
| 9,688,400 B2 | 6/2017 | Hutson | |
| 9,725,158 B2* | 8/2017 | Yan | B64C 1/08 |
| 9,731,820 B1* | 8/2017 | Godlasky | B64C 39/024 |
| 9,751,597 B1* | 9/2017 | Low | B63B 35/00 |
| 9,752,718 B2* | 9/2017 | Wittig | F16M 11/2042 |
| 9,760,072 B2* | 9/2017 | Hall | H04L 41/28 |
| 9,764,829 B1* | 9/2017 | Beckman | B64C 27/08 |
| 9,764,836 B1* | 9/2017 | Elzinga | B64U 30/20 |
| 9,764,839 B2* | 9/2017 | Whitaker | B64C 39/022 |
| 9,778,660 B2* | 10/2017 | Von Novak | G05D 1/042 |
| D803,097 S * | 11/2017 | Wang | D12/16.1 |
| D803,328 S * | 11/2017 | Lee | D21/441 |
| 9,809,305 B2* | 11/2017 | Buchmueller | G01C 21/3423 |
| 9,815,552 B1* | 11/2017 | Welsh | B64C 27/26 |
| 9,817,396 B1* | 11/2017 | Takayama | G05D 1/0088 |
| 9,817,405 B2* | 11/2017 | Li | G08G 5/0026 |
| 9,821,910 B1* | 11/2017 | Suiter | B64D 43/00 |
| 9,823,664 B2* | 11/2017 | Krogh | G01C 15/002 |
| 9,829,886 B2* | 11/2017 | Yang | B64D 31/06 |
| 9,832,910 B2* | 11/2017 | Pal | B64D 41/007 |
| D805,018 S * | 12/2017 | Sobota Rodriguez | D12/345 |
| 9,834,305 B2* | 12/2017 | Taylor | B64C 29/00 |
| 9,836,053 B2 | 12/2017 | Wang et al. | |
| 9,840,327 B1* | 12/2017 | Frank | B64D 1/10 |
| 9,840,339 B1* | 12/2017 | O'Brien | G05D 1/0094 |
| 9,840,380 B2 | 12/2017 | Saad et al. | |
| 9,842,505 B2 | 12/2017 | Wang et al. | |
| 9,845,165 B2* | 12/2017 | Michalski | G08G 5/0013 |
| 9,849,981 B1* | 12/2017 | Burgess | B64D 1/12 |
| D808,860 S * | 1/2018 | Tian | D12/16.1 |
| 9,863,276 B2* | 1/2018 | Prokup | F01D 25/24 |
| 9,878,786 B2* | 1/2018 | Chan | B64D 27/26 |
| 9,878,787 B2* | 1/2018 | Chan | G06Q 30/04 |
| 9,878,800 B2* | 1/2018 | Russ | H02K 7/183 |
| 9,894,158 B2* | 2/2018 | Ranasinghe | H04W 40/248 |
| 9,896,195 B2* | 2/2018 | Ou | B64C 25/06 |
| 9,902,491 B2* | 2/2018 | Chan | B64C 27/37 |
| 9,902,504 B2* | 2/2018 | Moore | H01F 38/14 |
| 9,908,616 B1* | 3/2018 | Horn | B64C 29/0033 |
| 9,908,618 B2* | 3/2018 | Vaughn | B64C 39/024 |
| 9,908,619 B1* | 3/2018 | Beckman | B64C 17/02 |
| 9,908,632 B1* | 3/2018 | Kimchi | B64C 1/30 |
| 9,914,537 B2* | 3/2018 | Wu | B64D 47/08 |
| 9,914,538 B2* | 3/2018 | Yu | B64C 27/20 |
| 9,928,474 B1* | 3/2018 | Evans | G06Q 10/083 |
| D814,350 S * | 4/2018 | Joo | D12/16.1 |
| D814,971 S * | 4/2018 | Huang | D12/328 |
| 9,932,110 B2* | 4/2018 | McNally | B64C 39/024 |
| 9,944,386 B1* | 4/2018 | Reichert | B64C 25/54 |
| 9,944,387 B2* | 4/2018 | Vander Lind | B64C 27/26 |
| 9,950,791 B2* | 4/2018 | Blomberg | B64F 1/368 |
| D817,251 S * | 5/2018 | Kim | D12/325 |
| D817,252 S * | 5/2018 | Kim | D12/325 |
| 9,957,045 B1* | 5/2018 | Daly | B64C 39/024 |
| 9,959,773 B2 | 5/2018 | Raptopoulos et al. | |
| 9,969,495 B2* | 5/2018 | Gil | B64F 1/22 |
| 9,970,526 B1* | 5/2018 | Bortoli | F16H 57/038 |
| 9,975,442 B2* | 5/2018 | Lee | B64F 1/12 |
| 9,975,629 B2* | 5/2018 | Horn | B64C 27/467 |
| 9,975,633 B1* | 5/2018 | Johnson | B64C 3/00 |
| 9,975,651 B1* | 5/2018 | Eck | B64F 1/32 |
| 9,977,435 B2* | 5/2018 | Fisher | G08G 5/0091 |
| 9,981,744 B2* | 5/2018 | Choo | B64C 39/02 |
| D820,768 S * | 6/2018 | Wang | D12/328 |
| 9,988,159 B2* | 6/2018 | Russ | F02C 7/36 |
| 9,994,305 B1* | 6/2018 | Moldovan | B64C 31/024 |
| 9,997,079 B2* | 6/2018 | Paczan | B64C 39/024 |
| 10,011,353 B1* | 7/2018 | Beckman | G05D 1/0858 |
| 10,013,886 B2* | 7/2018 | Blomberg | G08G 5/0082 |
| 10,028,606 B1* | 7/2018 | Ritchie | A47G 29/1214 |
| 10,035,581 B2* | 7/2018 | Wood | B64C 1/30 |
| 10,046,853 B2* | 8/2018 | Vander Mey | B64C 27/08 |
| 10,059,436 B1* | 8/2018 | Robertson | B64C 35/00 |
| 10,062,048 B2* | 8/2018 | High | B65D 88/12 |
| 10,062,292 B2* | 8/2018 | Blomberg | G08G 5/0013 |
| 10,078,330 B2* | 9/2018 | Bhageria | G05D 1/104 |
| D830,281 S * | 10/2018 | Maqbool | D12/326 |
| 10,093,416 B2* | 10/2018 | Alnafisah | B64C 39/024 |

(56) References Cited

U.S. PATENT DOCUMENTS

| | | | |
|---|---|---|---|
| 10,093,417 B2 * | 10/2018 | Meringer | B64C 27/10 |
| 10,093,430 B2 * | 10/2018 | Russ | H02K 7/183 |
| 10,099,783 B1 * | 10/2018 | Nilson | B64C 17/02 |
| 10,102,757 B2 * | 10/2018 | Manley | G08G 5/0091 |
| 10,104,300 B2 * | 10/2018 | Guo | H04N 23/695 |
| 10,109,209 B1 * | 10/2018 | Buchmueller | G08G 5/0013 |
| 10,113,568 B2 * | 10/2018 | Bannon | F15B 15/14 |
| D836,802 S * | 12/2018 | Armitage | D26/2 |
| 10,144,504 B1 * | 12/2018 | Selwa | G05G 1/01 |
| 10,148,121 B2 * | 12/2018 | Ehrmantraut | B64U 10/25 |
| D857,278 S * | 8/2019 | Luo | D26/88 |
| 10,434,885 B2 * | 10/2019 | Antonini | B60L 53/18 |
| D893,765 S * | 8/2020 | Yang | D26/2 |
| D895,853 S * | 9/2020 | Lin | D26/2 |
| D896,667 S * | 9/2020 | Chapman | D10/65 |
| 11,046,457 B1 * | 6/2021 | Huntzinger | B64F 1/20 |
| 11,180,263 B2 * | 11/2021 | Ratajczak | B60L 50/66 |
| 11,355,022 B2 * | 6/2022 | Surace | G05D 1/042 |
| 11,378,982 B2 * | 7/2022 | Wang | B64F 1/02 |
| 11,440,679 B2 * | 9/2022 | Cowden | B64F 1/007 |
| 2003/0057327 A1 | 3/2003 | Carroll | |
| 2004/0059497 A1 | 3/2004 | Sankrithi | |
| 2004/0249519 A1 | 12/2004 | Frink et al. | |
| 2004/0256519 A1 | 12/2004 | Ellis et al. | |
| 2005/0006525 A1 | 1/2005 | Byers et al. | |
| 2006/0097111 A1 | 5/2006 | Wood et al. | |
| 2006/0284003 A1 | 12/2006 | Chu | |
| 2007/0262195 A1 | 11/2007 | Bulaga et al. | |
| 2009/0214079 A1 | 8/2009 | Hamza et al. | |
| 2009/0299551 A1 | 12/2009 | So et al. | |
| 2010/0012769 A1 | 1/2010 | Alber et al. | |
| 2010/0140416 A1 | 6/2010 | Ohanian et al. | |
| 2010/0308180 A1 | 12/2010 | Helou, Jr. | |
| 2011/0084162 A1 | 4/2011 | Goossen et al. | |
| 2011/0130636 A1 | 6/2011 | Daniel et al. | |
| 2011/0174925 A1 | 7/2011 | Ying | |
| 2011/0202206 A1 | 8/2011 | Karthikeyan et al. | |
| 2011/0264311 A1 | 10/2011 | Lee et al. | |
| 2012/0019522 A1 | 1/2012 | Lawrence et al. | |
| 2012/0035788 A1 | 2/2012 | Trepagnier et al. | |
| 2012/0078451 A1 | 3/2012 | Ohtomo et al. | |
| 2012/0152654 A1 | 6/2012 | Marcus et al. | |
| 2012/0153087 A1 * | 6/2012 | Collette | B64C 39/024 244/135 R |
| 2012/0155714 A1 * | 6/2012 | Douglass | G06V 10/143 382/110 |
| 2012/0158280 A1 | 6/2012 | Ravenscroft | |
| 2012/0177497 A1 * | 7/2012 | Huang | A63H 27/02 416/204 R |
| 2012/0187243 A1 * | 7/2012 | Goldie | B64F 1/027 244/110 E |
| 2012/0199129 A1 * | 8/2012 | Kenyon | F04D 17/16 128/205.25 |
| 2012/0200703 A1 * | 8/2012 | Nadir | H04N 25/443 348/E7.085 |
| 2012/0226394 A1 * | 9/2012 | Marcus | A62B 5/00 701/2 |
| 2012/0231696 A1 * | 9/2012 | Xu | A63H 27/12 446/37 |
| 2012/0234969 A1 * | 9/2012 | Savoye | H05K 7/142 244/17.11 |
| 2012/0237083 A1 * | 9/2012 | Lange | G06F 16/29 382/103 |
| 2012/0237341 A1 * | 9/2012 | Simon | B64C 3/14 415/211.2 |
| 2012/0241553 A1 * | 9/2012 | Wilke | B64C 27/08 244/17.23 |
| 2012/0248259 A1 * | 10/2012 | Page | B64C 29/02 244/7 B |
| 2012/0267472 A1 * | 10/2012 | Pratzovnick | B64C 39/024 244/119 |
| 2012/0271461 A1 * | 10/2012 | Spata | G01C 23/00 706/45 |
| 2012/0280080 A1 * | 11/2012 | Lubenow | B64C 39/024 244/49 |
| 2012/0280091 A1 * | 11/2012 | Saiz | B64C 27/30 244/6 |
| 2012/0294719 A1 * | 11/2012 | Payne | B64C 29/0025 416/170 R |
| 2012/0298790 A1 * | 11/2012 | Bitar | B64D 27/24 244/17.11 |
| 2012/0300070 A1 * | 11/2012 | Ohtomo | G03B 15/006 348/E7.085 |
| 2013/0020429 A1 * | 1/2013 | Kroo | B64C 39/12 244/6 |
| 2013/0068876 A1 * | 3/2013 | Radu | B60F 5/02 244/2 |
| 2013/0068892 A1 * | 3/2013 | Bin Desa | B64C 39/024 701/4 |
| 2013/0105635 A1 * | 5/2013 | Alzu'bi | B64C 39/024 244/23 A |
| 2013/0110325 A1 * | 5/2013 | Sapp, II | G05D 1/0858 701/3 |
| 2013/0134254 A1 * | 5/2013 | Moore | B64D 1/16 244/17.11 |
| 2013/0145404 A1 * | 6/2013 | Ohayon | H04N 21/6143 725/62 |
| 2013/0146716 A1 * | 6/2013 | Gettinger | B64C 5/12 244/49 |
| 2013/0200207 A1 * | 8/2013 | Pongratz | B64C 39/024 244/2 |
| 2013/0206921 A1 * | 8/2013 | Paduano | B64D 27/02 244/7 C |
| 2013/0214088 A1 * | 8/2013 | Shachor | B64C 27/04 244/17.17 |
| 2013/0217439 A1 * | 8/2013 | Ulman | H04N 5/33 455/556.1 |
| 2013/0231208 A1 * | 9/2013 | Buono | B64D 27/24 475/5 |
| 2013/0233964 A1 * | 9/2013 | Woodworth | G05D 1/104 244/175 |
| 2013/0248656 A1 * | 9/2013 | Mohamadi | H04W 72/046 244/190 |
| 2013/0251525 A1 * | 9/2013 | Saiz | B64C 27/26 416/23 |
| 2013/0264412 A1 * | 10/2013 | Dyrla | B64C 27/82 244/17.13 |
| 2013/0270394 A1 * | 10/2013 | Downs | G05D 1/0027 283/67 |
| 2013/0277074 A1 * | 10/2013 | Corujo Pardo | A62C 3/02 169/53 |
| 2013/0287577 A1 * | 10/2013 | Lin | B64C 27/08 416/210 R |
| 2013/0297102 A1 * | 11/2013 | Hughes | G05D 1/0202 701/3 |
| 2013/0325325 A1 * | 12/2013 | Djugash | G01C 21/3697 701/425 |
| 2013/0327890 A1 * | 12/2013 | Lyons | B64C 25/56 244/107 |
| 2014/0008485 A1 * | 1/2014 | Lundgren | B64C 39/024 244/17.23 |
| 2014/0012732 A1 * | 1/2014 | Lindores | A01B 79/005 705/37 |
| 2014/0018976 A1 * | 1/2014 | Goossen | G05D 1/0022 701/2 |
| 2014/0023773 A1 * | 1/2014 | Sadakane | A23D 9/00 426/660 |
| 2014/0025229 A1 * | 1/2014 | Levien | A63H 27/12 701/2 |
| 2014/0025234 A1 * | 1/2014 | Levien | G06Q 10/08 701/3 |
| 2014/0032034 A1 * | 1/2014 | Raptopoulos | H04B 7/18506 701/25 |
| 2014/0034776 A1 * | 2/2014 | Hutson | F16M 11/123 244/17.17 |
| 2014/0037278 A1 * | 2/2014 | Wang | H04N 23/6812 396/55 |
| 2014/0039733 A1 * | 2/2014 | Ren | G08G 5/0013 701/14 |

(56) References Cited

U.S. PATENT DOCUMENTS

| | | | |
|---|---|---|---|
| 2014/0055613 A1* | 2/2014 | Ohtomo | H04N 7/18 348/144 |
| 2014/0061362 A1* | 3/2014 | Olm | B64C 39/005 244/2 |
| 2014/0061376 A1* | 3/2014 | Fisher | B64C 27/00 244/62 |
| 2014/0061392 A1* | 3/2014 | Karem | B64C 11/26 244/7 R |
| 2014/0062754 A1* | 3/2014 | Mohamadi | F41H 11/136 89/1.13 |
| 2014/0069666 A1* | 3/2014 | Vetesnik | A62C 3/0235 169/53 |
| 2014/0099853 A1* | 4/2014 | Condon | G05D 1/0033 446/37 |
| 2014/0111332 A1* | 4/2014 | Przybylko | G06Q 10/00 340/573.6 |
| 2014/0117149 A1* | 5/2014 | Zhou | B64C 27/20 244/17.23 |
| 2014/0124621 A1* | 5/2014 | Godzdanker | E01F 3/00 244/110 E |
| 2014/0129056 A1* | 5/2014 | Criado | B64C 31/024 701/4 |
| 2014/0131507 A1* | 5/2014 | Kalantari | A63H 33/005 244/2 |
| 2014/0131510 A1* | 5/2014 | Wang | B64C 25/06 244/17.23 |
| 2014/0138476 A1* | 5/2014 | Bystrom | B64C 29/00 244/17.13 |
| 2014/0138477 A1* | 5/2014 | Keennon | G05D 1/005 244/17.23 |
| 2014/0151502 A1* | 6/2014 | Kosheleff | B64F 1/007 244/114 R |
| 2014/0158816 A1* | 6/2014 | DeLorean | B64C 39/10 244/12.4 |
| 2014/0175214 A1* | 6/2014 | Lundgren | B64C 29/0033 244/17.23 |
| 2014/0204360 A1* | 7/2014 | Dowski, Jr. | G01S 17/74 356/4.01 |
| 2014/0218239 A1* | 8/2014 | Sharawi | G05D 1/0094 342/422 |
| 2014/0222246 A1* | 8/2014 | Mohamadi | G05D 1/0669 701/2 |
| 2014/0240498 A1* | 8/2014 | Ohtomo | H04N 7/185 348/144 |
| 2014/0246213 A1* | 9/2014 | Karagounis | A62C 99/0072 169/53 |
| 2014/0246545 A1* | 9/2014 | Markov | B64D 1/16 244/190 |
| 2014/0254896 A1* | 9/2014 | Zhou | G05D 1/0278 705/16 |
| 2014/0263823 A1* | 9/2014 | Wang | B64C 27/08 244/17.23 |
| 2014/0299708 A1* | 10/2014 | Green | B64D 27/24 244/17.11 |
| 2014/0303814 A1* | 10/2014 | Burema | A01C 21/00 901/1 |
| 2014/0316243 A1* | 10/2014 | Niedermeyer | G06Q 10/083 600/407 |
| 2014/0316608 A1* | 10/2014 | Alber | B64C 19/00 701/2 |
| 2014/0316616 A1* | 10/2014 | Kugelmass | B64C 39/024 701/8 |
| 2014/0319272 A1* | 10/2014 | Casado Magana | B60L 3/12 244/110 E |
| 2014/0339355 A1* | 11/2014 | Olm | B64C 39/024 244/17.23 |
| 2014/0339371 A1* | 11/2014 | Yates | B64D 39/00 244/53 R |
| 2014/0343752 A1* | 11/2014 | Fisher | G05D 1/0011 701/2 |
| 2014/0353422 A1* | 12/2014 | Westbrook, Sr. | B64D 7/00 244/17.21 |
| 2014/0356174 A1* | 12/2014 | Wang | F01D 5/021 416/204 R |
| 2014/0374532 A1* | 12/2014 | Duffy | G05D 1/104 244/2 |
| 2015/0006005 A1* | 1/2015 | Yu | G06Q 50/28 701/22 |
| 2015/0012154 A1* | 1/2015 | Senkel | B64C 27/473 701/4 |
| 2015/0012708 A1* | 1/2015 | Rubinstein | G06F 15/8015 711/125 |
| 2015/0041598 A1* | 2/2015 | Nugent | H02J 50/30 244/53 R |
| 2015/0097079 A1* | 4/2015 | Frolov | B64D 41/007 290/55 |
| 2015/0097950 A1* | 4/2015 | Wang | H04N 23/54 348/208.11 |
| 2015/0120094 A1* | 4/2015 | Kimchi | B64D 1/12 701/3 |
| 2015/0120126 A1* | 4/2015 | So | B64D 1/22 701/26 |
| 2015/0129716 A1* | 5/2015 | Yoffe | B64F 1/0297 244/110 C |
| 2015/0137523 A1* | 5/2015 | Sia | F03D 9/30 290/55 |
| 2015/0158599 A1* | 6/2015 | Sisko | B64F 1/20 244/114 R |
| 2015/0160658 A1* | 6/2015 | Reedman | B64C 39/028 701/3 |
| 2015/0175276 A1* | 6/2015 | Koster | B64F 1/00 244/114 R |
| 2015/0179219 A1* | 6/2015 | Gao | G06T 7/254 386/278 |
| 2015/0181819 A1* | 7/2015 | Celebi | B64C 39/024 701/2 |
| 2015/0183528 A1* | 7/2015 | Walsh | A01M 29/16 244/114 R |
| 2015/0184637 A1* | 7/2015 | Vander Lind | F03D 7/042 290/44 |
| 2015/0205301 A1* | 7/2015 | Gilmore | G01S 19/13 701/11 |
| 2015/0225071 A1* | 8/2015 | Tighe | B64C 29/02 244/12.4 |
| 2015/0254988 A1* | 9/2015 | Wang | G05D 1/0214 701/3 |
| 2015/0259066 A1* | 9/2015 | Johannesson | B64C 39/024 244/17.27 |
| 2015/0266570 A1* | 9/2015 | Metreveli | B64D 1/22 244/17.23 |
| 2015/0274286 A1* | 10/2015 | Kereth | B64C 27/10 244/17.21 |
| 2015/0286216 A1* | 10/2015 | Miwa | G05D 1/0808 701/4 |
| 2015/0314864 A1* | 11/2015 | Cserfoi | B64C 27/08 416/129 |
| 2015/0314869 A1* | 11/2015 | Lemus Martin | B64C 39/024 701/3 |
| 2015/0321755 A1* | 11/2015 | Martin | B64C 39/024 244/17.23 |
| 2015/0323930 A1* | 11/2015 | Downey | G08G 5/0056 701/14 |
| 2015/0331427 A1* | 11/2015 | Chaudary | G05D 1/0858 701/4 |
| 2015/0332206 A1* | 11/2015 | Trew | G06Q 10/0836 705/330 |
| 2015/0336667 A1* | 11/2015 | Srivastava | G05D 1/1062 701/2 |
| 2015/0336668 A1* | 11/2015 | Pasko | G05D 1/0005 701/2 |
| 2015/0336669 A1* | 11/2015 | Kantor | G08G 5/0013 701/3 |
| 2015/0339933 A1* | 11/2015 | Batla | G08G 5/0082 701/120 |
| 2015/0344136 A1* | 12/2015 | Dahlstrom | B05B 13/005 239/722 |
| 2015/0353192 A1* | 12/2015 | Morrison | B64D 31/06 244/17.23 |

(56) References Cited

U.S. PATENT DOCUMENTS

| | | | |
|---|---|---|---|
| 2015/0360797 A1* | 12/2015 | Melish | B64F 1/025 244/110 C |
| 2015/0370251 A1* | 12/2015 | Siegel | G05D 1/104 701/2 |
| 2015/0377405 A1* | 12/2015 | Down | B64C 17/06 244/76 R |
| 2015/0379874 A1* | 12/2015 | Ubhi | G08G 5/0039 701/3 |
| 2016/0000003 A1* | 1/2016 | Wendte | A01M 7/006 239/159 |
| 2016/0001875 A1* | 1/2016 | Daler | B64C 27/20 244/17.11 |
| 2016/0001883 A1* | 1/2016 | Sanz | H02J 7/0044 244/17.23 |
| 2016/0011592 A1* | 1/2016 | Zhang | B64C 39/024 244/114 R |
| 2016/0016652 A1* | 1/2016 | Barrett | B64D 27/02 244/15 |
| 2016/0023755 A1* | 1/2016 | Elshafei | G08G 5/025 244/17.23 |
| 2016/0023773 A1* | 1/2016 | Himmelmann | B64D 27/24 903/903 |
| 2016/0028230 A1* | 1/2016 | Elfman | B60L 15/2045 318/504 |
| 2016/0031275 A1* | 2/2016 | Monroe | B63G 8/001 244/2 |
| 2016/0031554 A1* | 2/2016 | Eshkenazy | A63H 27/12 244/6 |
| 2016/0031564 A1* | 2/2016 | Yates | B64D 39/00 307/9.1 |
| 2016/0046369 A1* | 2/2016 | Watkins | B64C 27/24 244/7 A |
| 2016/0068264 A1* | 3/2016 | Ganesh | G08G 5/0026 701/4 |
| 2016/0069578 A1* | 3/2016 | O'Donnell | A62C 99/0072 454/341 |
| 2016/0070264 A1* | 3/2016 | Hu | G05D 1/102 701/2 |
| 2016/0070265 A1* | 3/2016 | Liu | B64C 39/024 701/25 |
| 2016/0101856 A1* | 4/2016 | Kohstall | B64C 39/024 244/17.23 |
| 2016/0107751 A1* | 4/2016 | D'Andrea | B64D 45/00 701/4 |
| 2016/0114887 A1* | 4/2016 | Zhou | G06Q 20/321 348/148 |
| 2016/0122015 A1* | 5/2016 | Hutson | B64C 37/00 244/17.23 |
| 2016/0122038 A1* | 5/2016 | Fleischman | G06T 7/73 244/114 R |
| 2016/0123182 A1* | 5/2016 | Samaritano | B64C 27/08 416/43 |
| 2016/0129998 A1* | 5/2016 | Welsh | B64C 29/0025 244/12.3 |
| 2016/0130000 A1* | 5/2016 | Rimanelli | B64C 37/00 244/2 |
| 2016/0137304 A1* | 5/2016 | Phan | B64D 27/24 244/17.23 |
| 2016/0144954 A1* | 5/2016 | Daigle | B64C 39/024 244/17.23 |
| 2016/0144982 A1* | 5/2016 | Sugumaran | B64F 1/00 244/108 |
| 2016/0159496 A1* | 6/2016 | O'Toole | B64F 1/005 244/110 E |
| 2016/0167505 A1* | 6/2016 | Suzuki | F16C 33/585 180/65.51 |
| 2016/0176514 A1* | 6/2016 | Lavagen | B64C 39/02 244/50 |
| 2016/0185466 A1* | 6/2016 | Dreano, Jr. | G06Q 10/083 705/26.81 |
| 2016/0191793 A1* | 6/2016 | Yang | A63H 30/04 348/207.11 |
| 2016/0194069 A1* | 7/2016 | Taylor | B64C 39/024 244/17.23 |
| 2016/0196756 A1* | 7/2016 | Prakash | B64D 35/02 701/3 |
| 2016/0200415 A1* | 7/2016 | Cooper | B64C 39/001 244/17.15 |
| 2016/0200437 A1* | 7/2016 | Ryan | B64C 39/024 244/99.2 |
| 2016/0200438 A1* | 7/2016 | Bokeno | B64C 39/024 244/2 |
| 2016/0207619 A1* | 7/2016 | Darrow, Jr. | F16H 1/28 |
| 2016/0207627 A1* | 7/2016 | Hoareau | G06Q 10/0832 |
| 2016/0209839 A1* | 7/2016 | Hoareau | G08G 5/0069 |
| 2016/0214713 A1* | 7/2016 | Cragg | B64D 47/08 |
| 2016/0214727 A1* | 7/2016 | Hamel | B64C 21/06 |
| 2016/0216073 A1* | 7/2016 | Bonen | F41G 7/007 |
| 2016/0221671 A1* | 8/2016 | Fisher | B64C 27/32 |
| 2016/0221683 A1* | 8/2016 | Roberts | B64D 27/02 |
| 2016/0229530 A1* | 8/2016 | Welsh | A63H 27/12 |
| 2016/0229534 A1* | 8/2016 | Hutson | B64C 37/00 |
| 2016/0236775 A1* | 8/2016 | Eshkenazy | B64C 29/0025 |
| 2016/0236789 A1* | 8/2016 | Burns | B64C 39/02 |
| 2016/0239798 A1* | 8/2016 | Borley | B64C 39/024 |
| 2016/0243762 A1* | 8/2016 | Fleming | G06F 30/00 |
| 2016/0244157 A1* | 8/2016 | Welsh | B64C 27/28 |
| 2016/0244187 A1* | 8/2016 | Byers | G06Q 10/0832 |
| 2016/0251088 A1* | 9/2016 | Melish | B64F 1/0295 244/110 C |
| 2016/0257423 A1* | 9/2016 | Martin | B64C 39/024 |
| 2016/0263775 A1* | 9/2016 | Boon | F03D 1/0675 |
| 2016/0272313 A1* | 9/2016 | Chan | A63H 27/12 |
| 2016/0272316 A1* | 9/2016 | Nelson | B64C 39/024 |
| 2016/0280369 A1* | 9/2016 | Pounds | G05D 1/0816 |
| 2016/0284221 A1* | 9/2016 | Hinkle | B64U 10/13 |
| 2016/0286128 A1* | 9/2016 | Zhou | H04L 65/1069 |
| 2016/0288901 A1* | 10/2016 | Fisher | H02K 7/14 |
| 2016/0291445 A1* | 10/2016 | Fisher, Sr. | G03B 17/56 |
| 2016/0297545 A1* | 10/2016 | Yang | H04N 7/185 |
| 2016/0307448 A1* | 10/2016 | Salnikov | B64C 39/024 |
| 2016/0311526 A1* | 10/2016 | Geise | B64C 27/52 |
| 2016/0313742 A1* | 10/2016 | Wang | G05D 1/0669 |
| 2016/0318607 A1* | 11/2016 | Desai | B64C 39/024 |
| 2016/0318615 A1* | 11/2016 | Pick | B64D 17/54 |
| 2016/0325834 A1* | 11/2016 | Foster | B64D 27/24 |
| 2016/0327956 A1* | 11/2016 | Zhang | G01C 5/00 |
| 2016/0332747 A1* | 11/2016 | Bradlow | B64D 47/08 |
| 2016/0340006 A1* | 11/2016 | Tang | B63C 9/01 |
| 2016/0340021 A1* | 11/2016 | Zhang | B64C 27/006 |
| 2016/0340049 A1* | 11/2016 | Ferreyra | B64C 39/024 |
| 2016/0355258 A1* | 12/2016 | Williams | B05B 9/04 |
| 2016/0355261 A1* | 12/2016 | Chin | B64C 39/024 |
| 2016/0362173 A1* | 12/2016 | Marion | G01S 15/96 |
| 2016/0364989 A1* | 12/2016 | Speasl | B64U 80/82 |
| 2016/0376029 A1* | 12/2016 | Sekiya | F42B 12/68 244/110 F |
| 2016/0378108 A1* | 12/2016 | Paczan | B64D 31/06 705/330 |
| 2017/0010623 A1* | 1/2017 | Tang | G06V 20/13 |
| 2017/0011333 A1* | 1/2017 | Greiner | G06K 7/10722 |
| 2017/0015417 A1* | 1/2017 | Bishop | B64C 29/04 |
| 2017/0023947 A1* | 1/2017 | McMillion | B64C 39/024 |
| 2017/0023949 A1* | 1/2017 | Fisher | G08G 5/0034 |
| 2017/0030715 A1* | 2/2017 | Song | G01C 19/5783 |
| 2017/0036762 A1* | 2/2017 | Gamble | B64D 5/00 |
| 2017/0057630 A1* | 3/2017 | Schwaiger | B64C 27/026 |
| 2017/0057650 A1* | 3/2017 | Walter-Robinson | H02J 7/0068 |
| 2017/0069214 A1* | 3/2017 | Dupray | G05D 1/104 |
| 2017/0072812 A1* | 3/2017 | Von Novak | B64C 39/024 |
| 2017/0073065 A1* | 3/2017 | Von Novak | H02K 7/1823 |
| 2017/0081043 A1* | 3/2017 | Jones | B64C 39/024 |
| 2017/0084181 A1* | 3/2017 | Wilson | G08G 5/0056 |
| 2017/0091710 A1* | 3/2017 | Van Dyke | G06Q 10/0835 |
| 2017/0096222 A1* | 4/2017 | Spinelli | B64C 27/08 |
| 2017/0104353 A1* | 4/2017 | Zhao | H02J 7/0063 |
| 2017/0106986 A1* | 4/2017 | Sweeny | B64D 17/70 |
| 2017/0113787 A1* | 4/2017 | Hein | B64C 39/022 |
| 2017/0121023 A1* | 5/2017 | High | B64C 39/024 |

(56) References Cited

U.S. PATENT DOCUMENTS

| | | | |
|---|---|---|---|
| 2017/0121034 A1* | 5/2017 | Fisher | H04N 23/57 |
| 2017/0129580 A1* | 5/2017 | Mirzeabasov | B64B 1/06 |
| 2017/0129603 A1* | 5/2017 | Raptopoulos | G08G 5/0069 |
| 2017/0144753 A1* | 5/2017 | Yu | B64C 27/08 |
| 2017/0144754 A1* | 5/2017 | Limvorapun | B64C 39/024 |
| 2017/0144756 A1* | 5/2017 | Rastgaar Aagaah | F41B 11/80 |
| 2017/0154535 A1 | 6/2017 | Downey et al. | |
| 2017/0154536 A1* | 6/2017 | Kreiner | B64C 39/024 |
| 2017/0158340 A1* | 6/2017 | von Flotow | B64F 1/029 |
| 2017/0166309 A1* | 6/2017 | Sekiya | B64C 39/024 |
| 2017/0174335 A1* | 6/2017 | Malloy | B64C 27/20 |
| 2017/0174336 A1* | 6/2017 | Baba | B64C 27/08 |
| 2017/0175413 A1* | 6/2017 | Curlander | B64F 1/222 |
| 2017/0183074 A1* | 6/2017 | Hutson | B64C 39/024 |
| 2017/0185084 A1* | 6/2017 | Wang | G05D 1/0669 |
| 2017/0197719 A1* | 7/2017 | Kwon | B64C 27/20 |
| 2017/0199044 A1* | 7/2017 | Hoareau | G05D 1/104 |
| 2017/0208512 A1* | 7/2017 | Aydin | G05D 1/0202 |
| 2017/0217577 A1* | 8/2017 | Hattar | B64C 27/30 |
| 2017/0217584 A1* | 8/2017 | Elfeky | G05D 1/0858 |
| 2017/0217585 A1* | 8/2017 | Hulsman | B64C 39/024 |
| 2017/0225782 A1* | 8/2017 | Kohstall | B64C 1/063 |
| 2017/0225783 A1* | 8/2017 | Fisher | B64C 39/024 |
| 2017/0225784 A1* | 8/2017 | Hayes | B64C 39/024 |
| 2017/0233069 A1* | 8/2017 | Apkarian | B64C 27/52 244/7 R |
| 2017/0240714 A1* | 8/2017 | Ahmed | C08J 5/249 |
| 2017/0242431 A1* | 8/2017 | Dowlatkhah | G08G 5/0069 |
| 2017/0247107 A1* | 8/2017 | Hauer | B64U 30/20 |
| 2017/0247109 A1* | 8/2017 | Buchmueller | G05D 1/00 |
| 2017/0247110 A1* | 8/2017 | Chappell | B64C 27/52 |
| 2017/0253322 A1* | 9/2017 | Krebs | B64C 39/04 |
| 2017/0253348 A1* | 9/2017 | Ashdown | F41H 13/0006 |
| 2017/0261604 A1 | 9/2017 | Van Voorst | |
| 2017/0261613 A1 | 9/2017 | Van Voorst | |
| 2017/0261999 A1* | 9/2017 | Van Voorst | G05D 1/0088 |
| 2017/0267345 A1* | 9/2017 | Marom | B64D 1/12 |
| 2017/0269594 A1* | 9/2017 | Sydnor | G05D 1/0077 |
| 2017/0271925 A1* | 9/2017 | Plekhanov | H02J 50/10 |
| 2017/0271926 A1* | 9/2017 | Plekhanov | H01Q 21/061 |
| 2017/0291697 A1* | 10/2017 | Kornatowski | B64C 27/006 |
| 2017/0305575 A1* | 10/2017 | Bash | B64F 1/32 |
| 2017/0313418 A1* | 11/2017 | Yoon | B64C 27/32 |
| 2017/0320572 A1* | 11/2017 | High | B64D 1/02 |
| 2017/0328391 A1* | 11/2017 | Matsuda | F16B 2/22 |
| 2017/0328679 A1 | 11/2017 | Smith | |
| 2017/0328680 A1 | 11/2017 | Smith | |
| 2017/0328681 A1 | 11/2017 | Smith | |
| 2017/0328682 A1 | 11/2017 | Smith | |
| 2017/0328683 A1 | 11/2017 | Smith | |
| 2017/0329324 A1* | 11/2017 | Bachrach | G05D 1/0027 |
| 2017/0330478 A1* | 11/2017 | Zhang | G09B 9/08 |
| 2017/0349283 A1* | 12/2017 | Paunicka | B64C 39/024 |
| 2017/0351254 A1* | 12/2017 | Listwin | H04B 7/18506 |
| 2017/0355460 A1* | 12/2017 | Shannon | B64D 17/383 |
| 2017/0359106 A1* | 12/2017 | John Wilson | H04B 7/0617 |
| 2018/0002030 A1* | 1/2018 | Klassen | B64C 1/1407 |
| 2018/0009549 A1* | 1/2018 | Sullivan | B64F 1/22 |
| 2018/0027772 A1* | 2/2018 | Gordon | A01K 57/00 |
| 2018/0029703 A1* | 2/2018 | Simon | B64C 29/0025 |
| 2018/0035606 A1* | 2/2018 | Burdoucci | G05D 1/0094 |
| 2018/0074523 A1* | 3/2018 | Cantrell | B60L 53/68 |
| 2018/0075417 A1* | 3/2018 | Gordon | B64D 1/22 |
| 2018/0086456 A1 | 3/2018 | Burch et al. | |
| 2018/0086457 A1 | 3/2018 | Burch, V et al. | |
| 2018/0088598 A1* | 3/2018 | Lection | B64C 39/024 |
| 2018/0089611 A1 | 3/2018 | Burch et al. | |
| 2018/0089622 A1* | 3/2018 | Burch, V | B64U 50/19 |
| 2018/0092484 A1* | 4/2018 | Lewis | A47G 29/20 |
| 2018/0105289 A1* | 4/2018 | Walsh | G06Q 10/083 |
| 2018/0118361 A1* | 5/2018 | Choi | F02D 41/14 |
| 2018/0141672 A1* | 5/2018 | Bevirt | B64C 39/068 |
| 2018/0147429 A1* | 5/2018 | Won | A62C 3/0242 |
| 2018/0155018 A1* | 6/2018 | Kovac | B64D 45/04 |
| 2018/0194463 A1* | 7/2018 | Hasinski | B64C 39/024 |
| 2018/0233055 A1* | 8/2018 | Damnjanovic | G01S 5/14 |
| 2018/0253979 A1* | 9/2018 | Rey | G08G 5/0069 |
| 2018/0255465 A1* | 9/2018 | Priest | G05D 1/0094 |
| 2018/0260800 A1* | 9/2018 | Caution | G06Q 30/0623 |
| 2018/0275654 A1* | 9/2018 | Merz | G01S 13/935 |
| 2018/0327091 A1* | 11/2018 | Burks | B64C 29/0016 |
| 2018/0329431 A1* | 11/2018 | Cheng | H04N 23/13 |
| 2019/0043370 A1* | 2/2019 | Mulhall | G06Q 50/28 |
| 2019/0161190 A1* | 5/2019 | Gil | B64F 1/32 |
| 2020/0239138 A1* | 7/2020 | Raptopoulos | G08G 5/0069 |
| 2022/0073204 A1* | 3/2022 | Raptopoulos | B64C 39/024 |

FOREIGN PATENT DOCUMENTS

| | | |
|---|---|---|
| CN | 103914076 A | 7/2014 |
| CN | 104903194 A | 9/2015 |
| CN | 104981403 A | 10/2015 |
| EP | 1657611 A1 | 5/2006 |
| EP | 2749984 A2 | 7/2014 |
| JP | 6-149376 A | 5/1994 |
| JP | 2000-515088 A | 11/2000 |
| JP | 2003-127994 A | 5/2003 |
| JP | 2005-265699 A | 9/2005 |
| JP | 2009-57044 A | 3/2009 |
| JP | 2011-230756 A | 11/2011 |
| JP | 2014-500827 A | 1/2014 |
| JP | 2014-40231 A | 3/2014 |
| JP | 2015-42539 A | 3/2015 |
| JP | 3199308 U | 8/2015 |
| JP | 2017-530900 A | 10/2017 |
| WO | 2013/055265 A1 | 4/2013 |
| WO | 2014/068982 A1 | 5/2014 |
| WO | 2015/061008 A1 | 4/2015 |
| WO | 2015/143977 A1 | 10/2015 |
| WO | 2015/155086 A1 | 10/2015 |
| WO | 2015/155087 A1 | 10/2015 |
| WO | 2016/078093 A1 | 5/2016 |
| WO | 2017/213767 A2 | 12/2017 |

OTHER PUBLICATIONS

Office Action received for Canadian Patent Application No. 3,004,947, dated Apr. 21, 2021, 5 pages.

Office Action received for Chinese Patent Application No. 201680071440.3, dated Dec. 14, 2020, 13 pages Official Copy Only) (See Communication under 37 CFR § 1.98(a) (3)).

Office Action received for Chinese Patent Application No. 201680071440.3, dated Oct. 11, 2021, 11 pages Official Copy Only) (See Communication under 37 CFR § 1.98(a) (3)).

Office Action received for European Patent Application No. 16864925.9, dated Apr. 23, 2021, 7 pages.

Office Action received for Japanese Patent Application No. 2018-523769, dated May 29, 2020, 8 pages Official Copy Only) (See Communication under 37 CFR § 1.98(a) (3)).

Office Action received for Japanese Patent Application No. 2020-019271, dated Mar. 29, 2021, 2 pages Official Copy Only) (See Communication under 37 CFR § 1.98(a) (3)).

Office Action received for Japanese Patent Application No. 2020-145779, dated Sep. 3, 2021, 4 pages Official Copy Only) (See Communication under 37 CFR § 1.98(a) (3)).

Advisory Action received for U.S. Appl. No. 15/018,423, dated Jul. 27, 2017, 3 pages.

Extended European Search Report received for European Patent Application No. 16769780.4, dated Oct. 26, 2018, 10 pages.

Extended European Search Report received for European Patent Application No. 16864925.9, dated Apr. 4, 2019, 12 pages.

Final Office Action received for U.S. Appl. No. 15/081,195, dated Apr. 3, 2018, 12 pages.

Final Office Action received for U.S. Appl. No. 15/081,195, dated Mar. 7, 2019, 15 pages.

Final Office Action received for U.S. Appl. No. 15/347,442, dated Oct. 8, 2019, 16 pages.

Final Office Action received for U.S. Appl. No. 15/966,296, dated Oct. 4, 2019, 15 pages.

(56) References Cited

OTHER PUBLICATIONS

Final Office Action received for U.S. Appl. No. 16/843,602, dated May 14, 2021, 14 pages.
Final Office Action received for U.S. Appl. No. 15/018,423, dated Jan. 18, 2017., 18 pages.
International Preliminary Report on Patentability received for PCT Patent Application No. PCT/US2016/024251, dated Oct. 5, 2017, 6 pages.
International Preliminary Report on Patentability received for PCT Patent Application No. PCT/US2016/061161, dated May 24, 2018, 9 pages.
International Search Report and Written Opinion received for PCT Patent Application No. PCT/US2016/024251, dated Jun. 20, 2016, 8 pages.
International Search Report and Written Opinion received for PCT Patent Application No. PCT/US2016/061161, dated Dec. 29, 2016., 10 pages.
Non-Final Office Action received for U.S. Appl. No. 13/890,165, dated Aug. 13, 2015, 24 pages.
Non-Final Office Action received for U.S. Appl. No. 14/631,520, dated Apr. 15, 2016, 12 pages.
Non-Final Office Action received for U.S. Appl. No. 15/081,195, dated Aug. 11, 2017, 14 pages.
Non-Final Office Action received for U.S. Appl. No. 15/081,195, dated Sep. 20, 2018, 15 pages.
Non-Final Office Action received for U.S. Appl. No. 15/347,442, dated Mar. 4, 2019, 25 pages.
Non-Final Office Action received for U.S. Appl. No. 15/966,296, dated Mar. 11, 2019, 18 pages.
Non-Final Office Action received for U.S. Appl. No. 16/843,602, dated Oct. 22, 2020, 24 pages.
Non-Final Office Action received for U.S. Appl. No. 15/018,423, dated Apr. 8, 2016, 17 pages.
Notice of Allowance received for U.S. Appl. No. 13/890,165, dated Mar. 8, 2016, 5 pages.
Notice of Allowance received for U.S. Appl. No. 15/018,423, dated Dec. 29, 2017, 5 pages.
Notice of Allowance received for U.S. Appl. No. 15/966,296, dated Apr. 30, 2020, 9 pages.
Office Action received for Canadian Patent Application No. 3,004,947, dated Dec. 5, 2019, 4 pages.
Office Action received for Canadian Patent Application No. 3,004,947, dated May 7, 2019, 4 pages.
Office Action received for Japanese Patent Application No. 2018-502047, dated Jun. 28, 2019, 4 pages.
Office Action received for Japanese Patent Application No. 2018-502047, dated Nov. 19, 2018, 4 pages.
Office Action received for Japanese Patent Application No. 2018-523769, dated Jun. 14, 2019, 8 pages.
Kothari et al., "Multi-UAV Path Planning in Obstacle Rich Environments Using Rapidly-exploring Random Trees", Joint 48th IEEE Conference on Decision and Control and 28th Chinese Control Conference Shanghai, Dec. 16-18, 2009, pp. 3069-3074.
Non-Final Office Action received for U.S. Appl. No. 16/918,615, dated Apr. 6, 2023, 13 pages.
Suzuki et al., "Automatic Battery Replacement System for UAVs: Analysis and Design", Journal of Intelligent & Robotic Systems, 65, 2012, pp. 563-586.
Toksoz et al., "Automated Battery Swap and Recharge to Enable Persistent UAV Missions", Infotech@Aerospace 2011, Mar. 29-31, 2011, pp. 1-10.

\* cited by examiner

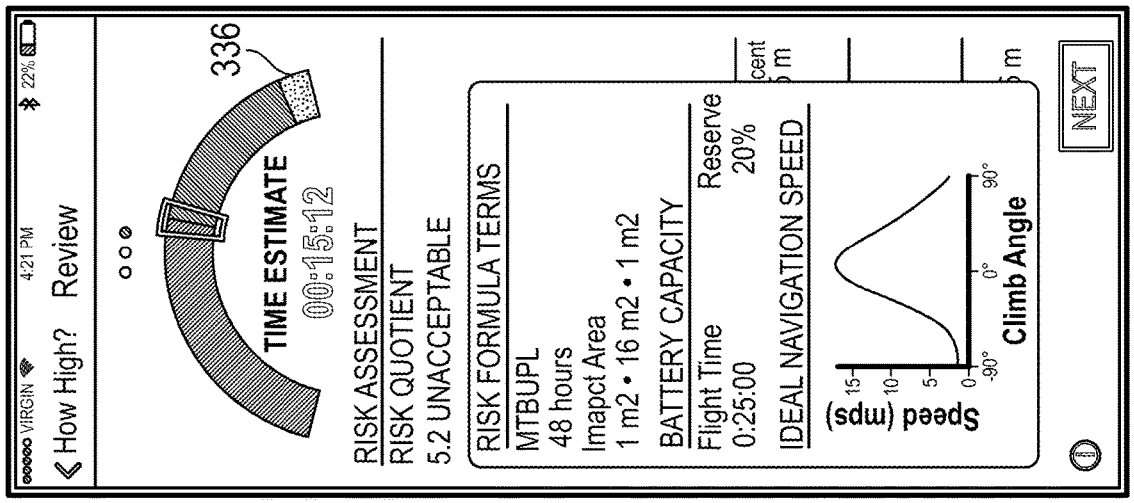
FIG. 3L3
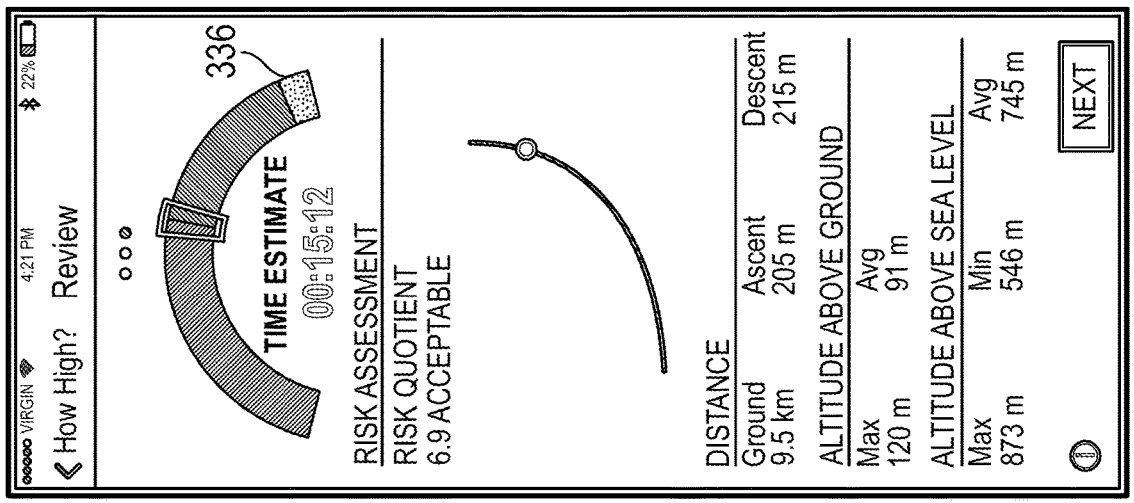
FIG. 3L2
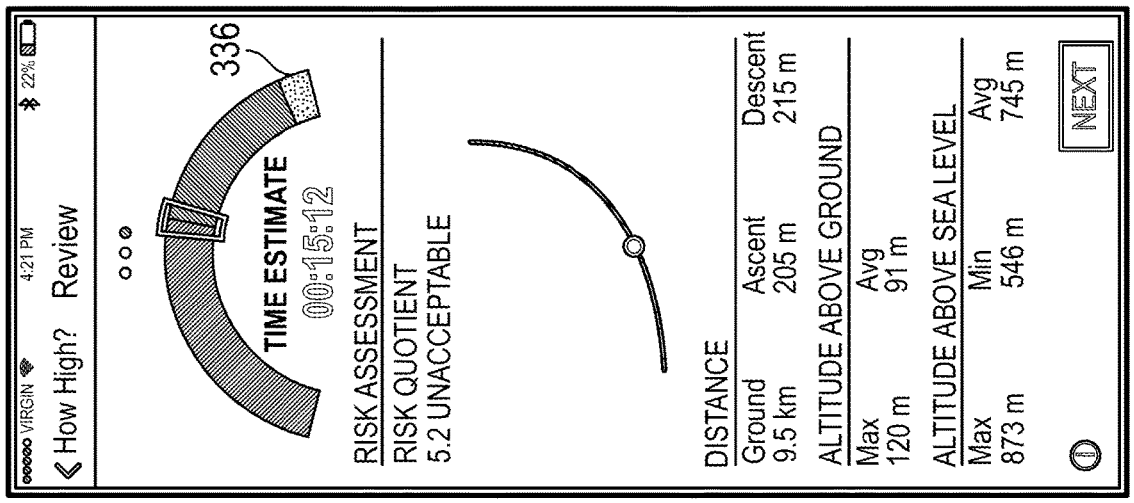
FIG. 3L1

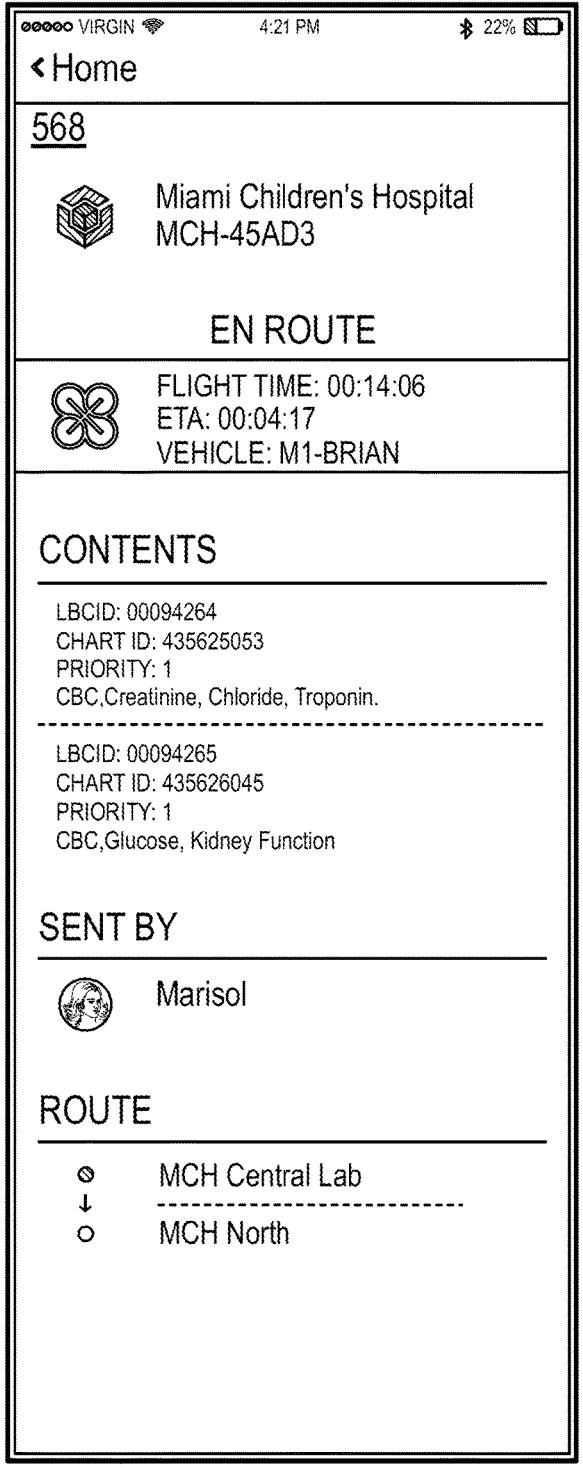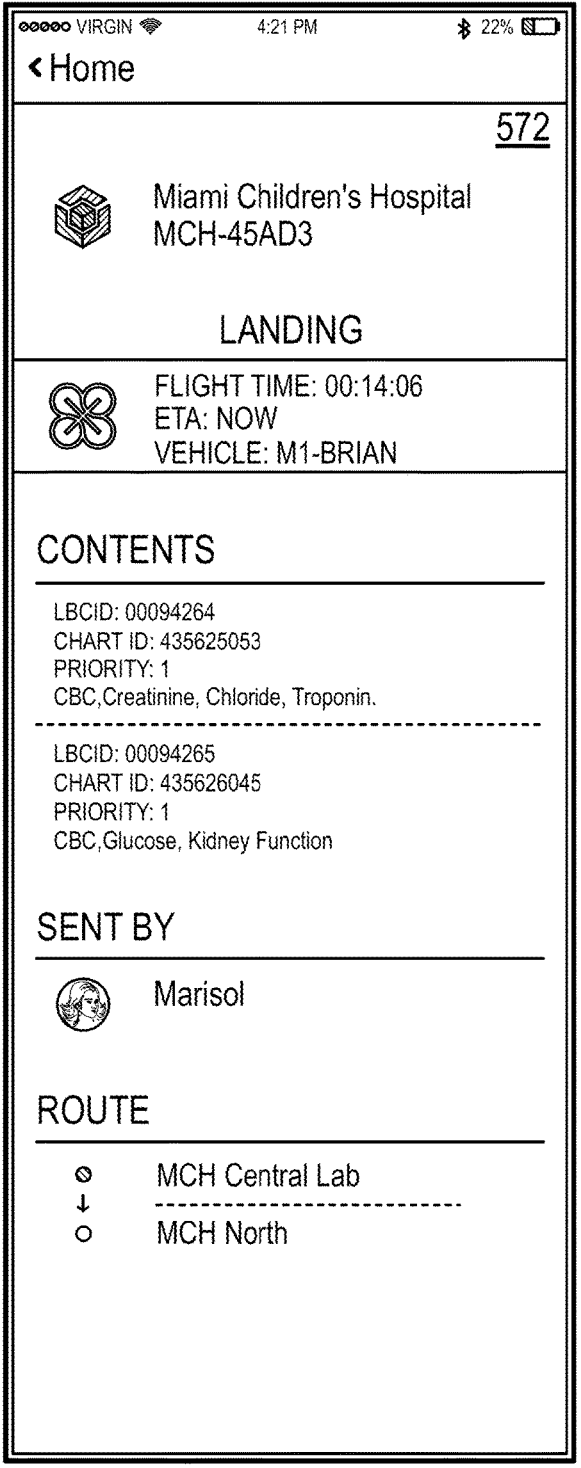
FIG. 5R     FIG. 5S

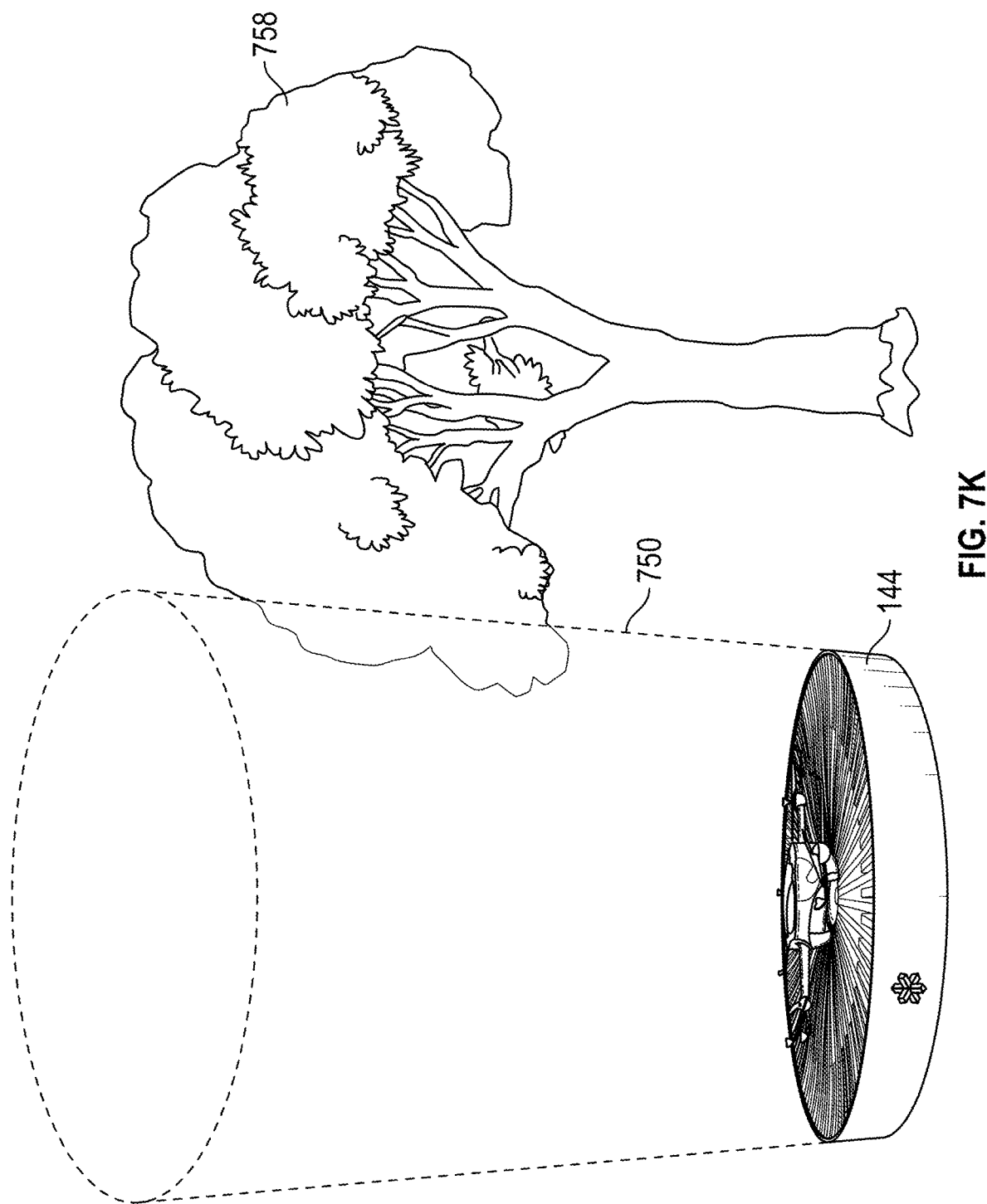

METHODS AND SYSTEMS FOR TRANSPORTATION USING UNMANNED AERIAL VEHICLES

CROSS-REFERENCE TO RELATED APPLICATIONS

This application is a continuation of U.S. patent application Ser. No. 16/843,602, entitled "METHODS AND SYSTEMS FOR TRANSPORTATION USING UNMANNED AERIAL VEHICLES", filed Apr. 8, 2020, which is a continuation of U.S. patent application Ser. No. 15/347,442, entitled "METHODS AND SYSTEMS FOR TRANSPORTATION USING UNMANNED AERIAL VEHICLES," filed Nov. 9, 2016, which claims priority to U.S. Provisional Patent Application Ser. No. 62/253,627, entitled "METHODS AND SYSTEMS FOR TRANSPORTATION USING UNMANNED AERIAL VEHICLE," filed on Nov. 10, 2015, the content of which are hereby incorporated by reference in their entirety for all purposes.

FIELD

The present disclosure relates generally to unmanned aerial vehicles (UAVs). More particularly, the present disclosure relates to payload transportation using UAVs and mobile UAV stations.

BACKGROUND

Unmanned aerial vehicles (UAVs) or drones are increasingly being used for various personal or commercial applications. For example, UAVs may be used for transportation packages in local neighborhoods. Nowadays, transportation of packages in local neighborhoods heavily relies on ground infrastructures using transporting vehicles such as delivery trucks. For example, to deliver 20 packages in a neighborhood, a delivery truck driver typically needs to make 20 stops at the packages' destination addresses to physically deliver the packages. While UAVs are being used to deliver packages in the recent years, they are limited by the range of flight because they are usually launched from a fix distribution facility. As a result, the current UAV transportation systems may not be flexible to deliver packages to a widespread area such as a city or multiple neighborhoods. Therefore, there is a need to integrate the UAVs with mobile exchange stations, such as package transporting vehicles, to provide flexibility and mobility for transporting packages to multiple neighborhoods.

SUMMARY

A method for facilitating payload transportation using an unmanned aerial vehicle (UAV) is provided. The method is performed at a portable electronic device including one or more processors and memory and comprises receiving a first input indicating a takeoff location of the UAV and a second input indicating a landing location of the UAV. In response to receiving the first and second, the portable electronic device obtains a determined UAV flight route from the takeoff location to the landing location. Based on the obtained UAV flight route, the portable electronic device provides flight route information indicating a viable flight route; and a takeoff command to the UAV according to the viable flight route.

An apparatus for transporting a payload using an unmanned aerial vehicle (UAV) is provided. The apparatus comprises a container having dimensions that correspond to a carrying space of a UAV. The apparatus further comprises a first identification accessible on an external surface of the container. The first identification is scannable for identifying the container. The apparatus further comprises a second identification readable by the UAV. The second identification is associated with the first identification for identifying the container.

A method for facilitating payload transportation using an unmanned aerial vehicle (UAV) is provided. The method is performed at a computer system including one or more processors and memory. The computer system receives an identification of a payload to be transported. The identification information of the payload is associated with a destination location of the payload. The computer system further receives a first identification of a container for housing the payload. The first identification is accessible on an external surface of the container and is scannable. The computer system further receives a second identification from the UAV. The second identification comprises a near-field identification tag associated with the first identification for identifying the container. The computer system determines a UAV flight route based on the identification of the payload; and provides the UAV flight route to the UAV based on the first and second identifications.

A method for facilitating a payload transportation using an unmanned aerial vehicle (UAV) is provided. The method is performed at a portable electronic device including one or more processors and memory. The portable electronic device obtains an identification of the payload to be transported. The identification of the payload is associated with a destination location of the payload. The portable electronic device provides the identification of the payload to a UAV service; and obtains a first identification of a container for housing the payload. The first identification is accessible on an external surface of the container and is scannable. The portable electronic device further provides the first identification to the UAV service; and provides one or more instructions to a selected UAV for transporting the payload based on a UAV flight route. The UAV flight route is generated based on the identification of the payload; and the UAV is selected based on the first identification and a second identification. The second identification corresponds to the first identification for identifying the container.

An unmanned aerial vehicle (UAV) for transporting a payload is provided. The UAV comprises a body; one or more propellers rotatably connected with the body; and a battery mounted to the body. The battery is releasable from, for example, the bottom of the UAV. The UAV further comprises a payload container mounted to the body. The payload container is releasable from the bottom of the UAV to a landing platform associated with a UAV station.

A method for transporting a payload is provided. The method is performed at a UAV comprising a body and one or more propellers rotatably connected to the body. The UAV receives a battery from an exchange station. The battery is received through a landing platform associated with the exchange station. The UAV mounts the battery to the body of the UAV. Upon receiving the battery, the UAV receives a payload container from the exchange station. The payload container is received through the landing platform associated with the exchange station. The UAV mounts the payload container to the body of the UAV. The UAV receives instructions for transporting the payload container to a destination; and transports the payload container to the destination according to the instructions.

A landing platform for receiving a payload container from an unmanned aerial vehicle (UAV) is provided. The landing platform comprises one or more landing subsystems configured to coordinate with the UAV for landing; one or more sensors for detecting the landing of the UAV on the landing platform; one or more actuators configured to align the UAV for receiving the payload container; and a payload receiving structure of the landing platform configured to receive the payload container.

A method for precision landing of an unmanned aerial vehicle (UAV) on a landing platform is provided. The UAV includes one or more processors and a communication interface. The method comprises determining, at the UAV, whether the UAV is in a landing phase based on the location of the UAV. After determining that the UAV is in the landing phase, the method further comprises receiving landing alignment information from the landing platform. The landing alignment information is generated based on at least one of a magnetic heading of the landing platform, a GPS position of the landing platform, or an infrared beacon of the landing platform. The method further comprises adjusting a landing path of the UAV based on the received landing alignment information.

A system for emergency landing of an unmanned aerial vehicle (UAV) is provided. The system comprises a battery manager configured to provide power to a control circuitry for emergency landing. The system further comprises a controller configured to determine whether an emergency landing signal is generated. The controller is further configured to determine whether one or more conditions for emergency landing are satisfied based on the determination that the emergency landing signal is generated. The controller is further configured to deploy an emergency landing mechanism based on the determination that the one or more conditions are satisfied.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The details of one or more embodiments of the subject matter described in the specification are set forth in the accompanying drawings and the description below. Other features, aspects, and advantages of the subject matter will become apparent from the description, the drawings, and the claims.

DESCRIPTION OF THE FIGURES

FIGS. 7E-7K illustrates perspective views of an exemplary landing platform fence, consistent with some embodiments of the present disclosure.

DETAILED DESCRIPTION

The following description sets forth exemplary systems and methods for transportation using UAVs. The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

Figure 1:
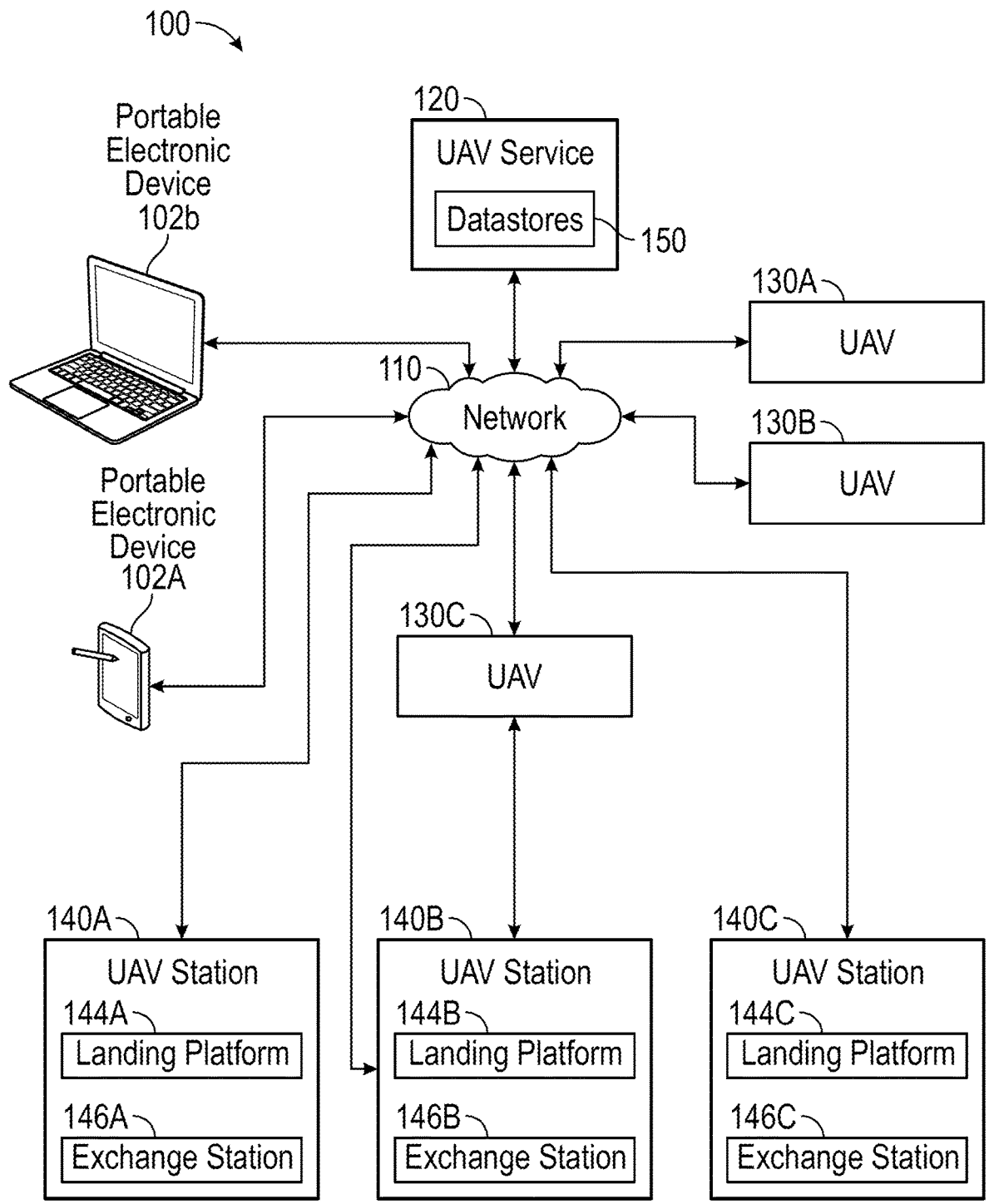
FIG. 1 illustrates an exemplary system for payload transportation using UAVs, consistent with some embodiments of the present disclosure.

FIG. 1 illustrates an exemplary payload transportation system 100 using UAVs, consistent with some embodiments of the present disclosure. Referring to FIG. 1, payload transportation system 100 can include one or more portable electronic devices 102A-B (collectively referred as portable electronic devices 102), a network 110, a UAV service 120, one or more UAVs 130A-C (collectively referred as UAVs 130), and one or more UAV stations 140A-C (collectively referred as UAV stations 140). Payload transportation system 100 can enable or facilitate requesting, scheduling, controlling, and/or navigating of UAVs for transporting payloads to locations.

Portable electronic devices 102A-B include devices that can request, schedule, or facilitate payload transportation through various means. Portable electronic devices 102A-B can communicate with UAV service 120, UAV 130, and/or UAV station 140 either directly or indirectly through a network 110. As an example, portable electronic device 102A can communicate directly with or identify the payload carried by UAV 130A. As another example, portable electronic device 102A can communicate indirectly with UAV service 120 through network 110 to request payload transportation or to provide payload identifications. While portable electronic devices 102A-B are portrayed as a computer or a laptop (e.g., portable electronic device 102A), a tablet, and a mobile smart phone (e.g., portable electronic device 102B), it is appreciated that portable electronic device 102 could be any type of device that communicates data.

Network 110 can be any type of network that facilitates wired and/or wireless communications. For example, network 110 can be a cellular network (e.g., GSM, GPRS, CDMA, LTE), a wide-area network (WAN), a local area network (LAN), a radio network, a satellite network, a Wi-Fi network, a near-filed communication network, Zigbee, Xbee, XRF, Xtend, Bluetooth, WPAN, line of sight, satellite relay, or any other wired or wireless network, or a combination thereof.

UAV service 120 can communicate with one or more components of payload transportation system 100, such as portable electronic devices 102, UAVs 130, and UAV stations 140, to facilitate payload transportation using UAVs. For example, based on communication with portable electronic devices 102, UAV service 120 can receive requests for transporting a payload, an identification of the payload to be transported, and an identifications of a payload container. Based on the request or information received, UAV service 120 can determine a UAV flight route for transporting the payload to its destination location. UAV service 120 can communicate the flight route information to the UAV that carries the payload. In some embodiments, UAV service 120 may continue to communicate with the UAV during the flight. After the payload is transported, UAV service 120 may receive a confirmation or notification of completion. UAV service 120 may include, for example, one or more geospatial data stores, geospatial caches, one or more application servers, one or more application data stores, one or more messaging queues, and tracking data. UAV service 120 may be provided on a desktop computer, a laptop computer, a server (physical or virtual), or a server farm. Exemplary UAV services (e.g., UAV service 120) are described in detail in U.S. patent application Ser. No. 13/890,165 filed on May 8, 2013, entitled "Transportation Using Network of Unmanned Aerial Vehicles" (now U.S. Pat. No. 9,384,668); in U.S. Provisional Patent Application No. 62/138,910 filed on Mar. 26, 2015, entitled "System and Methods for Unmanned Aerial Vehicle Route Planning;" in U.S. Provisional Patent Application No. 62/138,914 filed on Mar. 26, 2015, entitled "Unmanned Aerial Vehicle;" and in co-pending U.S. patent application Ser. No. 15/081,195 filed on Mar. 25, 2016, entitled "Route Planning For Unmanned Aerial Vehicle." These applications are incorporated by reference in their entirety for all purposes.

In some embodiments, UAV service 120 can include one or more datastores 150. Datastores 150 may include, for example, a time series datastore and a geospatial datastore. A time series datastore may be a software system for handling time series data and arrays of numbers indexed by time (e.g., a datetime or a datetime range). In some embodiments, UAVs 130 can transmit telemetry and sensor data to a system for storage within a time series datastore or a tracking datastore. These time series may also be called as profiles, curves, or traces. An application server of UAV service 120 may further monitor the time series datastore and/or the tracking datastore to determine trends such as UAV components that require maintenance based on the stored time series data or tracking data.

In some embodiments, a geospatial data store can be an object-relational spatial database that includes latitude and longitude data. Example data and data sources for a geospatial data store include, but are not limited to, terrain data from the National Aeronautics and Space Administration ("NASA"), airspace data from the Federal Aviation Administration ("FAA"), geospatial data from the National Park Service, Department of Defense, and/or other federal agencies, geospatial and/or building data from local agencies such as school districts, and/or some combination thereof. A geospatial data store may include large amounts of data such as hundreds of gigabytes of data or terabytes of data.

In some embodiments, UAV service 120 can include one or more application servers and message brokers. Application servers can perform various tasks such as processing authentication and authorization, maintaining general purpose data (e.g., UAV names, configurations, flight routes, UAV stations). Message brokers can enable data movement between software components or systems in substantially real time for providing authentication and authorization. Exemplary implementations of various components of UAV service 120 (e.g., the application services, the message brokers, the time series datastores, the geospatial datastores) and their interactions are describe in more detail in the U.S. Provisional Patent Application No. 62/138,910 filed on Mar. 26, 2015, entitled "System and Methods for Unmanned Aerial Vehicle Route Planning;" in the U.S. Provisional Patent Application No. 62/138,914 filed on Mar. 26, 2015, entitled "Unmanned Aerial Vehicle;" and in co-pending U.S. patent application Ser. No. 15/081,195 filed Mar. 25, 2016, entitled "Route Planning For Unmanned Aerial Vehicle." These applications are incorporated by reference in their entirety for all purposes.

UAV 130 can communicate with one or more components of payload transportation system 100, such as UAV service 120 and UAV stations 140, and one or more satellites (not shown) to transport a payload. For example, UAV 130A communicates with UAV service 120 to obtain a flight route for transporting the payload, picks up a payload container with the payload to be transported, autonomously navigates using the flight route and satellites signals, and transports the payload to its destination location such as a UAV station 140. UAV 130 can include, for example, a body with an optional payload carrying space, one or more propellers or fixed wings, a releasable and/or exchangeable battery, and a releasable and/or exchangeable payload container. UAV 130 is described in more detail with FIGS. 6A-6B.

UAV station 140 can communicate with one or more components, devices, or systems of payload transportation system 100, such as UAV service 120 and UAV 130 to facilitate payload transportation. In some embodiments, UAV station 140 can include a landing platform 144 and an exchange station 146. A landing platform facilitates landing and launching of a UAV 130. An exchange station 146 can receive a payload, a payload container, or a battery from a UAV 130; load a payload, a payload container, or a battery to a UAV 130, or exchange a payload, a payload container, or a battery with a UAV 130. UAV station 140 may be a mobile or fixed station dedicated for transporting multiple payloads. For example, UAV station 140 may include a delivery truck carrying multiple payloads to be delivered and carrying one or more UAVs 130 for transporting the payloads. In accordance with the information received from UAV service 120 (e.g., flight route, payload information, etc.), one or more UAVs 130 may be launched from a UAV station 140 to transport payloads to their destination locations (e.g., another UAV station 140, a residential address, or a business address). In addition, a UAV station 140 can also receive one or more UAVs 130. For example, a UAV station 140 can include a landing platform 144 and an exchange station 146. To receive a payload, landing platform 144 communicates with UAV 130 to assist landing of a UAV 130 on landing platform 144. In some embodiments, landing platform 144 can align or adjust the position of the landed UAV 130 such that the payload container can be released from UAV 130 to a payload receiving structure of landing platform 144. For example, landing platform 144 can include a center opening for receiving or exchanging payload containers. In some embodiments, after UAV 130 releases its payload container to exchange station 140, it can receive another payload container from exchange station 140 for transporting it to the next destination location.

In some embodiments, landing platform 144 can be mounted, attached, or integrated to an exchange station 146, such as a transporting vehicle (e.g., delivery truck, a van) or a fixed facility (e.g., a distribution warehouse). Exchange station 146 can include a payload processing mechanism (e.g., a robot) to enable the receiving and exchanging of payload containers or payloads. In some embodiments, exchange station 146 can also include a battery exchanging mechanism for exchanging battery of a landed UAV 130. In some embodiments, the battery exchanging mechanism and the payload processing mechanism may be separate mechanisms or may be integrated to form a single mechanism. UAV station 140 is described in more detail below with FIG. 2A.

In some embodiments, UAV station 140 may not be a dedicated transportation station. An exchange station 146 of such a UAV station 140 may include a user's vehicle (e.g., a consumer's truck, a van, or a passenger car). For example, the user may order a merchandise online and requests it to be transported to the user's location. UAV service 120 schedules the transportation of the merchandise payload to the user's location. UAV service 120 communicates the information for transporting the user's ordered merchandise to a UAV 130, which subsequently transports the payload to a UAV station 140, which may include the user's vehicle (e.g., a van or a car). As described, UAV station 140 can include a landing platform 144 to facilitate the landing of UAV 130. In some embodiments, landing platform 144 can be part of an exchange station 146 (e.g., the user's truck/van/car, the user's back yard, a roof of a building. etc.). The landing platform 144 may include a landing sub-system (e.g., an infrared beacon). An exchange station 146 that includes a user's vehicle (e.g., truck/van/car), rather than a dedicated transportation station (e.g., a delivery truck), may typically be capable of receiving the payload container using the landing platform 144, but may not have the capability of exchanging payload containers and batteries with the UAV 130. In some embodiments, after receiving the payload container, the UAV 130 may relaunch from UAV station 140 at the user's location for the next destination (e.g., returning to a distribution facility or another UAV station) according to the information provided by UAV service 120. The landing sub-system of a UAV station 140 is described in more detail with FIGS. 8A-8D.

Figure 2A:
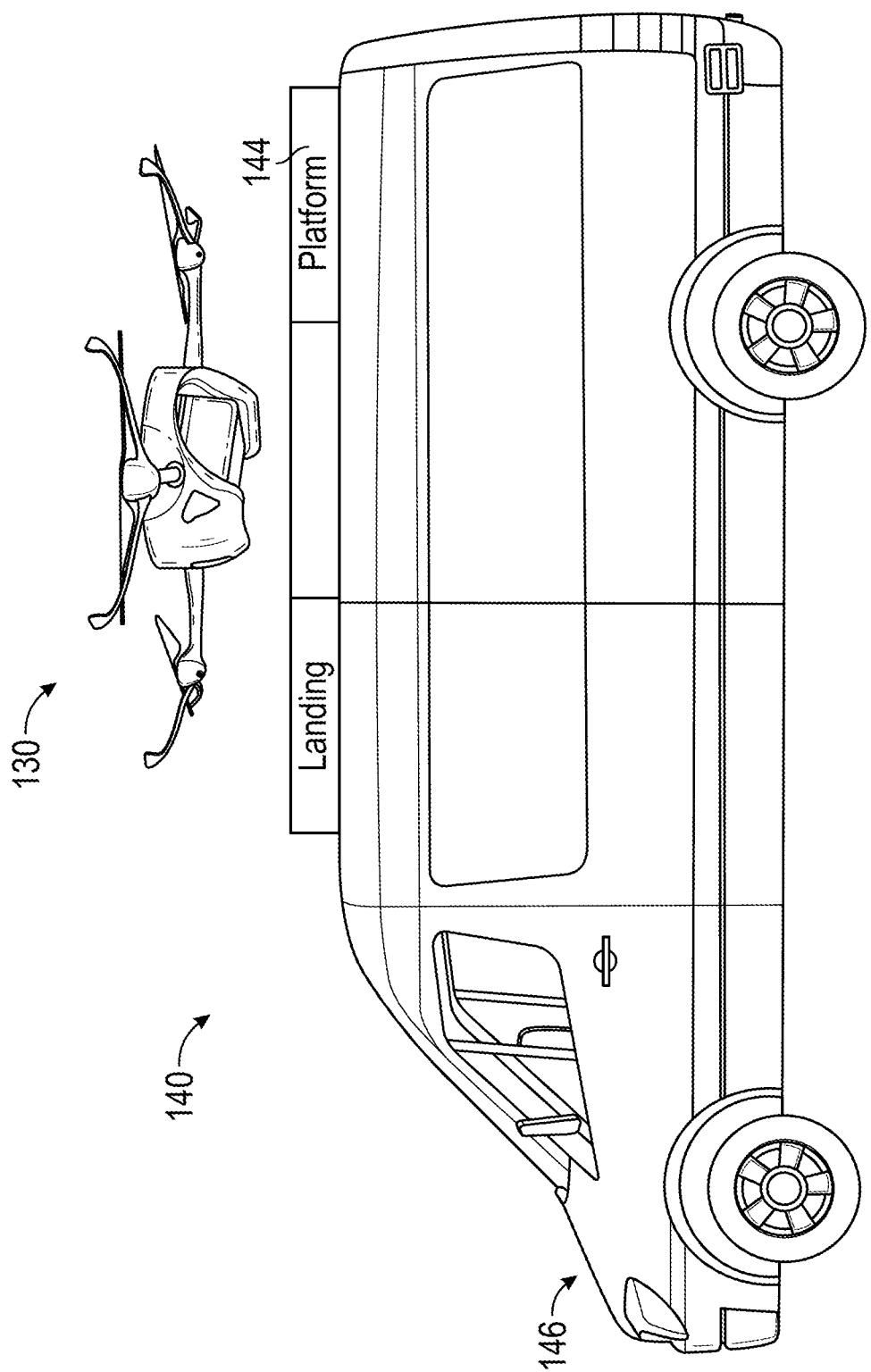
FIG. 2A illustrates an exemplary UAV station and an exemplary UAV, consistent with some embodiments of the present disclosure.

FIG. 2A illustrates an exemplary UAV station 140 and an exemplary UAV 130, consistent with some embodiments of the present disclosure. UAV station 140 includes, for example, a landing platform 144 and an exchange station 146. In some embodiments, landing platform 144 can be a disc-shaped platform that can facilitate landing of one or more UAVs 130. For example, landing platform 144 can be a disc-shaped platform having a diameter of about 120 centimeters (cm) and can accommodate two or more UAVs 130. It is appreciated that landing platform 144 can also have any other shapes, such as square shape, rectangular shape, circular shape, elliptical shape, etc. Further, landing platform 144 can also have any dimension to accommodate one or more UAVs 130.

In some embodiments, landing platform 144 can be a separate apparatus from exchange station 146. For example, landing platform 144 can be disposed on, mounted to, or attached to the top surface of exchange station 146. UAV 130 can thus land on landing platform 144 from above exchange station 146, as illustrated in FIG. 2A. In some embodiments, landing platform 144 can be integrated with exchange station 146 such that it is an integral portion of exchange station 146. For example, landing platform 144 can be integrated with the roof of exchange station 146, which can have a cover (e.g., a sliding door or sliding window) on top of landing platform 144. As a result, when landing platform 144 is not used, the cover can protect landing platform 144 from dirt, dust, rain, or any external objects (e.g., birds, leaves, etc.). When UAV 130 approaches landing platform 144 or is in a landing phase, exchange station 146 can open the cover to expose landing platform 144 for landing of UAV 130. In some embodiments, two or more landing platforms 144 can be disposed on or integrated with exchange station 146. In some embodiments, landing platform 144 can be part of (e.g., the roof) exchange station 146 (e.g., a user's truck/van/car) and can include a landing sub-system (e.g., an infrared beacon). As described, an exchange station 146 that includes a user's vehicle (e.g., truck/van/car), rather than a dedicated transportation station (e.g., a delivery truck), may typically be capable of receiving the payload container using the landing platform 144, but may not have the capability of exchanging payload containers and batteries with the UAV 130. The landing sub-system is described in more detail with FIGS. 8A-8D.

In some embodiments, landing platform 144 can have a payload receiving structure for receiving a payload or payload container carried by UAV 130. For example, landing platform 144 can have a center opening that has dimensions corresponding to the dimensions of a payload container that UAV 130 carries. As a result, after UAV 130 lands on landing platform 144 and aligns to the center opening, UAV 130 can release the payload container to the interior of exchange station 146 through the center opening of landing platform 144. In some embodiments, the payload receiving structure of landing platform 144 can be a dedicated area of the top surface of exchange station 146, and may not include a center opening. Thus, the payload container may be released to the exterior (e.g., top surface of exchange station 146). The released payload container can thus be transferred to exchange station 146. Landing platform 144 is described in more detail with FIGS. 7A-7E.

In some embodiments, exchange station 146 can be a mobile station or a fixed station. For example, exchange station 146 can be a delivery truck, a van, a train, a cargo airplane, or a carrier UAV (e.g., a UAV that carries multiple payloads), a distribution facility, a warehouse, a ground station, etc. In some embodiments, exchange station 146 may include a payload-processing mechanism (e.g., a robot) that handles the transfer of payloads. For example, exchange station 146 can receive a payload from the landed UAV 130 and/or transfer another payload to UAV 130 for transportation. In some embodiments, exchange station 146 can include a battery exchange mechanism for exchanging a battery of the UAV 130. For example, UAV 130 may include a sensor to detect the battery level of the battery, and determine that its battery is depleted or insufficient for completing the next flight. Based on the determination, a landed UAV 130 releases the battery to exchange station 146 through the center opening of landing platform 144. Exchange station 146 receives the released battery from the landed UAV 130 and can transfer a replacement battery to the landed UAV 130. Exchanging of a battery between an exchange station 146 and a UAV 130 enables the UAV 130 to continue transporting payloads without having to sit idle while re-charge the battery. Further, in some embodiments, the exchange station 146 can be a mobile station that are capable of travelling to any location, thereby significantly increases the range of payload transportation of the UAV.

Figure 2B:
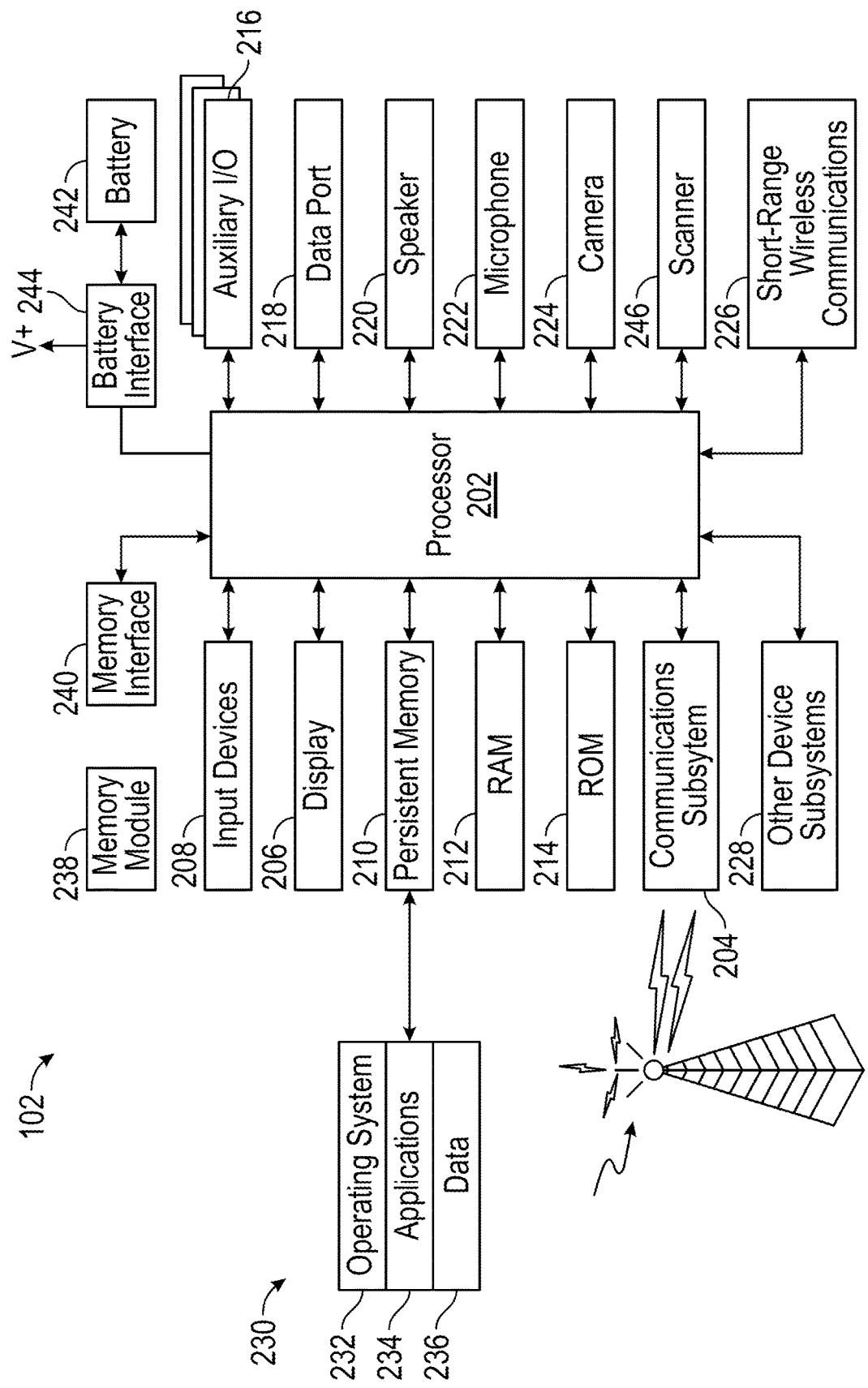
FIG. 2B is a simplified block diagram illustrating an exemplary portable electronic device, consistent with some embodiments of the present disclosure.

FIG. 2B is a simplified block diagram illustrating an exemplary portable electronic device 102, consistent with some embodiments of the present disclosure. Portable electronic device 102 can include a communication device having two-way or one-to-many data communication capabilities, voice communication capabilities, and video communication capabilities, and the capability to communicate with other computer systems, for example, via the Internet. Depending on the functionality provided by portable electronic device 102, in various embodiments, portable electronic device 102 can be a handheld device, a multiple-mode communication device configured for both data and voice communication, a smartphone, a mobile telephone, a netbook, a gaming console, a tablet, or a PDA enabled for wireless communication.

Portable electronic device 102 can include a case (not shown) housing component of portable electronic device 102. The internal components of portable electronic device 102 can, for example, be constructed on a printed circuit board (PCB). The description of portable electronic device 102 herein mentions a number of specific components and subsystems. Although these components and subsystems can be realized as discrete elements, the functions of the components and subsystems can also be realized by integrating, combining, or packaging one or more elements in any suitable fashion.

Portable electronic device 102 can include a controller comprising at least one processor 202 (such as a microprocessor), which controls the overall operation of portable electronic device 102. Processor 202 can be one or more microprocessors, field programmable gate arrays (FPGAs), digital signal processors (DSPs), or any combination thereof capable of executing particular sets of instructions. Processor 202 can interact with device subsystems such as a communication subsystem 204 for exchanging radio frequency signals with a wireless network (e.g., network 110) to perform communication functions.

Processor 202 can also interact with additional device subsystems including a communication subsystem 204, a display 206 such as a liquid crystal display (LCD) screen, an light emitting diode (LED) screen, or any other appropriate display, input devices 208 such as a keyboard and control buttons, a persistent memory 210, a random access memory (RAM) 212, a read only memory (ROM) 214, auxiliary input/output (I/O) subsystems 216, a data port 218 such as a conventional serial data port, a Universal Serial Bus (USB) data port, or a High-Definition Multimedia Interface (HDMI) data port, a speaker 220, a microphone 222, one or more cameras (such as camera 224), a short-range wireless communications subsystem 226 (which can employ any appropriate wireless (e.g., RF), optical, or other short range communications technology (for example, Bluetooth or NFC)), and other device subsystems generally designated as 228. Some of the subsystems shown in FIG. 2B perform communication-related functions, whereas other subsystems can provide "resident" or on-device functions.

Communication subsystem 204 includes one or more communication systems for communicating with network 110 to enable communication with external device, such as UAVs 130 and UAV stations 140. The particular design of communication subsystem 204 depends on the wireless network in which portable electronic device 102 is intended to operate. Portable electronic device 102 can send and receive communication signals over the wireless network after the required network registration or activation procedures have been completed.

Display 206 can be realized as a touch-screen display in some embodiments. The touch-screen display can be constructed using a touch-sensitive input surface, which is coupled to an electronic controller and which overlays the visible element of display 206. The touch-sensitive overlay and the electronic controller provide a touch-sensitive input device and processor 202 interacts with the touch-sensitive overlay via the electronic controller.

Camera 224 can be a CMOS camera, a CCD camera, or any other type of camera capable of capturing and outputting compressed or uncompressed image data such as still images or video image data. In some embodiments, portable electronic device 102 can include more than one camera, allowing the user to switch, during a video conference call, from one camera to another, or to overlay image data captured by one camera on top of image data captured by another camera. Image data output from camera 224 can be stored in, for example, an image buffer, which can be a temporary buffer residing in RAM 212, or a permanent buffer residing in ROM 214 or persistent memory 210. The image buffer can be, for example, a first-in first-out (FIFO) buffer.

Short-range wireless communications subsystem 226 is an additional optional component that provides for communication between portable electronic device 102 and different systems or devices, which need not necessarily be similar devices. For example, short-range wireless communications subsystem 226 can include an infrared device and associated circuits and components, or a wireless bus protocol compliant communication device such as a Bluetooth® communication module to provide for communication with similarly-enabled systems and devices.

Processor 202 can be one or more processors that operate under stored program control and executes software modules 230 stored in a tangibly-embodied non-transitory computer-readable storage medium such as persistent memory 210, which can be a flexible disk, a hard disk, a CD-ROM (compact disk-read only memory), and MO (magneto-optical); a DVD-ROM (digital versatile disk-read only memory); a DVD RAM (digital versatile disk-random access memory); or a semiconductor memory. Software modules 230 can also be stored in a computer-readable storage medium such as ROM 214, or any appropriate persistent memory technology, including EEPROM, EAROM, FLASH. These computer-readable storage mediums store computer-readable instructions for execution by processor 202 to perform a variety of functions on portable electronic device 102.

Software modules 230 can include operating system software 232, used to control operation of portable electronic device 102. Additionally, software modules 230 can include software applications 234 for providing additional functionality to portable electronic device 102. For example, portable electronic device 102 can include an application for an operator or administrator to manage the transportation of payloads using UAVs 130, and an application for a user (e.g., a transporting vehicle driver) to request or schedule a payload transportation using a UAV 130.

Software applications 234 can include a range of applications, including, for example, a messaging application, a scanner application, a near-filed tag reader, an Internet browser application, a voice communication (i.e., telephony or Voice over Internet Protocol (VoIP)) application, a mapping application, a media player application, a UAV scheduling application, a payload transportation monitoring application, a payload transportation managing application, or any combination thereof. Each of software applications 234 can include layout information defining the placement of particular fields and graphic elements (for example, text fields, input fields, icons, etc.) in the user interface (e.g., display 206) according to that corresponding application.

Operating system software 232 can provide a number of application protocol interfaces (APIs) providing an interface for communicating between the various subsystems and services of portable electronic device 102, and software applications 234. For example, operating system software 232 provides a user interface API to any application that needs to create user interfaces for display on portable electronic device 102. Accessing the user interface API can provide the application with the functionality to create and manage screen windows and user interface controls, such as text boxes, buttons, and scrollbars; receive mouse and keyboard input; and other functionality intended for display on display 206. Furthermore, a camera service API can allow a video conference application to access camera 224 for purposes of capturing image data (such as a photo or video data that can be shared with a receiving mobile communication device (e.g., mobile communication device 106)). A scanner service API can allow a scanning application to access a scanner 246 for purpose of barcode scanning, QR code scanning, image scanning, etc.

In some embodiments, persistent memory 210 stores data 236, including data specific to a user of portable electronic device 102, such as map data, UAV station data, flight route data, etc. Persistent memory 210 can additionally store identification data, such as identifiers related to particular conferences, or an identifier corresponding to portable electronic device 102 to be used in identifying portable electronic device 102 during conferences. Persistent memory 210 can also store data relating to various payloads, for example, identifications of payloads (e.g., barcodes), the details of the payloads such as the content of the payload, the originating location of the payload, the destination location of the payload, etc. Persistent memory 210 can further store data relating various applications with preferences of the particular user of, for example, portable electronic device 102. In certain embodiments, persistent memory 210 can store data 236 linking a user's data with a particular field of data in an application, such as for automatically entering a user's name into a username textbox on an application executing on portable electronic device 102. Furthermore, in various embodiments, data 236 can also include service data comprising information required by portable electronic device 102 to establish and maintain communication with network 110.

In some embodiments, auxiliary input/output (I/O) subsystems 216 comprise an external communication link or interface, for example, an Ethernet connection. In some embodiments, auxiliary I/O subsystems 216 can further comprise one or more input devices, including a pointing or navigational tool such as a clickable trackball or scroll wheel or thumbwheel; or one or more output devices, including a mechanical transducer such as a vibrator for providing vibratory notifications in response to various events on portable electronic device 102 (for example, receipt of an electronic message or incoming phone call), or for other purposes such as haptic feedback (touch feedback); or any combination thereof.

In some embodiments, portable electronic device 102 also includes one or more removable memory modules 238 (typically comprising FLASH memory) and a memory module interface 240. Among possible functions of removable memory module 238 is to store information used to identify or authenticate a user or the user's account to a wireless network (for example, network 110). For example, in conjunction with certain types of wireless networks, including GSM and successor networks, removable memory module 238 is referred to as a Subscriber Identity Module (SIM). Memory module 238 is inserted in or coupled to memory module interface 240 of portable electronic device 102 in order to operate in conjunction with the wireless network.

Portable electronic device 102 also includes a battery 242, which furnishes energy for operating portable electronic device 102. Battery 242 can be coupled to the electrical circuitry of portable electronic device 102 through a battery interface 244, which can manage such functions as charging battery 242 from an external power source (not shown) and the distribution of energy to various loads within or coupled to portable electronic device 102.

A set of applications that control basic device operations, including data and possibly voice communication applications, can be installed on portable electronic device 102 during or after manufacture. Additional applications or upgrades to operating system software 232 or software applications 234 can also be loaded onto portable electronic device 102 through the wireless network (for example network 110), auxiliary I/O subsystem 216, data port 218, short-range wireless communications subsystem 226, or other suitable subsystem such as 228. The downloaded programs or code modules can be permanently installed, for example, written into the persistent memory 210, or written into and executed from RAM 212 for execution by processor 202 at runtime.

Portable electronic device 102 can provide three principal modes of communication: a data communication mode, a voice communication mode, and a video communication mode. In the data communication mode, a received data signal such as a text message, an e-mail message, Web page download, VoIP data, or an image file are processed by communication subsystem 204 and input to processor 202 for further processing. For example, a downloaded Web page can be further processed by a browser application, or an e-mail message can be processed by an e-mail message messaging application and output to display 206. A user of portable electronic device 102 can also compose data items, such as e-mail messages, for example, using the input devices, such as auxiliary I/O subsystem 216, in conjunction with display 206. These composed items can be transmitted through communication subsystem 204 over the wireless network (for example network 110). In the voice communication mode, portable electronic device 102 provides telephony functions and operates as a typical cellular phone. In the video communication mode, portable electronic device 102 provides video telephony functions and operates as a video teleconference terminal. In the video communication mode, portable electronic device 102 utilizes one or more cameras (such as camera 224) to capture video for the video teleconference.

Figure 2C:
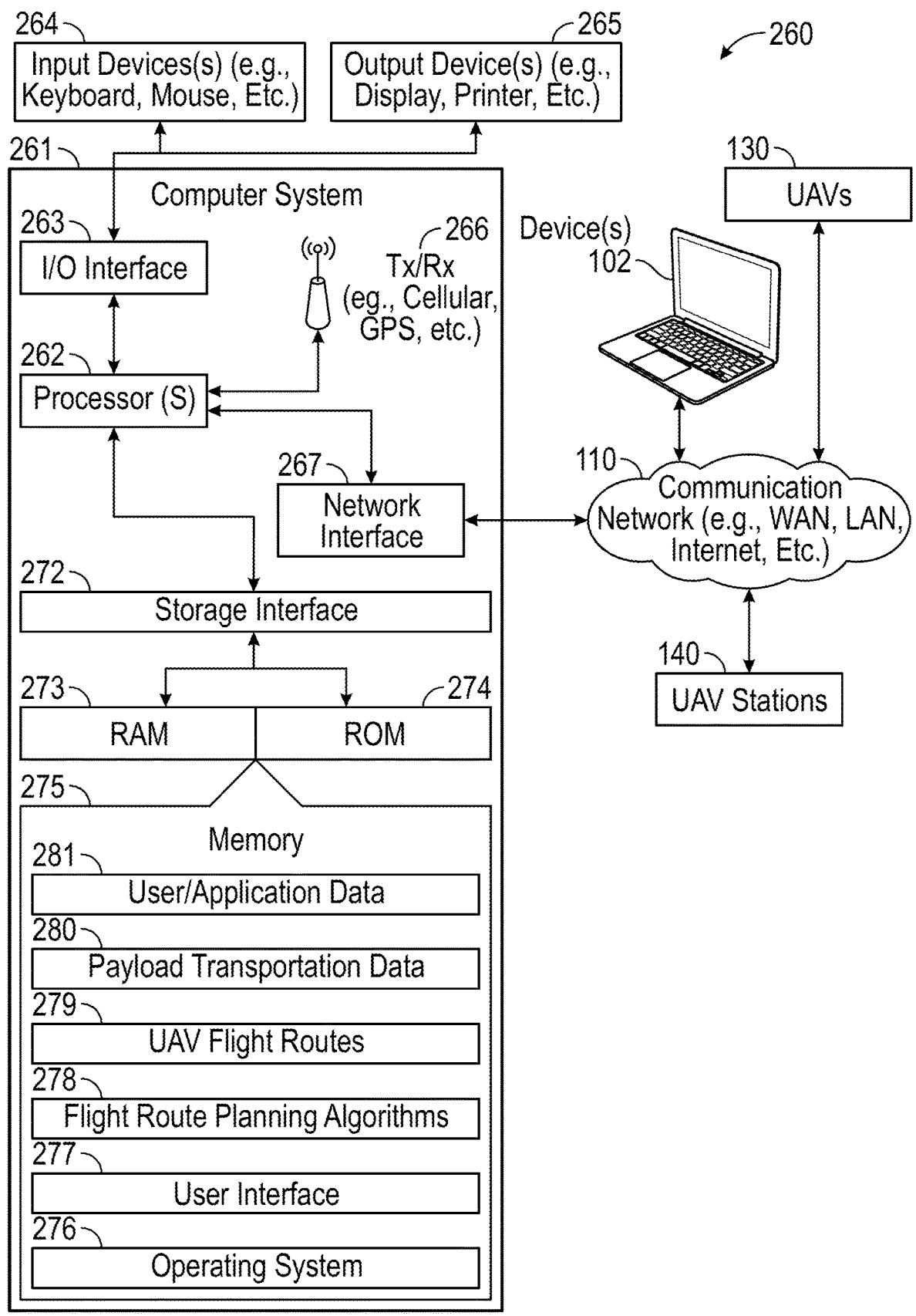
FIG. 2C illustrates an exemplary computer system for facilitating the payload transportation using UAVs, consistent with some embodiments of the present disclosure.

FIG. 2C illustrates an exemplary payload transportation system 260 for facilitating payload transportation using UAVs, consistent with some embodiments of the present disclosure. Referring to FIG. 2C, payload transportation system 260 can include a computer system 261, input devices 264, output devices 265, portable electronic devices 102, UAVs 130, and UAV stations 140. Computer system 261 can enable or provide a UAV service (e.g., UAV service 120) as described with FIG. 1. It is appreciated that components of payload transportation system 260 can be separate systems or can be integrated systems.

In some embodiments, computer system 261 can comprise one or more central processing units ("CPU" or "processor(s)") 262. Processor(s) 262 can comprise at least one data processor for executing program components for executing user- or system-generated requests. A user may include a person, a person using a device such as those included in this disclosure, or such a device itself. Processor(s) 262 can include specialized processing units such as integrated system (bus) controllers, memory management control units, floating point units, graphics processing units, digital signal processing units, etc. Processor(s) 262 can include a microprocessor, such as AMD Athlon, Duron or Opteron, ARM's application, embedded or secure processors, IBM PowerPC, Intel's Core, Itanium, Xeon, Celeron or other line of processors, etc. Processor(s) 262 can be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor(s) 262 can be disposed in communication with one or more input/output (I/O) devices via I/O interface 263. I/O interface 263 can employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 263, computer system 261 can communicate with one or more I/O devices. For example, input device 264 can be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, electrical pointing devices, etc. Output device 265 can be a printer, fax machine, video display (e.g., cathode ray tube (CRT), liquid crystal display (LCD), light-emitting diode (LED), plasma, or the like), audio speaker, etc. In some embodiments, a transceiver 266 can be disposed in connection with processor(s) 262. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor(s) 262 may be disposed in communication with a communication network 110 via a network interface 267. Network interface 267 can communicate with communication network 110. Network interface 267 can employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. As described above, communication network 110 can include, without limitation, a direct interconnection, local area network (LAN), wide area network (WAN), wireless network (e.g., using Wireless Application Protocol), the Internet, etc. Using network interface 267 and communication network 110, computer system 261 can communicate with portable electronic devices 102. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 261 may itself embody one or more of these devices.

In some embodiments, using network interface 267 and communication network 110, computer system 261 can also communicate with UAVs 130 and/or UAV stations 140. For example, computer system 261 can communicate with UAVs 130 to provide flight route for transporting payloads and communicate with UAV stations 140 to receive payload delivery confirmations.

In some embodiments, processor(s) 262 can be disposed in communication with one or more memory devices (e.g., RAM 273, ROM 274, etc.) via a storage interface 272. Storage interface 272 can connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, flash devices, solid-state drives, etc.

Memory devices 275 can store a collection of program or database components, including, without limitation, an operating system 276, user interface application 277, flight route planning algorithms 278, UAV flight routes 279, payload transportation data 280, user/application data 281 (e.g., any data variables or data records discussed in this disclosure), etc. Operating system 276 can facilitate resource management and operation of computer system 261. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

User interface 277 can facilitate display, execution, interaction, manipulation, or operation of program components through textual or graphical facilities. For example, user interfaces can provide computer interaction interface elements on a display system operatively connected to computer system 261, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 261 can implement flight route planning algorithms 278. Flight route planning algorithms 278 can include processes to determine or calculate flight routes for UAV 130 to transport a payload from an originating location to a destination location. Flight route planning algorithm 278 may determine the flight route based on, for example, location data, geospatial data, obstacle data, avoidance zones, latitude, longitude, and altitude data. Exemplary flight route planning algorithms 278 are described in more detail in the U.S. Patent Application No. 62/138,910 filed on Mar. 26, 2015, entitled "System and Methods for Unmanned Aerial Vehicle Route Planning" (Attachment B) and in U.S. Patent Application No. 62/138,914 filed on Mar. 26, 2015, entitled "Unmanned Aerial Vehicle" (Attachment C). Computer system 261 can also store UAV flight routes 279 (e.g., save previous determined UAV flight routes) and payload transportation data 280 (e.g., payload transporting requests, payload descriptions, and/or payload transportation confirmation).

In some embodiments, computer system 261 may store user/application data 121, such as data, variables, and parameters as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Mobile Application for Operator

Figure 3B:
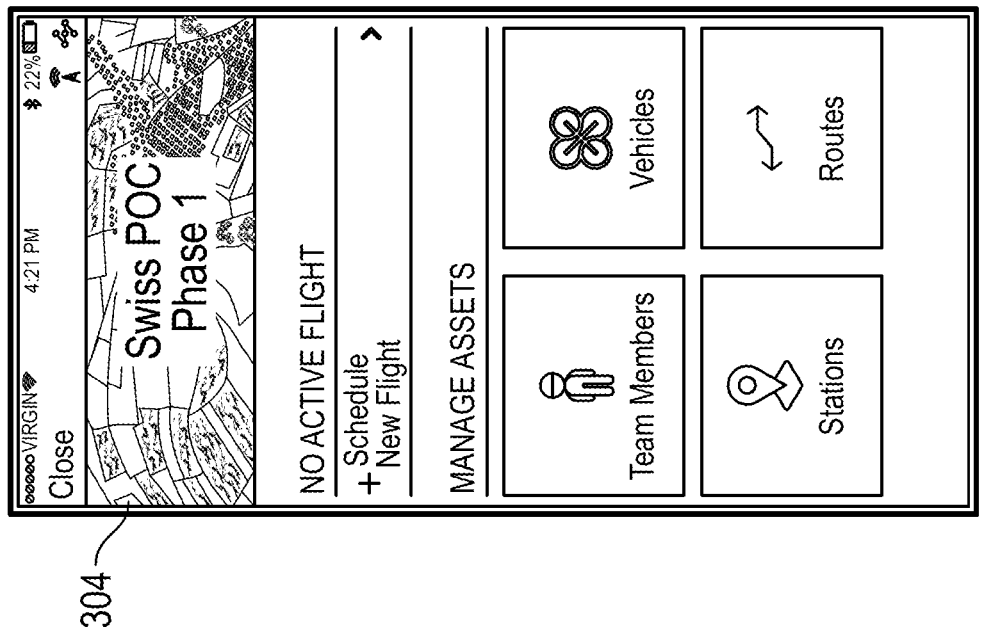
FIGS. 3A-3X illustrate exemplary user interfaces of an application for facilitating payload transportation using a UAV, consistent with some embodiments of the present disclosure.
FIG. 3Y illustrates a flow chart of an exemplary process for facilitating payload transportation using a UAV, consistent with some embodiments of the present disclosure.
Figure 3A:
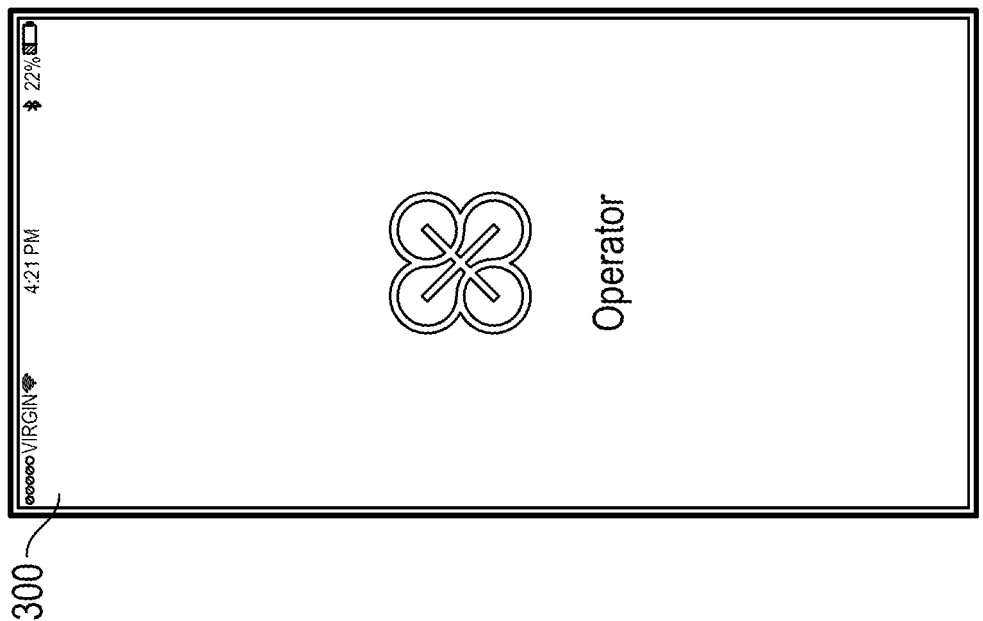
Figure 3D:
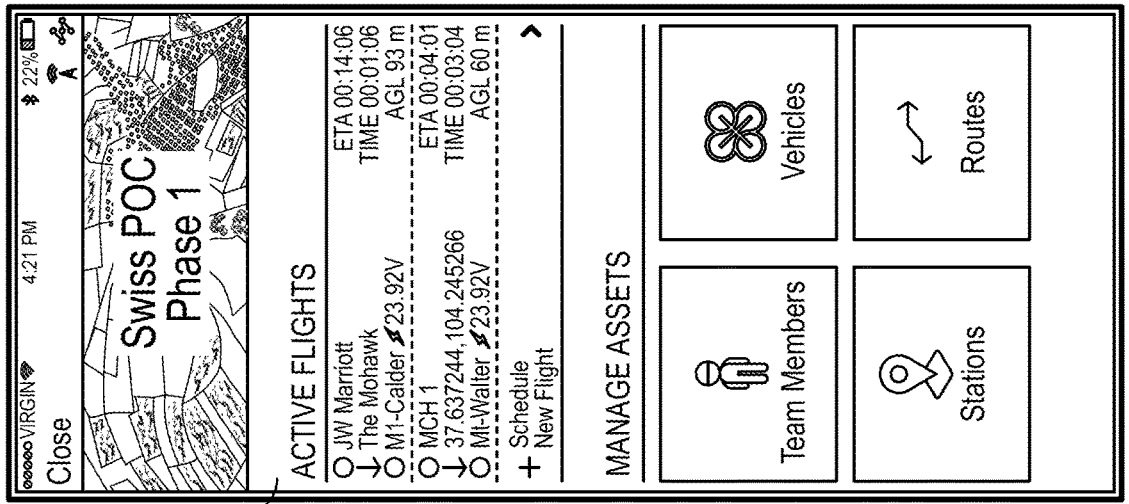
Figure 3C:
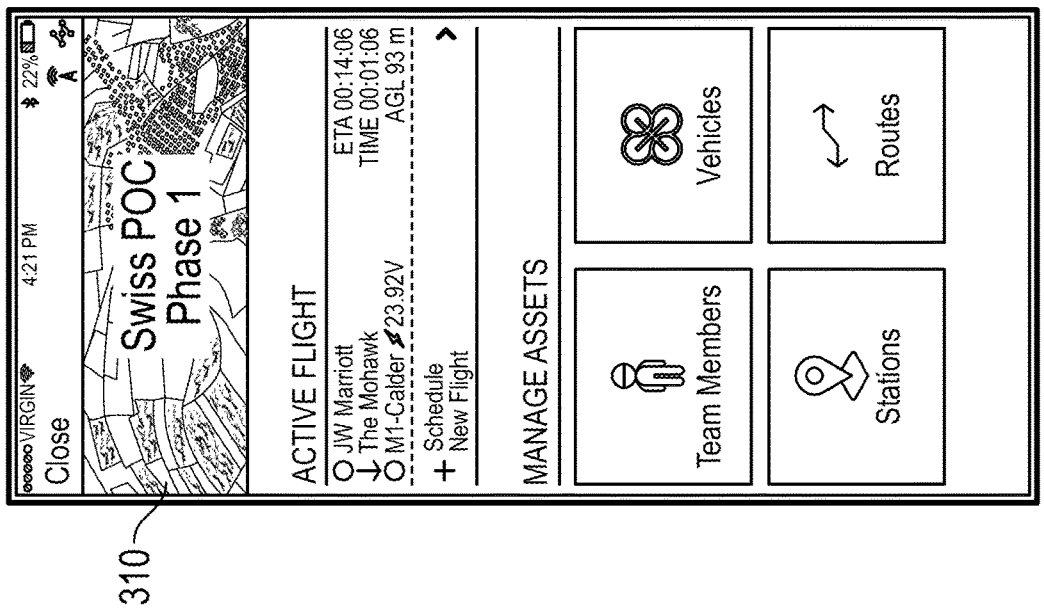
Figure 3F:
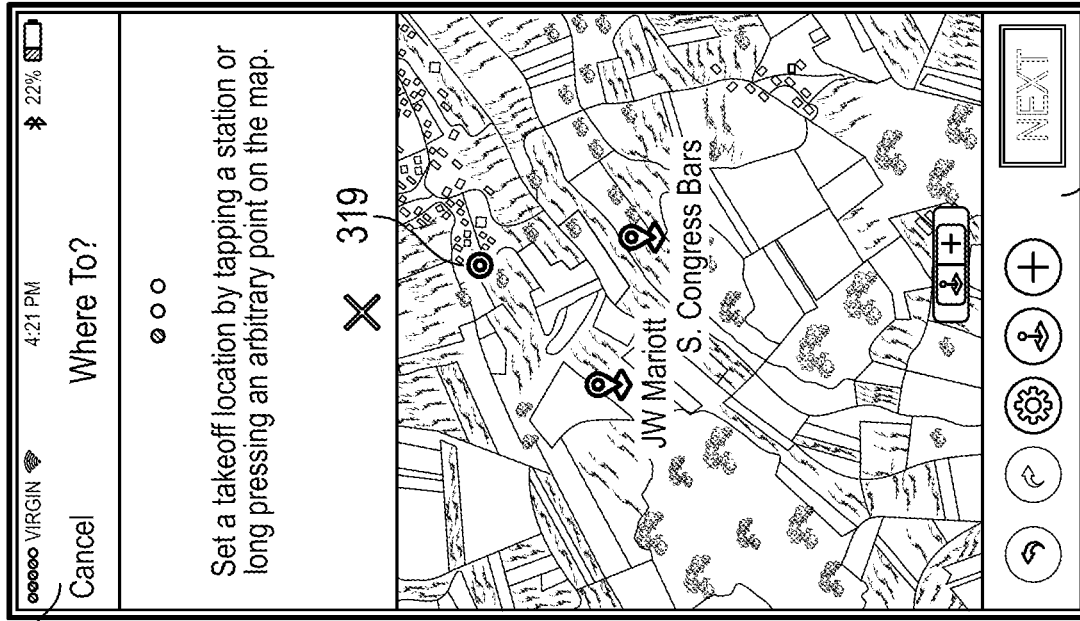
Figure 3E:
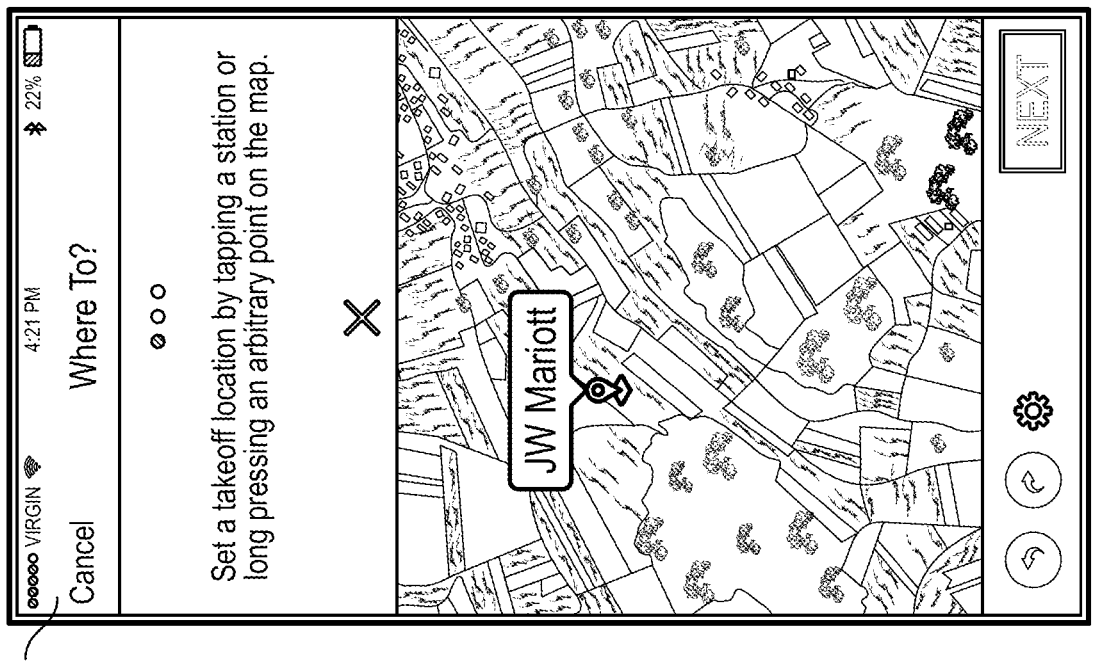
Figure 3H:
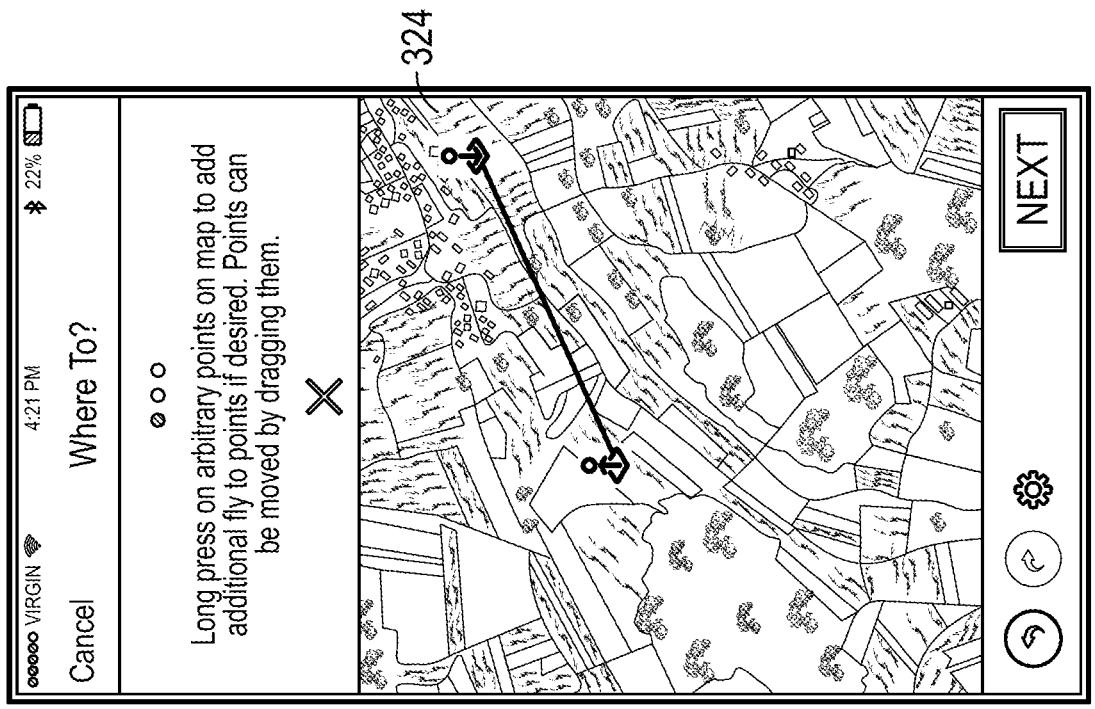
Figure 3G:
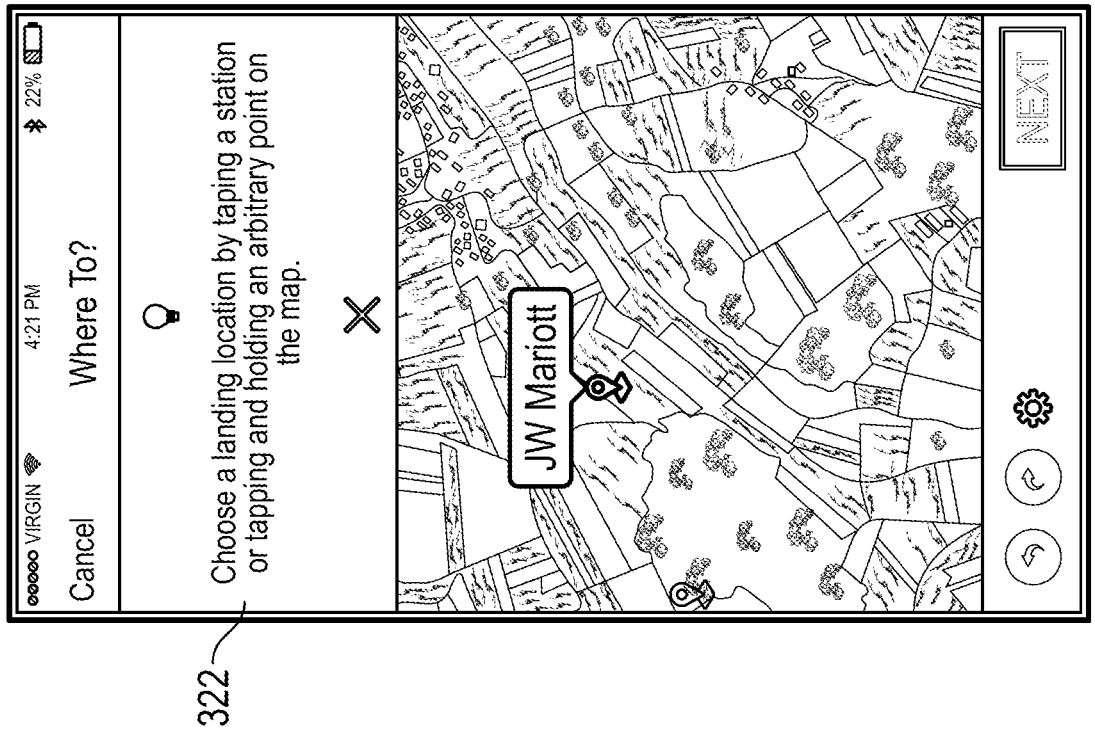
Figure 3J:
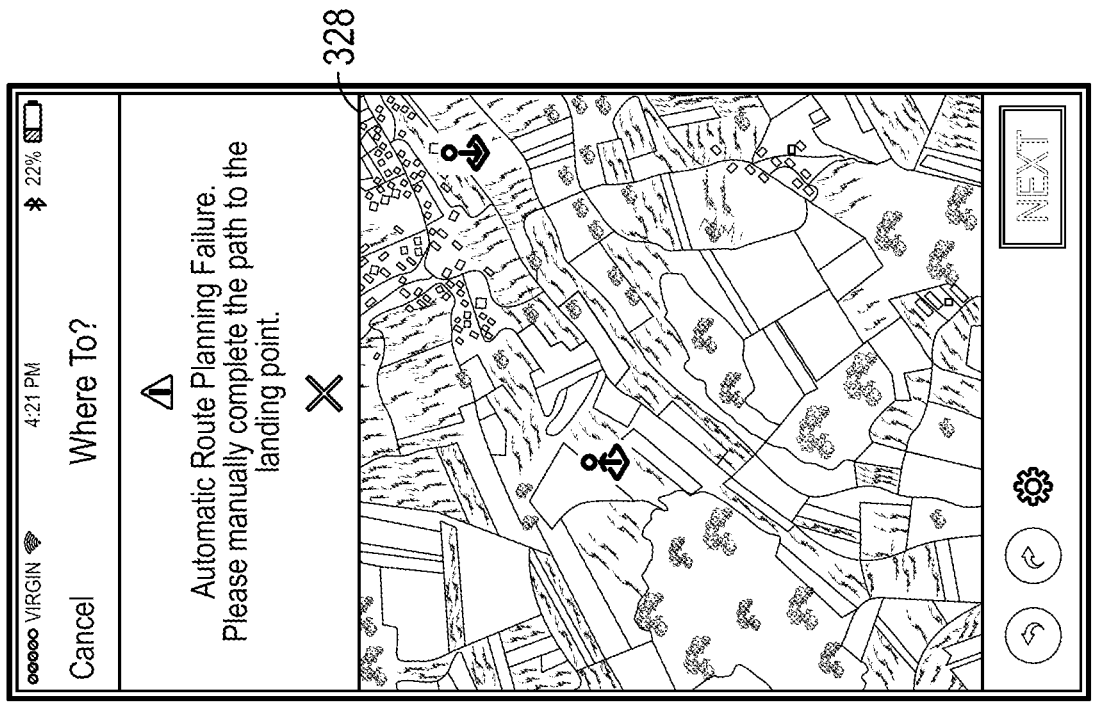
Figure 3I:
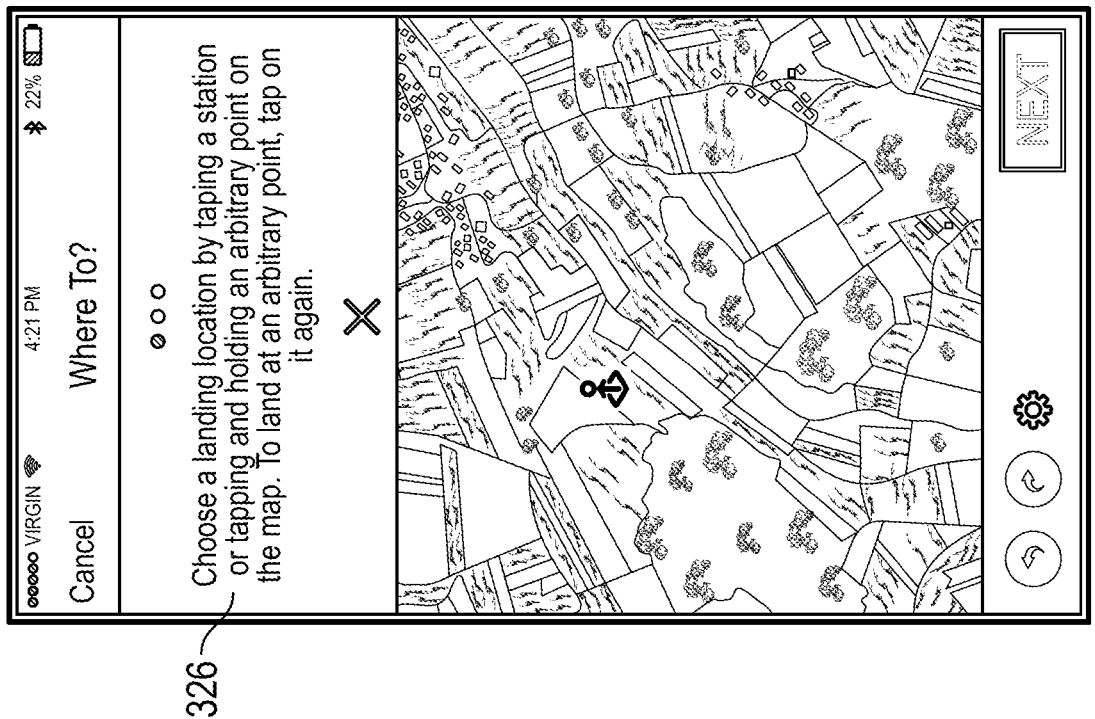
Figure 3L:
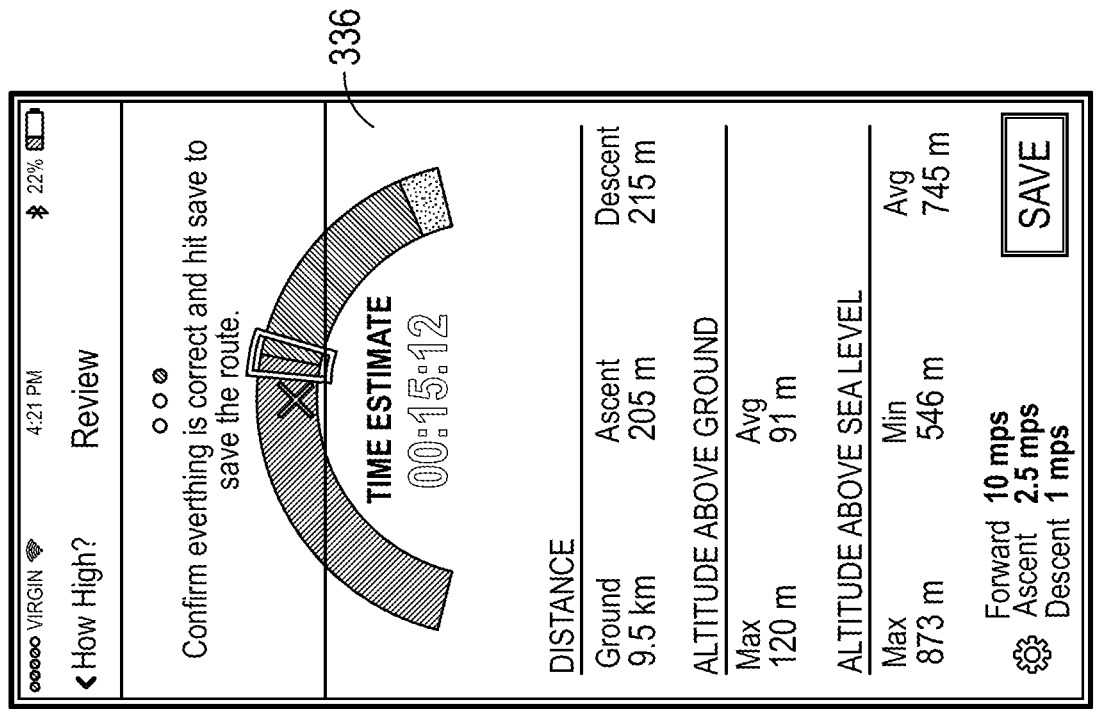
Figure 3K:
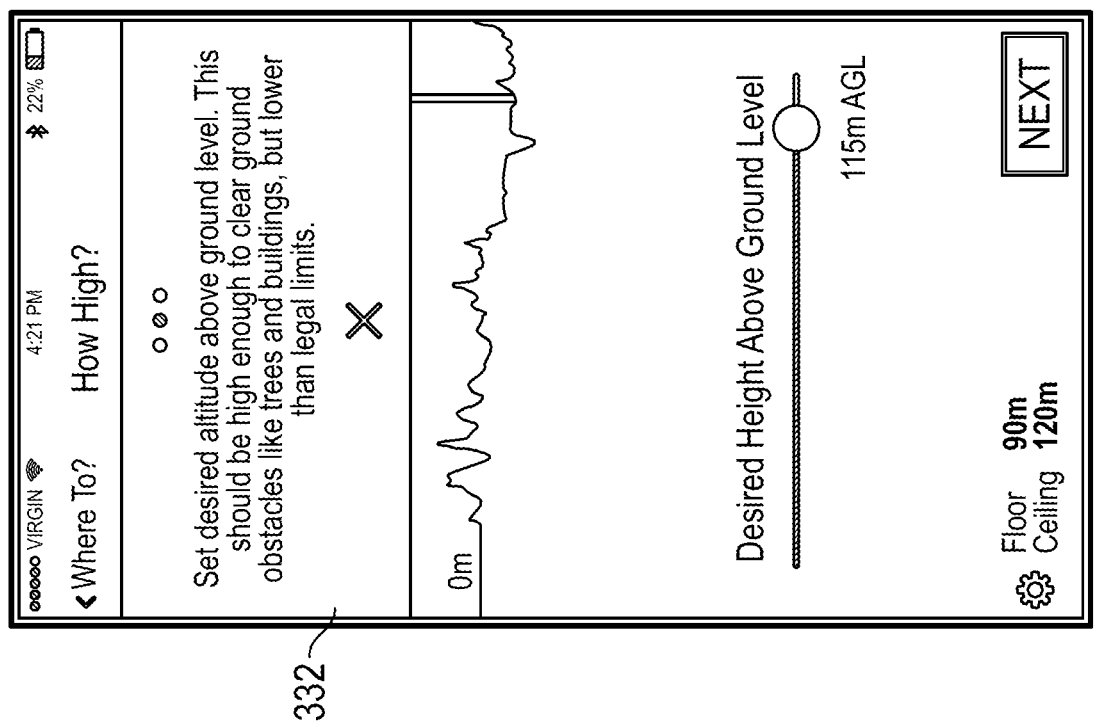
Figure 3M:
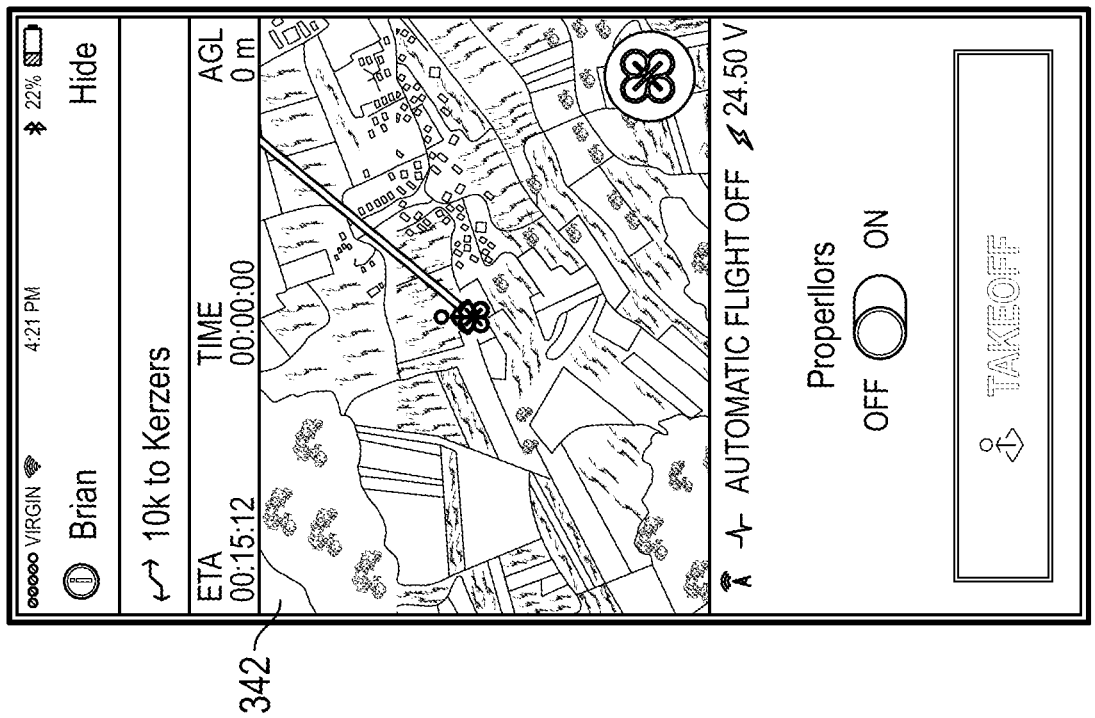
Figure 3N:
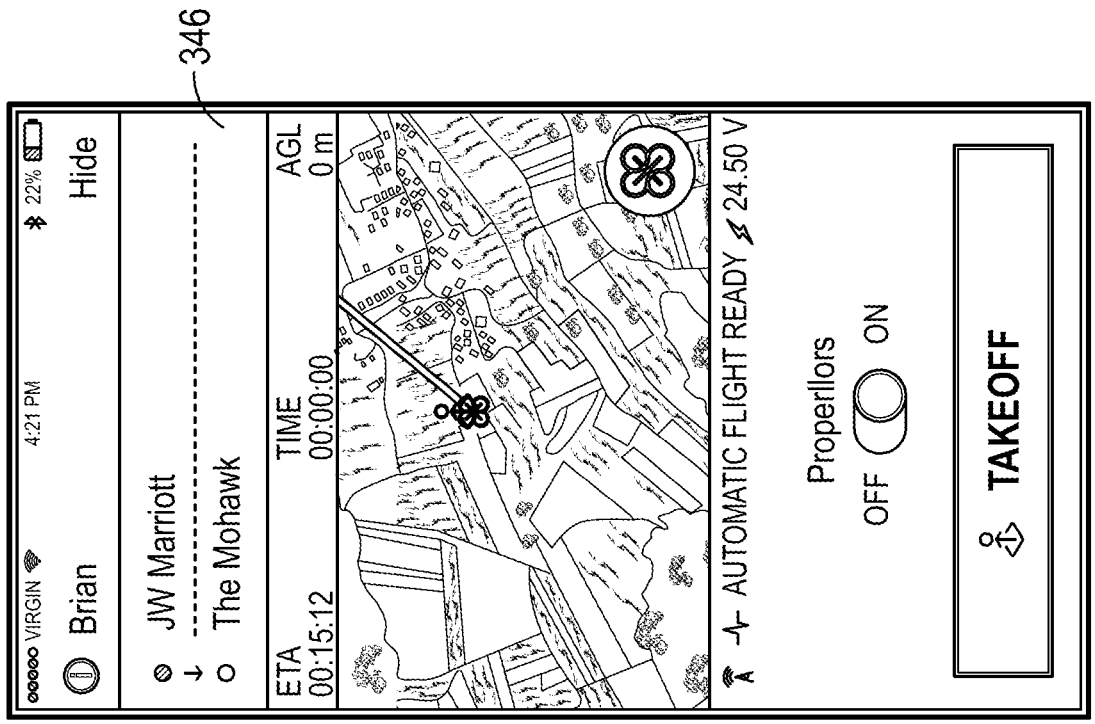
Figure 3P:
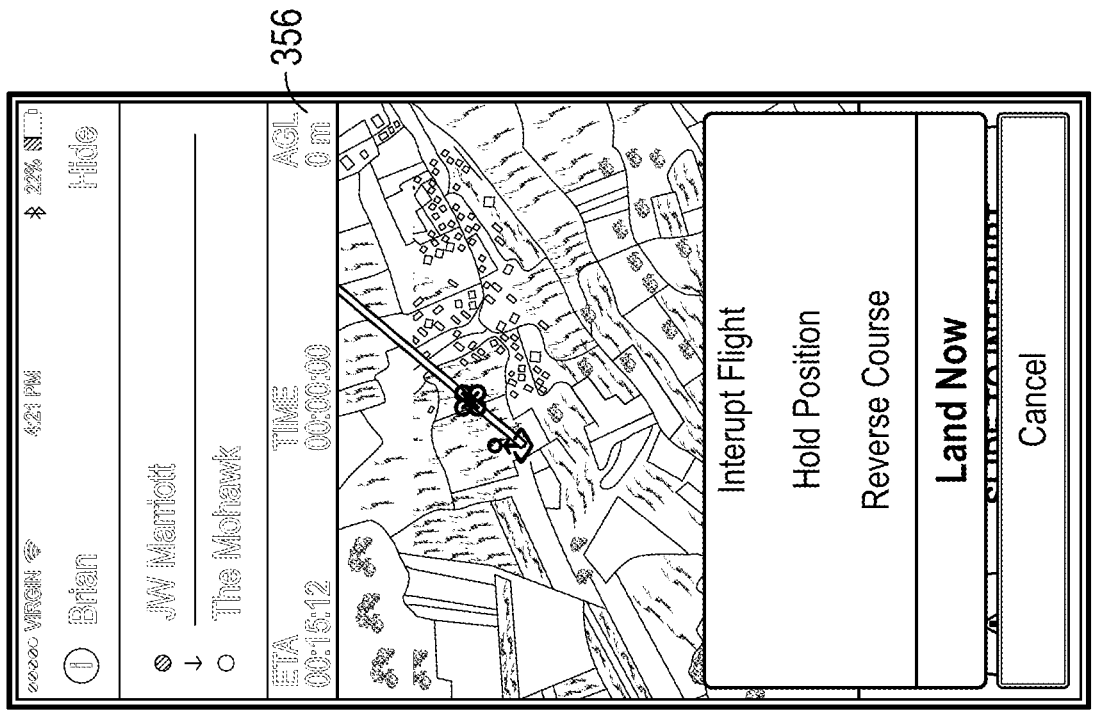
Figure 3O:
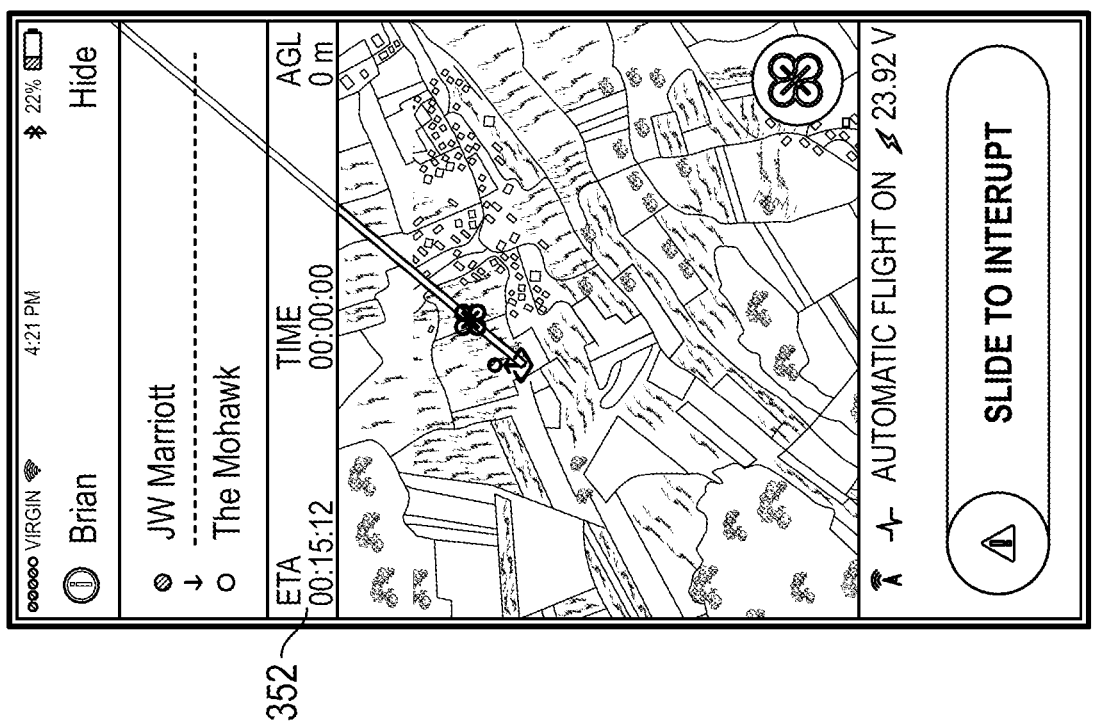
Figure 3R:
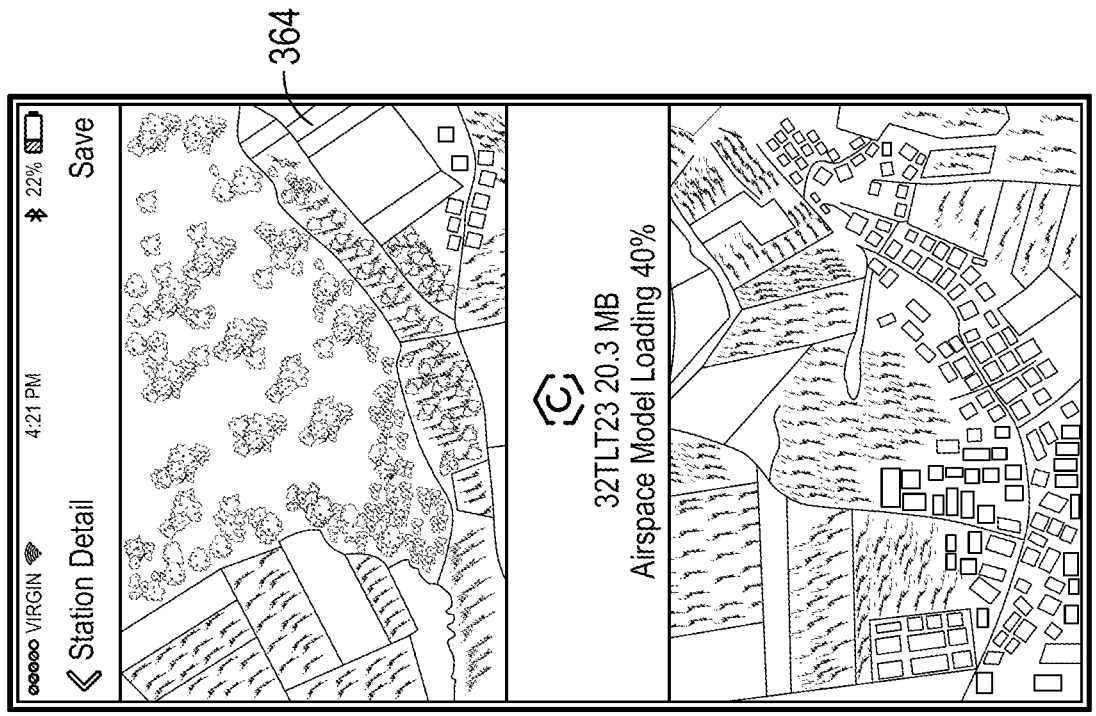
Figure 3Q:
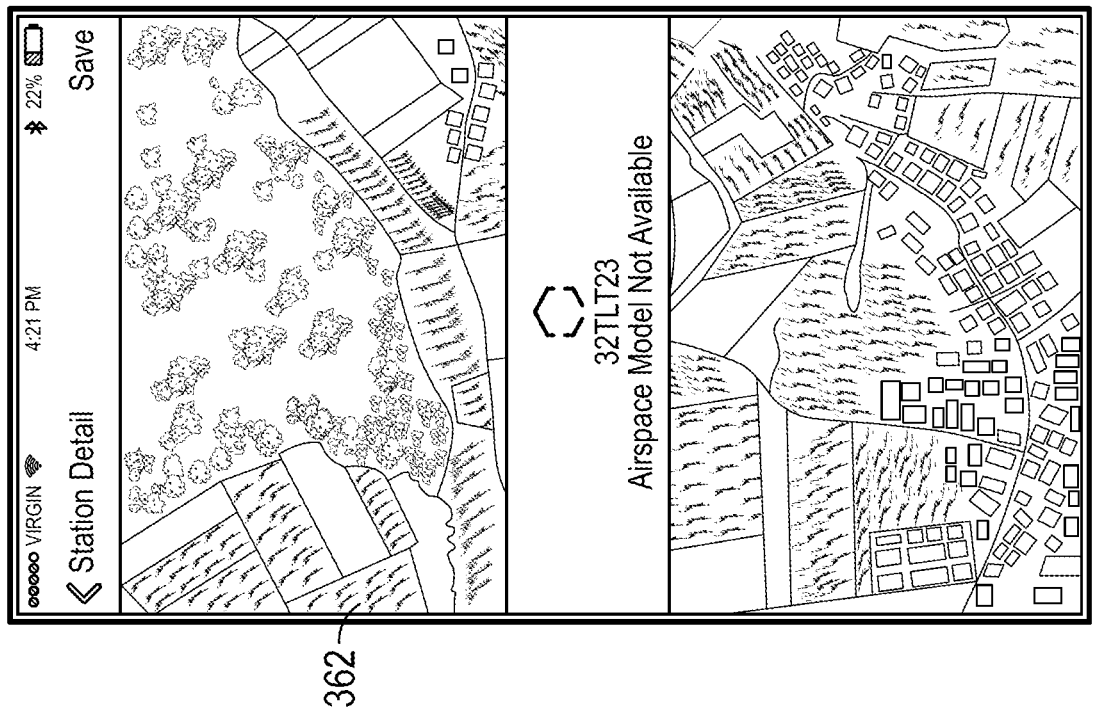
Figure 3T:
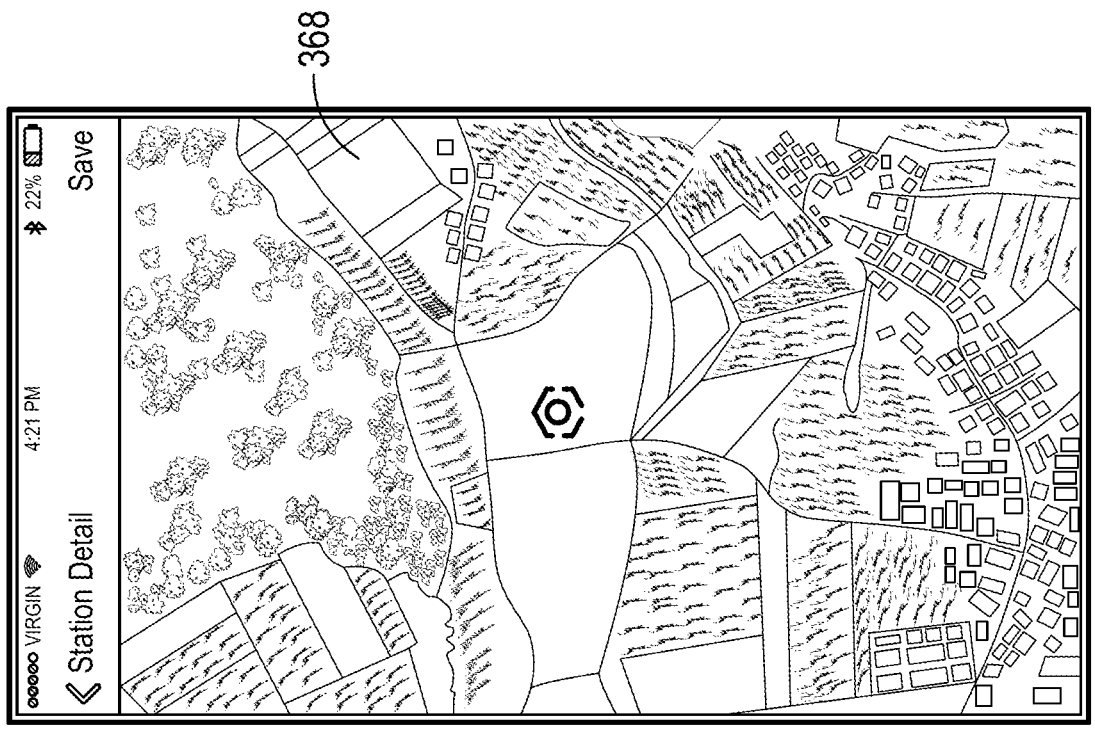
Figure 3S:
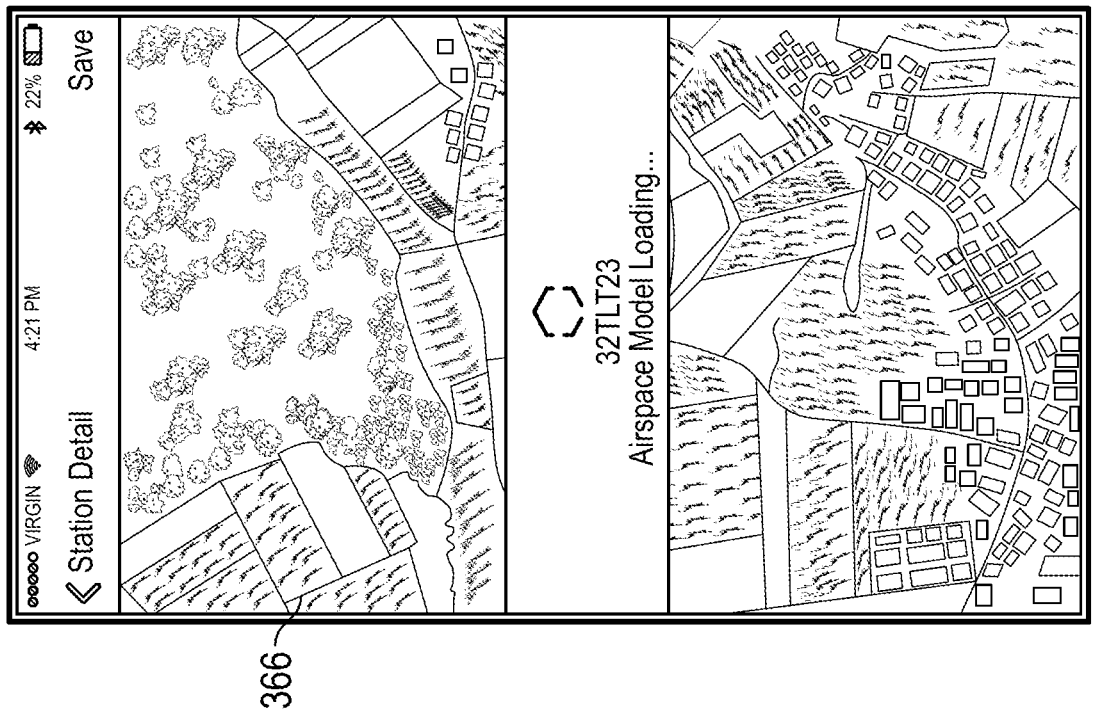
Figure 3V:
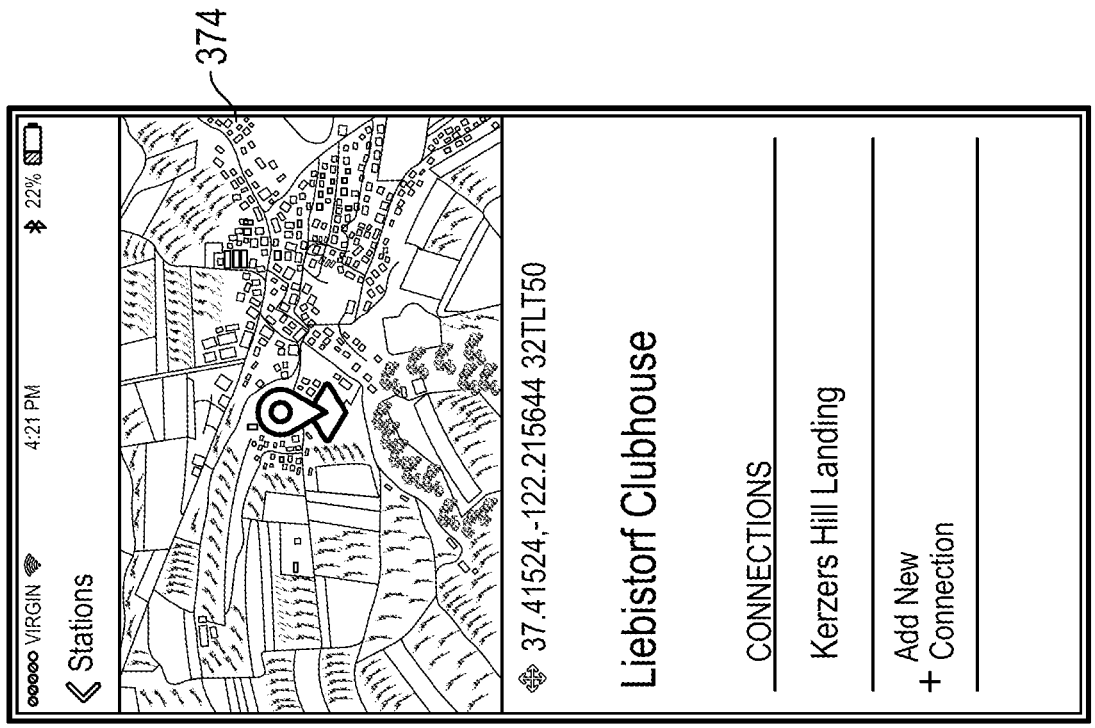
Figure 3U:
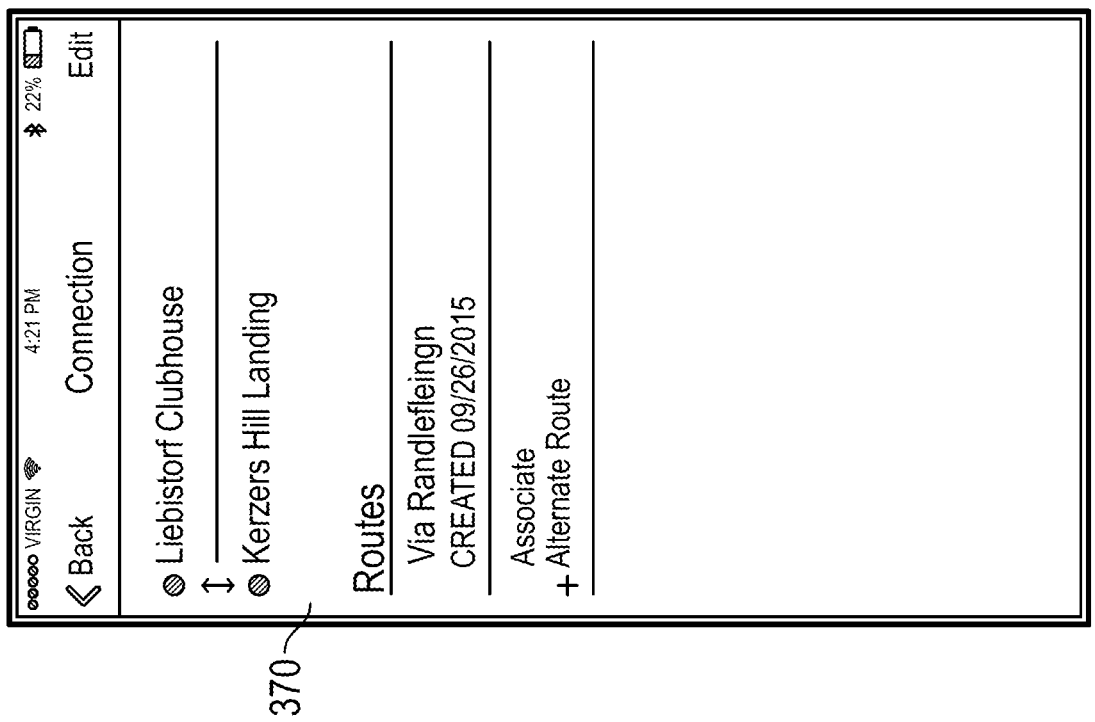
Figure 3X:
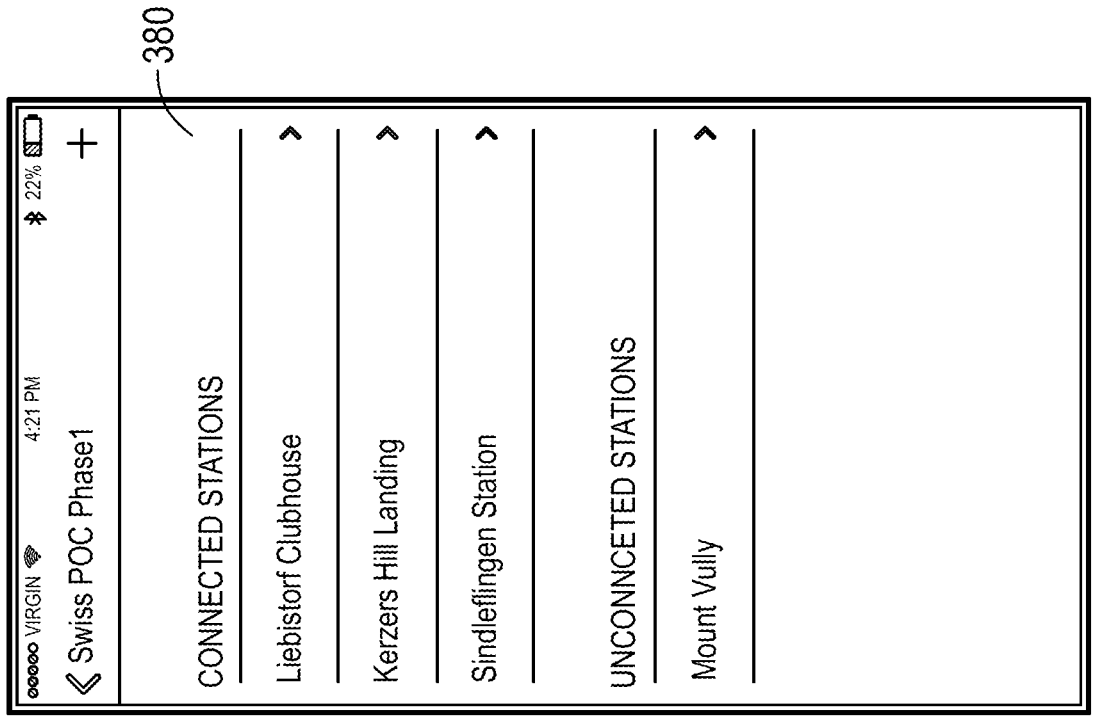
Figure 3W:
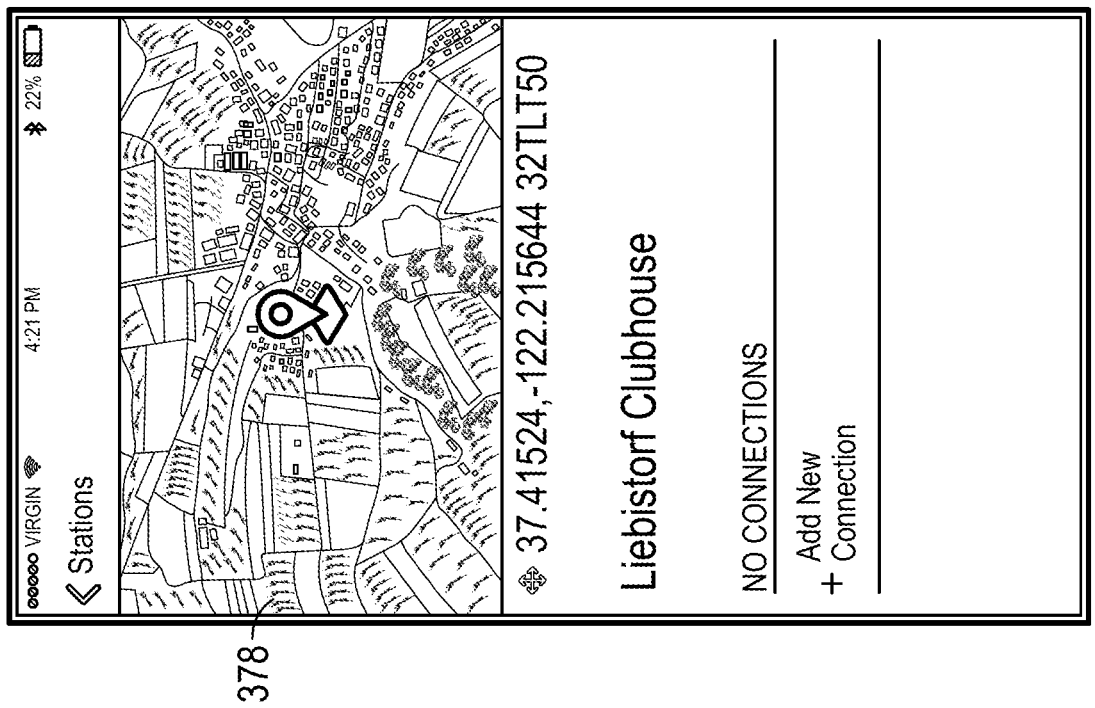

FIGS. 3A-3X illustrate an exemplary user interface 300 of an application for facilitating payload transportation using a UAV, consistent with some embodiments of the present disclosure. User interface 300 can be provided by, for example, an application (e.g., applications 234) of a portable electronic device (e.g., portable electronic device 102) shown in FIG. 2B. In some embodiments, user interface 300 provides an image indicating whether the application is for an administrator or a transporter. An administrator can be a user who oversees or manages a UAV service for transporting payloads using one or more UAVs. A transporter can be a user who requests, schedules, or delivers payloads. For example, the administrator can be a UAV service administrator or an operator. And the transporter can be an exchange station driver such as a transporting vehicle driver. As illustrated in FIG. 3A, user interface 300 indicates that the underlying application is for an administrator or an operator.

In some embodiments, the portable electronic device also provides authentication regions (not shown) on user interface 300. For example, the authentication regions can include a user name region and a password region for authenticating the user. Thus, a user may need to enter his or her user name and password before the portable electronic device allows the user to use the application or displays the next user interface (e.g., user interface 304 shown in FIG. 3B). It is appreciated that the authentication can be any process that confirms the user's identity. For example, the portable electronic device can authenticate the user by validating his or her identity documents, verifying the user's biometric characteristics, verifying a digital certificate, or verifying an encryption key.

FIG. 3B illustrate an exemplary user interface 304 of an application for facilitating payload transportation using a UAV, consistent with some embodiments of the present disclosure. User interface 304 can be provided by an application (e.g., application 234) of a portable electronic device (e.g., portable electronic device 102) shown in FIG. 2B. User interface 304 may include a plurality of regions, such as an active flight region, a flight scheduling region, and an asset management region. An active flight region displays information associated with an active flight. An active flight can be a flight that is scheduled, in-flight, or otherwise remaining in a mission for transporting a payload. For example, a UAV (e.g., UAV 130) is in an active flight when it has not completed the current mission for transporting a payload. Referring to FIG. 3B, on user interface 304, the portable electronic device may display "NO ACTIVE FLIGHTS" in the active flight region of user interface 304, indicating that there is currently no active flights.

Referring to FIG. 3B, the portable electronic device can also display "Schedule New Flight" text in the flight scheduling region of user interface 304. This "Schedule New Flight" text enables the user to schedule a new flight. The portable electronic device can further display a plurality of asset management icons in the asset managing region. For example, the asset management icons include a "Team Members" icon for managing team members (e.g., transporters), a "Vehicles" icon for managing vehicles (e.g., UAVs), a "Stations" icon for managing stations (e.g., UAV stations, landing platforms, or exchange stations), and a "Routes" icon for managing UAV flight routes. As an example, a user can obtain or manage the team members' information by selecting the team members icon. After the user selects the "Team Members" icon (e.g., by touching the "Team Members" icon displayed in the asset management region of user interface 304), the portable electronic device can display the information associated with a plurality of team members, such as the names of other operators who have access to the UAVs, UAV stations and routes of the same network.

Similarly, a user can obtain or manage the UAVs, the UAV stations, and the routes by selecting the "Vehicles" icon, the "Stations" icon, or the "Routes" icon, respectively, as shown on user interface 304. After the user selects the respective icons (e.g., by touching the desired icons displayed in the asset management region of user interface 304), the portable electronic device can display the information associated with the respective icons. For example, the portable electronic device can display the number of UAVs, the locations of the UAVs, the status of the UAVs (e.g., active, inactive, in-flight, etc.), the number of UAV stations, the locations of the UAV stations, the status of the UAV stations, the save flight routes, and any information associated with a particular flight route. The status of the UAV stations can include the number of UAVs landed on the landing platforms of the UAV stations, the number of remaining payloads of the UAV stations, and any other logistic information associated with the UAV stations. The information associated with a particular flight route includes, for example, the estimated time and distance for a flight route, the altitude information of the flight route, and whether a particular flight route is affected by a changing weather.

FIGS. 3C and 3D illustrate exemplary user interfaces 310 and 312, respectively, of an application for facilitating payload transportation using a UAV, consistent with some embodiments of the present disclosure. User interfaces 310 and 312 can be provided by an application (e.g., application 234) of a portable electronic device (e.g., portable electronic device 102) shown in FIG. 2B. Similar to user interface 304, user interface 310 also includes a plurality of regions such as the active flight region, the flight scheduling region, and the asset management region. In the active flight region of user interface 310, the portable electronic device can display information associated with an active flight. For example, it can display the takeoff location of the UAV used in the active flight (e.g., JW Marriott), the scheduled landing location of the UAV (e.g., the Mohawk), the identification of the UAV (e.g., M1-Calder), the battery status of the UAV (e.g., 23.92V), the estimated time of arrival (ETA) (e.g., 00:14:06), the time in flight (e.g., 00:01:06), and the altitude of the UAV (e.g., above ground level (AGL) 93 meters). The flight scheduling region and the asset management region on user interface 310 can be substantially similar to those on user interface 304 described above, and thus are not repeatedly described.

Referring to FIG. 3D, in some embodiments, the portable electronic device can display multiple active flights in the active flight region. For example, the active flight region of user interface 312 illustrates two active flights. Further, in the active flight region, the portable electronic device can display information in various forms. For example, the scheduled landing location of the second flight (i.e., the flight having a takeoff location of MCH1) is displayed using coordinates or positions rather than a name of the destination location. The flight scheduling region and the asset management region on user interface 312 can be substantially similar to those on user interface 304 described above, and thus are not repeatedly described.

FIGS. 3E and 3F illustrate exemplary user interface 316 and 318, respectively, of an application for facilitating payload transportation using a UAV, consistent with some embodiments of the present disclosure. User interfaces 316 and 318 can be provided by an application (e.g., application 234) of a portable electronic device (e.g., portable electronic device 102) shown in FIG. 2B. In some embodiments, the portable electronic device can display a map on user interface 316 to enable the user to select an originating location of a UAV flight. An originating location can be a location where the UAV takes off (e.g., a takeoff location) or a location where the payload originates (e.g., a location where the payload is received). In the present description, the originating location and the takeoff location may or may not be the same location. The map can display an icon of a UAV station that is located in the area shown on the map. For example, a UAV station may be located at the JW Marriott hotel and the portable electronic device displays an icon of that UAV station with a label indicating "JW Marriott." In some embodiments, the portable electronic device can display a map that allows a user to select an arbitrary location on the map. For example, a user may determine that the "JW Marriott" UAV station is not convenient or is not available to be a takeoff location, the user can thus select an arbitrary location on the map as the takeoff location. In some embodiments, the user can select the takeoff location by either tapping on a UAV station icon or by long pressing (e.g., pressing and holding) an arbitrary location on the map.

In some embodiments, the portable electronic device may not display a map or may display a map with a text input region. For example, the portable electronic device may display a text input region to allow the user to provide the description or coordinates of the takeoff location. Further, referring to FIG. 3E, the portable electronic device may also provide one or more messages on user interface 316. For example, the portable electronic device may display a message stating "Set a takeoff location by tapping a station or long pressing an arbitrary point on the map." The message provides instructions to the user for operating using user interface 316.

Similar to FIG. 3E, FIG. 3F illustrates user interface 318 that includes a map for enabling the user to select a takeoff location of a UAV flight. On the map, the portable electronic device can display icons of multiple (e.g., two) UAV stations (e.g., JW Marriott station and S. Congress Bats station). A user may select one or these UAV stations as the takeoff location by tapping on one of the UAV station icons. A user may also determine that both of these UAV stations are not convenient or not available. The user may thus select an arbitrary location on the map to be the takeoff location. For example, the user may long press an arbitrary location 319 on the map. In response, the portable electronic device displays a mark (e.g., a concentric circles icon) identifying the takeoff location that the use selects.

Referring to FIG. 3F, in some embodiments, the portable electronic device can also display a menu bar region on user interface 318. For example, the menu bar region may be located at the bottom of user interface 318 and includes a menu bar 320. Menu bar 320 can include a plurality of icons allowing the user to go-back to the previous user interface, go-forward to the next user interface, invoke a settings user interface, invoke a user interface for displaying UAV stations, and or invoke a user interface for adding a UAV station. In some embodiments, some of the icons on user interface 318 can be greyed out or disabled if the portable electronic device detects no user input or insufficient user input. For example, the portable electronic device may disable a "Next" button before it receives the user input for selecting a takeoff location.

FIGS. 3G and 3H illustrate exemplary user interfaces 322 and 324, respectively, of an application for facilitating payload transportation using a UAV, consistent with some embodiments of the present disclosure. User interfaces 322 and 324 can be provided by an application (e.g., application 234) of a portable electronic device (e.g., portable electronic device 102) shown in FIG. 2B. In some embodiments, after the portable electronic device receives a user input to select a takeoff location of the UAV and/or receives the user's selection of a "Next" button, the portable electronic device displays user interface 322. User interface 322 can provide one or more messages instructing the user to select a destination location for the UAV. A destination location can be a location the UAV releases the payload (e.g., a landing location) or can be a location where the payload is intended to be received. The destination location may or may not be the same as the landing location. For example, in a message region of user interface 322, the portable electronic device may display a message instructing the user to "Choose a landing location by taping a station or tapping and holding an arbitrary point on the map." Similar to the selection of a takeoff location, user interface 322 allows the user to select a destination location or landing location by tapping on an existing UAV station or long pressing an arbitrary location on the displayed map.

Referring to FIG. 3H, in some embodiments, after the portable electronic device receives a user selection of the destination location, the portable electronic device can obtain a determination of a flight route and display the flight route between the takeoff location and the landing location. As an example, the portable electronic device can receive a user input indicating a selected landing location and displays the landing location on user interface 324. The portable electronic device can then provide the users selection of takeoff location and landing location to a UAV service (e.g., UAV service 120). The UAV service can determine whether there is a viable flight route between the takeoff location and the landing location. For example, the UAV service determines whether there are obstacles, flight avoidance zones (e.g., an airport), or other factors interfering a flight between the takeoff location and the landing location. And if there are such interfering factors, the UAV service can determine whether a flight is still viable by, for example, taking an alternative route. The flight route determination or planning is described in more detail in U.S. Provisional Patent Application No. 62/138,910 filed on Mar. 26, 2015, entitled "System And Methods For Unmanned Aerial Vehicle Route Planning;" in U.S. Provisional Patent Application No. 62/138,914 filed on Mar. 26, 2015, entitled "Unmanned Aerial Vehicle;" and in co-pending U.S. patent application Ser. No. 15/081,195 filed Mar. 25, 2016, entitled "Route Planning For Unmanned Aerial Vehicle." These applications are incorporated by reference in their entirety for all purposes. If the UAV service determines there is a viable flight route between the selected takeoff location and the landing location, the UAV service provides the determined flight route to the portable electronic device. The portable electronic device can thus display, for example, a line between the takeoff location and the destination location indicating a viable flight route.

Referring to FIG. 3H, in some embodiments, after the portable electronic device displays a viable flight route between the selected takeoff location and the landing location, user interface 324 can allow the user to add additional locations and/or change the existing locations. For example, user interface 324 may display a message stating "Long press on arbitrary points on map to add additional fly to points if desires. Points can be moved by dragging them." Thus, if a user desires to add an additional takeoff and/or landing location, the user can repeat the above described process (e.g., tap on another UAV station or long press another arbitrary location on the map) to select additional takeoff and/or landing locations. In response to such a selection, the portable electronic device can repeat the process to obtain determinations indicating whether viable flight routes to the additional locations exist. Based on such determinations, user interface 324 can display one or more additional viable flight routes. Further, user interface 324 can allow the user to move a selected location to another location (e.g., allowing dragging of a selected arbitrary location) on the map. In response to such user movement, the portable electronic device can obtain further determination indicating whether a viable flight route exists for the new location. Based on the determination, user interface 324 can display such viable flight routes.

FIGS. 3I and 3J illustrate exemplary user interfaces 326 and 328, respectively, of an application for facilitating payload transportation using a UAV, consistent with some embodiments of the present disclosure. User interfaces 326 and 328 can be provided by an application (e.g., application 234) of a portable electronic device (e.g., portable electronic device 102) shown in FIG. 2B. User interface 326 is the same or substantially the same as user interface 322 illustrated in FIG. 3G, and thus is not repeatedly described here.

As described above, after receiving user inputs of the takeoff location and the landing location, the portable electronic device can obtain a determination indicating whether a viable flight route exists between the two locations. In some embodiments, the determination may indicate that there is no viable flight route. For example, the flight between the two locations may not be viable because the flight route is interfered by obstacles, by flight avoidance zones, or by severe weather conditions. The flight route may also not be viable if the power supply of the UAV (e.g., a battery) is not sufficient to support such a flight.

In some embodiments, a UAV service may fail to determine a viable flight route between the selected takeoff location and the landing location. For example, such determination may fail because there is insufficient geospatial data and/or weather information, because the selected landing location is in an avoidance zone, or because the selected landing location is known to have has no or weak satellite or cellular signal coverage. As a result, if the UAV service fails to determine a flight route or the portable electronic device fails to obtain a determination of a flight route, user interface 328 may display a message requesting the user to manually complete the flight route determination or planning. For example, as shown in FIG. 3J, user interface 328 may display a message stating "Automatic Route Planning Failure. Please manually complete the path to the landing point."

FIGS. 3K and 3J illustrate exemplary user interfaces 332 and 336, respectively, of an application for facilitating payload transportation using a UAV, consistent with some embodiments of the present disclosure. User interfaces 332 and 336 can be provided by an application (e.g., application 234) of a portable electronic device (e.g., portable electronic device 102) shown in FIG. 2B. As discussed above, after the user selects the landing location, the portable electronic device can display a viable flight route on a corresponding user interface. In some embodiments, the portable electronic device can display user interface 332 for acquiring altitude information. For example, in response to the user's selection of the "Next" button shown on user interface 324 of FIG. 3H, the portable electronic device displays user interface 332 of FIG. 3K.

Referring to FIG. 3K, user interface 332 may display a message instructing the user to provide a desired altitude. For example, such message may state "Set desired altitude above ground level. This should be high enough to clear ground obstacles like trees and buildings, but lower than legal limits." User interface 332 can also provide a text input region, a sliding scale input, a drop menu, or any other input mechanisms for the user to provide the altitude value. As an example, user interface 332 may provide a sliding scale for allowing the user to select an altitude (e.g., 115 m AGL). In some embodiments, in response to the user's selection, the portable electronic device can provide the user input to a UAV service (e.g., UAV service 120) for determination of the minimum altitude (e.g., floor altitude of 90 m) and the maximum altitude (e.g., ceiling altitude of 120 m). The portable electronic device can obtain such determination and display such information on user interface 332. In some embodiments, after obtaining the determination of the flight route, the portable electronic device can obtain determination of the altitude without the user's input. For example, the UAV service can automatically determine the altitude based on data associated with the determined flight route, and provide the determination to the portable electronic device.

Referring to FIG. 3L, in some embodiments, after the portable electronic device receives the user input of the altitude information or obtains the altitude information from the UAV service, it can display user interface 336. User interface 336 can provide information or flight parameters associated with the determined flight route for the user's review or confirmation. For example, user interface 336 can provide distance information showing that for a particular flight route, the UAV may travel 9.5 km with 205 m ascent distance and 215 m descent distance. User interface 336 can also provide altitude above ground (AGL) information showing, for example, the maximum AGL may be set at 120 m and the average altitude may be 91 m. User interface 336 can also provide altitude above mean sea level (AMSL) information showing that, for example, the maximum AMSL may be 873 m, the minimum AMSL may be 546 m, and the average AMSL may be 745 m.

In some embodiments, user interface 336 can also provide additional information such as the time estimate for the flight (e.g., 00:15:12) and/or the speeds of the UAV (e.g., forward speed of 10 mps, ascent speed of 2.5 mps, and descent speed of imps). Further, user interface 336 can display a message instructing the user to confirm the flight information is correct. For example, such message may state "Confirm everything is correct and hit save to save the route." User interface 336 can display a "Save" button to allow saving of the determined flight route and associated flight parameters. If one or more of the flight parameters are incorrect, user interface 336 allows the user to go back to previous user interfaces to change the inputs (e.g., the landing location, the altitude, etc.).

FIGS. 3L1-3L3 illustrate exemplary user interface 336 providing additional information regarding the risk assessment of flight route planning. As discussed above, the UAV service (e.g., UAV service 120) can determine a flight route based on the user's inputs (e.g., taking off location, landing location, altitude, etc.) In some embodiments, the UAV service determines such flight route using hardware and/or software tools such as automatic obstacle avoidance and terrain-aware vertical planning. The UAV service and/or the portable electronic device can also perform risk assessment of a determined flight route. For example, the UAV service may perform a risk assessment based on data related to the geographical areas along the determined flight route, the UAV's historical data, and one or more risk assessment algorithms.

As an example, the UAV service can obtain population density data from datastores 150. Datastore 150 may obtain the population density data from various resources such as a website providing information of FSO STATPOP 100 m resolution (e.g., http://www.bfs.admin.ch/bfs/portal/de/index/news/02/03/01/01.html). The UAV service can also obtain a particular UAV's empirical velocity data, such as a velocity lookup table as shown in Table 1 below.

TABLE 1

An exemplary UAV empirical velocity lookup table.
Example

| Climb Angle | Ideal Navigation Speed |
|---|---|
| 90° | 2.5 m/s |
| 45° | 10 m/s |
| 0° | 17 m/s |
| −45° | 5 m/s |
| −90° | 1.5 m/s |

The UAV service can further obtain a particular UAV's impact area data, which may represent impact area sizes corresponding with various phases of flight such as takeoff, ascent, forward flight, descent, and landing. The impact area data may be in the form of a lookup table such as the one shown in Table 2 below.

TABLE 2

An exemplary UAV impact area lookup table.
Example

| Flight Phase | Impact Area |
|---|---|
| Takeoff | 1 m$^2$ |
| Ascent | 4 m$^2$ |
| Forward Flight | 16 m$^2$ |

TABLE 2-continued

An exemplary UAV impact area lookup table.
Example

| Flight Phase | Impact Area |
|---|---|
| Descent | 4 m² |
| Landing | 1 m² |

Based on the data obtained, the UAV service can determine a risk quotient, which represents the risk assessment of a determined flight route. For example, the UAV service can determine the risk quotient based on a risk quotient algorithm or formula. An exemplary risk quotient formula is shown below as formula 1.

$$R_c = \sum_{i=1}^{m} R_{ci} = \sum_{i=1}^{m} P_{ci} * A_{ci} * D_i = \sum_{i=1}^{m} P_c \frac{T_i}{T} * A_{ci} * D_i = P_c * \sum_{i=1}^{m} \frac{T_i}{T} * A_{ci} * D_i \quad \text{Formula 1}$$

In formula 1, $R_c$ represents the mean risk per mission; $P_c$ represents probability of a crash during the mission; $A_c$ represents the UAV's "lethal area;" $D_i$ represents the population density in each segment of the mission; $T_i$ represents the time spent over each segment of the mission; and T represents the overall mission time. A mission may include one or more segments along a flight route.

In some embodiments, for determining the risk quotient, the UAV service subdivides the horizontal path of a flight route into grid squares sized according to the resolution of the population density data. A grid square may represent a segment of the flight route. For each grid square, the UAV service can determine the local risk quotient using the impact area value for the current phase or segment of flight, and the population density for the particular grid square. The UAV service can also determine the amount of time spent flying over the grid square using the velocity lookup table (e.g., Table 1) and the current climb angle of the UAV. The UAV service can determine the overall risk quotient by producing a weighted average of all local risk quotients. The weighted average can be based on local travel time weighting.

Referring to FIGS. 3L1-3L3, after the UAV service determines the risk quotient of the determined flight route, it can provide the risk quotient to the user's portable electronic device. The portable electronic device can display, for example, the risk quotient, a message indicating whether the risk is in an acceptable range, and a graphical representation of the risk assessment. As an example, if the determined risk quotient is in an unacceptable range, user interface 336 may provide the risk quotient number (e.g., "5.2") and a message indicating that it is "UNACCEPTABLE" (FIG. 3L1). As another example, if the determined risk quotient is in an acceptable range, user interface 336 may provide the risk quotient number (e.g., "6.9") and a message indicating that it is "ACCEPTABLE" (FIG. 3L2).

Referring to FIG. 3L3, in some embodiments, if the risk assessment is "UNACCEPTABLE," a user (e.g., an operator or an administrator) may need to adjust the inputs such that the risk assessment becomes "ACCEPTABLE." To facilitate such adjustments, user interface 336 can display, for example, a pop-up window or an area providing risk formula terms or parameters. As shown in FIG. 3L3, user interface 336 can provide mean time between unplanned landings (MTBUPL, e.g., 48 hours), the impact areas, the battery capacity of the UAV, and the ideal navigation speed. Based on the displayed risk formula terms or parameters, the user may adjust the inputs (e.g., horizontal path inputs such as the takeoff location and the landing location, and vertical path inputs such as the altitude). After the user adjusts one or more of the inputs, the portable electronic device can provide the adjusted or updated inputs to the UAV service, which may repeat the risk assessment process as described above. The adjustments of inputs and risk assessments can be adjusted as many times as desired to place the risk quotient in an acceptable range.

FIGS. 3M and 3N illustrate exemplary user interfaces 342 and 346, respectively, of an application for facilitating payload transportation using a UAV, consistent with some embodiments of the present disclosure. User interfaces 342 and 346 can be provided by an application (e.g., application 234) of a portable electronic device (e.g., portable electronic device 102) shown in FIG. 2B. As discussed above, the portable electronic device can allow a user to confirm and save a determined flight route and associated flight parameters. The portable electronic device can also provide user interfaces 342 and 346 to allow the user to initiate the flight of the UAV. For example, user interface 342 provides a control switch (e.g., a slide switch) for turning on the propellers of the UAV. In response to receiving the user input to turn on the propellers, the portable electronic device can communicate directly or indirectly (e.g., through a UAV service) with the UAV to turn on the propellers of the UAV. In some embodiments, user interface 342 also provides a plurality of flight parameters such as estimated time of arrival (ETA), the time in flight, the remaining distance to the destination, the AGL, etc. Using the control switch such as the one shown on user interface 342, the user can turn on the propellers of the UAV and therefore prepare the UAV for taking off.

Referring to FIG. 3N, after the portable electronic device receives user input to turn on the propellers, it can display user interface 346. User interface 346 can indicate that the propellers of the UAV are turned on and provide a control button for initiating the flight (e.g., a "takeoff" button). For example, the user may touch or push the control button on user interface 346 to initiate the flight. In some embodiments, user interface 346 can also display information associated with the flight. Such information includes, for example, the estimated time of arrival (ETA), the time in flight, the remaining distance to the destination, and the AGL.

FIGS. 3O and 3P illustrate exemplary user interfaces 352 and 356, respectively, of an application for facilitating payload transportation using a UAV, consistent with some embodiments of the present disclosure. User interfaces 352 and 356 can be provided by an application (e.g., application 234) of a portable electronic device (e.g., portable electronic device 102) shown in FIG. 2B. Referring to FIG. 3O, in some embodiments, after the UAV flight is initiated, the portable electronic device can provide user interface 352 to allow interruption of the UAV flight. As discussed above, a UAV is capable of autonomous flight after the flight route is configured. Therefore, after the UAV takes off, the UAV can fly and transport the payload it carries to the destination without control or further interference of the user. For example, the portable electronic device may indicate that the UAV is in the mode of automatic flight or auto pilot by displaying "automatic flight on" on user interface 352.

Under some circumstances, the user may wish to interrupt the flight. For example, the user may wish to interrupt the flight if there is a recent change of destination for delivering the payload; if there is a sudden weather change along the flight route; or if the UAV is not in a good condition to complete the flight. In some embodiments, the portable electronic device provides a flight interruption switch on user interface 352. For example, user interface 352 can display a sliding switch to allow the user to interrupt the flight. Similar to user interface 346, user interface 352 can also provide information associated with the UAV flight such as the estimated time of arrival (ETA), the time in flight, the remaining distance to the destination, the AGL, etc. In some embodiments, user interface 352 may also provide the current location of the UAV by displaying an icon representing the UAV on the map.

Referring to FIG. 3P, if the portable electronic device receives a user input to interrupt a flight, it can display a flight interruption menu on user interface 356. The flight interruption menu can include a plurality of selections such as "Hold Position," "Reverse Course," or "Land Now." The selections can allow the user to control the UAV accordingly. For example, if the portable electronic device receives a user selection indicating to "Hold Position," the portable electronic device can communicate with the UAV (e.g., via a UAV service) to hold the current location until further instructions. If the portable electronic device receive a user selection indicating to "Reverse Course," it can communicate with the UAV to abandon the current flight to the destination location and instead to fly back to the takeoff location. If the portable electronic device receives a user selection indicating to "Land Now," it communicates with the UAV to look for a nearby suitable landing place and/or land the UAV immediately. In some embodiments, the communication between the portable electronic device and the UAV may be a direct communication using, for example, cellular or radio communications. In some embodiments, the communication may be an indirect communication facilitated by a UAV service (e.g., UAV service 120).

Referring to FIG. 3P, the UAV interruption menu can also include a "cancel" selection to allow the portable electronic device to go back to a previous interface (e.g., user interface 352). As a result, the UAV flight may not be interrupted. In some embodiments, the flight interruption menu overlaps a background image (e.g., a greyed out image of the map and the information associated with the flight parameters).

FIGS. 3Q, 3R, 3S, and 3T illustrate exemplary user interfaces 362, 364, 366, and 368 respectively, of an application for facilitating payload transportation using a UAV, consistent with some embodiments of the present disclosure. User interfaces 362, 364, 366, and 368 can be provided by an application (e.g., application 234) of a portable electronic device (e.g., portable electronic device 102) shown in FIG. 2B. In some embodiments, the portable electronic device allows the user to load an airspace model associated with a UAV flight route. An airspace model can be, for example, a model that includes information required or employed for analyzing a flight route and/or for providing information to an administer or operator for flight route planning. An airspace model can be a collection of 2D or 3D geographic datasets, including, for example, a digital elevation model, polygonal data such as the locations of restricted or protected airspace, line string and point data indicating the location of navigation hazards like power lines and towers, and other data (e.g., the population density, etc.) that may impact the safe navigability of a UAV flight route.

For example, an airspace model may include a terrain model, which can provide earth elevation (e.g., elevation above sea level) repeatedly, periodically, or continuously (e.g., in every 30 meters within accuracy of 30 meters). The terrain model can also provide locations, heights, and/or geometries of high or elevated obstacles, such as power lines, cellular towers, buildings, etc. An airspace model may also include a model showing restricted airspace such as class B airspaces, or airspaces otherwise closed to UAV operation. An airspace model may also include population density data showing areas of higher population density that the operator may wish to avoid during flight route planning and areas of lower population density that the operator may wish to include during flight route planning. In some embodiments, an airspace model may also include weather data. For example, there may be areas in lower Manhattan of New York City that are deemed unsafe for UAV operation due to high winds between buildings. Thus, before initiating a UAV flight, the user may wish to load the airspace model associated with the determined flight route to determine, verify, or ensure the actions the UAV takes complies with all the airspace regulations and rules.

In some embodiments, an airspace model may be required for flight route planning. Thus, if an airspace model is not available, the portable electronic device can display a corresponding message (e.g., "Airspace Model Not Available"), as illustrated in user interface 362 of FIG. 3Q. If an airspace model is available, the portable electronic device and/or the UAV service (e.g., UAV service 120) can load the model for flight route planning. Correspondingly, the portable electronic device can display a message (e.g., "Airspace Model Loading 40%" or "Airspace Model Loading . . . ") showing the progress of the loading, as illustrated on user interfaces 364 or 366 of FIGS. 3R and 3S. After the airspace model loads, the portable electronic device can display an icon indicating that the model is loaded, as illustrated on user interface 368 of FIG. 3T. As a result, a flight route planning may begin using the loaded airspace model.

FIGS. 3U, 3V, 3W, and 3X illustrate exemplary user interfaces 370, 374, 378, and 380, respectively, of an application for facilitating payload transportation using a UAV, consistent with some embodiments of the present disclosure. User interfaces 370, 374, 378, and 380 can be provided by an application (e.g., application 234) of a portable electronic device (e.g., portable electronic device 102) shown in FIG. 2B. In some embodiments, the portable electronic device can provide one or more UAV flight connections associated with a flight route determination. A UAV flight connection may be required if the distance between the originating location and the destination location is beyond the maximum distance that the UAV can fly without a recharge of its battery. In some embodiment, the portable electronic device may provide one or more user interfaces to allow the user to configure one or more connections for a particular flight route. For example, referring to FIG. 3U, user interface 370 provides a flight route from an originating location (e.g., Liebistorf Clubhouse) to a connection location (e.g., Kerzers Hill Landing). User interface 370 can also provide information associated with such flight route. For example, user interface 370 may provide that the flight route from the originating location Liebistorf Clubhouse to the connection location Kerzers Hill Landing is via Randlefleingn. Further, in some embodiments, user interface 370 can allow the user to associate alternate route other than the existing flight routes.

Referring to FIG. 3V, in some embodiments, the portable electronic device can provide user interface 374 to allow the user to add additional connection locations. For example, user interface 374 can display the current connection location (e.g., Kerzers Hill Landing") and also display an option to add new connection locations. Alternatively, referring to FIG. 3W, user interface 378 can display only the option to add new connection locations if there is no current connection.

Referring to FIG. 3X, after the portable electronic device receives a user input to add a new connection location, it can provide a plurality of connection locations that are available for selection. For example, user interface 380 can display connected UAV stations such as Lieebistorf Clubhouse, Kerzers Hill Landing, and Sindleflingen Station. It may also provide unconnected UAV stations such as Mont Vully. UAV stations can be connected by one or more flight routes. Unconnected UAV stations may be stations that are not connected by any flight route. Based on the connected and unconnected UAV stations, a flight route graph can be obtained for flight route planning by the UAV service. For example, the flight route graph may allow for shortest path algorithms to resolve a route between UAV stations using routes as graph edges. In some embodiments, edges can be weighted by attributes such as distance, travel time, safety risk, occupancy, etc.

Figure 3Y:
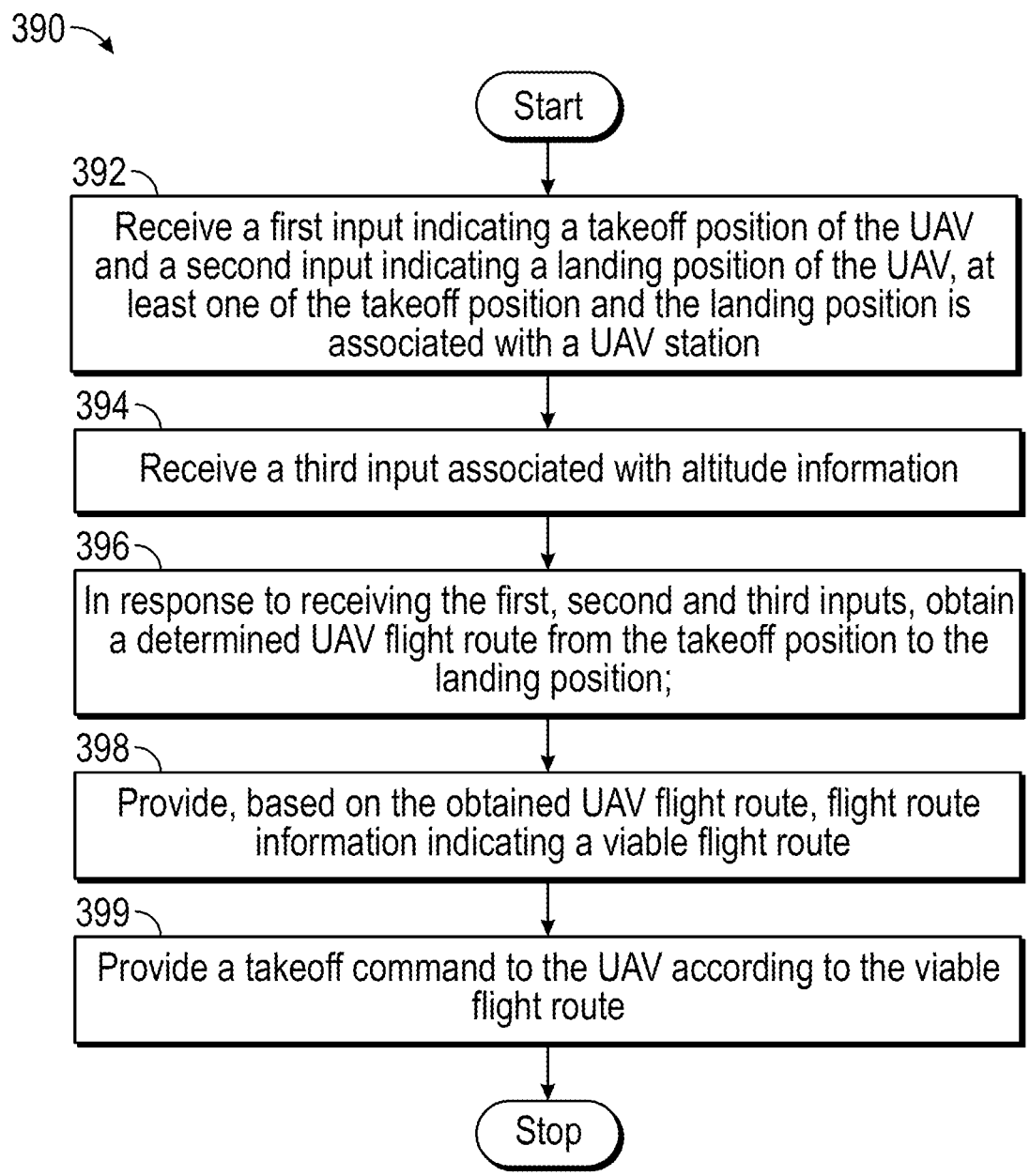

FIG. 3Y illustrates a flow chart of an exemplary process 390 for facilitating payload transportation using a UAV, consistent with some embodiments of the present disclosure. Some features of the process 390 are illustrated in FIGS. 1, 2A-2C, and 3A-3X and accompanying descriptions. In some embodiments, the process 390 can be performed by a portable electronic device (e.g., portable electronic device 102 in FIGS. 1 and 2B).

In the process 390, a portable electronic device (e.g., portable electronic device 102 in FIGS. 1 and 2B) having one or more processors and memory receives (step 392) a first input indicating a takeoff location of the UAV and a second input indicating a landing location of the UAV. At least one of the takeoff location and the landing location is associated with a UAV station. In some embodiments, the portable electronic device further receives (step 394) a third input associated with altitude information. In response to receiving the first, second, and optionally the third inputs, the portable electronic device obtains (step 396) a determined UAV flight route from the takeoff location to the landing location; and provides (step 398), based on the obtained UAV flight route, flight route information to the UAV. The flight route information indicates a viable flight route. The portable electronic device can further provide (step 399) a takeoff command to the UAV according to the viable flight route.

FIG. 3Y is merely illustrative of a method for facilitating payload transportation using a UAV. The illustrative discussions above are not intended to be exhaustive or to limit the invention to the precise form disclosed. Many modifications and variations are possible in view of the above teachings.

Using the application and methods as described in FIGS. 1, 2B, and 3A-3Y, a transportation administrator or an operator can conveniently and flexibly perform many tasks associated with payload transportation using UAVs. For example, the user can manage the UAV flight routes and flight status, and interrupt the flight in real time. Additionally, the user can simulate the flight route before the UAV actually flies, therefore avoiding potential crashes or failures of the transportation tasks. Moreover, the user is provided with options to flexibly select flight route through connection locations to enable long distance payload transportation using UAVs. Such transportation may not be possible with the current UAV technologies because of the limitation of UAV battery life.

UAV Cloud Service

Figure 4A:
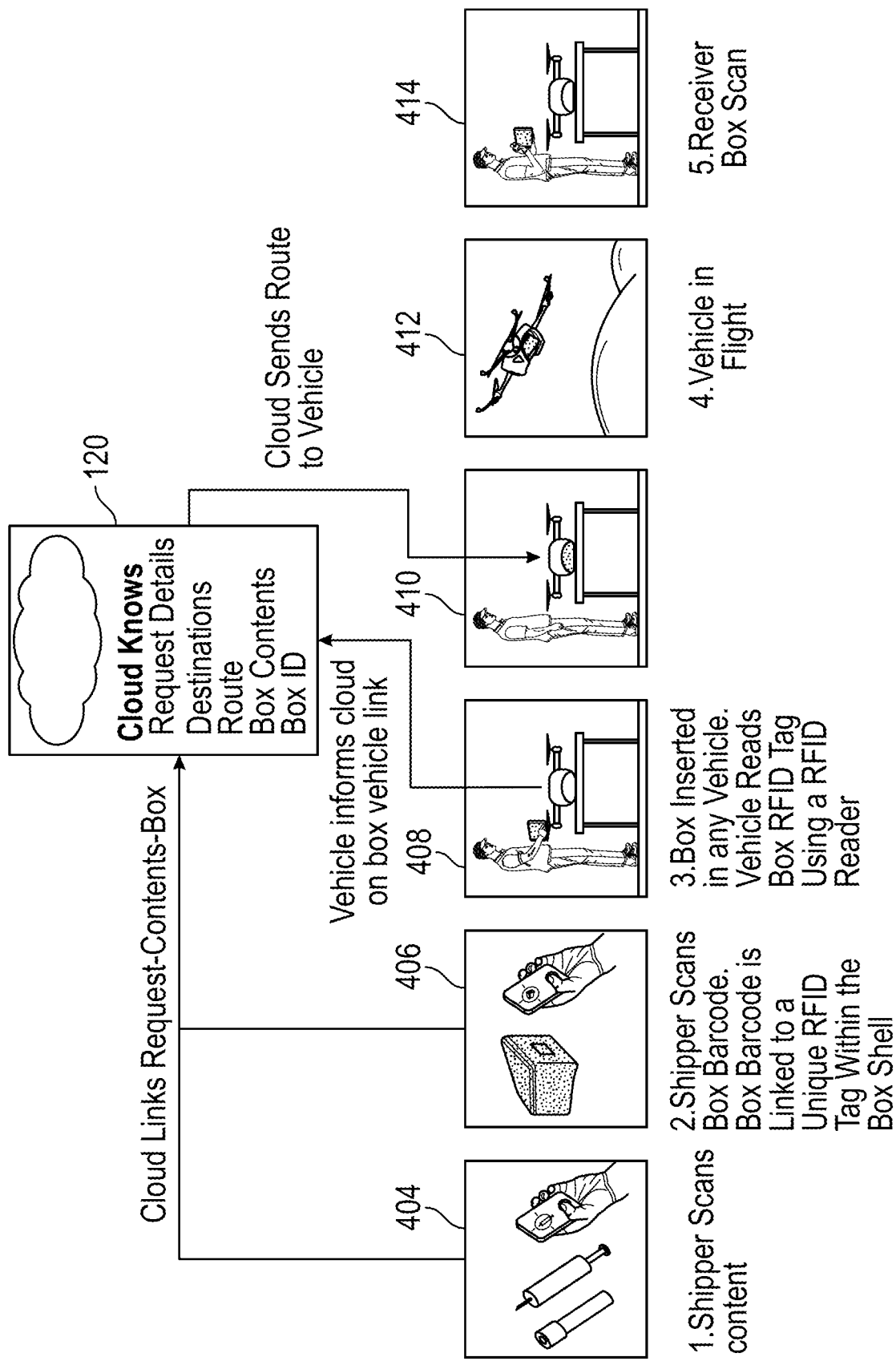
FIG. 4A is a block diagram illustrating exemplary UAV service for enabling payload transportation using UAVs, consistent with some embodiments of the present disclosure.

FIG. 4A is a block diagram illustrating exemplary UAV service 120 for enabling payload transportation using UAVs, consistent with some embodiments of the present disclosure. In some embodiments, UAV service 120 can be provided by a computer system (e.g., computer system 261). In some embodiments, UAV service 120 can be provided by a cloud service. A cloud service enables, for example, ubiquitous, convenient, on-demand access to a shared pool of configurable computing resources. Such cloud service can be, for example, IaaS (Infrastructure-as-a-Service), PaaS (Platform-as-a-Service), and/or SaaS (Software-as-a-Service) type services.

Referring to FIG. 4A, in some embodiments, UAV service 120 can communicate with a portable electronic device (e.g., portable electronic device 102 or the device shown in block 404 of FIG. 4A). In some embodiments, the portable electronic device can obtain an identification of a payload to be transported. The identification of the payload can be a barcode, a QR (quick response) code, an electronic identification tag, a near field identification tag, or any type of identification. Further, the identification of the payload can be in the form of the native format of a barcode, a QR code, an electronic identification tag, or a near field ID tag; or in the form of a digital representation thereof. For example, as illustrated in block 404 of FIG. 4A, using a scanner (e.g., scanner 238 shown in FIG. 2B), the portable electronic device can scan a barcode that identifies a blood sample. The portable electronic device can transmit the identification (e.g., a digital representation of the scanned barcode) to UAV service 120.

UAV service 120 receives the identification of the payload to be transported from the portable electronic device. In some embodiments, the identification can be associated with a destination location of the payload. For example, a scanned barcode that identifies a blood sample can be associated with the delivery destination address of the blood sample. As a result, UAV service 120 can acquire the destination location of the payload based on the received identification.

In some embodiments, UAV service 120 further receives a first identification of a payload container from the portable electronic device. For example, as illustrated in block 406, the portable electronic device can acquire a first identification identifying the payload container. The first identification can be a barcode, a QR code, an electronic identification tag, a near field identification tag, or any type of identification. Further, the first identification of the payload container may be the in the form of the native format of a barcode, a QR code, electronic identification tag, or near field ID tag; or in the form of a digital representation thereof. The portable electronic device can transmit the first identification of the payload container (e.g., a digital representation of the scanned barcode of the payload container) to UAV service 120. In some embodiments, UAV service 120 can associate the identification of the payload with the first identification of the payload container. For example, UAV service 120 can recognize that a scanned barcode identifying a blood sample and the scanned barcode of a payload container are provided by the same portable electronic device in a same transaction or scheduling process. UAV service 120 can thus associate the scanned barcode of the blood sample with the scanned barcode of the payload container. As a result, UAV service

120 can determine the destination location of the payload container using the destination location associated with the identification of the payload.

In some embodiments, the first identification of the payload container (e.g., a barcode) can be further associated with a second identification of the payload container (e.g., an RFID tag). The second identification can be obtainable by a UAV. For example, the second identification can be a Radio Frequency Identification (RFID) tag, a barcode, a QR code, an electronic identification tag, a near-filed ID tag, or any other type of identification. Further, the second identification of the payload container can be the in the form of the native format of an RFID tag, a barcode, QR code, electronic identification tag, or near field ID tag; or in the form of a digital representation thereof. The second identification can be readable by a reader (e.g., an RFID reader) of the UAV. In some embodiments, the first and second identifications correspond with each other such that they identify the same payload container.

As illustrated in block 408 of FIG. 4A, the payload container that contains the payload (e.g., the blood sample shown in block 404) to be transported can be received in a UAV. In some embodiments, the reader (e.g., an RFID reader) of the UAV can read the second identification of the payload container (e.g., the RFID tag) and transmit the second identification (e.g., a digital representation of the RFID tag) to UAV service 120. UAV service 120 receives the second identification identifying the payload container from the UAV. As discussed above, the second identification can correspond to the first identification of the payload container to identify the same payload container. And UAV service 120 can determine the destination location of the payload container using the first identification of the payload container. As a result, UAV service 120 can determine the destination location of the particular UAV that carries the payload container based on the second identification transmitted by the UAV. For example, if UAV service 120 receives an RFID identifying the payload container housing the blood sample from a particular UAV, UAV service 120 can determine the destination location of the particular UAV based on the RFID of the blood sample (and its associated destination location) and the first identification of the payload container provided by the portable electronic device.

Referring to FIG. 4A, after determining the destination location of the UAV, UAV service 120 can determine a UAV flight route. The determination of the UAV flight route is described above and thus not repeatedly described here. As illustrated in block 410 of FIG. 4A, after such determination, UAV service 120 can provide the determined UAV flight route to the particular UAV that transmits the second identification of the payload container. After receiving the flight route, the particular UAV can transport (block 412) the payload container to its destination location. In some embodiments, after the UAV arrives its destination location, UAV service 120 can receive a transportation confirmation (block 414). For example, a portable electronic device at the destination location can scan the payload box and transmit the first identification of the payload box and/or a confirmation message to UAV service 120, indicating that the payload is received at the destination location.

Figure 4B:
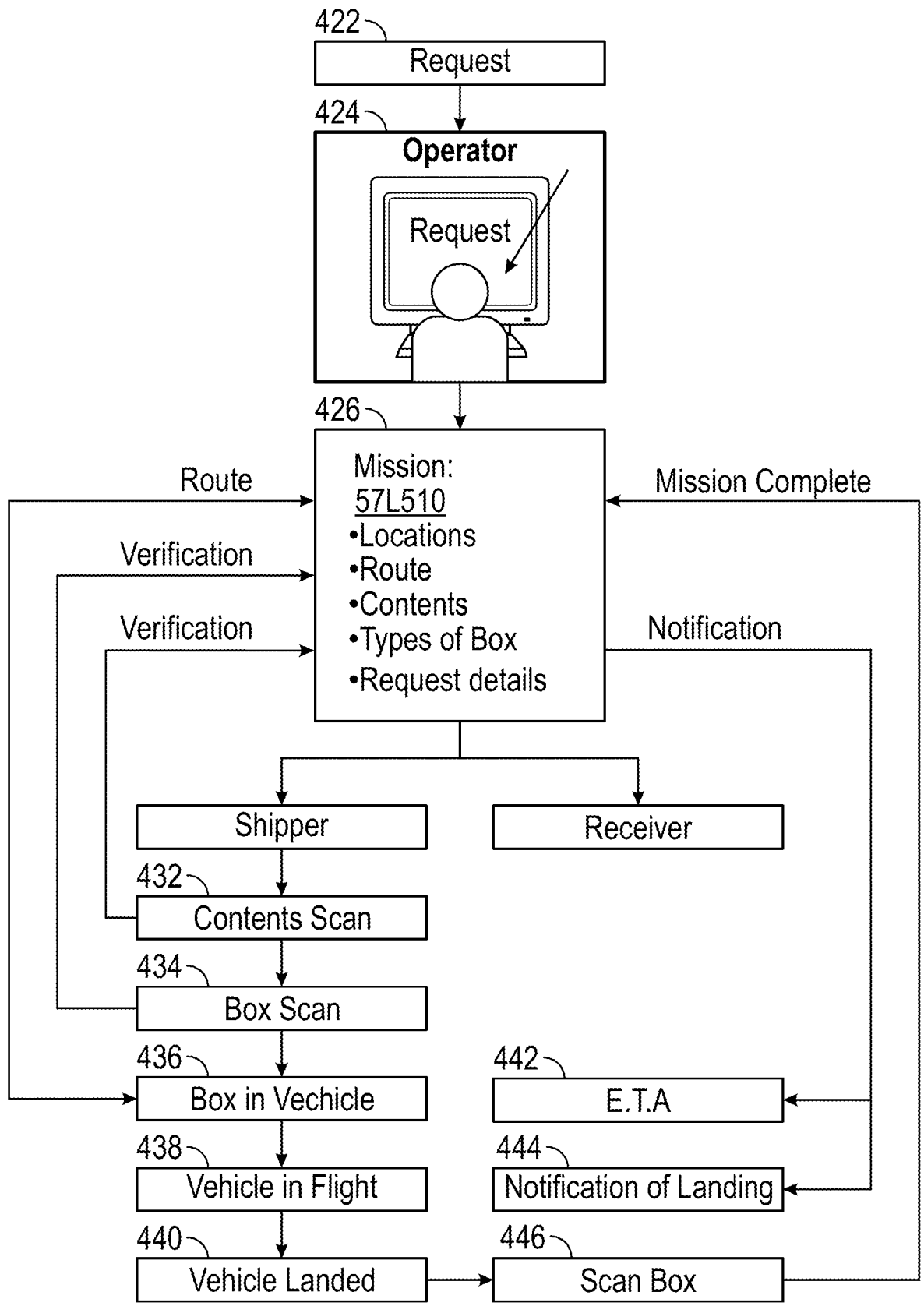
FIG. 4B illustrates a flow chart of an exemplary process for transporting a payload using a UAV, consistent with some embodiments of the present disclosure.

FIG. 4B illustrates a flow chart of an exemplary process 420 for facilitating payload transportation using a UAV, consistent with some embodiments of the present disclosure. Some features of the process 420 are illustrated in FIGS. 1, 2A-2C, 3A-3Y, and 4A and accompanying descriptions. In some embodiments, the process 420 is performed by a UAV service provided by a computer system (e.g., computer system 261 in FIG. 2C) or a cloud service. In the process 420, the UAV service receives (step 422) a request for transporting a payload. The request may be received from, for example, a portable electronic device of a user and provided to a portable electronic device of an operator or administrator (step 424).

Referring to FIG. 4B, in the process 420, the UAV service can communicate various information (step 426) with various devices. For example, the UAV service can receive (step 432) an identification of a payload to be transported from a portable electronic device of a payload shipper. The identification of the payload can be associated with a destination location of the payload. For example, the identification of the payload may be a digital representation of a barcode of the payload, which identifies the destination location of the payload. The UAV service can also receive (step 434) a first identification of a payload container for housing the payload from the portable electronic device of the shipper. The first identification can be accessible on an external surface of the container and can be scannable. For example, the first identification may be a digital representation of a barcode of the payload container, which identifies the payload container.

In some embodiments, the UAV service can further receive (step 436) a second identification from the UAV. The second identification comprises a near-field identification tag (e.g., an RFID tag) that corresponds to the first identification to identify the same container. For example, the UAV can read the RFID tag of the payload container and transmit the RFID tag or a representation of it to the UAV service. In step 426, the UAV service can also determine a UAV flight route based on the identification of the payload; and provide the UAV flight route to the UAV based on the first and second identifications.

Referring to FIG. 4B, after the UAV service provides the UAV flight route to the UAV, the UAV flies (step 438) from the takeoff location to the landing location, and transports the payload with it. The UAV lands (step 440) at the landing location (e.g., a destination UAV station) and unloads the payload container that houses the payload. In some embodiments, the UAV service can also provide (steps 442 and 444) information associated with the UAV flight to a portable electronic device of the payload receiver. Such information may include, for example, the ETA and the notification of UAV landing. In some embodiments, the portable electronic device of the payload receiver can obtain (step 446) the first identification (e.g., scan the barcode) of the payload container and provide the first identification and/or a confirmation message to the UAV service.

FIG. 4B is merely illustrative of a method for facilitating payload transportation using a UAV. The illustrative discussions above are not intended to be exhaustive or to limit the invention to the precise form disclosed. Many modifications and variations are possible in view of the above teachings.

By using a UAV service the operator or administrator can effectively schedule, manage, and monitor payload transportation in a large scale. Further, because the UAV service can utilize a broad range of computing resources (e.g., a cloud service) and network resources, it is more efficient to determine flight routes based on numerous conditions. Such determination may not be easily performed by a portable electronic device. In addition, the UAV service allows multiple payload transportation to be coordinated to avoid wasting of UAV resources. The UAV service also enables transporters (e.g., a delivery company or a delivery truck driver) to transport more payloads in a cost-efficient manner.

Mobile Application for Transporter

Figure 5B:
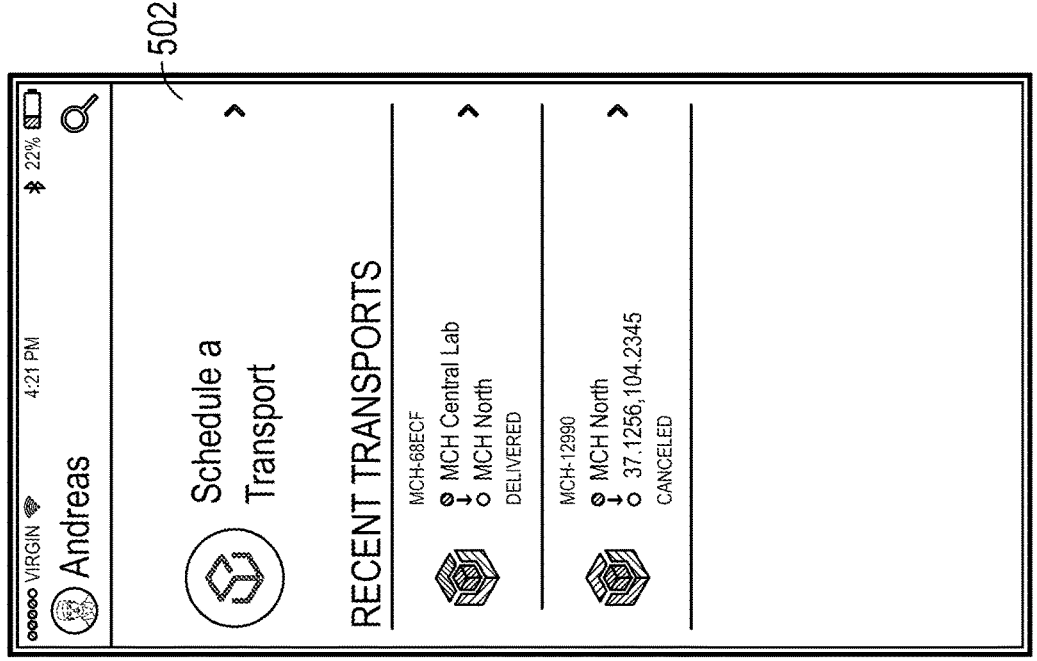
FIGS. 5A-5U illustrate exemplary user interfaces for facilitating a payload transportation using a UAV, consistent with some embodiments of the present disclosure.
FIG. 5V illustrates a flow chart of an exemplary process for facilitating a payload transportation using a UAV, consistent with some embodiments of the present disclosure.
Figure 5A:
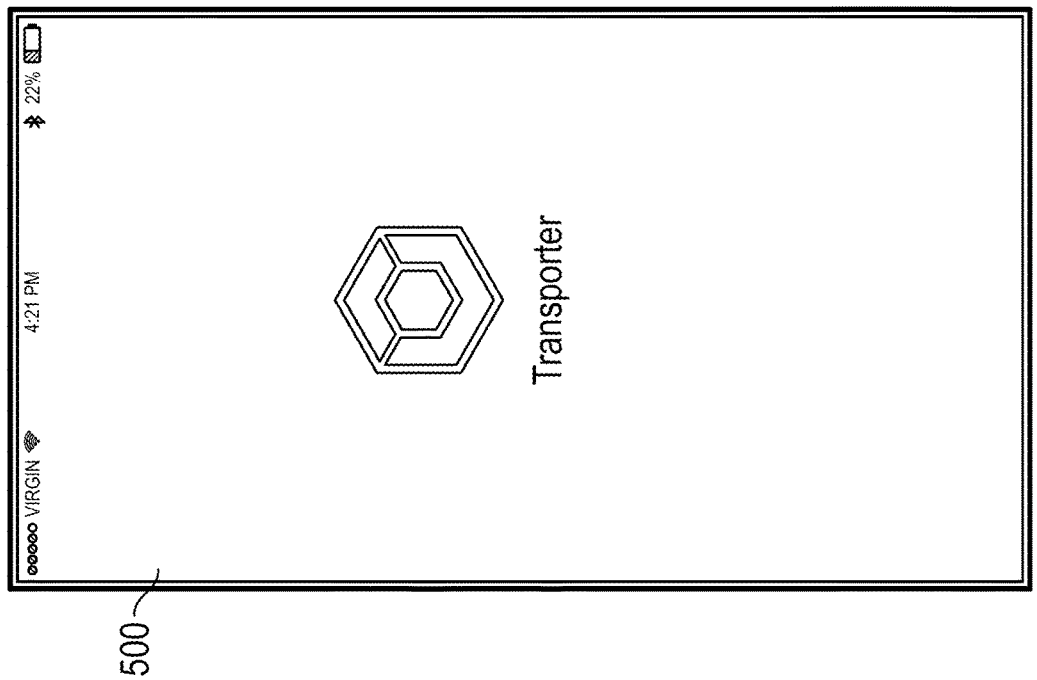

FIG. 5A illustrate an exemplary user interface 500 for facilitating a payload transportation using a UAV, consistent with some embodiments of the present disclosure. User interface 500 can be provided by, for example, an application (e.g., applications 234) of a portable electronic device (e.g., portable electronic device 102) shown in FIG. 2B. In some embodiments, user interface 500 can provide an image indicating whether the application is for an administrator or for a transporter. As discussed above with FIG. 3A, the administrator can be a user who oversees or manages the UAV service for transporting payloads using multiple UAVs. For example, the administrator may be a UAV service administrator or an operator. The transporter can be a user who requests, schedules, or delivers payloads. For example, the transporter may be an exchange station driver such as a transporting vehicle driver. As illustrated in FIG. 5A, user interface 500 indicates that the application is for a transporter.

In some embodiments, the portable electronic device can also provide authentication regions (not shown) on user interface 500. For example, the authentication regions can include a user name region and a password region for authenticating the user. Thus, a user may need to provide his or her user name and password before the portable electronic device allows the user to use the application or displays the next user interface (e.g., user interface 502 shown in FIG. 5B). It is appreciated that the authentication can be any process that confirms the user's identity. For example, the portable electronic device can authenticate the user by validating his or her identity documents, verifying the user's biometric characteristics, verifying a digital certificate, or verifying an encryption key.

Figures 5C, 5D:
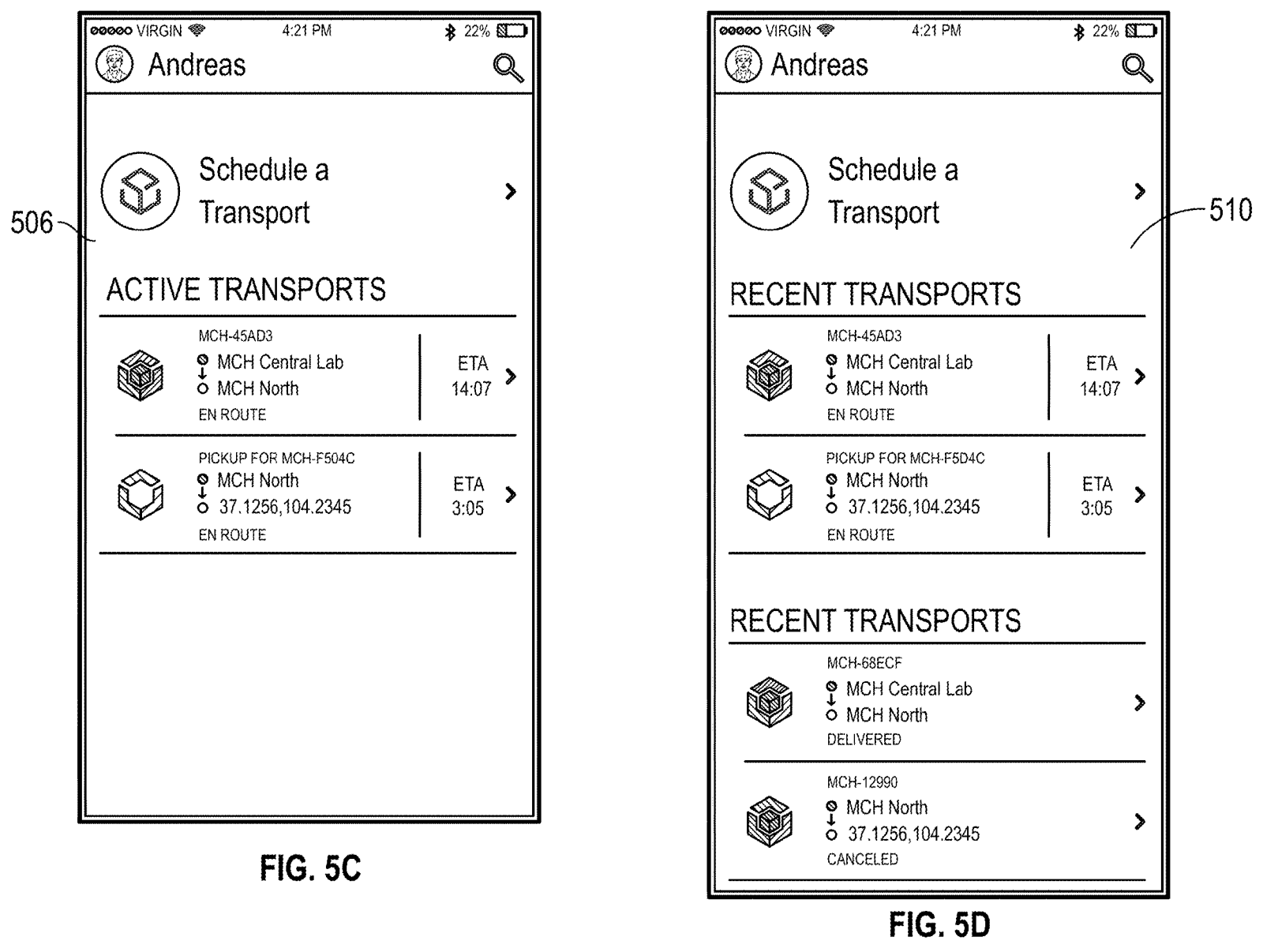

FIGS. 5B, 5C, and 5D illustrate exemplary user interfaces 502, 506, and 510 of an application for facilitating a payload transportation using a UAV, consistent with some embodiments of the present disclosure. User interfaces 502, 506, and 510 can be provided by an application (e.g., application 234) of a portable electronic device (e.g., portable electronic device 102) shown in FIG. 2B. Referring to FIG. 5B, in some embodiments, the portable electronic device provides one or more recent transports and information associated with these transports. The recent transports may be transports that are recent in time, but may not be currently active. For example, user interface 502 may display a list of recent transports including a first recent transport named MCH-68ECF and a second recent transport named MCH-12990. The portable electronic device can also provide details of these transports such as the originating location and the destination location, and the transport status. For example, user interface 502 may display that for the first transport, the originating location is MCH Central Lab, the destination location is MCH North, and the status of the first transport is delivered; and for the second transport, the originating location is MCH North, the destination location is a location with coordinates 37.1256 and 104.2345, and the status of the second transport is cancelled.

Referring to FIG. 5C, in some embodiments, the portable electronic device can provide one or more active transports and information associated with these transports. For example, user interface 506 may display a list of active transports including a first active transport named MCH-45A03 and a second active transport named Pickup for MCH-F504C. As discussed above, a UAV can transport a payload to a destination location; and can also fly to an originating location to pick the payload before it transports that payload to its destination location. In some embodiments, these two types of transports can be identified by their names. For example, as shown in user interface 506, the first active transport named MCH-45A03 is a transport flight from the originating location to its destination location; and the second active transport named Pickup for MCH-F504C is a transport flight for picking up a payload at the originating location. In some embodiments, user interface 506 can also display information associated with the active transports, such as the originating/destination locations, the status of the flight (e.g., "En Route"), and the ETAs of the transports (e.g., 14:07).

Referring to FIG. 5D, in some embodiments, the portable electronic device can provide both one or more active transports and one or more recent transports and information associated with these transports. For example, user interface 510 displays both the two active transports similar to those illustrated in FIG. 5C and the two recent transports similar to those illustrated in FIG. 5B. By providing these transports, the portable electronic device can enable the user to effectively schedule a transport. For example, the user may obtain information from the active and recent transports and reuse the information to quickly schedule a new transport. The user may also observe that a particular transport is already en route and therefore avoid duplicate scheduling of the same transport.

In some embodiments, the portable electronic device can provide an option on a user interface (e.g., user interfaces 502, 506, and 510) for scheduling a transport. For example, user interface 510 displays "Schedule a Transport" indicating the user can select to schedule a transport. A user can select the option by, for example, touch or press in the area indicating such option on the user interfaces. After the portable electronic device receives such user selection or input, it can display the next user interface (e.g., user interface 516 of FIG. 5E).

Figure 5F:
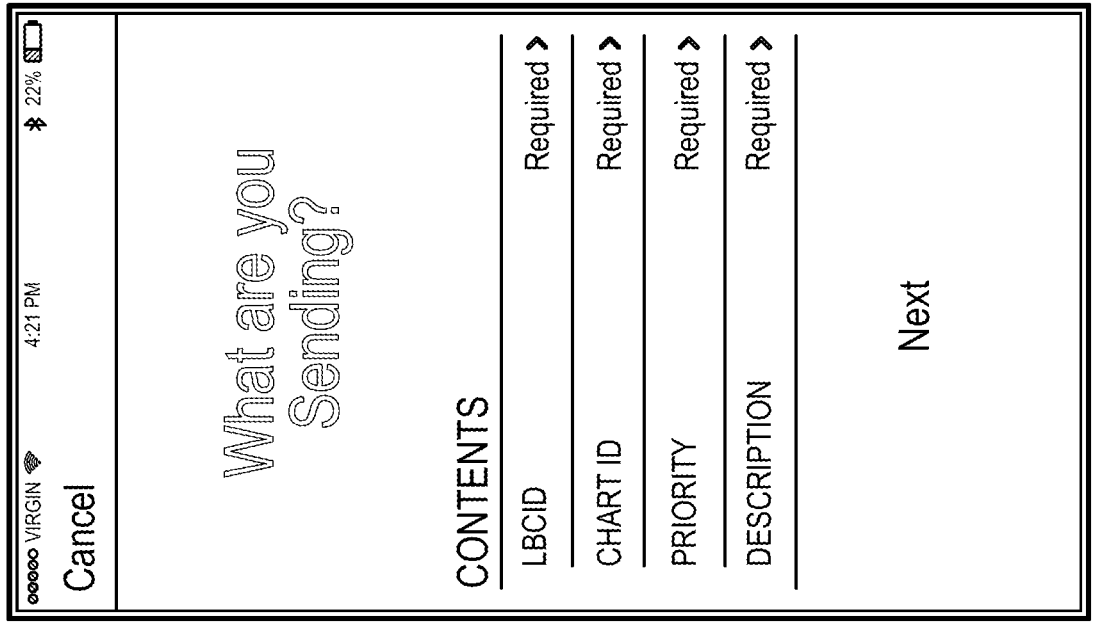
Figure 5E:
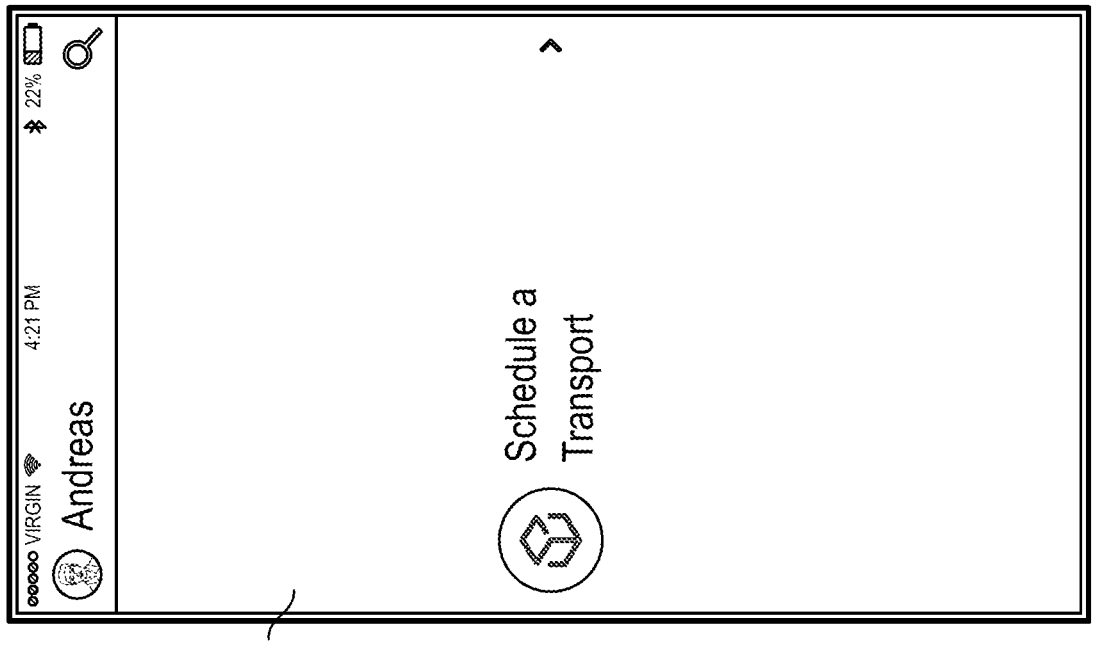

FIGS. 5E-5J illustrate exemplary user interfaces 516, 518, 524, 528, 532, and 536, respectively, of an application for facilitating a payload transportation using a UAV, consistent with some embodiments of the present disclosure. User interfaces 516, 518, 524, 528, 532, and 536 can be provided by an application (e.g., application 234) of a portable electronic device (e.g., portable electronic device 102) shown in FIG. 2B. Referring to FIG. 5E, in some embodiments, after the portable electronic device receives a user input for scheduling a transport, it displays user interface 516 for allow the user to confirm scheduling a transport. In some embodiments, user interface 516 may be skipped. For example, the portable electronic device may display instead user interface 518 requesting the user to provide the contents of the payload.

Referring to FIG. 5F, in some embodiments, the portable electronic device can display user interface 518 instructing the user to provide the contents of the payload. For example, user interface 518 may display a message stating "What are you sending?" The contents of the payload may include, for example, the identifications of the payload, the priority of the payload, and the description of the payload. As illustrated in FIG. 5F, user interface 518 displays a list of content fields for user inputs. Some of these content fields may be required, while the other fields may be optional. In some embodiments, the content fields are also configurable or customizable. As an example, if the transport is for delivering a blood sample, the content fields displayed on user interface 518 may include a "LBCID" field, a "Chart ID" field, a "Priority" field, and a "Description" field. User interface 518 may also indicate that for a blood sample, all these content fields are required. Based on user interface 518, a user may select one of the content filed to provide the input.

Figure 5H:
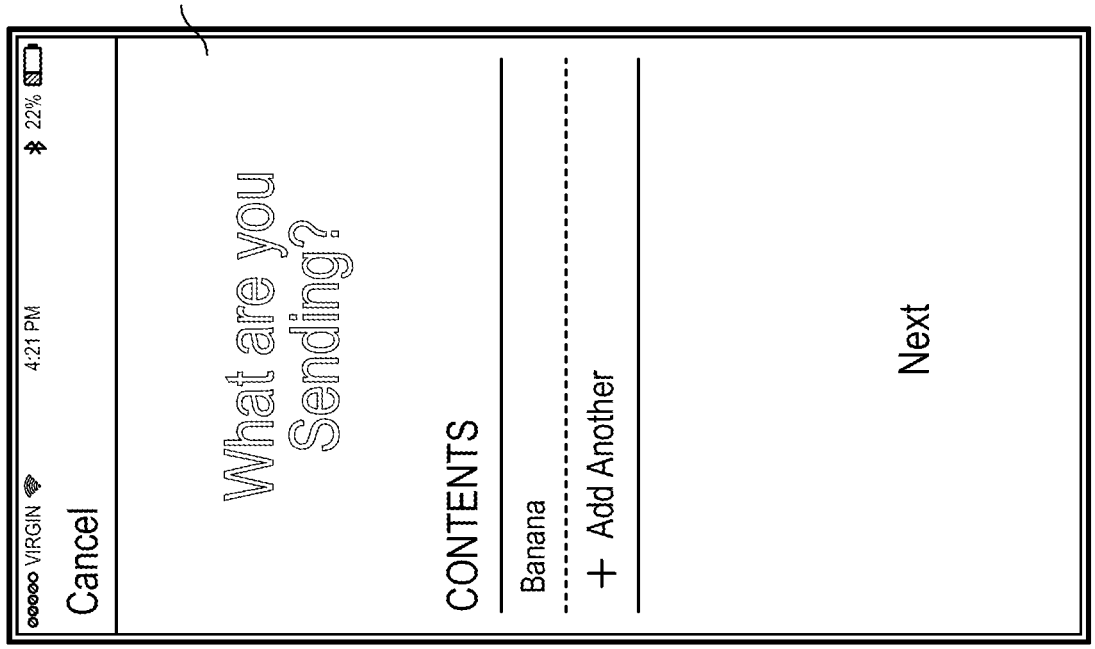
Figure 5G:
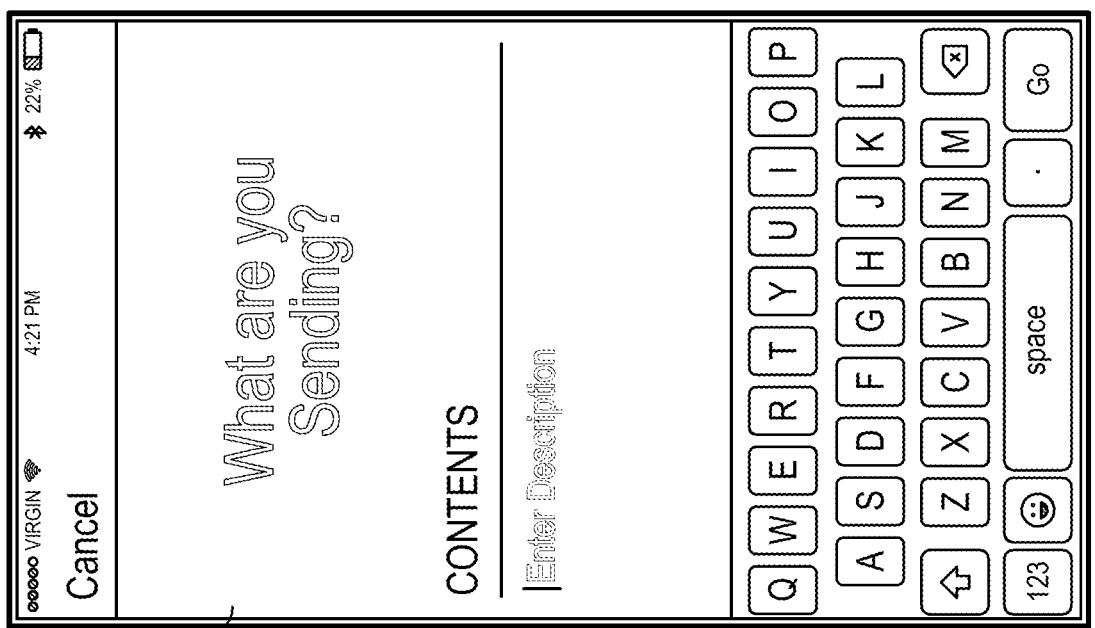

Referring to FIG. 5G, in some embodiments, the portable electronic device can display user interface 524 after receiving a user's selection for providing input of the description field. For example, user interface 524 can display a message stating "What are you sending?" instructing the user to provide a description of the payload content. User interface 524 can also provide a text input region to receive the user input of the payload content.

Referring to FIG. 5H, after the portable electronic device receives description of the payload content, it may display the received content (e.g., "Banana") on user interface 528 and provide an option to add another description. For example, user interface 528 can include an "Add Another" option for receiving additional user inputs associated with the payload contents.

As discussed above, in some embodiments, the portable electronic device may indicate that certain content fields are required. It can also detect whether it has received all the required fields. For example, for a blood sample, the "LBCID" field, the "Chart ID" field, the "Priority" field, and the "Description" field may all be required fields. Referring to FIG. 5I, for example, after the portable electronic device detects that it has received all the required fields, it can display the received user inputs on user interface 532. Similar to user interface 528, user interface 532 also can provide an option to add additional user inputs associated with the payload contents.

Figure 5J:
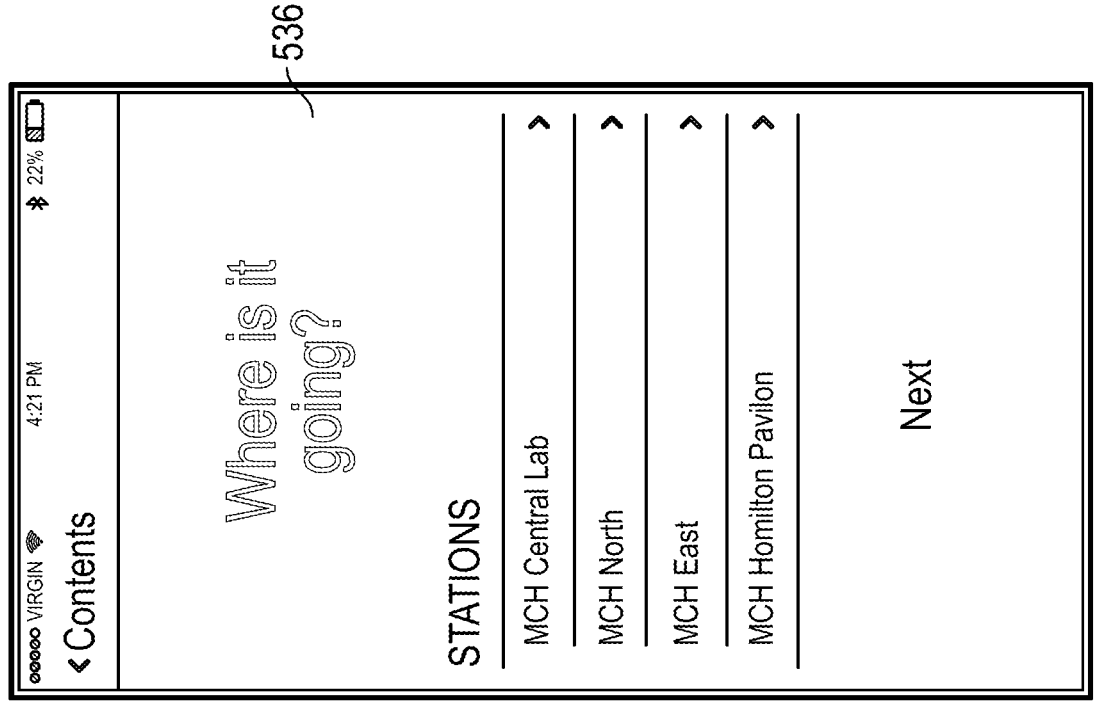
Figure 5I:
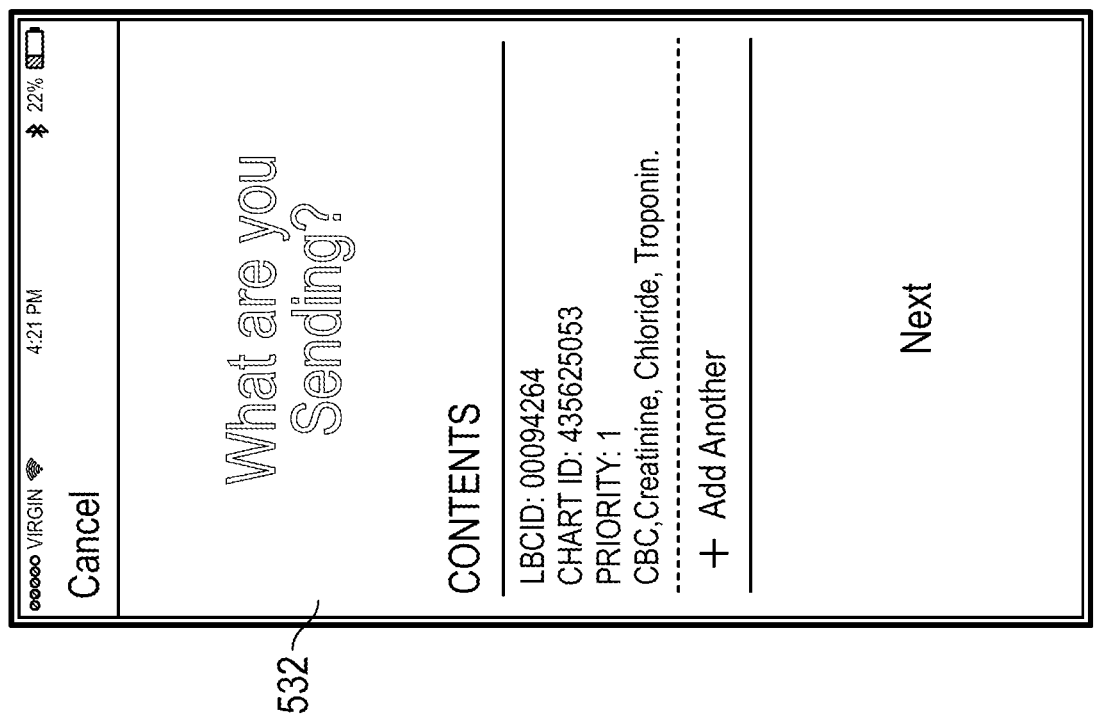

Referring to FIG. 5J, in some embodiments, the portable electronic device can display user interface 536 instructing the user to provide the destination location of the payload transport. For example, user interface 536 can display a message stating "Where is it going?". In some embodiments, user interface 536 may provide a plurality of destination location selections such as available UAV stations. As illustrated in FIG. 5J, user interface 536 may provide a list of UAV stations including, for example, a "MCH Central Lab" station, a "MCH North" station, a "MCH East" station, and a "MCH Hamilton Pavilion" station. In some embodiments, user interface 536 can provide a plurality of destination location selections such as addresses (street names, city, state, etc.), business names (e.g., JW Marriott), or areas for transport (e.g., the central park area). Using user interface 536, a user may select one of the destination locations.

Figure 5L:
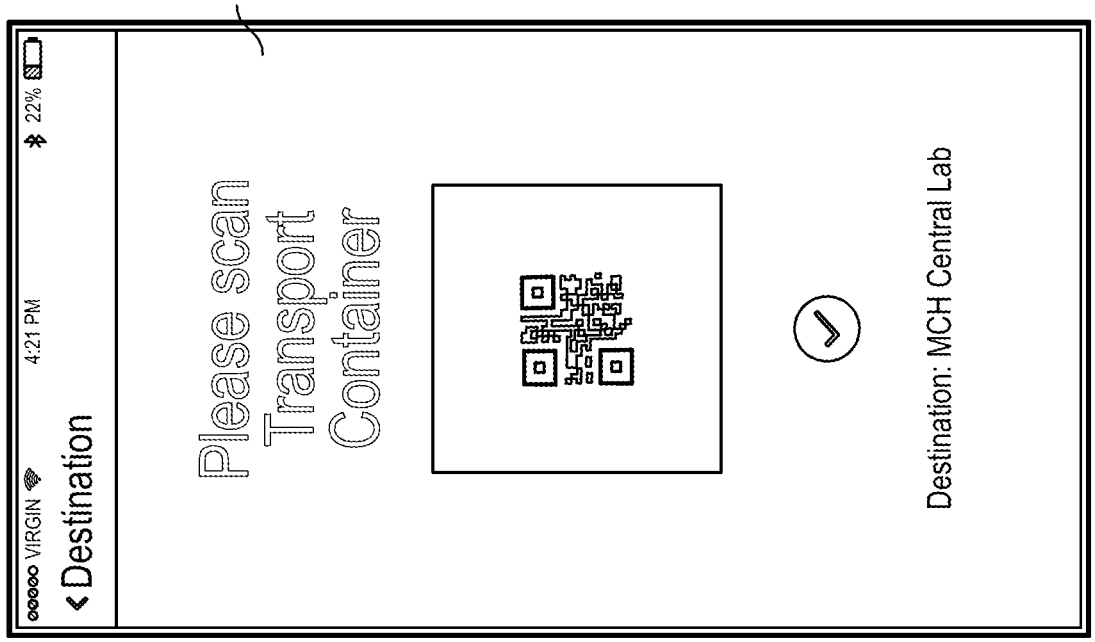
Figure 5K:
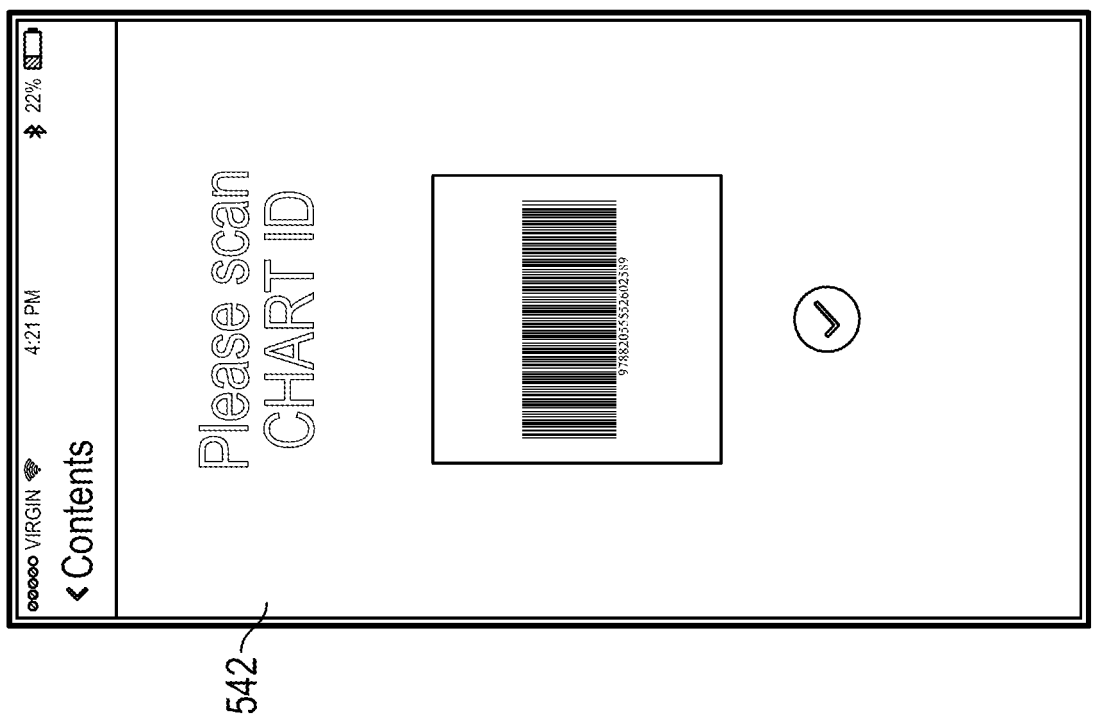

FIGS. 5K-5L illustrate exemplary user interfaces 542 and 544, respectively, of an application for facilitating a payload transportation using a UAV, consistent with some embodiments of the present disclosure. User interfaces 542 and 544 can be provided by an application (e.g., application 234) of a portable electronic device (e.g., portable electronic device 102) shown in FIG. 2B. Referring to FIG. 5K, in some embodiments, after the portable electronic device receives the user input of the payload contents (e.g., the description, the destination location, etc.), it also receives an identification of the payload to be transported. The identification may be in the form of a barcode, a QR code, a near-field identification tag, etc., or a digital representation thereof.

For example, to receive the identification of the payload, the portable electronic device displays user interface 542, which provides a message stating "Please scan chart ID" and provides a window for scanning a barcode. For scanning the barcode, the portable electronic device can use a scanner such as scanner 238 shown in FIG. 2B. The portable electronic device then determines whether the scanning is successful. For example, it can determine whether the scanned barcode is readable or useable. If the scanning is successful, the portable electronic device can display a confirmation (e.g., a check mark) indicating the identification of the payload is received. As discussed above, after obtaining the identification of the payload, the portable electronic device can transmit the identification to a UAV service (e.g., UAV service 120). The identification of the payload can also be associated with the contents and destination location that the portable electronic device received.

Referring to FIG. 5L, in some embodiments, the portable electronic device can further obtain a first identification of the payload container. The first identification can be a barcode, a QR code, an electronic identification tag, a near field identification tag, or any type of identification, or a digital representation thereof. For example, to receive the first identification of the payload container, the portable electronic device displays user interface 544, which provides a message stating "Please scan Transport Container" and provides window for scanning a QR code. For scanning the QR code, the portable electronic device can use a scanner such as scanner 238 shown in FIG. 2B. The portable electronic device can then determine whether the scanning is successful. For example, it can determine whether the scanned QR code is readable or useable. If the scanning is successful, the portable electronic device can display a confirmation (e.g., a check mark) indicating the identification of the payload is received. As discussed above, the portable electronic device can transmit the first identification of the payload container (e.g., a digital representation of the scanned barcode of the payload container) to a UAV service (e.g., UAV service 120). In some embodiments, UAV service 120 may associate the identification of the payload with the first identification of the payload container. As a result, the UAV service can determine the destination location of the payload container using the destination location associated with the identification of the payload.

FIGS. 5M-5Q illustrate exemplary user interfaces 546, 552, 556, 560, and 564 respectively, of an application for facilitating a payload transportation using a UAV, consistent with some embodiments of the present disclosure. User interfaces 546, 552, 556, 560, and 564 can be provided by an application (e.g., application 234) of a portable electronic device (e.g., portable electronic device 102) shown in FIG. 2B. As discussed above, the portable electronic device can provide both the identification of the payload and the first identification of the payload container to the UAV service. Based on the received identifications, the UAV service can determine that the particular payload container is associated with the particular payload. Correspondingly, referring to FIG. 5M, the portable electronic device can display a message (e.g., "Load content into transport container") on user interface 546 to instruct the user to place the particular payload to the particular payload container.

Figure 5M:
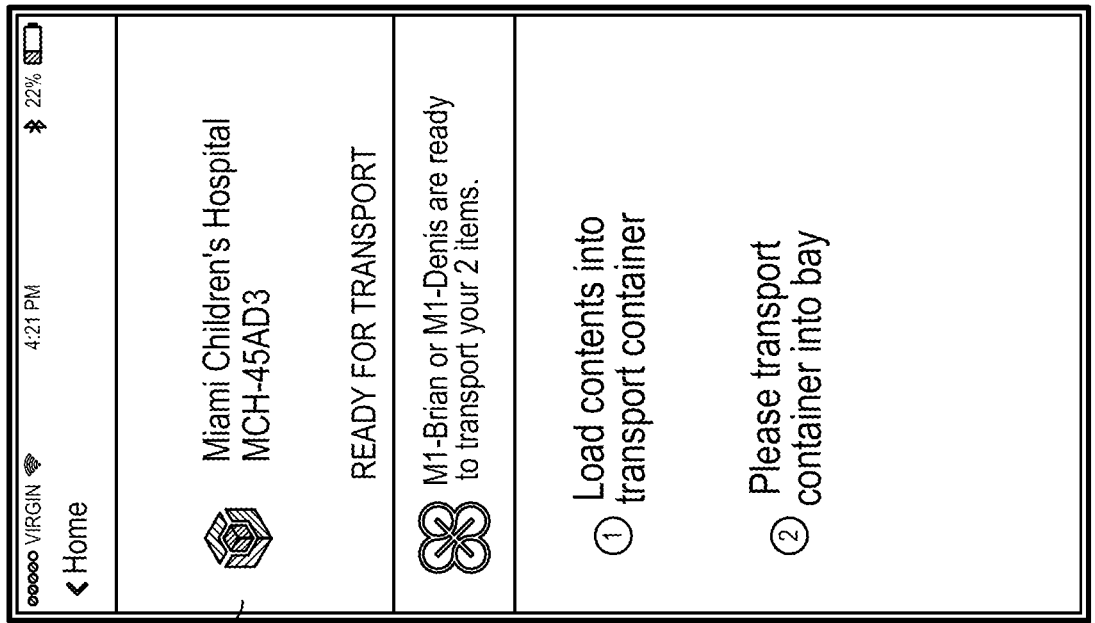
Figure 5N:
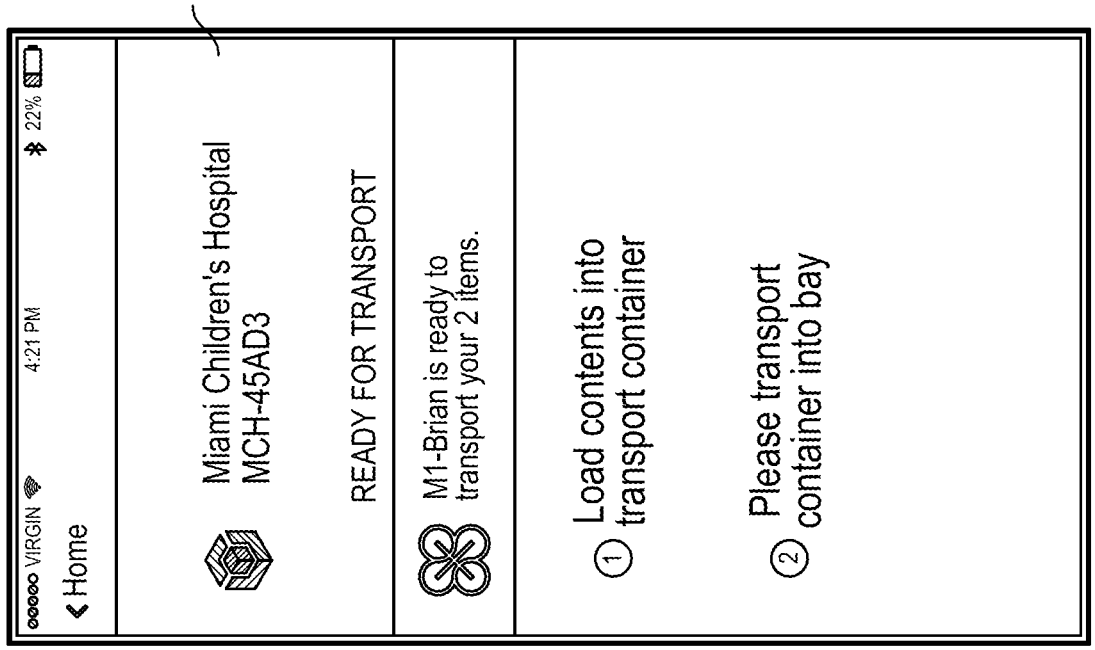
Figure 5O:
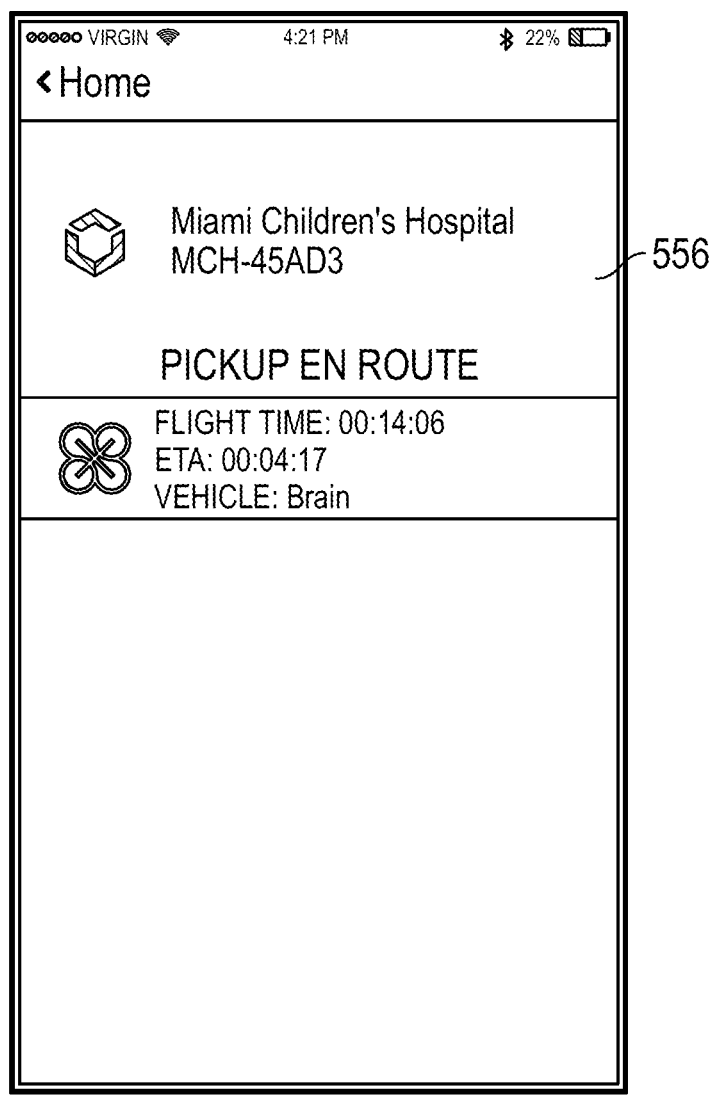

Referring to FIG. 5M, the portable electronic device can also display a message (e.g., "Place transport container into bay.") to instruct the user to place the particular payload container into a UAV. One or more UAVs may be available for transporting the payload; and the portable electronic device can provide the identities of the available UAVs to the user. As an example, if two UAVs are available, user interface 546 displays a message stating "M1-Brian or M1-Denis are ready to transport your 2 items," as illustrated in FIG. 5M. As another example, if only one UAV is available, user interface 552 displays a message stating "M1-Brian is ready to transport your 2 items," as illustrated in FIG. 5N. Based on the displayed messages, the user can select a UAV and place the payload to be transported into the selected UAV (e.g., M1-Brian).

In some embodiments, referring to FIGS. 5M and 5N, user interfaces 546 and 552 can also display other information such as the destination location (e.g., Miami Children's Hospital), the flight route identification (e.g., MCH-45AD3), and a message stating "Ready For Transport."

Under certain circumstances, a UAV service (e.g., UAV service 120) may determine that no UAV is available at the user's location for transporting the payload. Based on such determination, the UAV service can instruct a nearby UAV to fly to the user's location to pick up the payload. The UAV service can also notify the user's portable electronic device that a UAV is en route to pick up the payload to be transported. Correspondingly, referring to FIG. 5O, the user's portable electronic device can display user interface 556 to provide certain information associated with the incoming UAV for picking up the payload. For example, user interface 556 may display that for a scheduled UAV flight (e.g., Miami Children's Hospital, MCH-45AD3), a UAV (e.g. the UAV named Brian) is incoming for picking up the payload. User interface 556 can also provide the status of the incoming UAV (e.g., flight time 00:14:06, ETA 00:04:17).

As discussed above, after the user placed the payload container in a selected UAV, a reader (e.g., an RFID reader) of the selected UAV can read the second identification of the payload container (e.g., the RFID tag) and transmit the second identification to the UAV service. The UAV service receives the second identification identifying the particular payload container from the UAV. Because the second identification corresponds to the first identification of the payload container to identify the same payload container, the UAV service can determine the destination location of the payload container using the first identification of the payload container. As a result, the UAV service can determine the destination location of the particular UAV based on the second identification transmitted by that UAV. Further, using the determined destination location, the UAV service can determine the UAV flight route and provide the flight route to the UAV. In some embodiments, the UAV service can also provide the UAV flight route to the user's portable electronic device. In some embodiments, the UAV service can provide an indication that the flight route has been transmitted to the particular UAV.

Figure 5P:
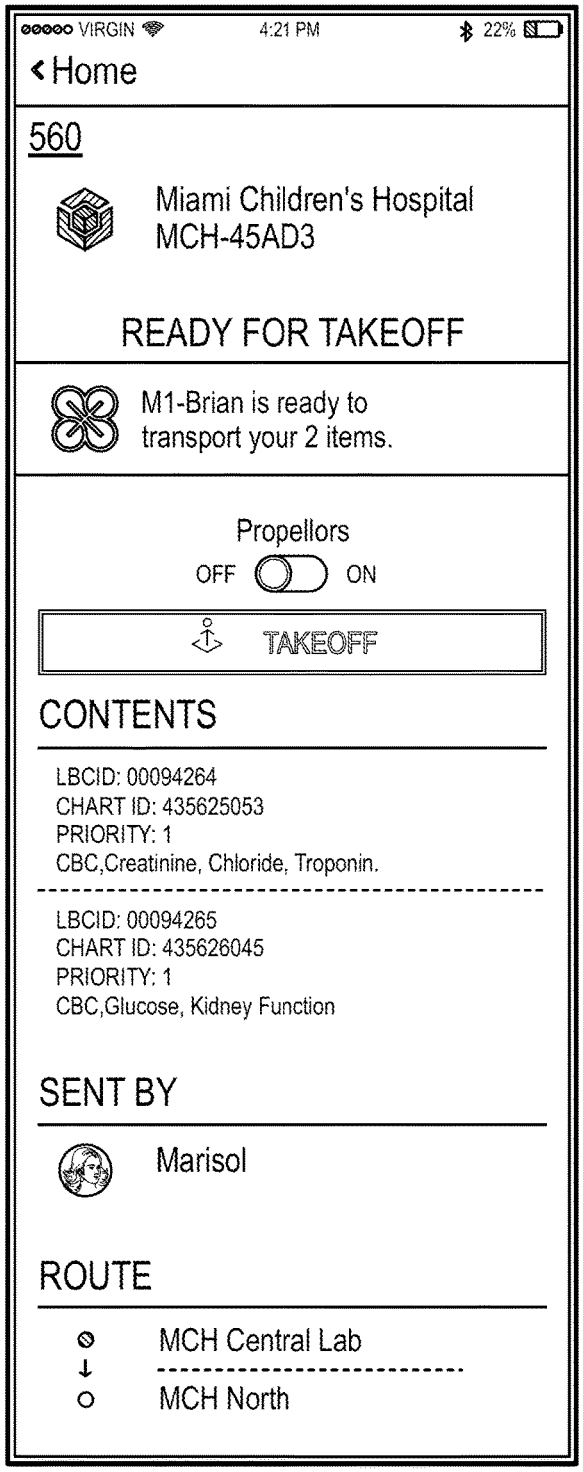

Referring to FIG. 5P, after receiving the flight route or the indication that the flight route has been transmitted to the UAV, the user's portable electronic device can display one or more messages (e.g., "Ready For Takeoff" and "M1-Brian is ready to transport your 2 items") on user interfaces 560 to confirm that the particular UAV (e.g., UAV named M1-Brian) is ready to takeoff. Further, user interface 560 can also provide a control switch to allow the user to initiate the flight of the UAV. For example, as illustrated in FIG. 5P, user interface 560 provides a control switch for turning on the propellers of the UAV. In response to receiving the user input to turn on the propellers, the portable electronic device can communicate with directly or indirectly (e.g., through a UAV service) with the UAV to turn on the propellers of the UAV. In some embodiments, the portable electronic device can also display other information on user interface 560. Such information may include the flight destination location (e.g., Miami Children's Hospital), the flight route identification (e.g., MCH-45AD3), contents information of the payload (e.g., information of LBCID, Chart ID, Priority, etc.), the name of the user who sent the payload (e.g., Marisol Lopez), the time that the payload was sent (e.g., 2016-02-21, 3:30 PM), and the flight route details (e.g., from the MCH Central Lab station to the MCH North station).

Figure 5Q:

Based on the information displayed on user interface 560, the user of the portable electronic device can review and/or confirm that the information is correct and accurate. Referring to FIG. 5Q, based on such review, the user can use one or more control switches to initiate the flight. For example, after the user's portable electronic device receives the user's input to turn on the propeller, the portable electronic device can display user interface 564. User interface 564 can indicate that the propellers of the UAV are turned on and provide a control button for initiating the flight (e.g., a "takeoff" button). For example, the user may touch or push the control button on user interface 564 to initiate the flight. In some embodiments, the portable electronic device can also display information associated with the flight on user interface 564. Such information may include the flight destination location (e.g., Miami Children's Hospital), the flight route identification (e.g., MCH-45AD3), contents information of the payload (e.g., information of LBCID, Chart ID, Priority, etc.), the name of the user who sent the payload (e.g., Marisol Lopez), the time that the payload was sent (e.g., 2016-02-21, 3:30 PM), and the flight route details (e.g., from the MCH Central Lab station to the MCH North station).

FIGS. 5R-5U illustrate exemplary user interfaces 568, 572, 578, and 582 respectively, of an application for facilitating a payload transportation using a UAV, consistent with some embodiments of the present disclosure. User interfaces 568, 572, 578, and 582 can be provided by an application (e.g., application 234) of a portable electronic device (e.g., portable electronic device 102) shown in FIG. 2B. Referring to FIGS. 5R-5U, a user's portable electronic device can monitor the flight status of the UAV and/or the transporting status of the payload. As examples, in FIG. 5R, the portable electronic device displays a message on user interface 568 stating that the UAV is currently "En Route". In FIG. 5S, the portable electronic device displays a message on user interface 572 stating, for example, that the UAV is currently "Landing." In FIG. 5T, the portable electronic device displays a message on user interface 578 stating, for example, that the UAV has currently "Arrived." And in FIG. 5U, the portable electronic device displays a message on user interface 582 stating, for example, that the payload has been "Received."

Figures 5T, 5U:
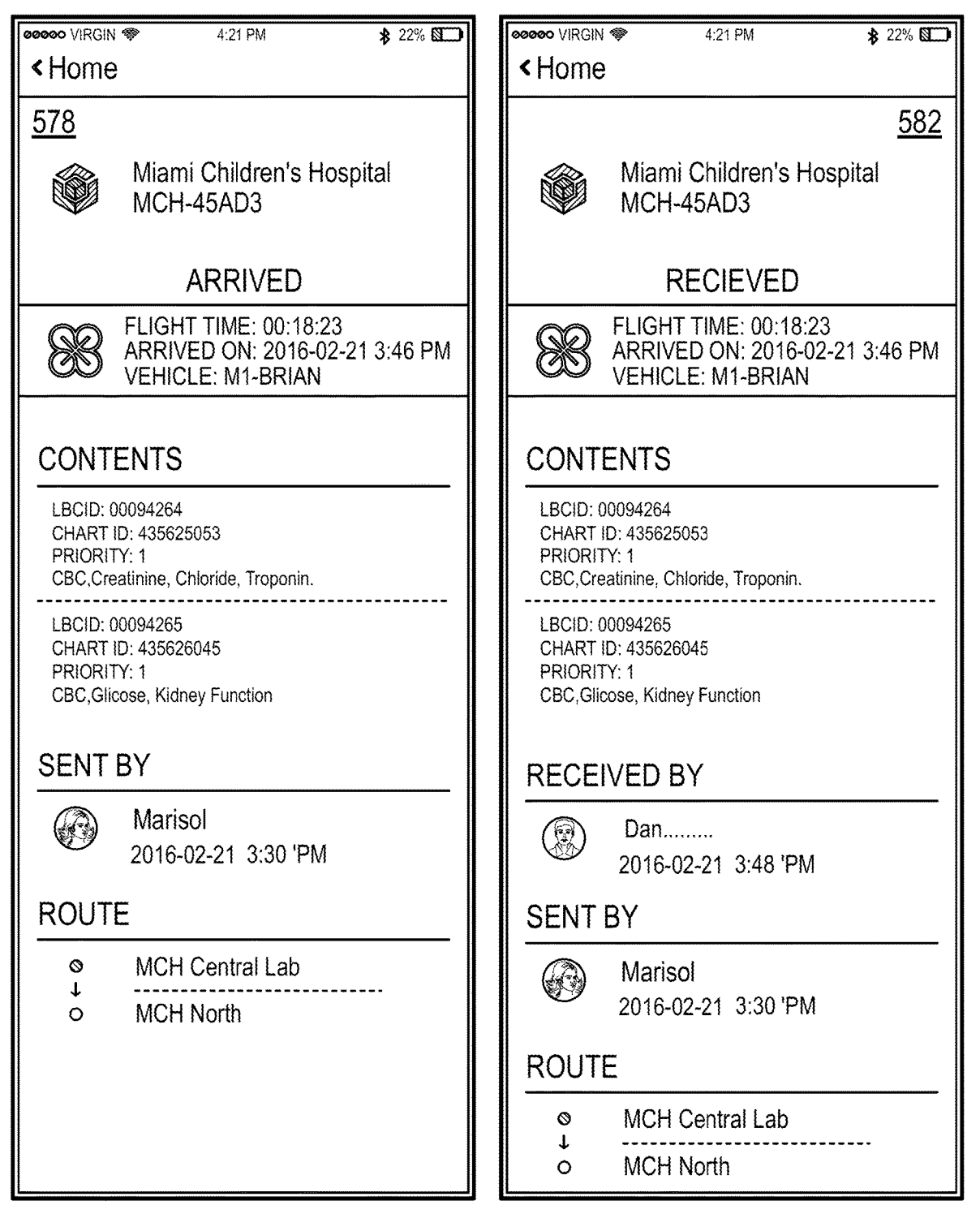

In some embodiments, the portable electronic device can also display information associated with the flight on user interfaces 568, 572, 578, and 582. Such information may include, for example, the flight destination location (e.g., Miami Children's Hospital), the flight route identification (e.g., MCH-45AD3), contents information of the payload (e.g., information of LBCID, Chart ID, Priority, etc.), the name of the user who sent the payload (e.g., Marisol Lopez), the time that the payload was sent (e.g., 2016-02-21, 3:30 PM), and the flight route details (e.g., from the MCH Central Lab station to the MCH North station). In some embodiments, after the payload is transported and received, user interface 582 can also provide information associated with the receiving of the payload. For example, as illustrated in FIG. 5U, user interface 582 may provide the name of the person signed or scanned the received payload (e.g., Dan Henry), and the day and time the payload is received (e.g., 2016-02-21, 3:48 PM).

Figure 5V:
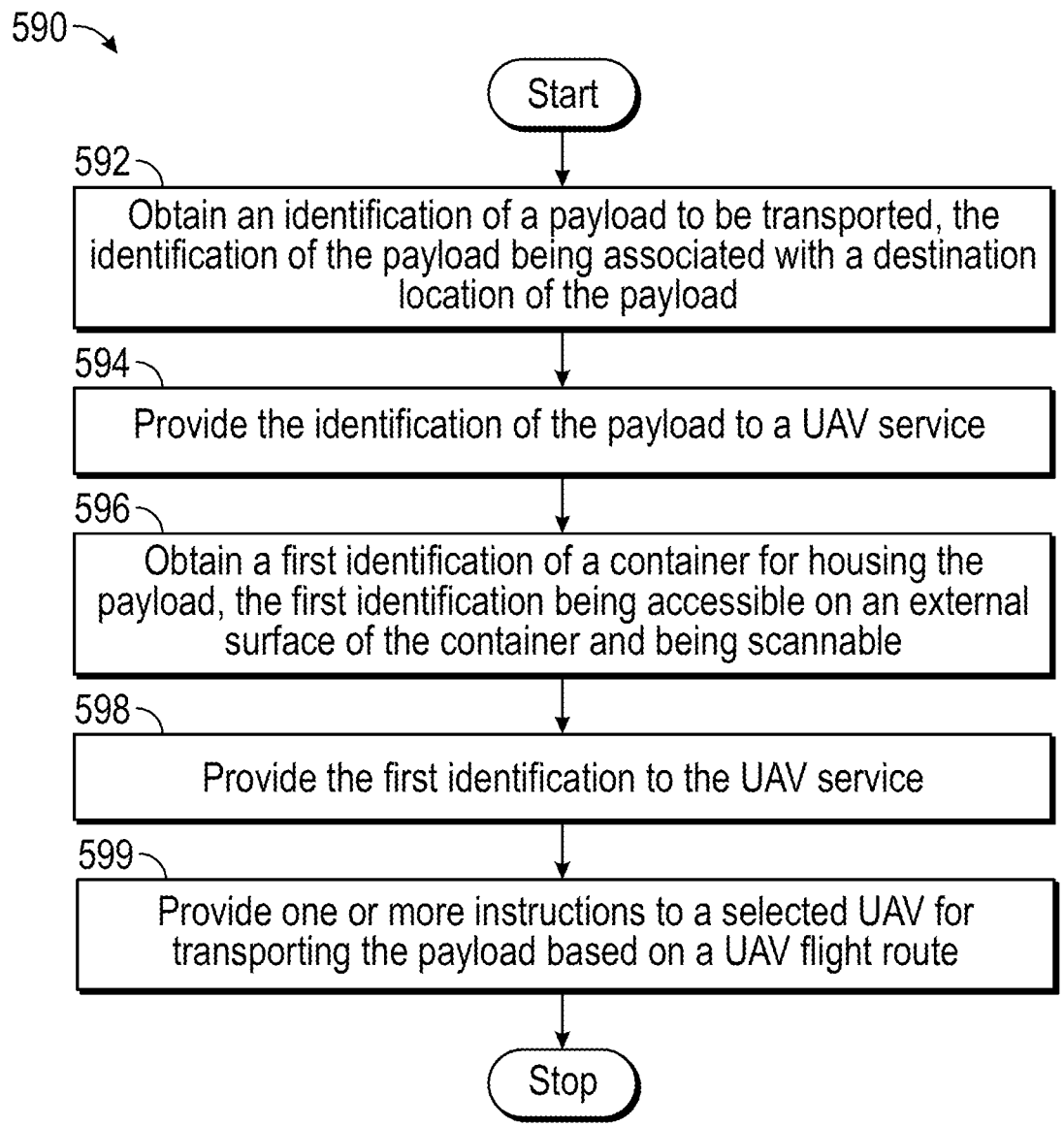

FIG. 5V illustrates a flow chart of an exemplary process 590 for facilitating a payload transportation using a UAV, consistent with some embodiments of the present disclosure. Some features of the process 590 are illustrated in FIGS. 1, 2A-2C, and 5A-5U and accompanying descriptions. In some embodiments, the process 590 is performed by a portable electronic device (e.g., portable electronic device 102 in FIGS. 1 and 2B).

In the process 590, a portable electronic device (e.g., portable electronic device 102 in FIGS. 1 and 2B) having one or more processors and memory obtains (step 592) an identification of the payload to be transported. The identification of the payload is associated with a destination location of the payload. The portable electronic device provides (step 594) the identification of the payload to a UAV service. The portable electronic device further obtains (step 596) a first identification of a container for housing the payload. The first identification is accessible on an external surface of the container and is scannable. The portable electronic device provides (step 598) the first identification to the UAV service. As discussed above, the UAV service determines the flight route and transmits the flight route information to the UAV. In some embodiments, the UAV service also transmits the flight route information to the portable electronic device. In some embodiments, the UAV service transmits an indication to the portable electronic device indicating that the flight route has been transmitted to the UAV. After receiving the flight route or the indication, the portable electronic device provides (step 599) one or more instructions to a selected UAV for transporting the payload based on a UAV flight route. The UAV flight route is generated based on the identification of the payload; and the UAV is selected based on the first identification and a second identification. The second identification is associated with the first identification for identifying the container.

FIG. 5V is merely illustrative of a method for facilitating payload transportation using a UAV. The illustrative discussions above are not intended to be exhaustive or to limit the invention to the precise form disclosed. Many modifications and variations are possible in view of the above teachings.

Using the application and methods described above with FIGS. 5A-5V, a transporter (e.g., a delivery truck driver) can readily schedule a plurality of transportations using UAVs. The transporter can thus delivery more payloads to their destinations faster and more cost-effective. The application can also prioritize the transportation of payloads for the transporter. Moreover, the transporter can conveniently monitor the status of transportation from his or her portable electronic device. The transporter can also receive confirmation of transportation remotely without having to interact with the payload receiver.

Unmanned Aerial Vehicle and Smart Payload Container

Figure 6A:
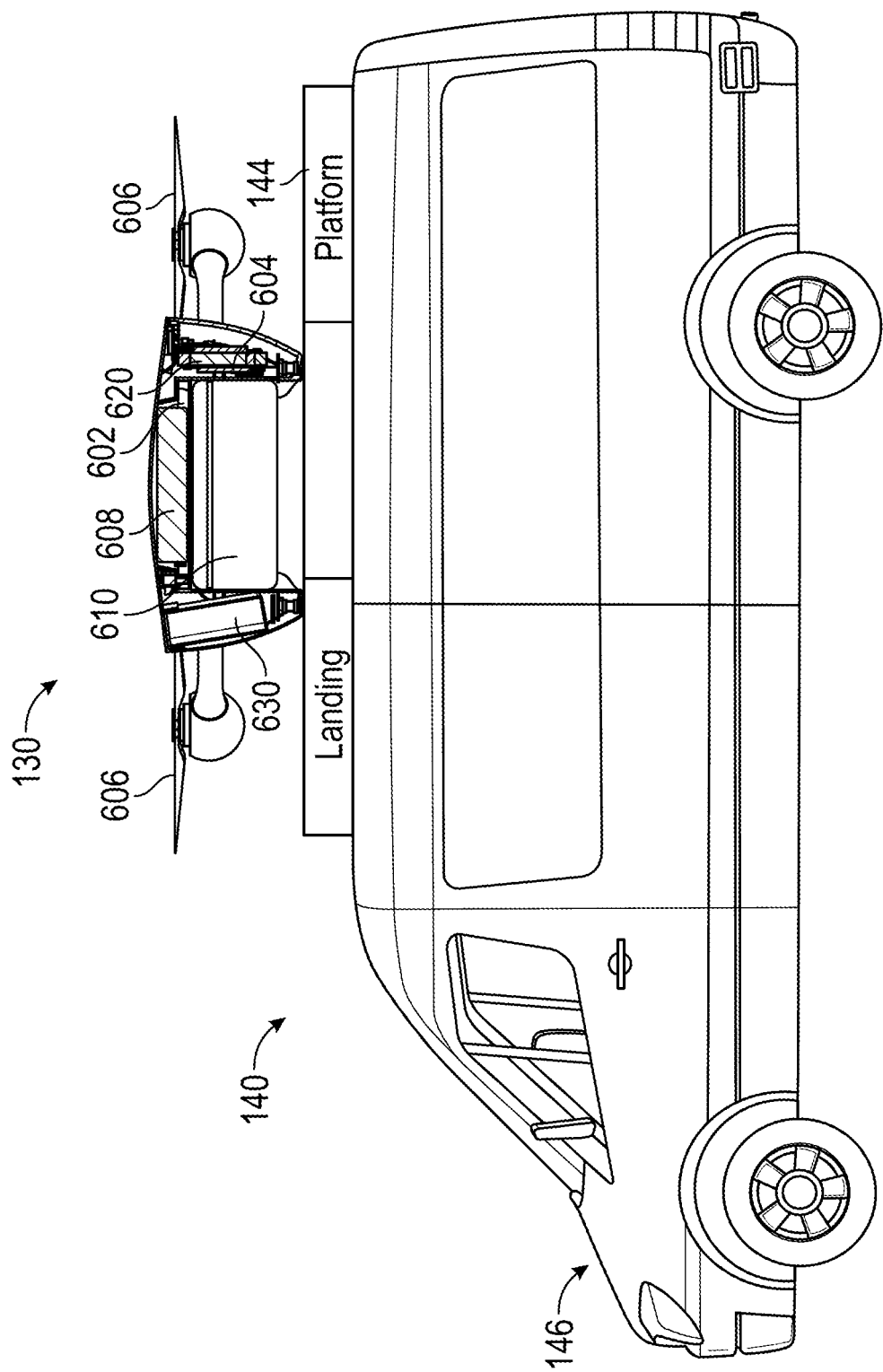
FIG. 6A illustrates an exemplary UAV and an exemplary UAV station, consistent with some embodiments of the present disclosure.

FIG. 6A illustrates an exemplary UAV 130 and an exemplary UAV station 140, consistent with some embodiments of the present disclosure. Referring to FIG. 6A, in some embodiments, UAV 130 can include a body 602, one or more propellers 606, a main power supply 608, a payload container 610, a flight control system 620, and a flight termination system 630. As described, in some embodiments, UAV station 140 can include a landing platform 144 and an exchange station 146. A landing platform facilitates landing and launching of UAV 130. An exchange station 146 receives a payload, a payload container, or a battery from UAV 130; loads a payload, a payload container, or a battery to UAV 130, or exchanges a payload, a payload container, or a battery with UAV 130. In some embodiments, as shown in FIG. 6A, body 602 may optionally comprise a carrying space 604. As described above, UAV 130 can launch from and/or land on landing platform 144 for releasing/loading/exchanging payload container 610 and/or main power supply 608 (e.g., a battery) with exchange station 146. After landing on landing platform 144, UAV 130 can align with a payload receiving structure of landing platform 144 for exchanging the payload container 610 and/or main power supply 608. UAV 130 can also release the payload to landing platform 144 without exchanging payload container 610 and/or main power supply 608. In some embodiments, landing platform 144 can include a latch mechanism to latch or lock UAV 130 such that UAV 130 can dock on landing platform 144 to prevent undesired movements or drifting.

Referring to FIG. 6A, in some embodiments, body 602 can include a carrying space 604 that may extend to the bottom of UAV 130. Carrying space 604 may be at least partially enclosed by body 602. Carrying space 604 of UAV 130 can accommodate a payload container 610 and optionally main power supply 608. For example, carrying space 604 may have a rectangular shape, or any other shape, corresponding to a similarly shaped payload container 610. In some embodiments, carrying space 604 may not be partially enclosed by body 602, and body 602 may not have the vertical portions as shown in FIG. 6A. Instead, carrying space 604 may comprise an open space underneath body 602 such that a payload container can have any dimensions. For example, the payload container can be releasably mounted at the bottom of UAV 130 and extends beyond the edges of body 602.

In some embodiments, payload container 610 may have dimensions (length, width, and thickness) corresponding to the payload receiving structure of landing platform 144, such that payload container 610 may pass through the payload receiving structure of landing platform 144. For example, after UAV 130 lands on landing platform 144 and aligns with the payload receiving structure of landing platform 144, it may release payload container 610 to allow payload container 610 to transfer through a center opening of landing platform 144 to the interior of exchange station 146. As a result, exchange station 146 can receive the payload container 610 through the center opening of landing platform 144. After receiving the payload container 610, exchange station 146 can further load another payload container to UAV 130 for the next transportation.

In some embodiments, the payload receiving structure of landing platform 144 may be part of exchange station 146 (e.g., a designated area of the rooftop of a consumer's vehicle), and may not have a center opening. As such, payload container 610 may be transferred to the exterior of exchange station 146 (e.g., the designated area of the rooftop of exchange station 146). The components of UAV 130 are further described in detail below.

Figure 6B:
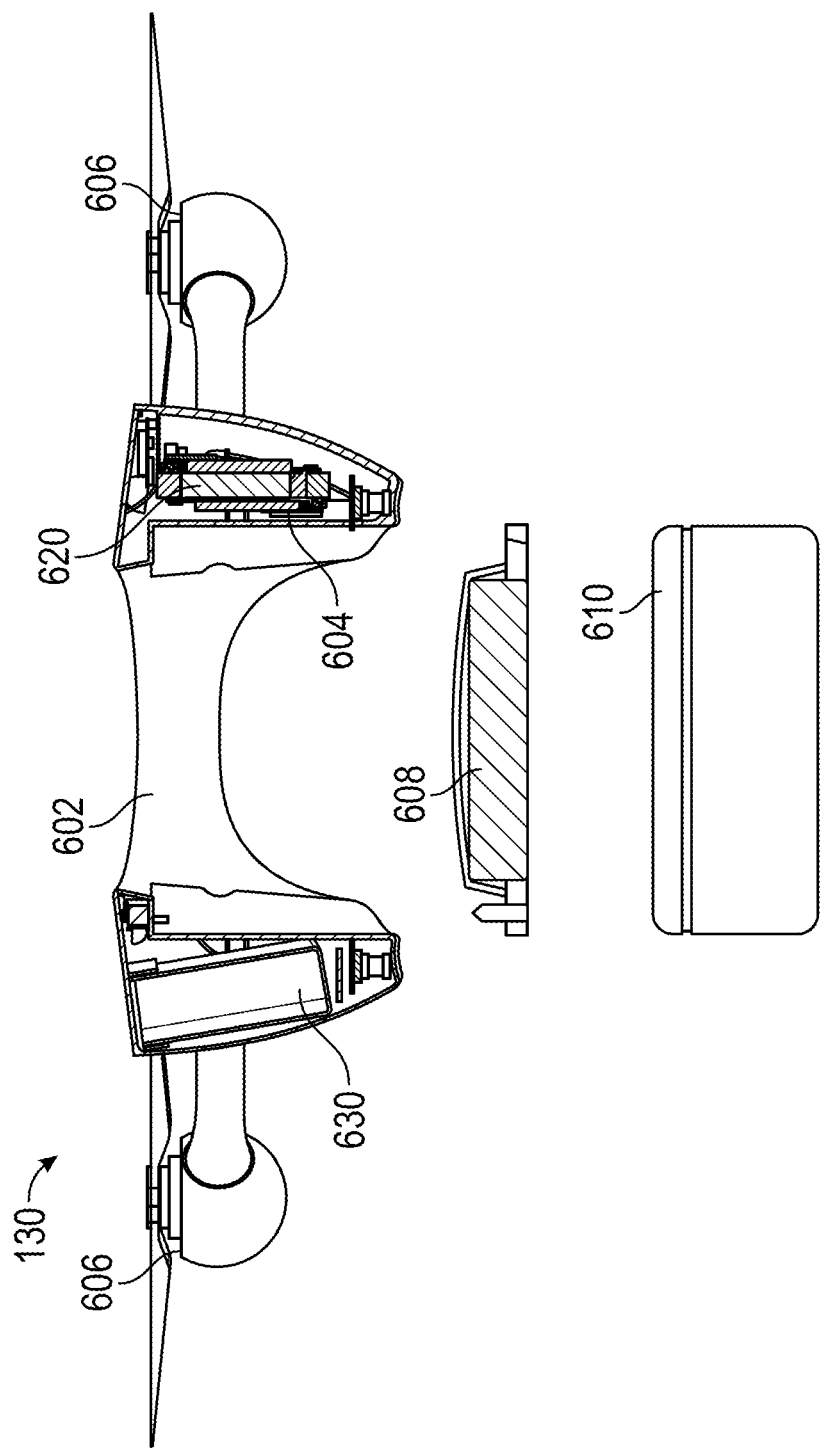
FIG. 6B illustrates an exploded view of a UAV, consistent with some embodiments of the present disclosure.

FIG. 6B illustrates an exploded view of UAV 130, consistent with some embodiments of the present disclosure. As shown in FIG. 6B, UAV 130 includes a body 602 and a carrying space 604. In some embodiments, body 602 can be formed using metal, plastic, alloy, or any other suitable materials. For example, body 602 may include aluminum alloy material such that UAV 130 has a reduced overall weight while still possess sufficient strength or hardness for protecting the electronic systems inside body 602 and payload container 610.

As discussed above, carrying space 604 can accommodate payload container 610. In some embodiments, carrying space 604 can also accommodate main power supply 608. For example, carrying space 604 can form an opening from the top surface of UAV 130 to the bottom surface of UAV 130 (e.g., a single through hole or a hole with covered top surface). Inside the carrying space 604, payload container 610 may be placed toward the bottom of UAV 130 and main power supply 608 may be placed on top of payload container 610. In some examples, one or both payload container 610 and main power supply 608 (e.g., a battery) can be released from UAV 130. For example, UAV 130 can release payload container 610 to exchange station 146 to transport the payload housed in payload container 610. In some embodiments, UAV 130 can detect and determine whether main power supply 608 has sufficient battery power. If UAV 130 determines that the main power supply 608 has insufficient battery power for the next flight or other requires replacement, it may also release main power supply 608 to, for example, exchange station 146. In some examples, payload container 610 may be released before main power supply 608 (e.g., a battery) is released. In some examples, payload container 610 and main power supply 608 may be release together as one unit. For example, payload container 610 and main power supply 608 may be disposed side-by-side horizontally, and be release together from the bottom of UAV 130. In some embodiments, exchange station 146 can dispose a replacement battery into carrying space 604 of UAV 130 before it dispose another payload container. It is appreciated that main power supply 608 and payload container 610 can be placed in any spatial relationship. For example, both main power supply 608 and payload container 610 can be placed vertically or horizontally occupying a substantial portion of the vertical or horizontal dimension of carrying space 604. As a result, main power supply 608 and payload container 610 can be replaced in any desired order. It is appreciated that carrying space 604 can form any shape, form one single space or multiple spaces, or be arranged in any manner that is suitable to carry and release payload container 610 and/or main power supply 608.

In some embodiments, body 602 can include holding and releasing mechanisms, such as protrusions, cavities, connectors, latches, switches, or hinges, for holding and releasing main power supply 608 and payload container 610. For example, the inner surface of body 602 may include movable or retractable protrusions. The movement of the protrusions can be enabled by mechanical or electrical sensors and switches. For example, if a sensor senses the insertion or placement of one or both of main power supply 608 and payload container 610, one or more of the protrusions may be asserted or pushed out from the inner surface of body 602 to hold and/or lock the main power supply 608 and/or payload container 610 in place. If a sensor senses a signal for releasing the payload container 610 and/or main power supply 608, one or more of the protrusions may be retracted.

Main power supply 608 can be a Lithium ion battery, a Lithium iron phosphate (LeFePO4) battery, a Lithium polymer (LiPo) battery, a Lithium Titanate battery, Lithium Cobalt Oxide, or any other type of batteries. In some embodiments, main power supply 608 can include a battery interface (e.g., a battery connector) for exchanging batteries. For example, when main power supply 608 is placed or inserted in carrying space 604, it can be electrically coupled to provide electrical power to the electronic systems (e.g., flight control system 620 and flight termination system 630) of UAV 130 through the battery interface. The battery interface can also allow main power supply 608 to be removed or released from UAV 130 such that it can be replaced. In some embodiments, UAV 130 can detect that main power supply 608 needs to be replaced and therefore release main power supply 608.

Referring to FIG. 6B, in some embodiments, payload container 610 can include a housing and a cover for substantially enclosing a payload. Payload container 610 can prevent or reduce the likelihood of shock/drop/impact-, water-, dust-, and/or chemical-damage of the enclosed payload. In some embodiments, payload container 610 can be substantially waterproof or water resistant. The material of payload container 610 can include metal, alloy, stainless steels, nylons, hard plastics, iron, aluminum, lead, rubber, and/or any other desired materials.

In some embodiments, the housing and the cover of payload container 610 can have similar length and width dimensions such that they can be snuggly coupled with each other. In some embodiments, the housing and the cover can be hingedly, rotatably, movably, permanently, detachably, and/or latchably coupled or engaged with each other. Further, one or both of the housing and the cover can include a seal strip configured to provide additional water-sealing or water-resistance capability. For example, the housing or the cover may include a groove. The seal strip can be disposed inside the groove. The seal strip and its surrounding structures (e.g., the groove, a protrusion, coupling elements, etc.) can provide protection of the enclosed payload from damaged by water, shock, dust, oil, mud, snow, vibration, spill, drop, impact, heat, frost, acid, chemical, corrosion, rain, sand, and/or other forms of intrusion. In some embodiments, the material of the seal strip can include silicone, rubber, thermoforming plastics, polyvinylchoride materials, polycarbonate, polyethylene terephthalate (PET), poly methyl methacrylate acrylic (PMMA), adhesive tape, and/or any material having similar characteristics. The seal strip may be formed, for example, by a molding processing.

In some embodiments, one or both of the housing and the cover of payload container 610 can include internally disposed cushion elements. For example, the cushion elements may be filled with air, gas, cottons, soft materials, or any other force or stress absorption materials. The cushion elements can provide the payload enclosed in payload container with additional protection against physical impact, force, impact, stress, shock, collision, etc.

In some embodiments, payload container 610 can include one or more identifications for identifying the payload container. For example, payload container 610 can include a first identification accessible on an external surface of payload container 610. The first identification can be a barcode, a QR code, a scannable/readable tag, or a near-filed communication tag (e.g., a RFID tag), or a digital representation thereof. To obtain the identity of payload container 610, a portable electronic device can scan or read the first identification (e.g., a barcode disposed on an external surface of payload container 610). In some embodiments, the first identification can be different for different payload containers. As a result, each payload container can have a unique first identification. As a result, the payload container can be identified, monitored, or tracked using this first identification. Uniquely identifying a payload container can be helpful to track or monitor the transportation status of the payload enclosed in the payload container. For example, after a particular payload is placed in payload container 610, a first identification (e.g., a barcode) attached to payload container 610 can be scanned/read by a user's portable electronic device. The first identification can be associated with information of the payload such as the contents, the weight, the destination location, the sender of the payload, the receiver of the payload, etc. The first identification can be transmitted to a UAV service. Based on the first identification of payload container 610, the UAV service can associate payload container 610 with the payload enclosed therein.

Moreover, the first identification can also be associated with information generated by the portable electronic device that scans the barcode. For example, after scanning/reading of the first identification, the portable electronic device can generate information such as the location and the day/time of the scanning/reading, the user who scanned/read the first identification, etc. The information can also be associated with the first identification of payload container 610 to enable tracking or monitoring of payload container 610.

In some embodiments, payload container 610 can include a second identification identifying payload container 610. The second identification can be a barcode, a QR code, or a scannable/readable tag, or a near-filed communication tag (e.g., an RFID tag), or a digital representation thereof. The second identification can correspond to the first identification to identify payload container 610. In some embodiments, the second identification can be different in form or type from the first identification, but can also uniquely identify payload container 610. For example, the second identification can be an RFID tag that is readable by an RFID reader of UAV 130. UAV 130 can also transmit the second identification to a UAV service. Using the second identification, the UAV service associates a particular UAV 130 with payload container 610. The UAV service can thus provide a flight route for transporting the payload enclosed in payload container 610 to the particular UAV 130.

In some embodiments, payload container 610 may include only one identification for identifying payload container 610. For example, payload container 610 may include only an RFID tag, which can be read by a user's portable electronic device and by UAV 130. After the user's portable electronic device obtains the RFID tag of payload container 610 and obtains the identification of the enclosed payloads, it can transmit the RFID tag to a UAV service. The UAV service can thus associate the payload with the payload container 610. Moreover, after UAV 130 reads the RFID tag of payload container 610, it can also transmit the RFID tag to the UAV service. The UAV service can thus associate payload container 610 with UAV 130 and provide the flight route to UAV 130 for transporting payload container 610. Thus, in some embodiments, if the user's portable electronic device and the RAV can read or obtain the same type of identification (e.g., an RFID tag), only one identification may be used for payload container 610.

Referring to FIG. 6B, UAV 130 can include one or more propellers 606. As one example, UAV 130 can include four propellers 606 surrounding body 602 (e.g., a quadrotor helicopter). Propellers 606 enable UAV 130 to operate in the air and fly from one location to another. Propellers 606 may be substantially similar to those described in U.S. patent application Ser. No. 13/890,165 filed on May 8, 2013, entitled "Transportation Using Network of Unmanned Aerial Vehicles" (now U.S. Pat. No. 9,384,668), the content of which is incorporated by reference in its entirety for all purposes.

UAV 130 may also include a flight control system 620. In some embodiments, flight control system 620 can include electronic control systems and sensors for flying and navigating the UAV. For example, flight control system 620 can provide control for aerial flight of the UAV by changing flight dynamics (e.g., yaw, pitch, and roll), the lift generated, the angle of attack, velocity, or any other flight characteristics. Flight control system 620 can also provide stability control of the UAV. Flight control system 620 can also communicate with, for example, satellites, a UAV service, portable electronic devices, and other UAVs. Further, flight control system 620 can include navigation systems to navigate between geo-locations. Sensors of the UAV can include, for example, infrared cameras, lidars, inertial measurement units (IMU), accelerometers, gyroscopes, inertial navigation systems, gravity sensors, external speed sensors, pressure sensors, gravity sensors, external speed sensors, altitude sensors, barometric systems, magnetometer or other sensors. Flight control system 620 may be substantially similar to the electronic control systems and sensors described in U.S. patent application Ser. No. 13/890,165 filed on May 8, 2013, entitled "Transportation Using Network of Unmanned Aerial Vehicles" (now U.S. Pat. No. 9,384,668), the content of which is incorporated by reference in its entirety for all purposes. In some embodiments, flight control system 620 can also include a landing system (e.g., UAV landing system 800 shown in FIG. 8A). The landing system is capable of perform precision landing on a landing platform or on any other locations. The landing system is described in detail below with FIGS. 8A-8C.

In some embodiments, UAV 130 can include flight termination system 630. Flight termination system 630 can include a controller, a battery manager, a power supply, an emergency landing system, and one or more sensors. Flight termination system 630 can detect whether one or more conditions for triggering termination of a flight are satisfied. For example, flight termination system 630 can detect a mid-air collision, a sudden change of weather conditions that prevents the UAV from completing the current flight, a mechanical/electrical failure of the UAV, a main power supply failure such as a battery failure, whether the remaining battery power is insufficient for supporting the remaining flight, non-responsive of the autopilot system and/or the flight control system (e.g., flight control system 620 shown in FIGS. 6A-6B). Flight termination system 630 can also detect a decent rate greater than a threshold value (e.g., 5 m/s), and a pitch or bank angle greater than a threshold value (e.g., 60 degrees). Flight termination system 630 can also communicate with the autopilot system and/or the flight control system, which can detect a violation of flight envelop (e.g., Geofence), or a disparity between barometric and GPS-derived altitude above ground level. If one or more of these conditions are satisfied, flight termination system 630 may engage the emergency landing system to search for and/or land the UAV immediately at a nearby UAV station or location. For example, flight termination system 630 may cut power to the motors or rotors of the UAV, retain power to the avionics, and/or deploy a parachute for immediate landing of the UAV near its current location. Flight termination system 630 is described in more detail below with FIGS. 9A-9D.

Figure 6C:
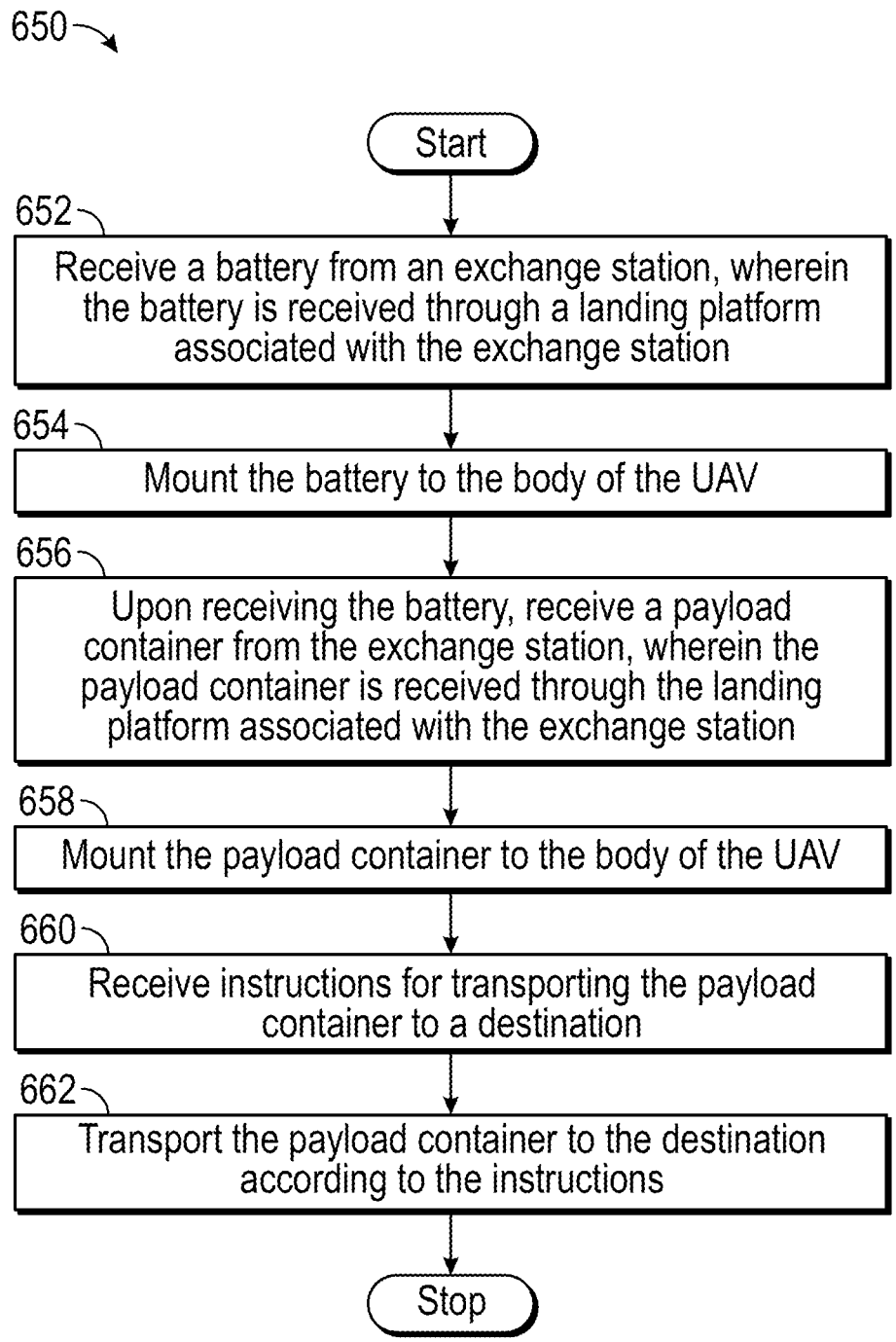
FIG. 6C illustrates a flow chart of an exemplary process for transporting a payload using a UAV, consistent with some embodiments of the present disclosure.

FIG. 6C illustrates a flow chart of an exemplary process 650 for transporting a payload using a UAV. Process 650 can be performed by a UAV (e.g., UAV 130) comprising a body and one or more propellers rotatably connected to the body. The UAV receives (step 652) a battery from an exchange station. The battery is received through a landing platform (e.g., landing platform 144) associated with the exchange station. The UAV mounts (step 654) the battery to the body of the UAV. Upon receiving the battery, the UAV receives (step 656) a payload container from the exchange station. The payload container is received through the landing platform associated with the exchange station. The UAV mounts (step 658) the payload container to the body of the UAV. The UAV receives (step 660) instructions for transporting the payload container to a destination; and transports (step 662) the payload container to the destination according to the instructions.

FIG. 6C is merely illustrative of a method for transporting a payload using a UAV. The illustrative discussions above are not intended to be exhaustive or to limit the invention to the precise form disclosed. Many modifications and variations are possible in view of the above teachings UAV 130 as described above can provide flexibility for exchanging payload containers and/or batteries. As a result, the UAV can be better utilized to transport more payloads in an efficient manner. Moreover, UAV 130 can also autonomously navigate and transport payload with reduced or eliminated human intervention. UAV 130 can also intelligently handle or process emergency situations such that the payload can be protected under the emergency situations. Moreover, UAV 130 can communicate directly or indirectly with other UAVs, with the users' portable electronic devices, and/or with a UAV service. As a result, it enables the monitor, tracking, and intervention if the user desires.

Landing Platform

Figure 7A:
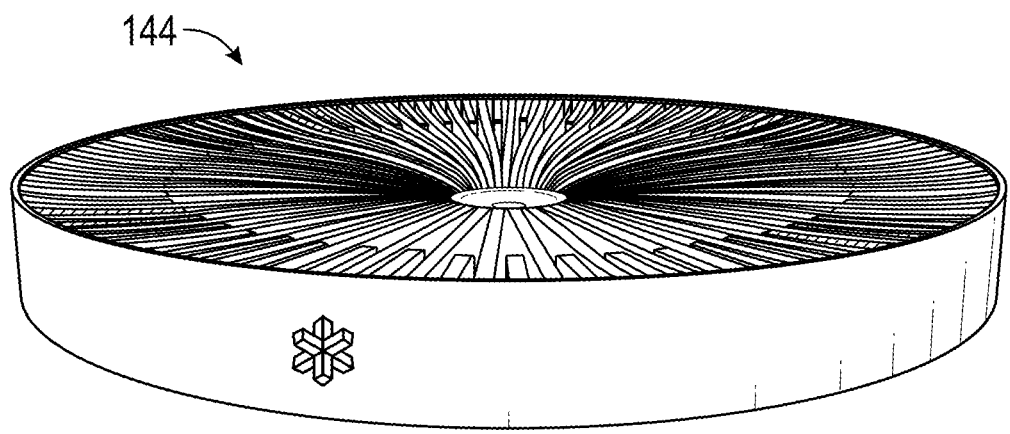
FIG. 7A illustrates a perspective view of an exemplary landing platform, consistent with some embodiments of the present disclosure.

FIG. 7A illustrates a perspective view of an exemplary landing platform 144, consistent with some embodiments of the present disclosure. The material of landing platform 144 can include metal, alloy, stainless steels, nylons, hard plastics, iron, aluminum, lead, rubber, and/or any other desired materials. In some embodiments, landing platform 144 can also include various structures for assisting alignment of a landed UAV. Alignment of a landed UAV may be required because the UAV may land on any area of landing platform 144. As a result, the landed UAV may not be aligned with a payload receiving structure of landing platform 144. For example, the landed UAV may not be aligned with the center opening area where landing platform 144 can receive the payload container. Thus, alignment or repositioning of the landed UAV may be required. Referring to FIG. 7A, one or more mechanisms for assisting the alignment of a landed UAV with a payload receiving structure of landing platform 144 may include surface materials or coatings for aligning the landed UAV, surface textures, guiding rails, actuators, air-actuated or liquid-actuated mechanisms, or any other type of alignment systems. As an example, landing platform 144 can include a surface costing for reducing the friction between landing platform 144 and the landed UAV, such that the landed UAV can move and align with the payload receiving structure under the force of gravity. The alignment of a landed UAV on the surface of landing platform 144 is described in more detail below with FIGS. 7C-7D.

Referring to FIG. 7A, in some embodiments, landing platform 144 can be a disc-shaped platform for providing a surface for landing one or more UAVs. In some embodiments, landing platform 144 can include one or more openings, housings, compartments, or structures for receiving payload containers. For example, landing platform 144 can include a center opening having dimensions corresponding to the dimensions of a payload container. As a result, landing platform 144 can receive the payload container in the center opening. In some embodiments, the center opening can be formed such that its vertical height/thickness is different than the vertical height/thickness of edge of landing platform 144. For example, the height of the center opening may be slightly less than the height of the edge of landing platform 144. As a result, a landed UAV can move toward the center of landing platform 144 under the force of gravity. It is appreciated that the center opening can also have any desired shape, dimension, formation, material, coating for alignment of a landed UAV and for receiving a payload container. It is further appreciated that one or more openings for receiving payload containers may be disposed at any areas of landing platform 144 other than the center area.

Figure 7B:
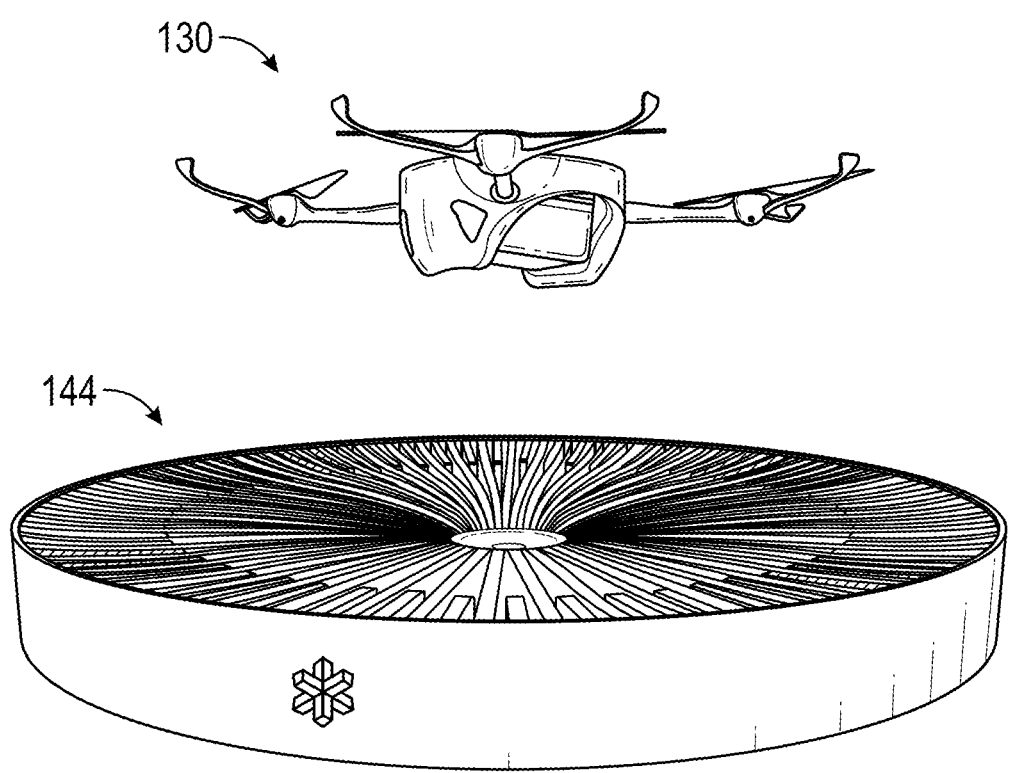
FIG. 7B illustrates a perspective view of an exemplary landing platform and a landing UAV, consistent with some embodiments of the present disclosure.

FIG. 7B illustrates a perspective view of an exemplary landing platform 144 and a landing UAV 130, consistent with some embodiments of the present disclosure. Referring to FIG. 7B, in some embodiments, landing platform 144 can have a dimension that is sufficiently large for landing or parking two or more UAVs. For example, landing platform 144 can have a 120 centimeter diameter. As a result, the area of landing platform 144 can park two landed UAVs.

In some embodiments, precision landing may be required. For example, for exchanging a payload container with an exchange station, UAV 130 may be required to land on landing platform 144, which can be attached to or integrated with the exchange station. Failure to land on landing platform 144 may result in failure to transport the payload. For UAV 130 to land on landing platform 144, UAV 130 can include a landing system. The landing system of UAV 130 can include one or more of a magnetic heading based landing subsystem, an infrared light based landing subsystem, a global positioning system (GPS)/Real Time Kinematic (RTK) based landing subsystem, and an optical based landing subsystem. The landing system of UAV 130 can operate to coordinate with corresponding subsystems or components of a landing system of landing platform 144 to assist the landing of UAV 130 onto landing platform 144. The landing systems of UAV 130 and landing platform 144 are described in more detail below with FIGS. 8A-8C.

In some embodiments, for operating the landing system, landing platform 144 can be electrically powered by a battery, an AC or DC power supply, a solar panel power supply, or any other type of power supplies. For example, landing platform 144 can be electrically coupled to a power supply of an exchange station (e.g., exchange station 146 of FIG. 2A) to receive electrical power. As another example, in a location (e.g., a rural area) that lacks electrical infrastructure, landing platform 144 can be powered by a battery that is charged by a solar panel.

Moreover, UAV 130 may be interfered from landing on landing platform 144 due to various reasons. For example, landing platform 144 may have an object (e.g., a leaf, a bird, a cat, dirt, water, etc.) disposed on top of it. The object may likely prevent UAV 130 from landing on landing platform 144. In some embodiments, landing platform 144 can include an automated shield or cover (not shown) for protecting its top surface and for enabling landing of UAV 130. For example, landing platform 144 may include a circular-shaped shield capable of covering the entire or a substantial portion of the top surface of landing platform 144. If no UAV is approaching or landing, the shield can remain closed or cover landing platform 144. If a UAV is approach or is landing, the landing system of landing platform 144 can detect the landing and send a signal to a controller of the shield. The controller of the shield may activate a motor or send an alert to open the shield (e.g., slide the shield away, flip the shield up, alert a user, etc.) In some embodiments, the shield can be partitioned to multiple slices and each slice can be operated separately. As a result, for example, if the landing system detects that one UAV is landing, it can send a signal to the controller to open some slices of the shield depending on the predicted landing area of the UAV. If the landing system detects that two UAVs are landing, it can send a signal to the controller to open all slices of the shield.

Figure 7C:
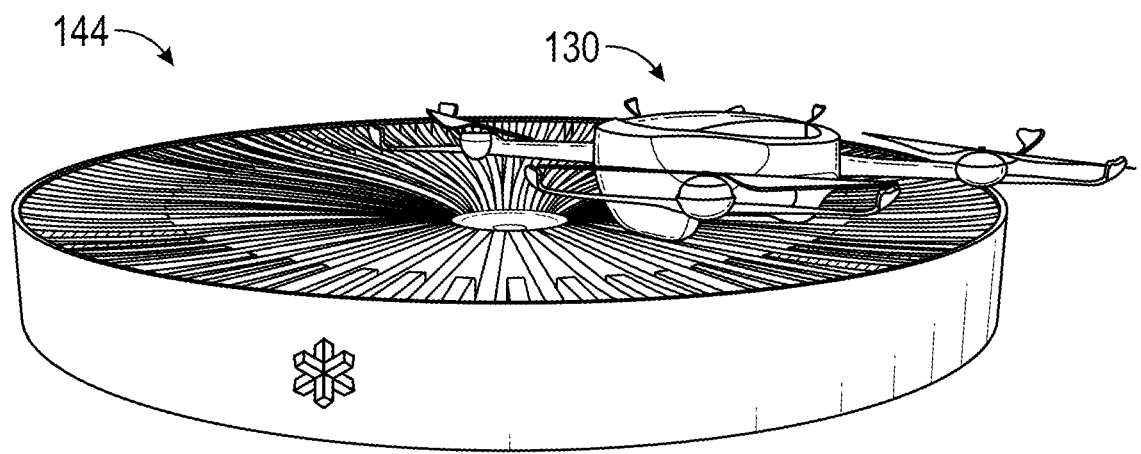
FIG. 7C illustrates a perspective view of an exemplary landing platform and a landed UAV, consistent with some embodiments of the present disclosure.

FIG. 7C illustrates a perspective view of an exemplary landing platform 144 and a landed UAV 130, consistent with some embodiments of the present disclosure. As discussed above, using the landing systems, UAV 130 can land on landing platform 144. Preferably, UAV 130 can land on the payload receiving structure of landing platform 144 (e.g., the center opening area) such that the payload container carried by UAV 130 can be directly released. In reality, UAV 130 may not land on such area or structure each time. For example, in average, UAV 130 may land about 20 centimeters from the center opening area of landing platform 144. As a result, alignment or repositioning of UAV 130 may be required to transport the payload container that UAV 130 carries.

As discussed above, landing platform 144 can include one or more mechanisms for assisting the alignment or repositioning of a landed UAV. Referring to FIG. 7C, mechanisms for assisting the alignment of a landed UAV can include, for example, surface materials or coatings for aligning the landed UAV, surface textures, guiding rails, air-assisted or liquid-assisted alignment mechanisms, actuators, or any other type of alignment systems. As an example, a material having a low coefficient of friction or surface costing for reducing the friction between landing platform 144 and the landed UAV can be used to enhance the movement of landed UAV 130. Such materials or coatings include, for example, graphite, PTFE (Teflon), glass, diamond-like-carbon (DLC) and diamond. In some embodiments, by using the low coefficient friction materials/coatings, UAV 130 can move and align under the force of gravity.

In some embodiments, landing platform 144 can include surface textures or guiding rails to assist the alignment or repositioning of a landed UAV. Referring to FIG. 7C, landing platform 144 can include guiding rails arranged in a radial or spokewise structure. The guiding rails may have gaps or spaces between them. The dimensions of the guiding rails and the spaces can be configured to guide the landed UAV 130 to the payload receiving structure for releasing the payload container and/or for reducing the movement of landed UAV 130 in other directions. For example, in FIG. 7C, the guiding rails can have widths that correspond to the landing gears or landing portions of the body of UAV 130. As a result, the guiding rails can enhance the moving of UAV 130 toward the payload receiving structure for releasing the payload container (e.g., the center opening area). Moreover, the spaces or gaps between the guiding rails can prevent or reduce the likelihood that UAV 130 moves in an undesired direction. For example, referring to FIG. 7C, the gaps between guiding rails may reduce the likelihood that landed UAV 130 moves in a perpendicular-to-the-longitudinal direction of the guiding rail.

In some embodiments, landing platform 144 can include gas assisted or liquid assisted mechanisms for aligning or repositioning of landed UAV 130. For example, landing platform 144 can include a pump, an air intake, a plurality of air pipes/ducts/tubes/grooves, and one or more sensors. The sensors of the landing systems can detect the landing of UAV 130 by, for example, sensing the weight change or receiving one or more signals indicating UAV 130 is landing or has landed. Such signals can be provided by a controller of the landing system of landing platform 144. After the sensors detect the landing of UAV 130, they can provide one or more signals to initiate the pump to enable air or other gas to flow in a desired direction. For example, in FIG. 7C, to move the landed UAV 130 toward the center opening of landing platform 144, it may be desired to enable the air or other gas to flow from the edge to the center. In some embodiments, the air pipes/ducts/tubes/grooves of landing platform 144 may enable the flowing of the air or gas in the desired direction. In some embodiments, the gaps between the guiding rails can also assist the flowing of the air or gas in the desired direction.

In some embodiments, landing platform 144 can also include a liquid assisted mechanism for aligning or repositioning of landed UAV 130. The liquid assisted alignment mechanism of landing platform 144 can include a pump, a liquid intake or a liquid circulation system, a plurality of pipes/ducts/tubes/grooves, and one or more sensors. Similar to the air assisted mechanism, after the sensors detect and indicate that UAV 130 is landing or has landed, the controller of the landing system of landing platform 144 can provide a signal to initiate the liquid assisted alignment mechanism. The pump can start to flow the liquid in the desired direction (e.g., toward the center opening of landing platform 144). In some embodiments, the liquid flows only on the surface of land platform 144, and therefore does not affect the electrical systems inside landing platform 144. Flowing the liquid can reduce the friction between the landed UAV 130 and the surface of land platform 144. In some embodiments, the liquid assisted alignment mechanism includes a close-loop liquid circulation system such that the liquid are collected and circulated in the system.

Figure 7D:
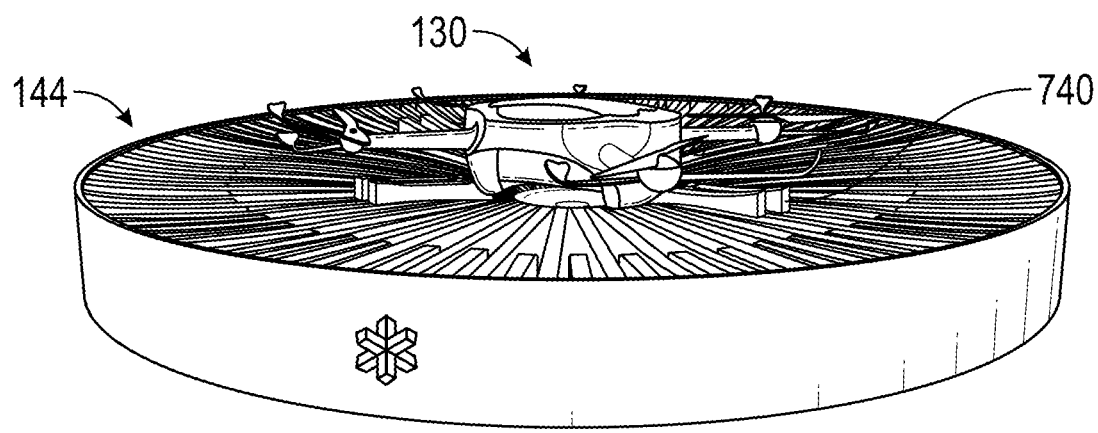
FIG. 7D illustrates a perspective view of an exemplary landing platform and a landed UAV that is aligned for transporting the payload, consistent with some embodiments of the present disclosure.

FIG. 7D illustrates a perspective view of an exemplary landing platform 144 and a landed UAV 130 that is aligned with a payload receiving structure, consistent with some embodiments of the present disclosure. Referring to FIGS. 7C and 7D, in some embodiments, a mechanism for aligning or repositioning a landed UAV may include one or more actuators. As discussed above, UAV 130 may land in any area of landing platform 144. Further, UAV 130 may also land in any directions. For example, the landing gears or landing portions of UAV 130 may be parallel to the guiding rails or perpendicular to the guiding rails. Moreover, UAV 130 may carry heavy payloads. As a result, under certain circumstances, previously described mechanisms (e.g., using surface coatings, guide rails, air-assisted alignments) may not be sufficient to move UAV 130 for alignment or reposition, and additional external forces may be required.

In some embodiments, landing platform 144 can include one or more actuators that can apply external forces to landed UAV 130. An actuator is a mechanism or system that is moved or controlled by a motor (not shown). The motor can be included in landing platform 144 or be a separate component (e.g., a component included in an exchange station such as a transporting vehicle). The motor can operate using various types of power sources such as electric current, hydraulic fluid pressure, or pneumatic pressure. The motor can convert the energy supplied by such power sources to the motion of the actuator. The motion of the actuator may include, for example, a linear motion (e.g., movement along a line), a circular motion, a back-and-forth motion, or any other desired motion. Moreover, the motion of the actuator may be activated or triggered based on a signal provided by one or more sensors. The sensors of the landing systems may detect the landing of UAV 130 by, for example, sensing the weight change of the landing platform 144 or the receiving of one or more signals indicating UAV 130 is landing or has landed. Such signal may be provided by a controller of the landing system of landing platform 144. After the sensor detects the landing of UAV 130, it can provide a signal to activate or trigger the motion of actuators 740. For example, the sensors may send a signal to start the motor, which causes actuators 740 to move in a preconfigured motion (e.g., a linear motion toward the center of landing platform 144).

Referring to FIG. 7D, one or more actuators 740 can be disposed in landing platform 144. For example, four actuators 740 can be disposed symmetrically with a 90 degree angle between the adjacent two actuators. As a result, at least one of the four actuators can apply external force on a landed UAV 130 no matter where UAV 130 lands on landing platform 144. Such force may move landed UAV 130 toward a payload receiving structure (e.g., the center opening area). In some embodiments, the actuators 740 can be configured to perform one or more types of motions. For example, the actuators 740 may perform a linear motion to move the landed UAV 130 toward the center opening, and then perform a circular motion to turn landed UAV 130 to better align with the center opening for releasing the payload container. It is appreciated that any number of actuators may be disposed in any desired manner in landing platform 144; and that the actuators may be configured to perform any types of motions for aligning and/or repositioning of a landed UAV.

Figure 7E:
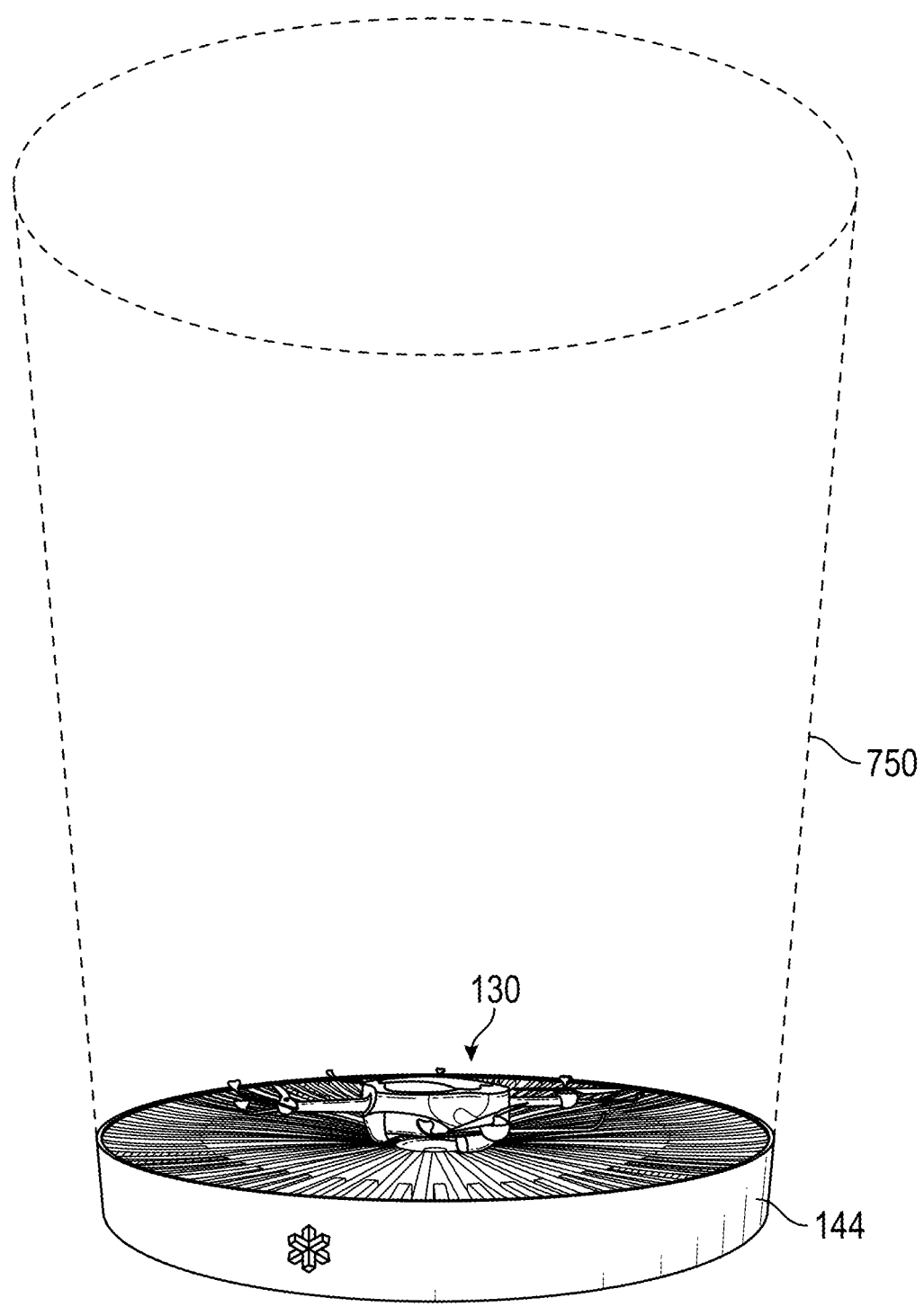

FIGS. 7E-7K illustrates prospective views of an exemplary landing platform fence 750. Referring to FIG. 7E, landing platform fence 750 can be a visible fence or an invisible fence. A visible fence can be, for example, a physical fence or a laser fence emitting visible laser light. An invisible fence can be a fence emitting invisible light, acoustic signals, and/or radio signals. In some embodiments, landing platform 144 and/or landing platform fence 750 can include a mechanism to detect objects passing landing platform fence 750. Based on the detection, landing platform 144 can communicate with UAV 130 to take proper actions.

In some embodiments, landing platform fence 750 is a laser fence, which can enable the detection of objects passing the line of sight between a laser source and a sensor (not shown). For example, landing platform fence 750 can include a laser source and/or remote sensors along the edge. The laser source can emit laser light in a substantially upward direction to form a light fence. One or more sensors (not shown) can be installed at corresponding internal or external positions of landing platform 144 for detecting an intrusion of the laser fence by an external object. In some embodiments, one or more LIDAR sensors can be installed or integrated along the periphery of landing platform 144 in an arrangement designed to detect an obstacle within a preconfigured distance (e.g., 10 meters) above landing platform 144. In some embodiments, the landing platform fence 750 can have continuous laser light surrounding the perimeter of landing platform 144, as illustrated in FIG. 7I. In some embodiments, the laser light may not be continuous and may form a plurality of beams. The directions of the plurality of beams may be substantially parallel or may be overlapping. Thus, in some embodiments, landing platform fence 750 can be a laser light mesh surrounding the perimeter of landing platform 144.

Landing platform fence 750 can include laser light sources such as gas lasers, chemical lasers, excimer lasers, solid-state lasers, fiber lasers, photonic crystal lasers, semiconductor lasers, dye lasers, free-electron lasers, and/or any other type of lasers. In some embodiments, the power of the laser light source can be configured such that it does not hurt or damage the intruding object such as a human user.

Figure 7F:
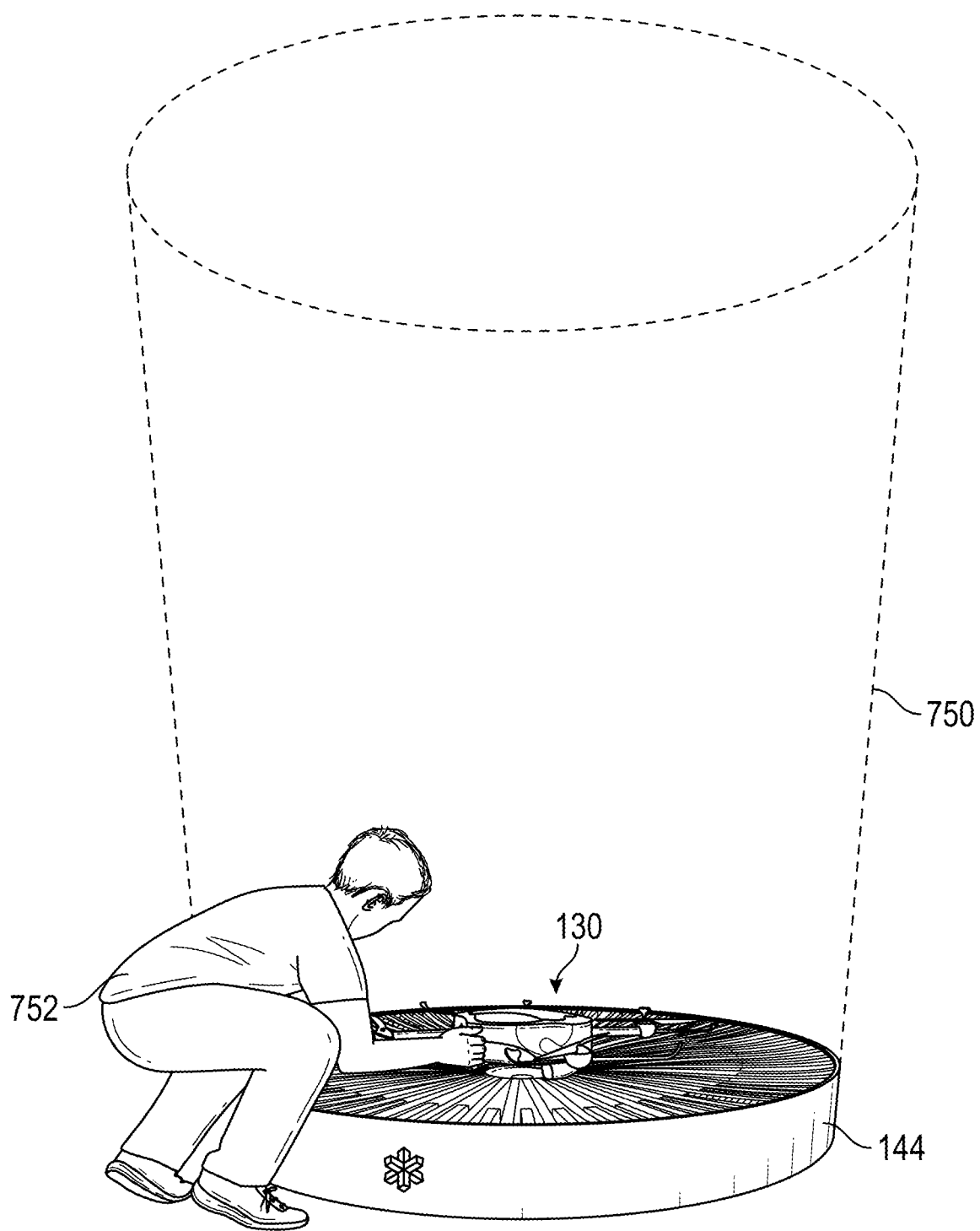

Referring to FIG. 7F, one or more sensors can detect that an object 752 (e.g., a user) is currently intruding landing platform fence 750. Such a determination can be based on the detection that the light emitted by the laser source is interrupted, disturbed, altered, etc. Upon such determination, the sensors can provide one or more signals to landing platform 144, indicating that landing platform fence 750 is currently being intruded. Based on the received signals, landing platform 144 can communicate with UAV 130 to take proper actions. For example, based on the communication from landing platform 144 indicating that the landing platform fence 750 is currently being intruded, UAV 130 can disable the propellers to prevent it from taking off. In some embodiments, landing platform 144 and/or UAV 130 can also communicate directly or indirectly (e.g., through UAV service 120) with the user's portable electronic device to disable the control switch (e.g., control switch shown on user interface 346 of FIG. 3N) on a user interface for turning on the propellers. Thus, landing platform fence 750 can provide safety measures to the user of UAV 130 (e.g., an operator or transporter who is manipulating UAV 130) and/or to UAV 130.

Figure 7G:
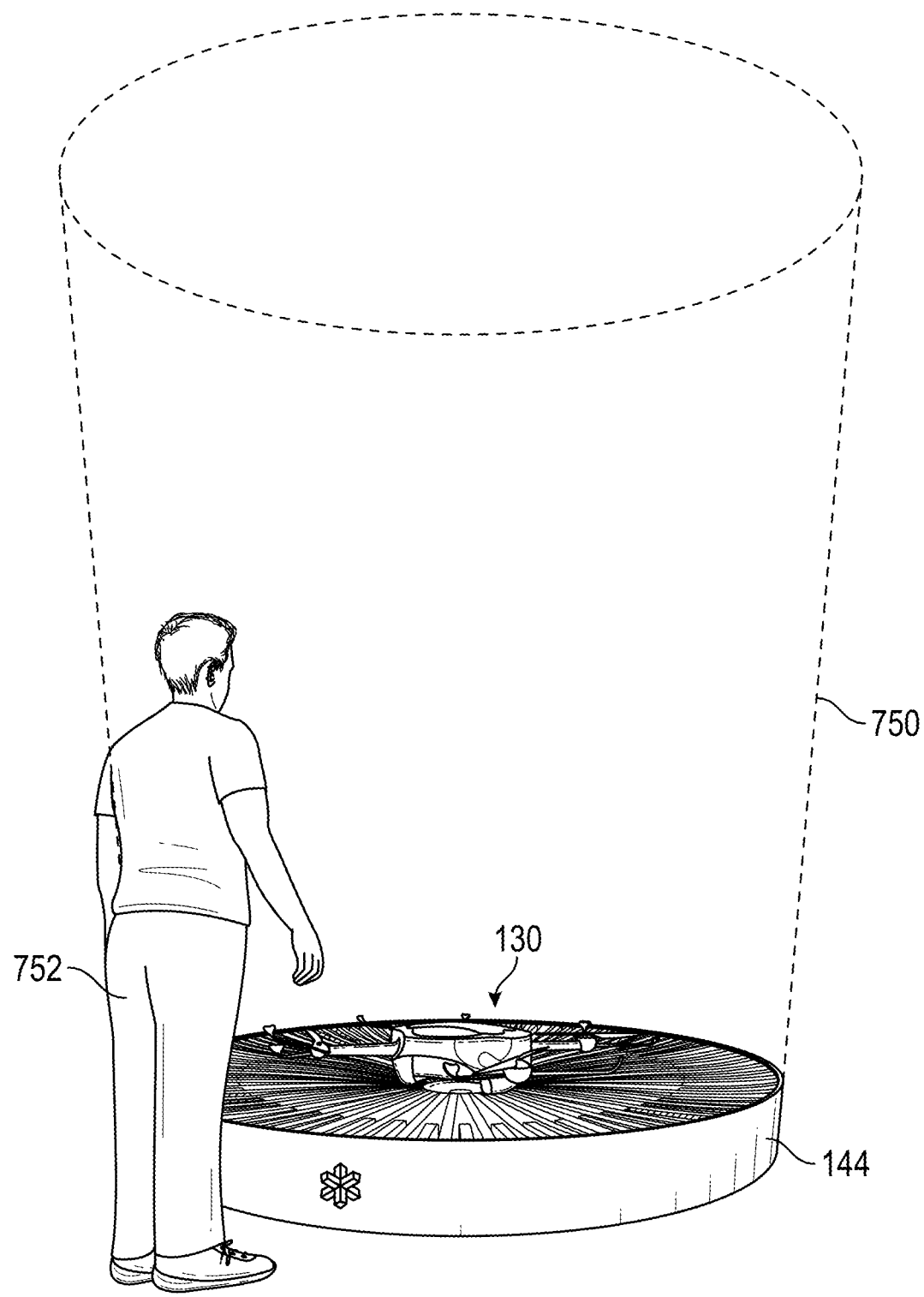

Referring to FIG. 7G, in some embodiments, one or more sensors may continue to detect an on-going intrusion and continue to provide signals for preventing a landed UAV from taking off or preventing an approaching UAV from landing. For example, the one or more sensors can continuously, repeatedly, or periodically monitor the intrusion of landing platform fence 750 and send signals to landing platform 144, which can communicate with UAV 130 to take proper actions.

Figure 7H:
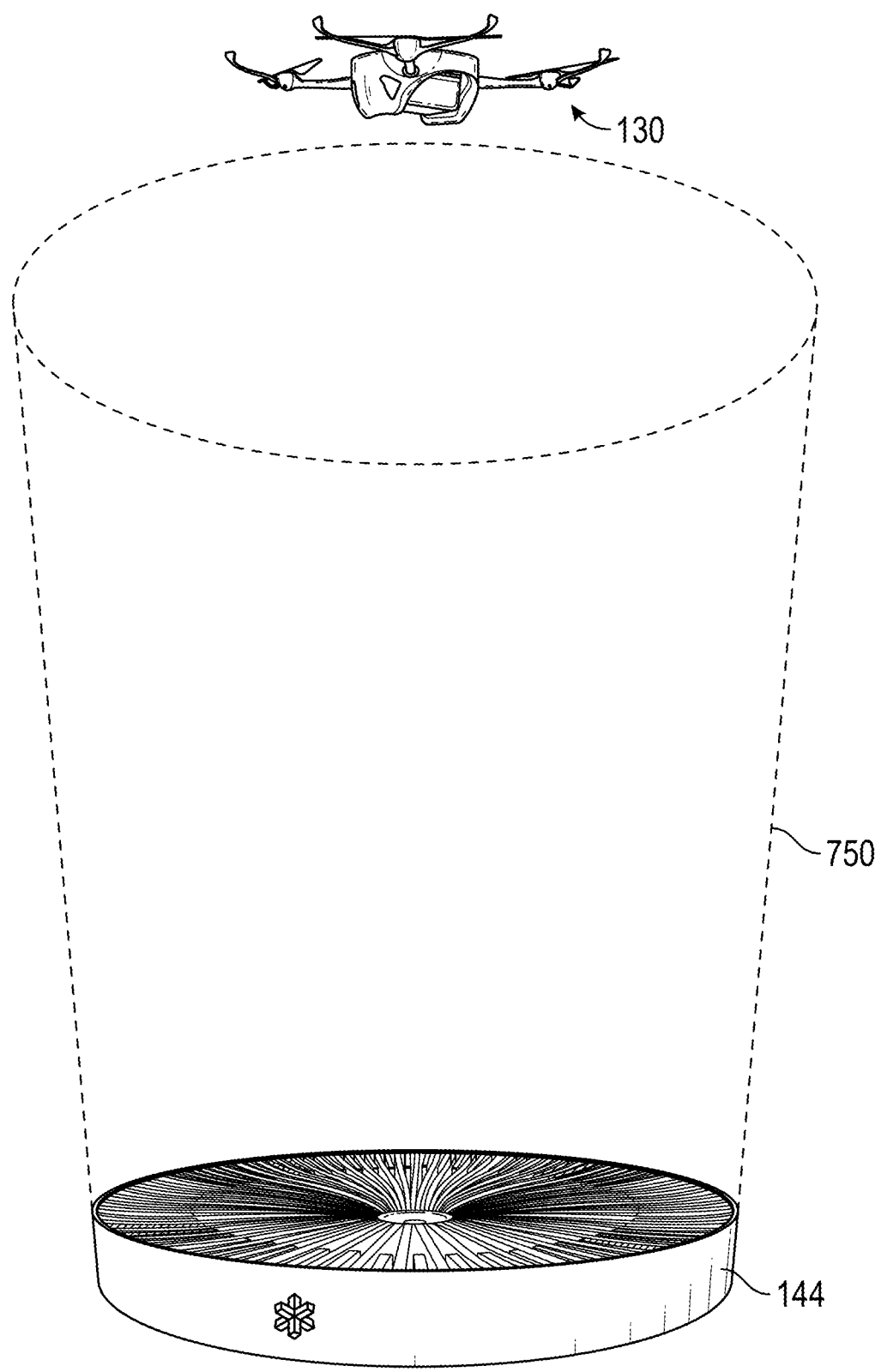
Figure 7I:
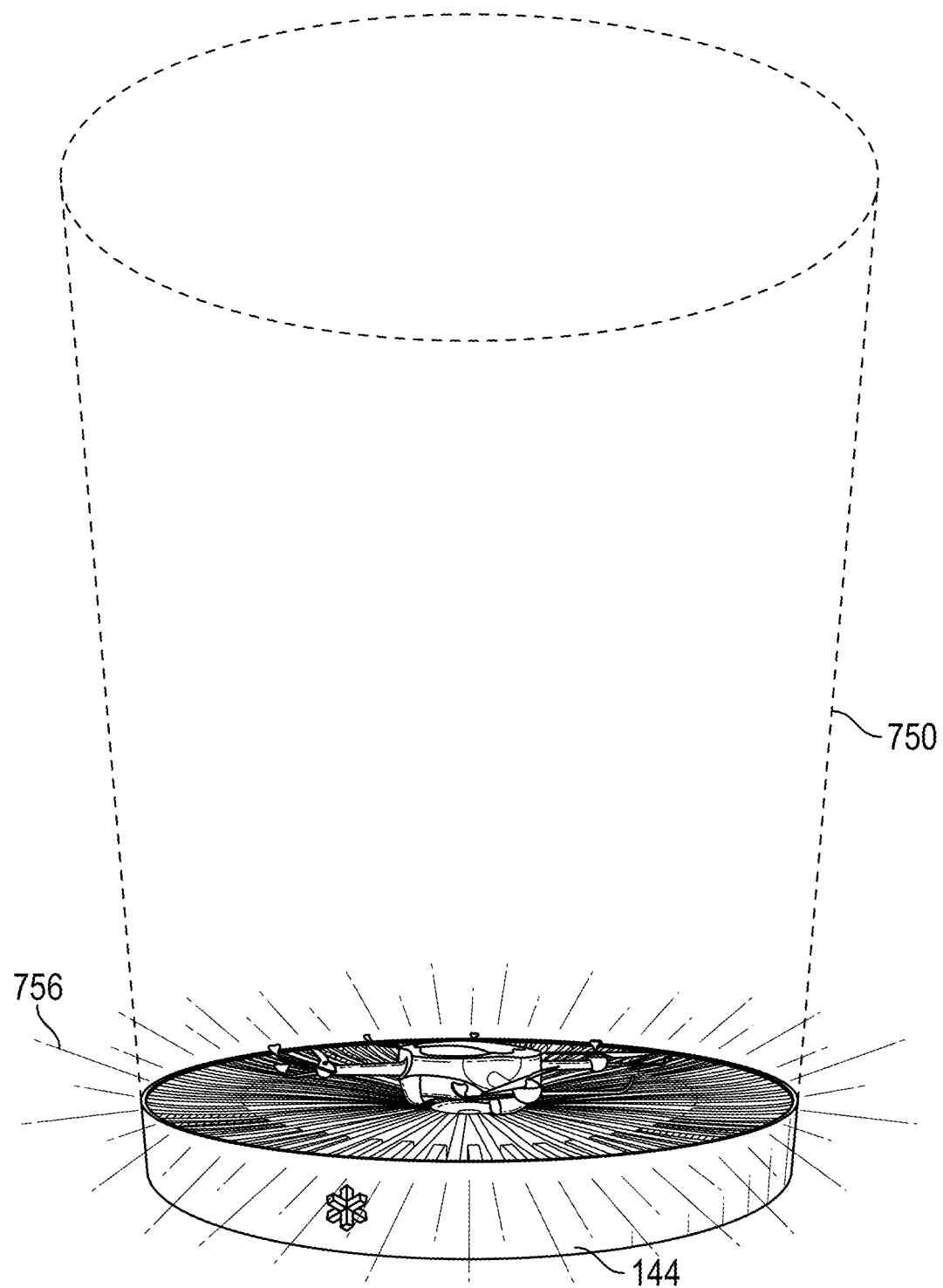

Referring to FIG. 7H, in some embodiments, if one or more sensors detect no intrusion of landing platform fence 750, they may provide one or more signals to landing platform 144, indicating that landing platform fence 750 is clear and free of intrusion. Such signals may be provided immediately after landing platform fence 750 becomes clear or after it becomes clear for a preconfigured period of time (e.g., 1 minute). Based on the received signals, landing platform 144 can communicate with UAV 130 to take proper actions. As an example, based on the communication from landing platform 144 indicating that the landing platform fence 750 is clear, UAV 130 can enable the propellers for preparing to taking off. In some embodiments, landing platform 144 and/or UAV 130 can also communicate directly or indirectly (e.g., through UAV service 120) with the user's portable electronic device to enable the control switch (e.g., control switch shown on user interface 346 of FIG. 3N) on a user interface for turning on the propellers. Thus, after the propellers are turned on, a landed UAV can take off.

As another example, landing platform 144 can also communicate with an approaching or landing UAV to indicate that landing platform 144 is clear for landing. Based on the communication from landing platform 144, a UAV landing system (e.g., UAV landing system 800 shown in FIG. 8A) can coordinate with an LP landing system (e.g., LP landing system 820 shown in FIG. 8A) for landing the UAV. The landing systems are described in more detail below with FIGS. 8A-8D.

Referring to FIG. 7I, in some embodiments, landing platform 144 can include a UAV alert system 756 for alerting that a UAV is approaching, landing or taking off. For example, UAV alert system 756 can include a plurality of light sources that are configured or controlled to flash during the landing or taking off of a UAV. Such light sources may be the same or different from light sources for establishing landing platform fence 750. For example, the light source for establishing landing platform fence 750 can be a laser light source. The light source of UAV alerting system 756 can be LED lights. In some embodiments, the light sources of UAV alert system 756 can be disposed along the edge of landing platform 144. It is appreciated that the light sources of UAV alert system 756 can be disposed at any portion that is internal or external to landing platform 144.

Figure 7J:
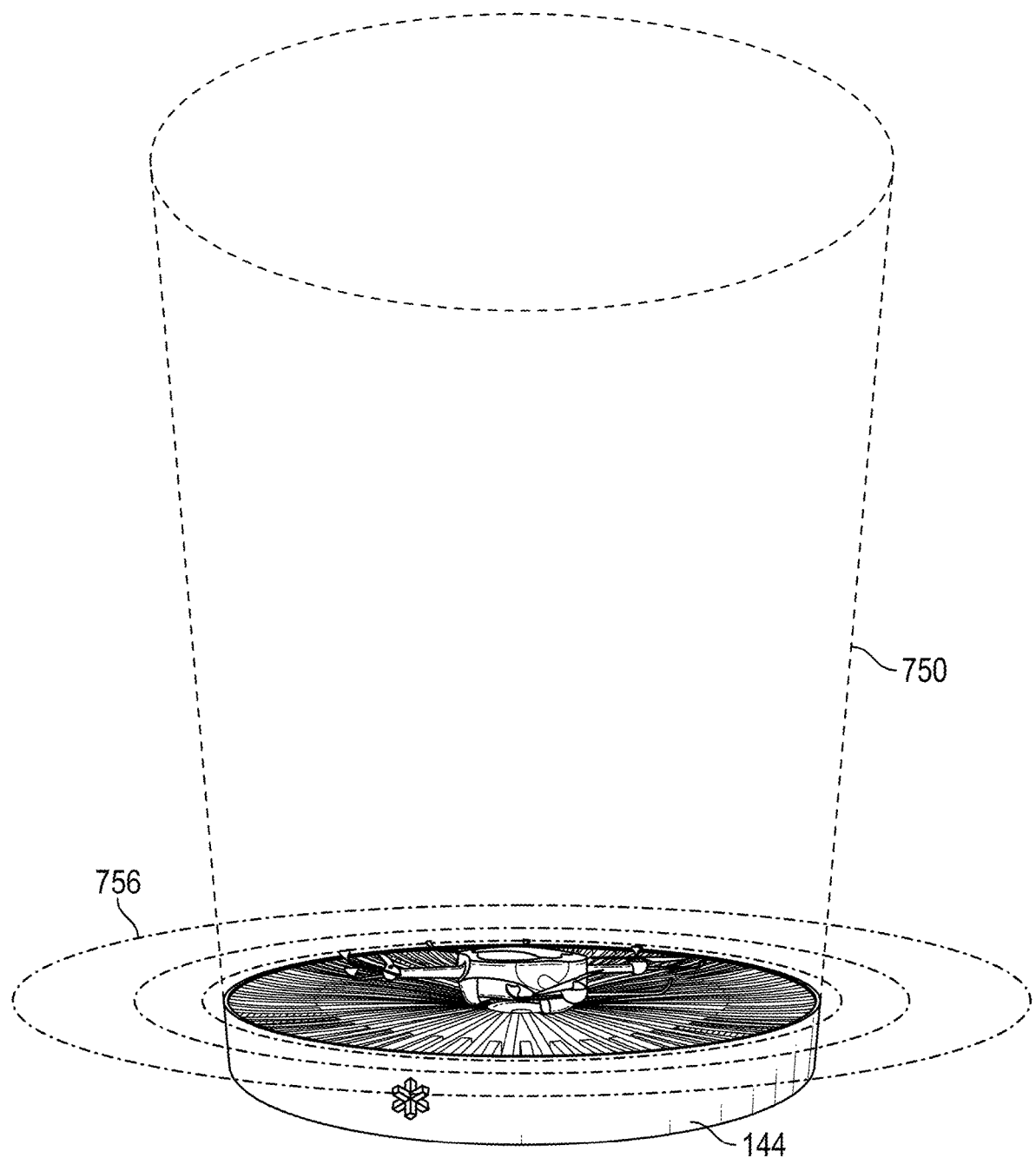

Referring to FIG. 7J, in some embodiments, UAV alert system 756 can include one or more acoustic sources that are configured or controlled to transmit an acoustic wave (e.g., a siren) during the landing or taking off of a UAV. In some embodiments, the acoustic sources are disposed along the edge of landing platform 144 such that the acoustic wave emitted can be received or detected from all directions. It is appreciated that the acoustic sources of UAV alerting system 756 can be disposed at any portion that is internal or external to landing platform 144.

Referring to FIG. 7K, in some embodiments, one or more sensors for detecting the intrusion of landing platform fence 750 can also detect intrusions during the installation, placement, or positioning of landing platform 144. For example, landing platform 144 may be mounted on or integrated with an exchange station (e.g., a transportation truck). The exchange station may move around a neighborhood and may stop or park at any location. Based on landing platform fence 750, landing platform 144 can determine whether such location is acceptable for UAV landing or taking off. For example, one or more sensors may detect that landing platform fence 750 is intruded by an object 758, such as a tree or a portion of it. The sensors may provide one or more signals to landing platform 144, indicating that landing platform fence 750 is intruded or otherwise not clear for landing. Based on such indication, landing platform 144 can alert and/or communicate with the user's portable electronic device to indicate that the current location is not acceptable or not approved for positioning landing platform 144. As a result, the user can move the landing platform 144 to select a better location. In some embodiments, if the current location is not approved for positioning landing platform 144, the control switch for taking off on the user interface of the user's portable electronic device can be disabled. Similarly, if the current location is not approved, landing platform 144 may not coordinate with an approaching or landing UAV for landing.

If landing platform 144 receives signals indicating that landing platform fence 750 is clear and free from intrusion, it may provide one or more signals to indicate that the current location is approved. As a result, the control switch for taking off on the user interface of the user's portable electronic device can be enabled. Similarly, if the current location is approved, landing platform 144 may coordinate with an approaching or landing UAV for landing.

Figure 7L:
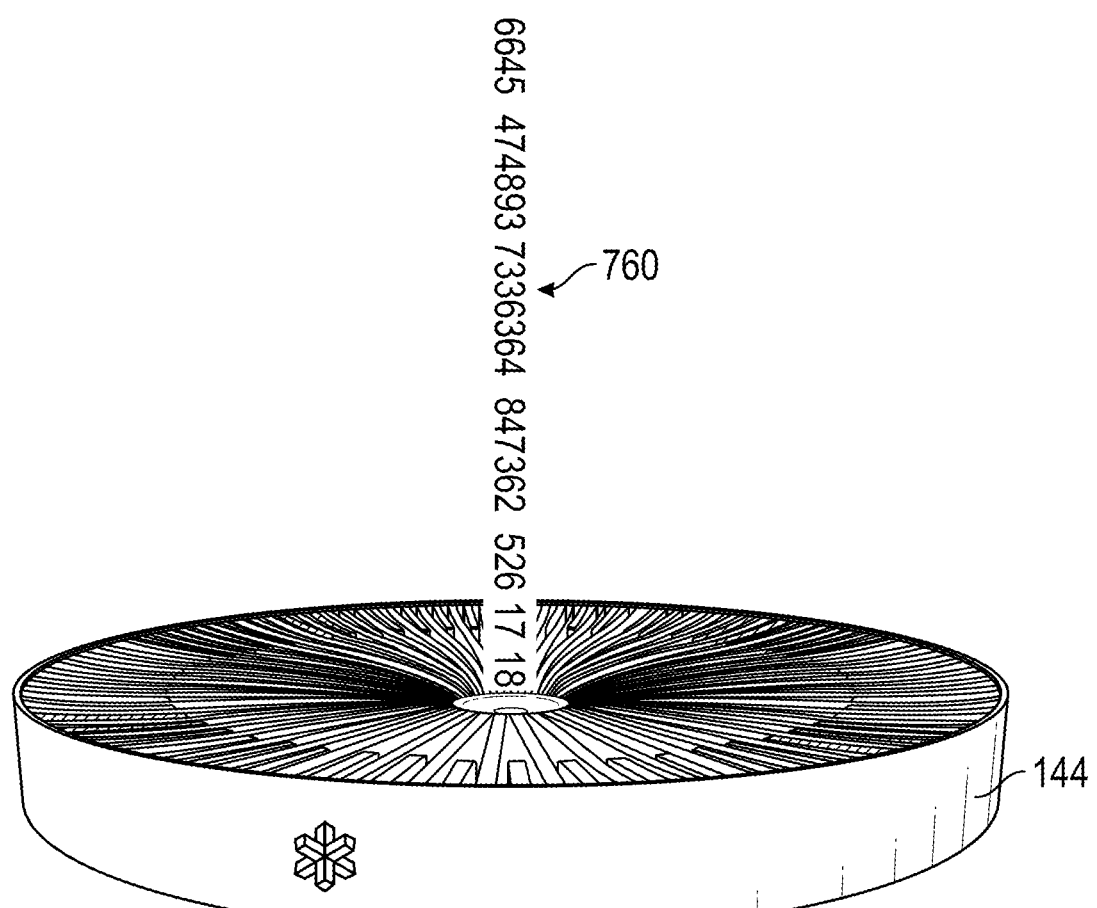
FIG. 7L illustrates a perspective view of an exemplary landing platform, consistent with some embodiments of the present disclosure.

Referring to FIG. 7L, in some embodiments, each landing platform can be identified by a unique infrared flash code. For example, each landing platform can broadcast its unique infrared flash code to enable the approaching UAV to land on the correct landing platform. In some embodiments, landing platform 144 can include one or more infrared light emitting diodes (LEDs) (not shown) for transmitting the infrared flash code. The infrared LEDs can transmit invisible infrared lights. These infrared lights may flash rapidly (e.g., 38,000 times a second). The infrared LEDs can be configured to change the amount of time between each flash, thereby forming a plurality of bits. The plurality of bits can form a code. Each landing platform 144 can be configured to instruct its infrared LEDs to broadcast a unique code (e.g., code 760 as illustrated in FIG. 7L). As a result, landing platform 144 can be identified by an infrared reader or receiver of UAV 130 based on the unique code.

Figure 7M:
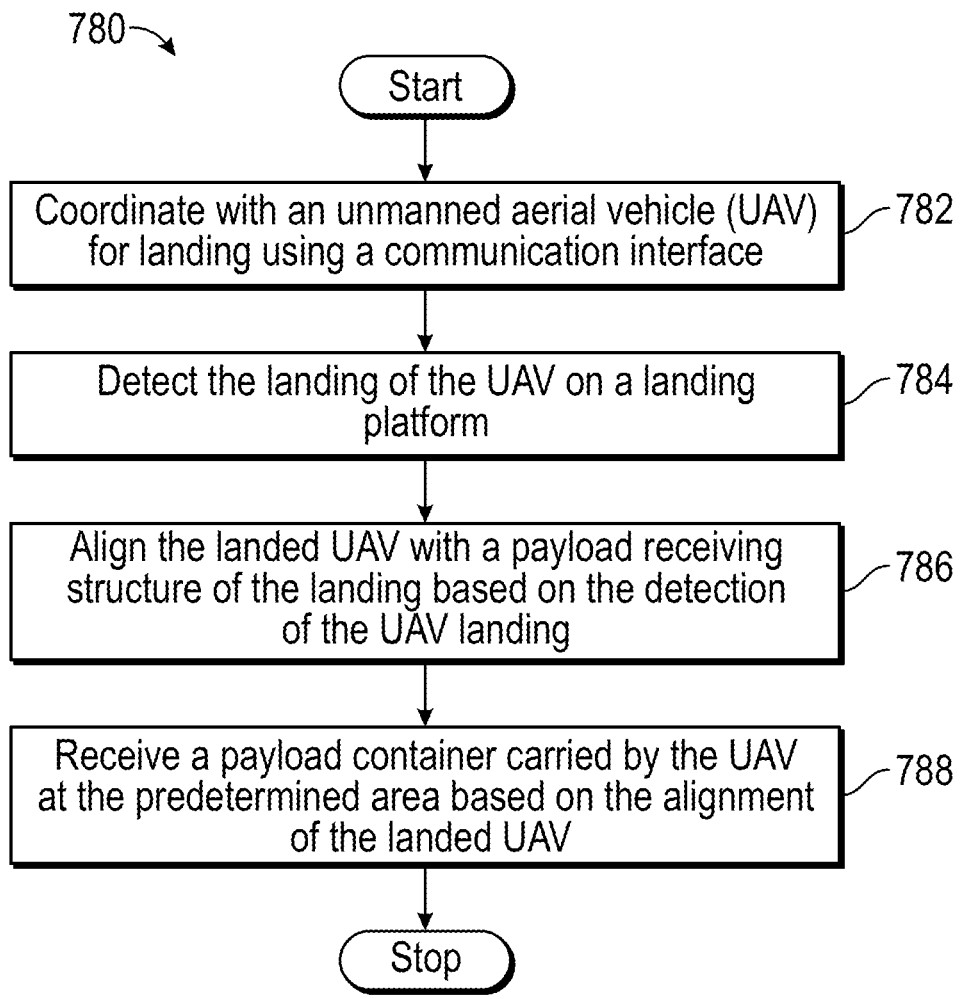
FIG. 7M illustrates a flow chart of an exemplary process for receiving a payload container from a UAV, consistent with some embodiments of the present disclosure.

FIG. 7M illustrates a flow chart of an exemplary process 780 for receiving a payload container from a UAV at a landing platform, consistent with some embodiments of the present disclosure. Some features of the process 780 are illustrated in FIGS. 1, 2A-2C, and 7A-7D and accompanying descriptions. In some embodiments, the process 780 is performed by a landing platform (e.g., landing platform 144 in FIGS. 1, 2A, and 7A-7D).

In the process 780, one or more landing subsystems of a landing platform (e.g., landing platform 144) coordinate (step 782) with the UAV for landing. One or more sensors of the landing platform can detect (step 784) whether the UAV has landed on the landing platform. After the sensors detect that the UAV has landed, they may provide one or more signals to activate or trigger one or more actuators. The actuators can align (step 786) the landed UAV with a payload receiving structure (e.g., a center opening) of the landing platform for receiving a payload container carried by the UAV. Using the payload receiving structure, the landing platform receives (step 788) the payload container carried by the UAV. In some embodiments, the payload receiving structure has dimensions corresponding to the dimensions of the payload container associated with the UAV.

FIG. 7M is merely illustrative of a method for receiving a payload container from a UAV at a landing platform. The illustrative discussions above are not intended to be exhaustive or to limit the invention to the precise form disclosed. Many modifications and variations are possible in view of the above teachings.

Landing platform 144 as described above can provide a standardized platform or improved platform for landing and parking of the UAV and for transporting the payloads. Landing platform 144 can also coordinate with a UAV to provide precision landing of the UAV to enhance the likelihood that the UAV can interact with an exchange station to transport a payload. Landing platform 144 can be conveniently and flexibly disposed with any type of exchange stations, such as a delivery truck/van, a train, a cargo airplane, a carrier UAV, such that payloads can be transported automatically with reduced or eliminated human intervention. Moreover, landing platform 144 enables the UAV to land on any location that can house or accommodate a landing platform, thereby extending the transportation area that UAV can reach.

Precision Landing System

Figure 8A:
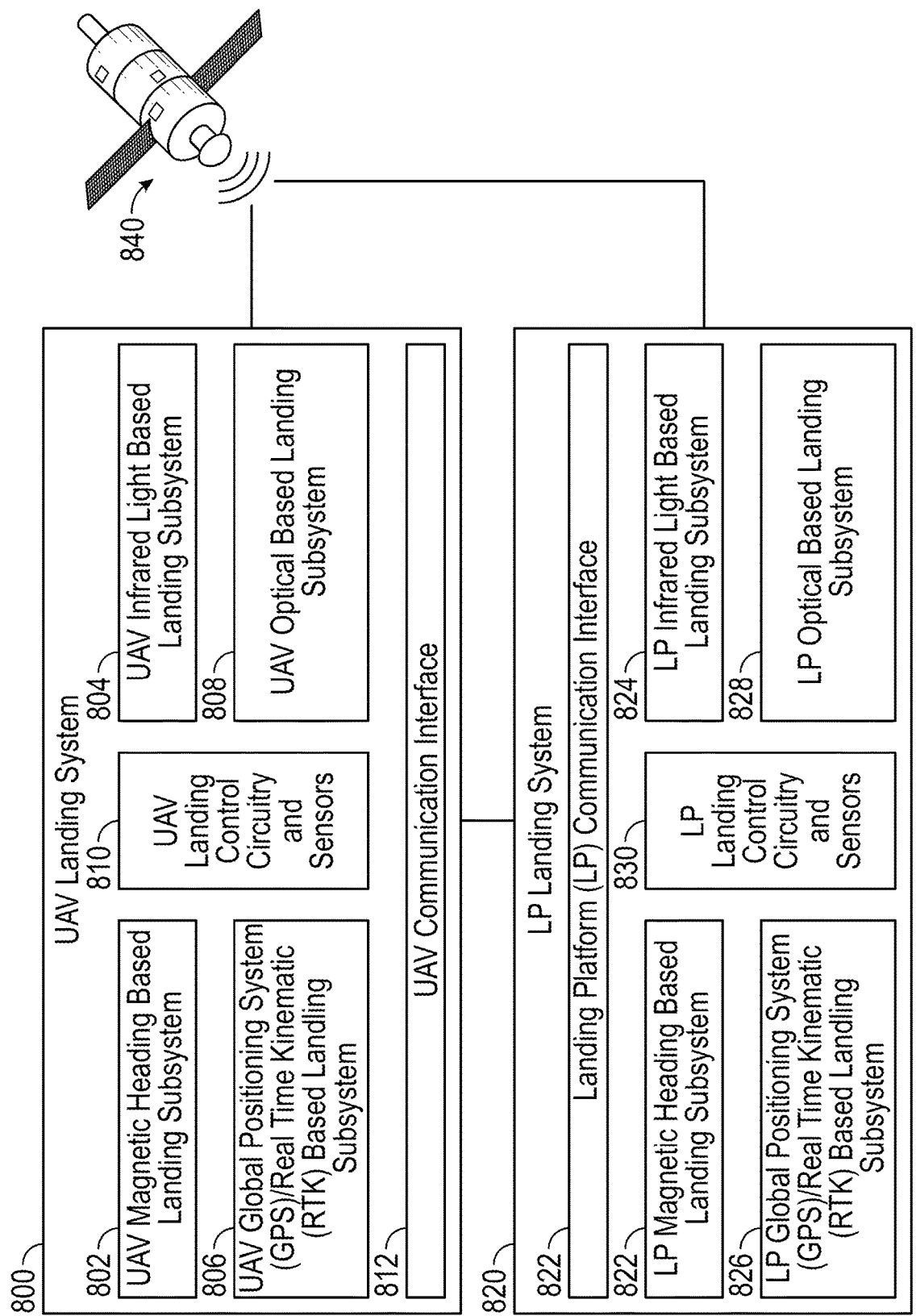
FIG. 8A is a block diagram illustrating an exemplary UAV landing system and an exemplary LP landing system, consistent with some embodiments of the present disclosure.

FIG. 8A is a block diagram illustrating an exemplary UAV landing system 800 and an exemplary landing platform (LP) landing system 820, consistent with some embodiments of the present disclosure. As discussed above, for transporting a payload to an exchange station, a UAV may need to land on a landing platform. A landing platform may have a limited dimension (e.g., 1.2 meter) and therefore landing the UAV on a landing platform may require precision landing within a few centimeters. In some embodiments, the UAV (e.g., UAV 130) can navigate using a regular GPS system. A regular GPS system, however, may have an accuracy of about 1.5 meters (5 feet). As a result, the regular GPS system may not be sufficient for precision landing within a few meters or a meter.

Referring to FIG. 8A, to enable precision landing, UAV landing system 800 can include a UAV communication interface 812 and one or more UAV landing subsystems such as a UAV magnetic heading based landing subsystem 802, a UAV infrared light based landing subsystem 804, a UAV global positioning system (GPS)/Real Time Kinematic (RTK) based landing subsystem 806, a UAV optical based landing subsystem 808, and UAV landing control circuitry and sensors 810. Correspondingly, LP (landing platform) landing system 820 can include a LP communication interface 822 and one or more LP landing subsystems such as a LP magnetic heading based landing subsystem 822, an LP infrared light based landing subsystem 824, an LP global positioning system (GPS)/Real Time Kinematic (RTK) based landing subsystem 826, an LP optical based landing subsystem 828, and LP landing control circuitry and sensors 830. The term GPS may refer to the American NAVSTAR system, the Russian GLONASS system, the European Union Galileo system, the Japanese Quasi-Zenith satellite system, and/or the China's BeiDou navigation satellite system.

In some embodiments, UAV landing control circuitry and sensors 810 can determine that the UAV is approaching a landing platform and/or is in a landing phase. For example, UAV landing control circuitry and sensors 810 can determine that the UAV is approaching a landing platform based on the GPS coordinates of the UAV's current location and the landing location (e.g., within 20 meters). Based on the determination, UAV landing control circuitry and sensors 810 can provide one or more signals to activate one or more of UAV magnetic heading based landing subsystems 802, UAV infrared light based landing subsystem 804, UAV GPS/RTK based landing subsystem 806, and UAV optical based landing subsystem 808 for precision landing.

In some embodiments, when the UAV is approaching the landing platform (e.g., within 20 meters), UAV landing control circuitry and sensors 810 can also provide one or more signals to LP landing system 820 for activating or triggering one or more of LP magnetic heading based landing subsystems 822, LP infrared light based landing subsystem 824, LP GPS/RTK based landing subsystem 826, and LP optical based landing subsystem 828 for precision landing for precision landing. For example, UAV landing control circuitry and sensors 810 can determine that the UAV is approaching based on the GPS coordinates of the current location and the destination location. Based on the determination, UAV landing control circuitry and sensors 810 can provide one or more signals to UAV communication interface 812. UAV communication interface 812 can transmit the signals to LP communication interface 822 for activating or triggering one or more of LP magnetic heading based landing subsystems 822, LP infrared light based landing subsystem 824, LP GPS/RTK based landing subsystem 826, and LP optical based landing subsystem 828. As an example, based on the received signals, LP communication interface 822 can communicate directly with LP magnetic heading based landing subsystem 822. LP communication interface 822 can also communicate with LP control circuitry and sensors 830, which then activates or triggers LP magnetic heading based landing subsystem 822.

In some embodiments, LP control circuitry and sensors 830 activates or triggers one or more of LP magnetic heading based landing subsystems 822, LP infrared light based landing subsystem 824, LP GPS/RTK based landing subsystem 826, and LP optical based landing subsystem 828 without receiving signals from the approaching UAV. For example, LP control circuitry and sensors 830 can detect the approaching UAV using optical sensors (e.g., a camera), radio communications, and/or infrared sensors. Based on such detection, LP landing control circuitry and sensors 830 communicates with one or more LP landing subsystems 822, 824, 826, and 828 to active or trigger them. LP landing control circuitry and sensors 830 communicates can also communicate with the LP communication interface 822 to initiate handshake and following communications with UAV communication interface 812 for precision landing.

In some embodiments, one or more of LP magnetic heading based landing subsystems 822, LP infrared light based landing subsystem 824, LP GPS/RTK based landing subsystem 826, and LP optical based landing subsystem 828 can broadcast signals without detecting an approaching UAV. For example, they can continuously or periodically transmit signals without knowing that a UAV is approaching.

UAV communication interface 812 can communicate directly or indirectly with LP communication interface 822. For example, UAV communication interface 812 can communicate with LP communication interface 822 using a Wi-Fi network, a near-filed communication network, Zigbee, Xbee, 802.15.4 radios, XRF, Xtend, Bluetooth, WPAN, line of sight, satellite relay, or any other wireless network, or a combination thereof. In some embodiments, direct communication between UAV communication interface 812 and LP communication interface 822 may be desired because such direct communication reduces the delay or latency to allow faster landing corrections or adjustments. In some embodiments, if delay or latency is within an acceptable range, indirect communication between UAV communication interface 812 of the UAV and LP communication interface 822 may also be used. For example, the two communications interfaces 802 and 822 can communicate through a UAV service based on cellular communication.

In some embodiments, UAV landing system 800 can align the UAV with the landing platform using magnetic heading information. Referring to FIG. 8A, UAV magnetic heading based landing subsystem 802 can include a magnetic heading sensor (e.g., an electric compass) that provides magnetic heading information. The magnetic heading sensor can sense the heading of UAV. The heading of the UAV is the angle between the course of the UAV or the direction in which the UAV is pointing and a reference direction (e.g., the Earth's magnetic field's north direction). UAV magnetic heading based landing subsystem 802 can obtain the heading information of the UAV. Similarly, LP magnetic heading based landing subsystem 822 can include a magnetic heading sensor for sensing the heading of a landing platform. LP magnetic heading based landing subsystem 822 can obtain landing alignment information (e.g., a desired heading or a target heading) based on the magnetic heading of the landing platform.

In some embodiments, LP magnetic heading based landing subsystem 822 can provide landing alignment information of the landing platform to UAV landing system 800, e.g., through LP communication interface 822 and UAV communication interface 812. Based on the landing alignment information, UAV magnetic heading based landing subsystem 802 can enable the adjusting of the UAV's landing path (e.g., heading, flight course, and/or landing trajectory) such that the UAV's heading substantially matches with the heading of the landing platform. For example, based on the difference between the heading of the UAV and the heading of the LP, UAV magnetic heading based landing subsystem 802 can determine the amount of correction required and instruct UAV landing control circuitry and sensors 810 and/or a flight control system (e.g., flight control system 620 shown in FIGS. 6A-6B) to make corresponding corrections. The magnetic heading based precision landing method can be simple, reliable, and energy efficient for landing a UAV on a landing platform.

In some embodiments, UAV landing system 800 can align the UAV with the landing platform based on infrared beacon communications. Referring to FIG. 8A, LP infrared light based landing subsystem 824 can include one or more infrared beacons (IR beacons). An IR beacon can transmit landing alignment information, such as a modulated light beam in the infrared spectrum. An IR beacon can transmit the modulated light beam repeatedly, periodically, or continuously. In some embodiments, one or more IR beacons can be disposed or integrated with LP infrared light based landing subsystem 824 to mark the location of the landing platform.

Correspondingly, UAV infrared light based landing subsystem 804 can include a receiver to identify and trace the landing alignment information (e.g., the modulated infrared light transmitted by IR beacons). The modulated infrared light may be transmitted by line of sight. As an example, the receiver of UAV infrared light based landing subsystem 804 can include one or more infrared light sensors to locate and trace the infrared light transmitted by the IR beacons. Based on the received infrared light, UAV infrared light based landing subsystem 804 can enable the adjusting of the UAV's landing path (e.g., heading, flight course, and/or landing trajectory) such that the UAV approaches the IR beacons of the landing platform.

As an example, a UAV can navigate to a waypoint using a regular GPS system and then initiate or activate UAV infrared light based landing subsystem 804. A waypoint can be a predetermined position with a set of coordinates that identify a physical location along the flight route of the UAV. After the UAV infrared light based landing subsystem 804 is activated, the receiver of UAV infrared light based landing subsystem 804 can detect the infrared light transmitted by the IR beacons of the landing platform; and determine the coordinates of the UAV relative to the IR beacons (e.g., X-Y coordinates). In some embodiments, the receiver of the UAV infrared light based landing subsystem 804 can detect IR beacons at about 30-60 feet. Based on the determined coordinates, UAV infrared light based landing subsystem 804 can determine the amount of correction required and instruct UAV landing control circuitry and sensors 810 and/or a flight control system (e.g., flight control system 620 shown in FIGS. 6A-6B) to make corresponding corrections of the flight path. Infrared light based landing can enable precise, accurate, and reliable landing of the UAV.

In some embodiments, UAV landing system 800 can align the UAV with the landing platform using differential GPS/RTK. Referring to FIG. 8A, LP landing system 820 can include LP GPS/RTK based landing subsystem 826, which has one or more GPS/RTK receivers. The GPS/RTK receiver receives signals from one or more satellites 840. Based on the satellite signals, LP GPS/RTK based landing subsystem 826 can determine its current location, which is also the location of the landing platform. In some embodiments, LP GPS/RTK based landing subsystem 826 communicates its current location to UAV landing system 800, e.g., through LP communication interface 822 and UAV communication interface 812.

Referring to FIG. 8A, UAV landing system 800 can include a UAV GPS/RTK based landing subsystem 806. The location of the landing platform can be provided to UAV GPS/RTK based landing subsystem 806 for determining the distance between the UAV and the landing platform. For example, UAV GPS/RTK based landing subsystem 806 obtains the current location of the UAV from a UAV GPS receiver and compares it to the GPS location of the landing platform. Based on the comparison, UAV GPS/RTK based landing subsystem 806 can calculate the distance between the current location of the UAV and the location of the landing platform. Based on the distance, UAV GPS/RTK based landing subsystem 806 can determine the amount of correction required and instruct UAV landing control circuitry and sensors 810 and/or a flight control system (e.g., flight control system 620 shown in FIGS. 6A-6B) to make corresponding corrections of the flight path. Differential GPS/RTK can also enable precise and accurate landing of the UAV. To enable differential GPS/RTK, the landing platform may include a GPS receiver.

In some embodiments, UAV landing system 800 can align the UAV with the landing platform optical instruments. For example, UAV landing system 800 can include UAV optical based landing subsystem 808, which has one or more cameras. Correspondingly, LP landing system 820 can include LP optical based landing subsystem 828, which has certain optical markers or images. UAV optical based landing subsystem 808 can acquire the optical markers or images of the landing platform. Based on the acquired optical markers or images, UAV optical based landing subsystem 808 can calculate the location of the landing platform and/or the distance between the current location of the UAV and the location of the landing platform. Based on the distance, UAV optical based landing subsystem 808 can determine the amount of correction required and instruct UAV landing control circuitry and sensors 810 and/or a flight control system (e.g., flight control system 620 shown in FIGS. 6A-6B) to make corresponding corrections of the flight path. Optical based landing is described in more detail in co-pending U.S. patent application Ser. No. 14/631,520 filed on Feb. 25, 2015, entitled "Optically Assisted Landing of Autonomous Unmanned Aircraft". This application is herein incorporated by reference in its entirety for all purposes.

Figure 8B:
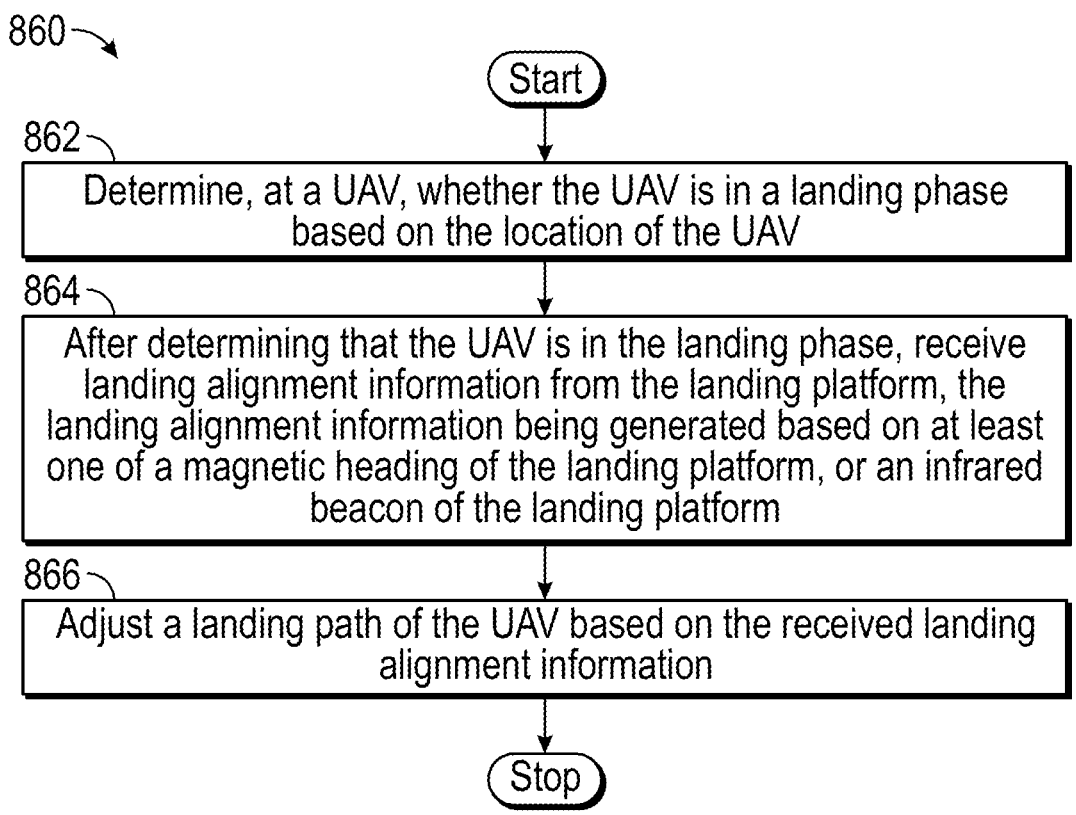
FIG. 8B illustrates a flow chart of an exemplary process for landing a UAV on a landing platform, consistent with some embodiments of the present disclosure.

FIG. 8B illustrates a flow chart of an exemplary process 860 for landing a UAV on a landing platform, consistent with some embodiments of the present disclosure. Some features of the process 860 are illustrated in FIGS. 1, 2A-2C, and 8A and accompanying descriptions. In some embodiments, the process 860 is performed by a UAV (e.g., UAV 130 in FIGS. 1 and 2A). In the process 860, a UAV (e.g., UAV 130) determines (step 862) whether it is in a landing phase or is approaching a landing platform based on the location of the UAV. After determining that the UAV is in the landing phase, the UAV receives (step 864) landing alignment information from the landing platform. The landing alignment information can be generated based on at least one of a magnetic heading of the landing platform, a GPS position of the landing platform, or an infrared beacon of the landing platform. Based on the received landing alignment information, the UAV can adjust (step 866) its landing path.

FIG. 8B is merely illustrative of a method for precision landing of a UAV on a landing platform. The illustrative discussions above are not intended to be exhaustive or to limit the invention to the precise form disclosed. Many modifications and variations are possible in view of the above teachings.

Figure 8C:
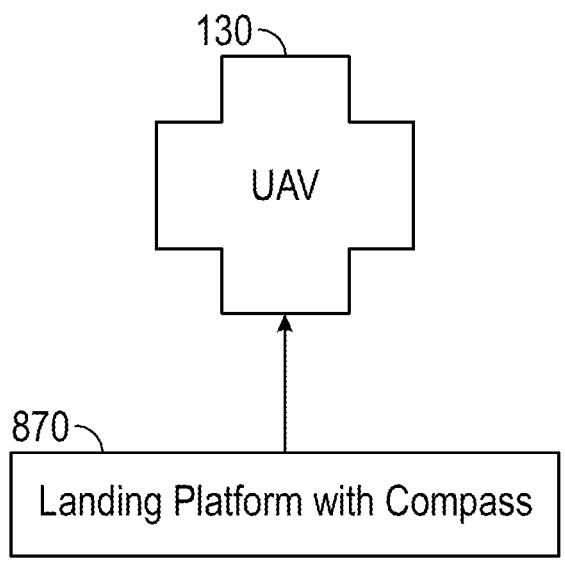
FIG. 8C illustrates a flow chart of an exemplary process for landing a UAV on a landing platform based on magnetic heading, consistent with some embodiments of the present disclosure.

FIG. 8C is a block diagram illustrating an exemplary process for landing a UAV on a landing platform based on magnetic heading, consistent with some embodiments of the present disclosure. As discussed above, a UAV 130 can align with a landing platform 870 (e.g., landing platform 144 having a compass) using magnetic heading information. Referring to FIG. 8C, in some embodiments, the landing platform 870 includes a magnetic heading sensor (e.g., a compass) for sensing the heading of a landing platform. The landing platform 870 can obtain landing alignment information (e.g., a desired heading) based on the magnetic heading of the landing platform 870.

Similar to those discussed above, the landing platform 870 can detect that the UAV 130 is approaching or landing based on direct or indirect communications with the UAV 130, and/or based on signals provided by one or more sensors such as an optical sensor. In some embodiments, after the landing platform 870 detects that UAV 130 is approaching, it can provide landing alignment information (e.g., a desired or target heading) of the landing platform 870 to the UAV 130 for landing. Based on the landing alignment information, the UAV 130 can adjust the UAV's landing path (e.g., heading, flight course, and/or landing trajectory) such that the UAV's heading substantially matches with the target heading provided by the landing platform. For example, based on the difference between the heading of the UAV 130 and the target heading, the UAV 130 can determine the amount of correction required and make corresponding corrections. The magnetic heading based precision landing method can be simple, reliable, and energy efficient for landing a UAV on a landing platform.

Figure 8D:
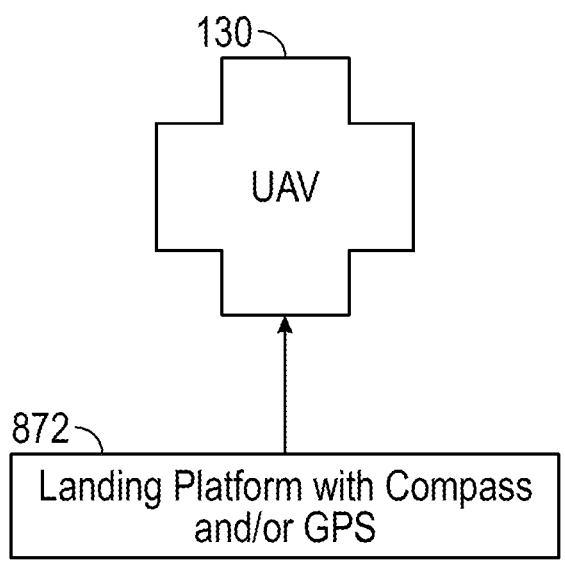
FIG. 8D illustrates a flow chart of an exemplary process for landing a UAV on a landing platform based on differential GPS, consistent with some embodiments of the present disclosure.

FIG. 8D is a block diagram illustrating an exemplary process for landing a UAV 130 on a landing platform 872 based on differential GPS, consistent with some embodiments of the present disclosure. As discussed above, the UAV 130 can align with the landing platform 872 (e.g., a landing platform 144 having a compass and/or a GPS) using differential GPS/RTK. Referring to FIG. 8D, in some embodiments, the landing platform 872 can include one or more GPS receivers and/or compasses. The GPS receiver can receives signals from one or more satellites. Based on the satellite signals, the GPS of the landing platform can determine its current location, which is also the location of the landing platform. In some embodiments, the landing platform 872 communicates its current location to the UAV 130 using, for example, broadcasting based on direct radio communication.

Referring to FIG. 8D, the UAV 130 can also include a GPS receiver, which can determine the location of the UAV 130. Based on the GPS location of the UAV 130 and the broadcast GPS location of the landing platform, the UAV 130 can determine the distance between the UAV 130 and the landing platform. For example, the UAV 130 can obtain the current location of the UAV 130 from its GPS receiver and compares it to the GPS location of the landing platform 872. Based on the comparison, the UAV 130 can calculate the difference between the current location of the UAV 130 and the location of the landing platform 872. Based on the difference, the UAV 130 can determine the amount of correction required and make corresponding corrections of the flight path. The above described process for determining the difference can be repeatedly, periodically, or continuously performed by the UAV 130 such that the difference between the UAV 130 and the landing platform 872 is reduced or minimized. Differential GPS can also enable precise and accurate landing of the UAV 130.

Precision landing on landing platform can enhance the likelihood that a UAV can interact with an exchange station to transport a payload. Therefore, precision landing allows faster and more efficient transportation of payloads. Moreover, precision landing also enables the UAV to transport payloads to a wide variety of exchange stations such as a transportation truck. Without precision landing, landing on a transportation truck, whether stationary or moving, can be challenging.

UAV Flight Termination System

Figure 9A:
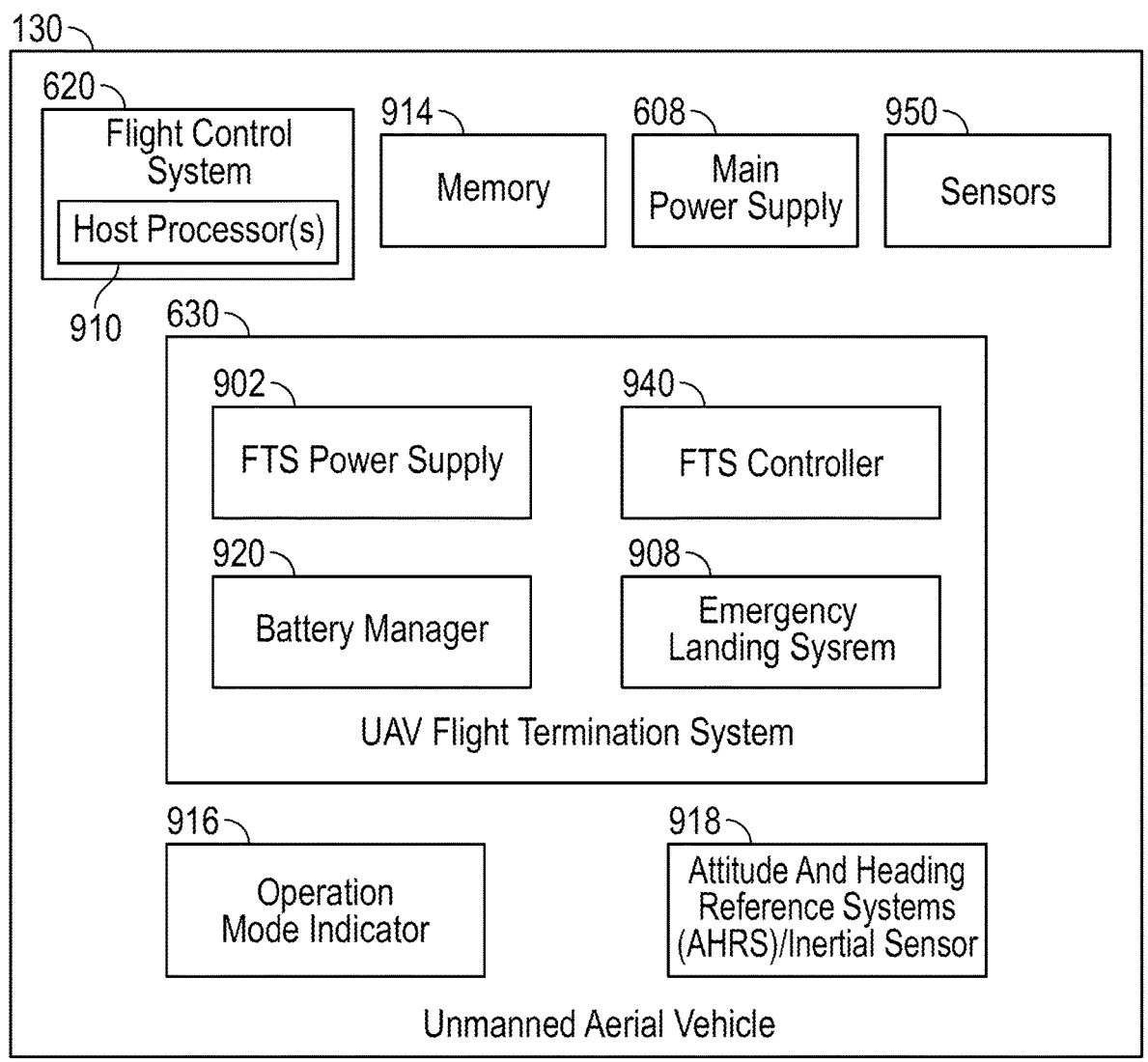
FIG. 9A illustrates a block diagram of an exemplary UAV flight termination system (FTS) of a UAV, consistent with some embodiments of the present disclosure.

FIG. 9A illustrates a block diagram of an exemplary UAV flight termination system (FTS) 630 of a UAV 130 and portions of UAV 130, consistent with some embodiments of the present disclosure. As discussed above, UAV FTS 630 can determine or obtain a determination whether one or more conditions for triggering termination of a flight are satisfied. For example, the one or more conditions may include a mid-air collision, a sudden change of weather conditions that may prevent the UAV from completing the current flight, a mechanical/electrical failure of the UAV, whether the battery fails, whether the remaining battery power is insufficient for supporting the remaining flight, etc.

These conditions can be detected by one or more sensors 950 of UAV 130. After determining or obtaining the determination that one or more of these conditions are satisfied, UAV FTS 630 can invoke emergency landing system 908 to search for and/or land UAV 130 in a nearby UAV station or location. For example, UAV FTS 630 may deploy a parachute for immediate landing of UAV 130 at its current location.

Referring to FIG. 9A, UAV FTS 630 can include a FTS power supply 902, a battery manager 920, a FTS controller 940, and an emergency landing system 908. FTS power supply 902 can supply electrical power to UAV FTS 900. FTS power supply 902 can be, for example, a battery, a fuel cell, and/or a solar panel. In some embodiments, FTS power supply 902 can be a separate power supply from main power supply 608 of the UAV. As a result, a power supply failure (e.g., a depleted battery) of main power supply 608 may not affect the operation of UAV FTS 630, which is powered by FTS power supply 902. Separating FTS power supply 902 from main power supply 608 reserves FTS power supply 902 as the emergency power supply for operating UAV FTS 630, which can be a mission-critical system.

UAV FTS 630 can also include a battery manager 920. In some embodiments, battery manager 920 can monitor the status of FTS power supply 902 (e.g., the state of charge of a FTS battery). Based on the monitoring, battery manager 920 can determine whether FTS power supply 902 requires recharge, refuel, or replacement. For example, if battery manager 920 detects that FTS power supply 902 (e.g., a battery) is depleted, it can determine that the FTS battery needs to be recharged or replaced. Battery manager 920 can also enable the charging of FTS power supply 902 using internal or external power supplies. For example, battery manager 920 can electrically couple main power supply 608 to FTS power supply 902 to charge FTS power supply 902. Main power supply 608 can be a power supply for operation of UAV 130. For example, main power supply 608 enables the regular operation (e.g., transporting payloads) of UAV 130. In some embodiments, main power supply 608 may have a larger capacity than that of FTS power supply 902.

In some embodiments, battery manager 920 can also monitor hazardous conditions or abnormal conditions of FTS power supply 902. For example, battery manager 920 can detect whether FTS power supply 902 is overheated, on fire, short circuited, or leaking at an abnormal rate. After determining that FTS power supply 902 has one or more hazardous conditions or abnormal conditions, battery manager 920 can send an alert signal to one or more host processors 910 to indicate such conditions. Host processors 910 can be, for example, a portion of flight control system 620. Based on the alert signal, host processors 910 can determine one or more proper actions. For example, host processors 910 can determine that an alert message needs to be provided to an operator or administrator's portable electronic device. Host processors 910 can also determine that the FTS power supply 902 needs to be replaced or that the UAV needs to perform an emergency landing.

In some embodiments, battery manager 920 can detect whether FTS power supply 902 is being electrically coupled or exposed to excessively low or high voltages or currents. For example, FTS power supply 902 can be a battery that is charged within a range of DC voltages. However, if FTS power supply 902 is exposed or coupled to a DC or AC voltages outside of the acceptable range, it can be reparably or irreparably damaged. To prevent such damage, battery manager 920 can include under-voltage/current or over-voltage/current protection circuits (e.g., electrical overstress (EOS) or electrostatic discharge (ESD) protection circuits) to protect FTS power supply 902.

In some embodiments, battery manager 920 can record information associated with operation of FTS power supply 902. For example, battery manager 920 can record a plurality of battery parameters (e.g., battery discharge rate, temperature, capacity, etc.), battery statuses and conditions, alert signals, and/or messages. Battery manager 920 can record the information associated with FTS power supply 902 using, for example, memory 914 of the UAV or internal memory of UAV FTS 630 (not shown). Memory 914 and/or internal memory of UAV FTS 630 can include a drum, magnetic disc drive, magneto-optical drive, optical drive, redundant array of independent discs (RAID), solid-state memory devices, flash devices, solid-state drives, etc. Battery manager 920 can further provide the recorded information for diagnosis, forensics, failure analysis, and/or any other purposes.

In some embodiments, battery manager 920 can provide power to UAV FTS 630 from at least one of FTS power supply 902 and main power supply 608. For example, battery manager 920 can detect that FTS power supply 902 is depleted or insufficient for operation of UAV flight termination system. Battery manager 920 can thus determine FTS power supply 902 needs a recharge or replacement. In some embodiments, before FTS power supply 902 is recharged or replaced, battery manager 920 can electrically couple main power supply 608 to UAV FTS 630 such that components of UAV FTS 630 (e.g., FTS controller 940, emergency landing system 908) can continue to operate.

In some embodiments, battery manager 920 can also detect that main power supply 608 is insufficient or is temporarily unavailable. As a result, battery manager 920 can electrically couple FTS power supply 902 to UAV 130 such as components of UAV 130 (e.g., flight control system 620, the navigation system) can continue to operate. For example, as illustrated in FIG. 6A, UAV 130 can land on landing platform 144 for exchanging the payload container 610 and main power supply 608 with exchange station 146. After UAV 130 releases main power supply 608 (e.g., a battery) to exchange station 146, it can be powered by FTS power supply 902 so that UAV 130 can continue to operate. In some embodiments, if FTS power supply 902 is used to power UAV 130, UAV 130 can operate in a low power mode (e.g., place certain systems or components in hibernate or sleep mode, while only operating certain necessary systems or components).

Figure 9B:
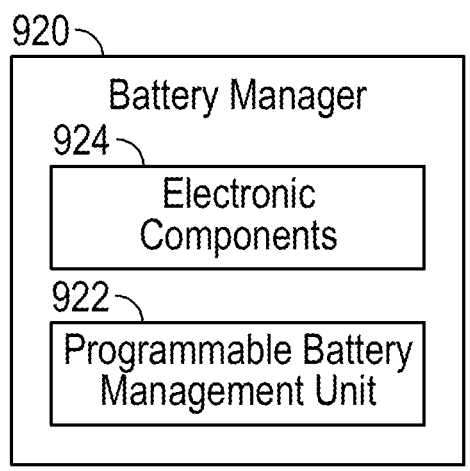
FIG. 9B illustrates a block diagram of an exemplary battery manager of a UAV flight termination system, consistent with some embodiments of the present disclosure.

FIG. 9B illustrates a block diagram of an exemplary battery manager 920 of a UAV flight termination system, consistent with some embodiments of the present disclosure. Referring to FIG. 9B, battery manager 920 can include a programmable battery management unit 922 and one or more electronic components including, for example, one or more resistors, capacitors, inductors, diodes, transistors, and other electrical components. Programmable battery management unit 922 can provide battery control functions, battery charging control outputs, gas gauging, and protection for autonomous operation of battery packs. For example, programmable battery management unit 922 can be a Texas Instruments' BQ40Z60 type integrated circuits. It is appreciated that FIG. 9B merely illustrates one embodiment of the circuit architecture of battery manager 920, and any other circuit architecture may be used to implement battery manager 920.

Referring back to FIG. 9A, UAV FTS 630 can also include FTS controller 940. In some embodiments, FTS controller 940 can communicate with battery manager 920 to control charging of FTS power supply 902 and/or main power supply 608. FTS controller 940 can also communicate with battery manager 920 to receive information (e.g., battery status, parameters, alerts, etc.) associated with FTS power supply 902. FTS controller 940 and battery manager 920 can communicate using, for example, inter-integrated circuit (I²C) or system management bus (SMbus or SMB).

In some embodiments, FTS controller 940 can monitor the status or operation mode of UAV 130. For example, FTS controller 940 can communicate with operation mode indicator 916, which detects and provides the current operation mode of UAV 130. The operation mode may be, for example, a standby mode, a preflight mode, an in-flight mode, a landed mode, a payload exchange mode, etc. Based on the detected operation mode, FTS controller 940 can control the power state of FTS power supply 902 and/or main power supply 608. For example, if FTS controller 940 determines that UAV 130 is in a standby mode, it may communicate with batter manager 920 to turn off or reduce power supply (e.g., reduce current) from main power supply 608 and/or FTS power supply 902. As a result, FTS controller 940 intelligently manages the power supply to reserve power.

In some embodiments, FTS controller 940 can monitor an emergency landing signal. For example, flight control system 620, an autopilot system, and/or the navigation system of UAV 130 can obtain an indication that UAV 130 requires to perform an emergency landing by deploying a parachute. For example, sensors 950 can determine that there is a mid-air collision, a sudden change of weather conditions that may prevent UAV 130 from completing the current flight, a mechanical/electrical failure of UAV 130, a failure of main power supply 608, etc. Based on the determination, sensors 950 can generate an emergency landing signal and provide the signal to flight control system 620 and/or FTS controller 940 for engaging emergency landing system 908.

After receiving the emergency landing signal, FTS controller 940 can determine whether one or more conditions are satisfied for deploying an emergency landing mechanism (e.g., a parachute). As an example, before deploying a parachute, the propellers (e.g., propellers 606) may be required to stop or to slow down. As another example, before deploying a parachute, UAV 130 may be required to search for a suitable place for landing (e.g., a place that has a solid surface and free of obstacles). In some embodiments, if one or more of these conditions are not satisfied, FTS controller 940 may not engage emergency landing system 908 to deploy the emergency landing mechanism. In some embodiments, FTS controller 940 may take one or more corresponding actions or engage other systems/components of UAV 130 to adjust or change the conditions. For example, FTS controller 940 can communicate with main power supply 608 to reduce or eliminate power supply to the propellers (e.g., propellers 606) of UAV 130 to prepare for deploying the parachute. In some embodiments, FTS controller 940 can engage emergency landing system 908 regardless of whether one or more of these conditions are satisfied. For example, FTS controller 940 can deploy a parachute even after determining that a solid surface is not available but a soft surface is available, or that the obstacles would not substantially affect emergency landing.

In some embodiments, if one or more conditions for emergency landing are satisfied, FTS controller 940 can engage the emergency landing system 908 to deploy the emergency landing mechanism (e.g., a parachute).

In some embodiments, FTS controller 940 can also monitor one or more signals provided by main power supply 608.

Based on the monitoring, FTS controller 940 can determine whether to take one or more proper actions, e.g., whether to engage FTS power supply 902 or whether to engage emergency landing system 908. As an example, FTS controller 940 can determine that main power supply 608 is depleted and determine that FTS power supply 902 needs to be engaged. As another example, FTS controller 940 can determine that there is a power failure while UAV 130 is in-flight and therefore engage the emergency landing system 908. As another example, FTS controller 940 can determine that the remaining charge of main power supply 608 is insufficient for the next flight, and therefore prevent UAV 130 from taking off.

In some embodiments, FTS controller 940 can communicate with attitude and heading reference systems (AHRS) and/or inertial sensors 918. AHRS and/or inertial sensors 918 can be independent and/or separate from an autopilot system of UAV 130. AHRS and/or inertial sensors 918 can include sensors on three axes that provide attitude information for UAV 130, including heading, pitch, and yaw. AHRS can be solid-state microelectromechanical systems (MEMS) gyroscopes, accelerometers, and/or magnetometers. In some embodiments, FTS controller 940 communicates with AHRS and/or inertial sensors 918 to receive data for enabling redundancy from the autopilot and/or navigation system of UAV 130. For example, if there is a failure of autopilot and/or navigation system, UAV 130 can continue to fly or land using data received from AHRS and/or inertial sensors 918.

In some embodiments, FTS controller 940 can obtain and communicate status information (e.g., the main power supply status, the FTS power supply status, the emergency landing system status, the flight status of UAV 130, etc.). For example, FTS controller 940 can communicate the status information using visual and/or audio device (e.g., light emitting diodes, buzzers) or using packet communication.

Figure 9C:
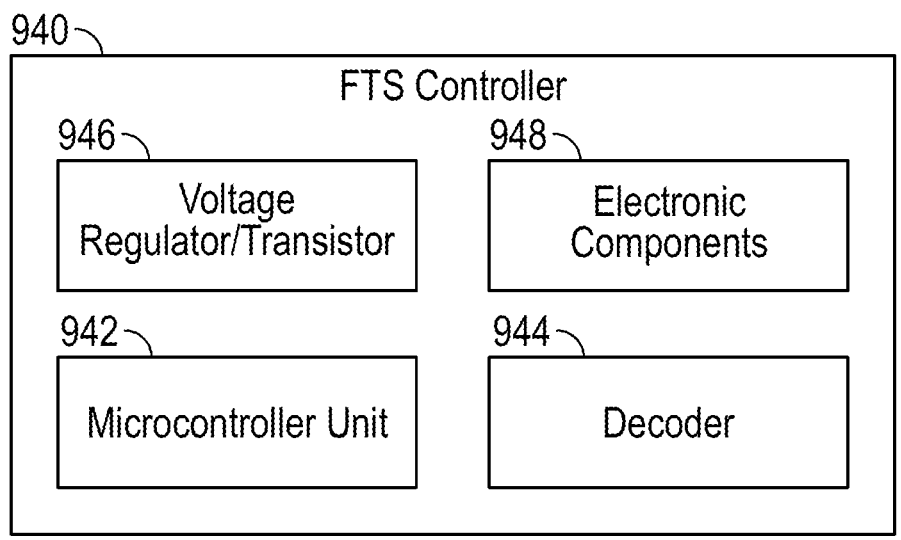
FIG. 9C illustrates a block diagram of an exemplary FTS controller of a UAV flight termination system, consistent with some embodiments of the present disclosure.

FIG. 9C illustrates a block diagram of an exemplary FTS controller 940, consistent with some embodiments of the present disclosure. Referring to FIG. 9C, FTS controller 940 can include a microcontroller unit 942, a decoder 944, a voltage regulator or translator 946, and one or more electronic components 948 including, for example, one or more resistors, capacitors, inductors, diodes, transistors, and other electrical components. Microcontroller unit 942 can provide embedded control of motors and general purpose applications. For example, microcontroller unit 942 can be a Microchip's PIC16F1618 type integrated circuits. Decoder 944 can decode signals (e.g., pulse width modulation (PWM) signals) from the autopilot system of UAV 130 and provide decoded signals to microcontroller unit 942. In some embodiments, decoder 944 can be Pololu 2801 type of circuitry. Voltage regulator or translator 946 can provide voltage conversion and provide a constant voltage level to the components of FTS controller 940. It is appreciated that FIG. 9C merely illustrates one embodiment of the circuit architecture of FTS controller 940, and any other circuit architecture may be used to implement FTS controller 940.

Figure 9D:
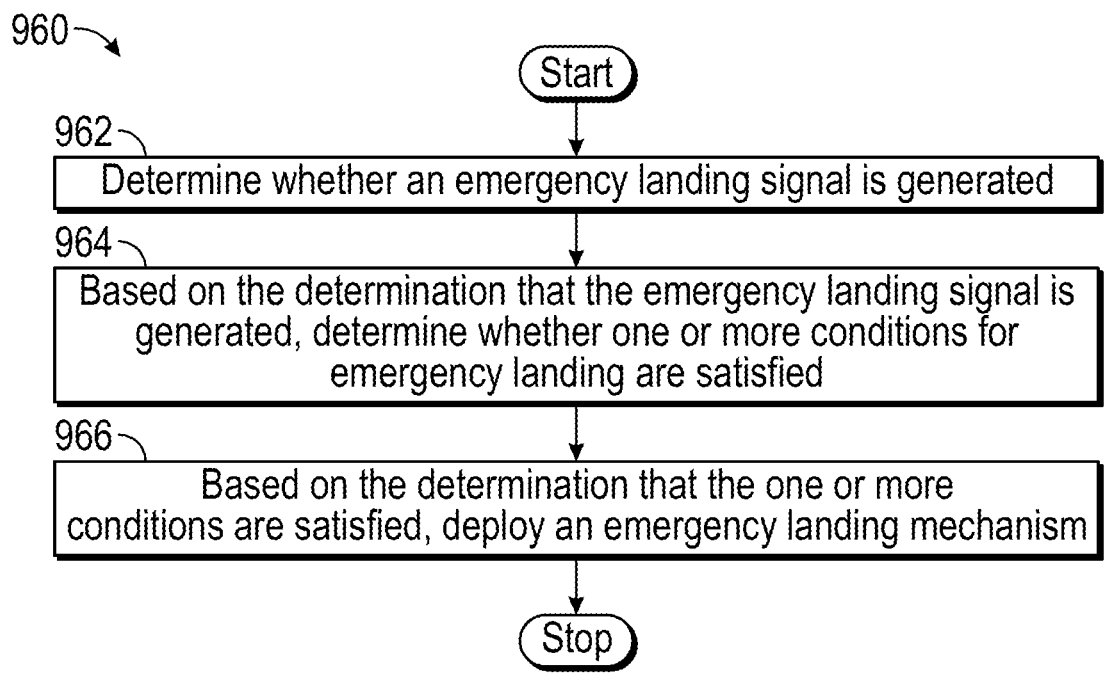
FIG. 9D illustrates a flow chart of an exemplary process for controlling termination of a UAV flight, consistent with some embodiments of the present disclosure.

FIG. 9D illustrates a flow chart of an exemplary process 960 for controlling termination of a UAV flight, consistent with some embodiments of the present disclosure. Some features of the process 960 are illustrated in FIGS. 1, 2A-2C, and 9A-9C and accompanying descriptions. In some embodiments, the process 960 is performed by a flight termination system of a UAV (e.g., UAV FTS 630 in FIG. 9A). In the process 960, a UAV flight termination system (e.g., UAV FTS 630) determines (step 962) whether an emergency landing signal is generated. Based on the determination that the emergency landing signal is generated, the UAV flight termination system determines (step 964) whether one or more conditions for emergency landing are satisfied. Based on the determination that the one or more conditions are satisfied, the UAV flight termination system deploys (step 966) an emergency landing mechanism, such as a parachute.

FIG. 9D is merely illustrative of a method for emergency landing of a UAV. The illustrative discussions above are not intended to be exhaustive or to limit the invention to the precise form disclosed. Many modifications and variations are possible in view of the above teachings.

Exemplary methods, non-transitory computer-readable storage media, systems and electronic devices are set out in the following items:

Mobile App for Operator—Performed by a Mobile Device (FIGS. 1, 2B, and 3A-3Y).

1. A method for facilitating payload transportation using an unmanned aerial vehicle (UAV), comprising:
   at a portable electronic device including one or more processors and memory,
   receiving a first input indicating a takeoff location of the UAV and a second input indicating a landing location of the UAV;
   in response to receiving the first and second, obtaining a determined UAV flight route from the takeoff location to the landing location;
   providing, based on the obtained UAV flight route, flight route information indicating a viable flight route; and
   providing a takeoff command to the UAV according to the viable flight route.

Smart Payload Container (FIGS. 4A-4B)

2. An apparatus for transporting a payload using an unmanned aerial vehicle (UAV), comprising:
   a container having dimensions that correspond to a carrying space of a UAV;
   a first identification accessible on an external surface of the container, the first identification being scannable for identifying the container; and
   a second identification readable by the UAV, the second identification being associated with the first identification for identifying the container.

UAV Cloud Service—Performed by the UAV Service Server (FIGS. 1, 2C, and 4A-4C)

3. A method for facilitating payload transportation using an unmanned aerial vehicle (UAV), comprising:
   at a computer system including one or more processors and memory,
   receiving an identification of a payload to be transported, the identification information of the payload being associated with a destination location of the payload;
   receiving a first identification of a container for housing the payload, the first identification being accessible on an external surface of the container and being scannable;
   receiving a second identification from the UAV, the second identification comprising a near-field identification tag associated with the first identification for identifying the container;
   determining a UAV flight route based on the identification of the payload; and
   providing the UAV flight route to the UAV based on the first and second identifications.

Mobile App for Transporter—Performed by a Mobile Device (FIGS. 1, 2B, and 5A-5W)

4. A method for facilitating a payload transportation using an unmanned aerial vehicle (UAV), comprising:
   at a portable electronic device including one or more processors and memory,
   obtaining an identification of the payload to be transported, the identification of the payload being associated with a destination location of the payload;
   providing the identification of the payload to a UAV service;
   obtaining a first identification of a container for housing the payload, the first identification being accessible on an external surface of the container and being scannable;
   providing the first identification to the UAV service; and
   providing one or more instructions to a selected UAV for transporting the payload based on a UAV flight route, wherein the UAV flight route is generated based on the identification of the payload, and wherein the UAV is selected based on the first identification and a second identification, the second identification corresponds to the first identification for identifying the container.

UAV (FIGS. 6A-6B)

5. An unmanned aerial vehicle (UAV) for transporting a payload, comprising:
   a body having a carrying space that extends to the bottom of the UAV;
   one or more propellers connected with the body;
   a battery mounted to the body, the battery being releasable through the opening of the carrying space at the bottom of the UAV; and
   a payload container mounted to the body, the payload container being releasable through the opening of the carrying space at the bottom of the UAV.

6. The unmanned aerial vehicle of item 5, wherein the opening of the carrying space at the bottom of the UAV has dimensions that correspond to the dimensions of an opening at a landing platform.

Landing Platform (FIGS. 1, 2A, 7A-7E).

7. A landing platform for receiving a payload container from an unmanned aerial vehicle (UAV), comprising:
   one or more landing subsystems configured to coordinate with the UAV for landing;
   one or more sensors for detecting the landing of the UAV on the landing platform;
   one or more actuators configured to align the UAV for receiving the payload container; and
   a payload receiving structure of the landing platform configured to receive the payload container.

8. The landing platform of item 7, wherein the landing subsystems include at least one of a magnetic heading based landing subsystem, an infrared light based landing subsystem, a global positioning system based landing subsystem, and an optical based landing subsystem.

9. The landing platform of item 8, wherein the magnetic heading based landing subsystem includes a magnetic heading sensor for providing heading information of the landing platform to the communication interface; and wherein the communication interface provides the heading information of the landing platform to the UAV.

10. The landing platform of item 8, wherein the infrared light based landing subsystem includes an infrared beacon that transmits a modulated infrared light beam.

11. The landing platform of item 8,
    wherein the global positioning system (GPS) based landing subsystem comprises:
       a GPS signal receiver that receives satellite signals, and
       one or more processors that determine the location of the landing platform based on the received satellite signals; and
    wherein the communication interface provides the determined location of the landing platform to the UAV.

12. The landing platform of item 7, wherein the actuator comprises:
    a sensor that detects a landing of the UAV based on sensing a change of at least one of: a light path, a weight, a center of gravity, a magnetic field, an electrical signal; and
    a motor that activates based on the detected landing of the UAV, the motor being operated by at least one of an electric current, a hydraulic fluid pressure, or a pneumatic pressure.

Precision Landing—Performed by the UAV (FIG. 8A-8B)

13. A method for precision landing of an unmanned aerial vehicle (UAV) on a landing platform, the UAV including one or more processors and a communication interface, the method comprising:
    determining, at the UAV, whether the UAV is in a landing phase based on the location of the UAV;
    after determining that the UAV is in the landing phase, receiving landing alignment information from the landing platform, the landing alignment information being generated based on at least one of a magnetic heading of the landing platform, a GPS position of the landing platform, or an infrared beacon of the landing platform; and
    adjusting a landing path of the UAV based on the received landing alignment information.

UAV Flight Termination System—Performed by the UAV (FIGS. 9A-9C)

14. A system for emergency landing of an unmanned aerial vehicle (UAV), comprising:
    a battery manager configured to provide power to a control circuitry for emergency landing; and
    a controller configured to
       determine whether an emergency landing signal is generated;
       based on the determination that the emergency landing signal is generated, determine whether one or more conditions for emergency landing are satisfied;
       based on the determination that the one or more conditions are satisfied, deploy an emergency landing mechanism.

15. The system of item 14, wherein the emergency landing signal is generated based on at least one of: loss of main power supply of the UAV, a flight control system or an autopilot system being non-responsive, a detection of a violation of flight envelop, a disparity between barometric and GPS-derived altitude above ground level, a decent rate that is greater than a decent-rate threshold, and a pitch or bank angle that is greater than an angle threshold.

16. An unmanned aerial vehicle (UAV) for transporting a payload, comprising:
   a body;
   one or more propellers rotatably connected to the body;
   a battery mounted to the body, the battery being releasable from the bottom of the UAV; and
   a payload container mounted to the body, the payload container being releasable from the bottom of the UAV to a landing platform associated with a UAV station.

17. The UAV of item 16, wherein the battery is mounted above the payload container to facilitate releasing of the payload container followed by releasing of the battery.

18. The UAV of item 16, wherein the battery is mounted on the side of the payload container.

19. The UAV of item 16, wherein the battery and the payload container is releasable together as one unit.

20. An unmanned aerial vehicle (UAV) for transporting a payload, comprising:
   a body;
   one or more propellers rotatably connected to the body;
   a releasable battery mounted to the body; and
   a payload container mounted to the body, the payload container being releasable from the bottom of the UAV to a landing platform associated with a UAV station.

It should be noted that, despite references to particular computing paradigms and software tools herein, the computer program instructions with which embodiments of the present subject matter may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, references to particular algorithms herein are merely by way of examples. Suitable alternatives or those later developed known to those of skill in the art may be employed without departing from the scope of the subject matter in the present disclosure.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. An unmanned aerial vehicle (UAV) station, comprising:
   a landing platform;
   a payload receiving structure configured to receive payloads from and attach payloads to a UAV positioned on the landing platform;
   a plurality of optical sensors configured to monitor and scan airspace proximate the landing platform for obstacles; and
   a communication interface configured to issue instructions authorizing takeoff and landing operations of the UAV based on sensor readings generated by the plurality of optical sensors, wherein in response to one or more of the plurality of optical sensors detecting an obstacle proximate the landing platform, the communication interface is operable to issue instructions to prevent takeoff of the UAV and disable propellers of the UAV.

2. The UAV station as recited in claim 1, further comprising a cover for protecting a landing surface of the landing platform, the cover being configured to open to accommodate landing of the UAV.

3. The UAV station as recited in claim 1, wherein the ground station further comprises a centering mechanism configured to position the UAV in a central region of the landing platform such that the UAV is positioned above the payload receiving structure.

4. The UAV station as recited in claim 1, wherein the payload receiving structure comprises a central opening in the landing platform and the payload receiving structure is configured to attach a payload to the UAV through the central opening in the landing platform.

5. The UAV station as recited in claim 4, wherein the payload receiving structure is further configured to receive a battery from and attach a battery to the UAV through the central opening.

6. The UAV station as recited in claim 1, wherein the instructions authorizing takeoff and landing are delivered to the UAV by a UAV service separate and distinct from the UAV station.

7. The UAV station as recited in claim 1, wherein the communication interface is co-located with the UAV station.

8. The UAV station as recited in claim 1, wherein in response to one or more of the plurality of optical sensors detecting an obstacle proximate the landing platform, the communication interface is operable to issue instructions to prevent landing of the UAV.

* * * * *